US006223293B1

(12) United States Patent
Foster et al.

(10) Patent No.: US 6,223,293 B1
(45) Date of Patent: *Apr. 24, 2001

(54) SUSPEND/RESUME CAPABILITY FOR A PROTECTED MODE MICROPROCESSOR

(75) Inventors: Mark J. Foster, Lincoln Township, Berrien County; Saifuddin T. Fakhruddin, St. Joseph; James L. Walker, Benton Harbor; Matthew B. Mendelow; Jiming Sun, both of St. Joseph; Rodman S. Brahman, St. Joseph Township, Berrien County; Michael P. Krau, Hagar Township, Berrien County; Brian D. Willoughby, Lincoln Township, Berrien County; Michael D. Maddix, Lincoln Township, Berrien County; Steven L. Belt, Stevensville; Scott A. Hovey, St. Joseph; Mark A. Ruthenbeck, Lincoln Township, Berrien County, all of MI (US)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/389,779

(22) Filed: Feb. 16, 1995

Related U.S. Application Data

(63) Continuation of application No. 07/752,342, filed on Aug. 30, 1991, now abandoned, which is a continuation-in-part of application No. 07/705,039, filed on May 17, 1991, now abandoned.

(51) Int. Cl.$^7$ ........................................................ G06F 1/26
(52) U.S. Cl. .......................... 713/300; 713/323; 713/322; 710/15; 710/18
(58) Field of Search .................... 395/700, 650; 717/1, 2, 3, 4; 713/1, 100, 200, 300–340; 709/670, 108; 710/15–19

(56) References Cited

U.S. PATENT DOCUMENTS 4,294,496   10/1981   Murez .
4,317,180   2/1982    Lies .

(List continued on next page.)

FOREIGN PATENT DOCUMENTS 53-22345   3/1978   (JP) .

OTHER PUBLICATIONS

Microsoft, MS–DOS, User's Guide, 1986, Title Pages and p. 245.
IBM System/360 Principles of Operation, Eighth Edition (Sep. 1968) Title Pages and pp. 68–83.
Clements, Alan; "Microprocessor Systems Design", 1987, Title pages and pp. 117, 246, 247, 353, 354, PWS–Kent Publishing Company, Boston.
Toshiba T1600 "User's Manual" 2d ed.; Title page, pp. 2–1 to 2–3, and pp. 2–8 to 2–11; 1987.

Primary Examiner—Kakali Chaki
(74) Attorney, Agent, or Firm—Katten Muchin Zavis

(57) ABSTRACT

A laptop computer system includes a protected mode microprocessor capable of operating in restricted and unrestricted modes, and an arrangement which in response to a predetermined condition saves information from the processor and then forcibly switches the processor to its unrestricted mode of operation. When running a multi-tasking operating system where an application program is being executed in a restricted mode, a suspend/resume operation can be carried out in which the system is substantially powered down and then powered back up, and will resume the interrupted application with the restricted mode back in effect. Further, setup changes such as adjustment of the processor speed can be made without exiting the application program running in the restricted mode.

18 Claims, 171 Drawing Sheets

U.S. PATENT DOCUMENTS

| | | |
|---|---|---|
| 4,381,552 | 4/1983 | Nocilini et al. . |
| 4,458,307 | 7/1984 | McAnlis et al. . |
| 4,461,003 | 7/1984 | Tamaki . |
| 4,506,323 | 3/1985 | Pusic et al. . |
| 4,523,295 | 6/1985 | Zato . |
| 4,564,751 | 1/1986 | Alley et al. . |
| 4,626,986 | 12/1986 | Mori . |
| 4,646,307 | 2/1987 | Nishimura . |
| 4,658,352 | 4/1987 | Nagasawa . |
| 4,674,089 | 6/1987 | Poret et al. . |
| 4,689,761 | 8/1987 | Yurchenco . |
| 4,694,393 | 9/1987 | Hirano et al. . |
| 4,698,748 | 10/1987 | Juzswik et al. . |
| 4,734,851 | 3/1988 | Director . |
| 4,757,505 | 7/1988 | Marrington et al. . |
| 4,763,333 | 8/1988 | Byrd . |
| 4,782,468 | 11/1988 | Jones et al. . |
| 4,823,292 | 4/1989 | Hillion . |
| 4,839,837 | 6/1989 | Chang . |
| 4,868,832 | 9/1989 | Marrington et al. . |
| 4,870,570 | 9/1989 | Satoh et al. . |
| 4,907,150 * | 3/1990 | Arroyo et al. . |
| 4,933,785 * | 6/1990 | Morehouse et al. . |
| 4,945,335 | 7/1990 | Kimura et al. . |
| 4,980,836 * | 12/1990 | Carter et al. . |
| 4,991,129 | 2/1991 | Swartz . |
| 5,014,193 | 5/1991 | Garner et al. . |
| 5,021,983 | 6/1991 | Nguyen et al. . |
| 5,027,273 | 6/1991 | Letwin . |
| 5,027,294 | 6/1991 | Fakruddin et al. . |
| 5,068,652 | 11/1991 | Kobayashi . |
| 5,077,551 | 12/1991 | Saitou . |
| 5,083,266 | 1/1992 | Watanabe . |
| 5,086,387 | 2/1992 | Arroyo et al. . |
| 5,129,091 | 7/1992 | Yorimoto et al. . |
| 5,136,694 | 8/1992 | Belt et al. . |
| 5,142,684 | 8/1992 | Perry et al. . |
| 5,155,840 | 10/1992 | Niijima . |
| 5,163,153 | 11/1992 | Cole et al. . |
| 5,167,024 * | 11/1992 | Smith et al. . |
| 5,175,845 | 12/1992 | Little . |
| 5,175,853 * | 12/1992 | Kardach et al. . |
| 5,182,810 | 1/1993 | Bartling et al. . |
| 5,189,647 | 2/1993 | Suzuki et al. . |
| 5,214,762 * | 5/1993 | Bush et al. . |
| 5,218,704 | 6/1993 | Watts, Jr. et al. . |
| 5,230,074 | 7/1993 | Canova, Jr. et al. . |
| 5,237,692 | 8/1993 | Raasch et al. . |
| 5,241,680 | 8/1993 | Cole et al. . |
| 5,254,888 | 10/1993 | Lee et al. . |

* cited by examiner

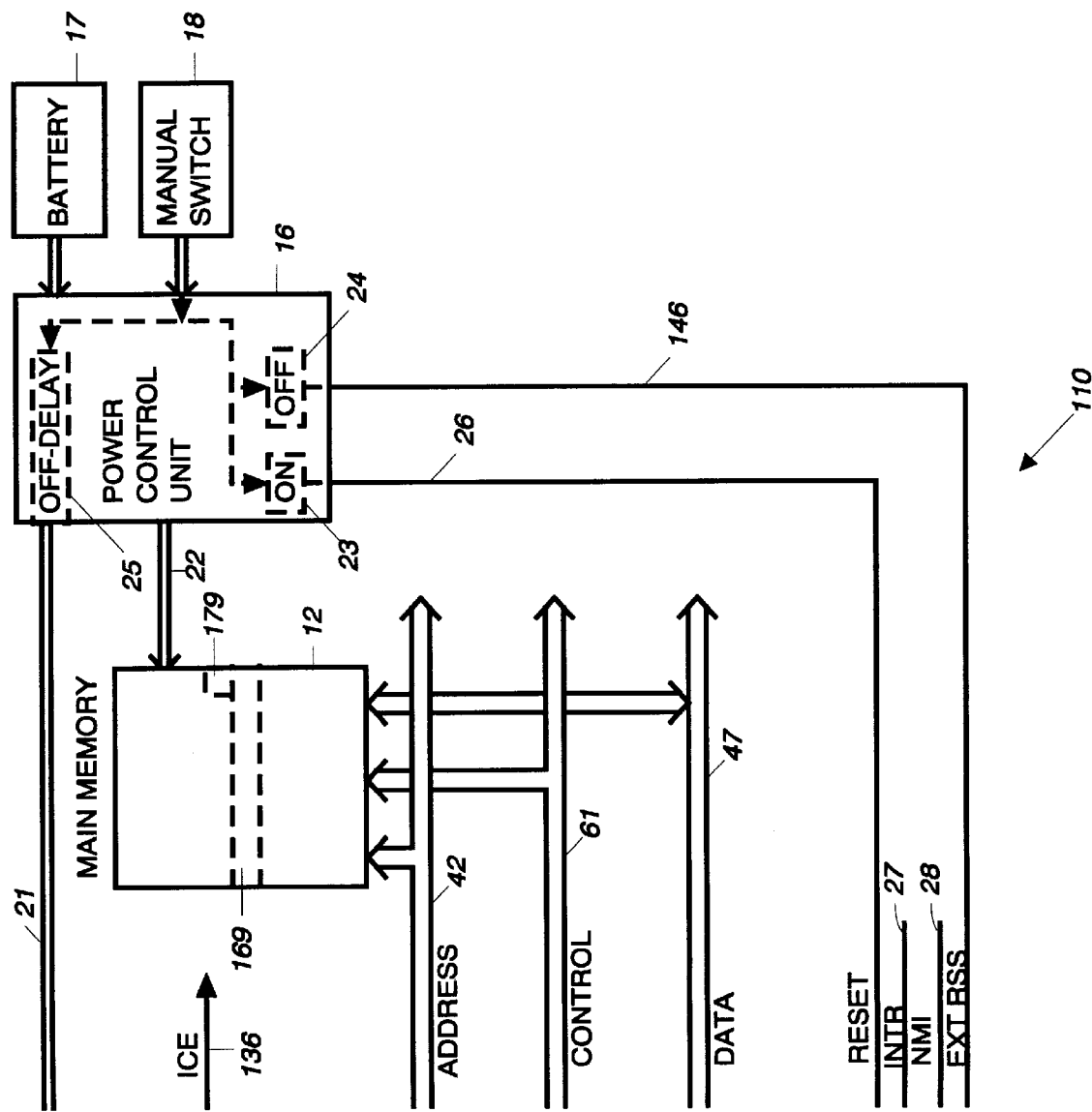

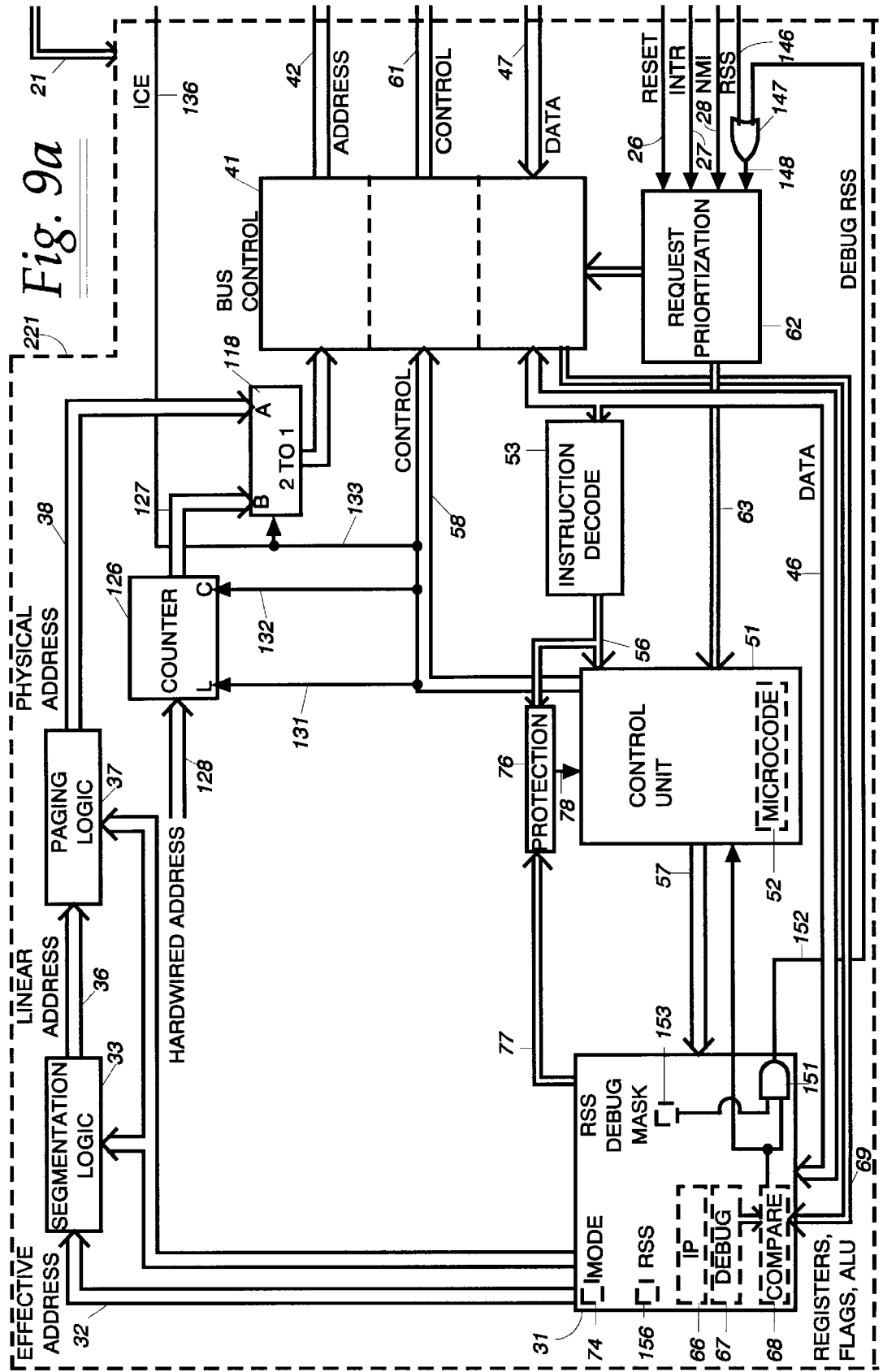

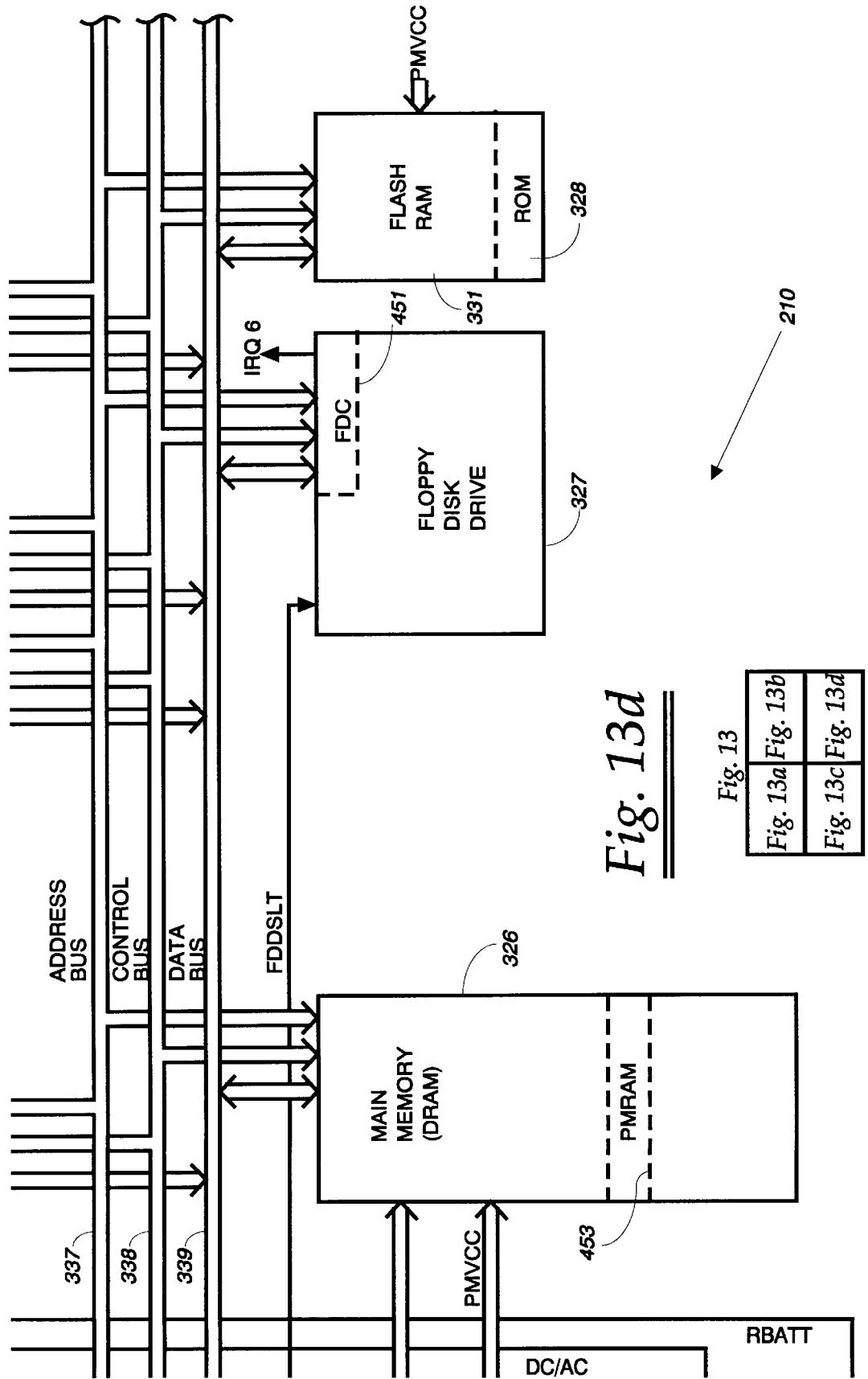

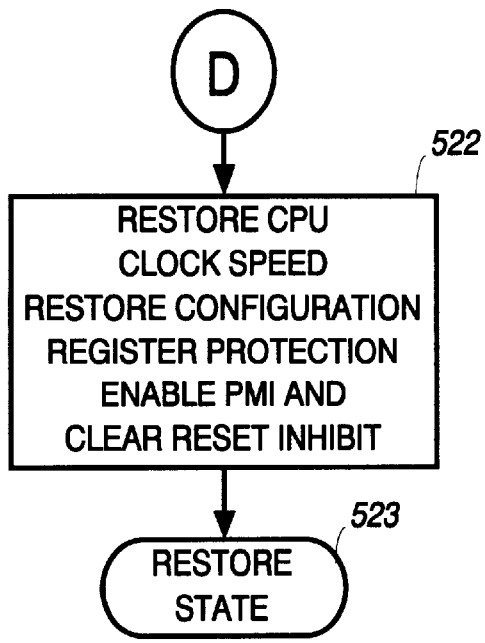
*Fig. 16c*
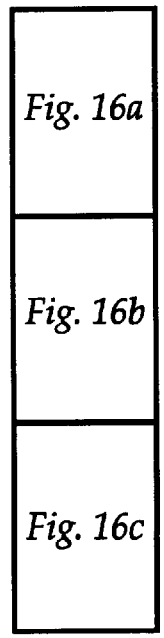

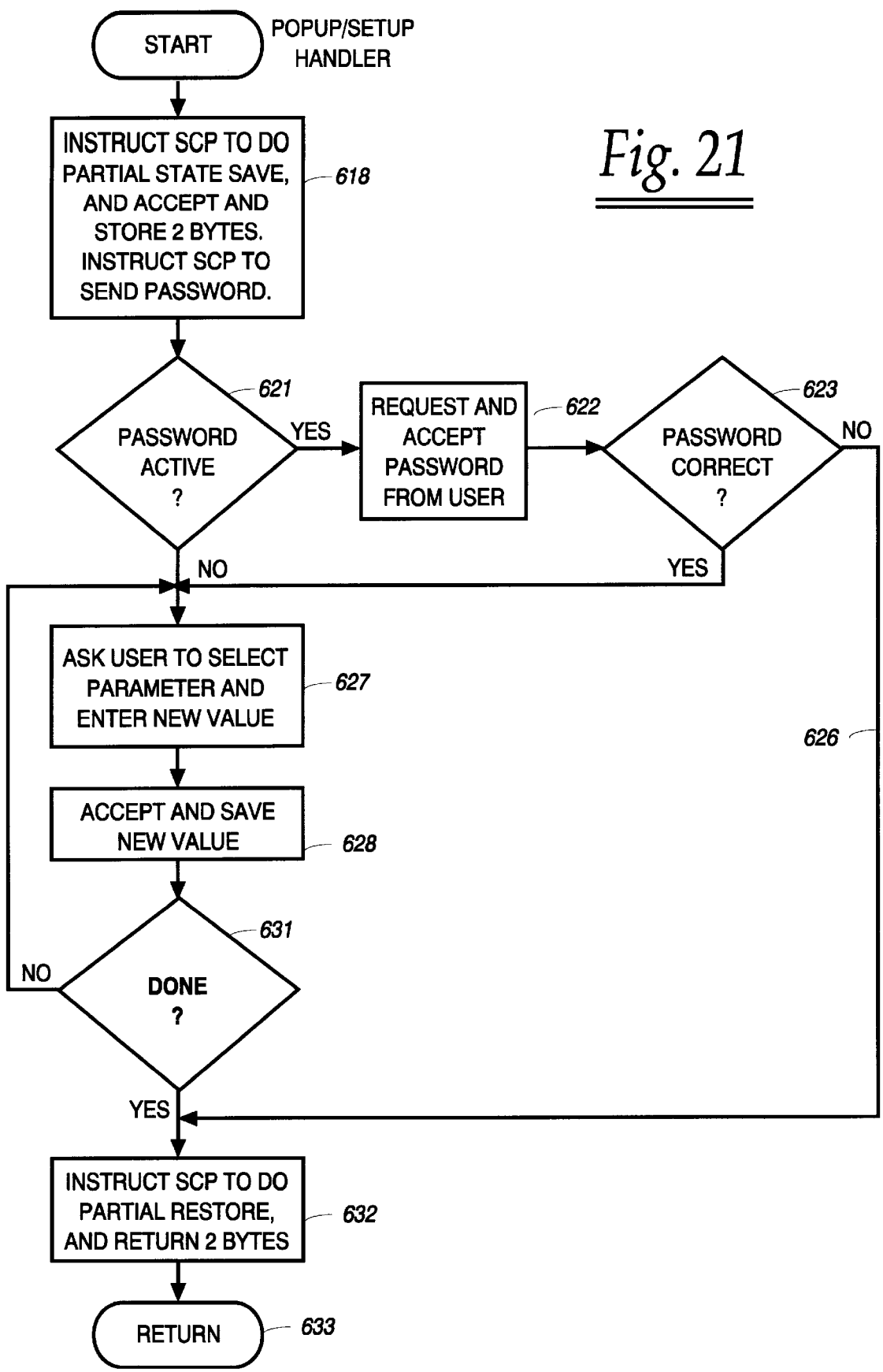

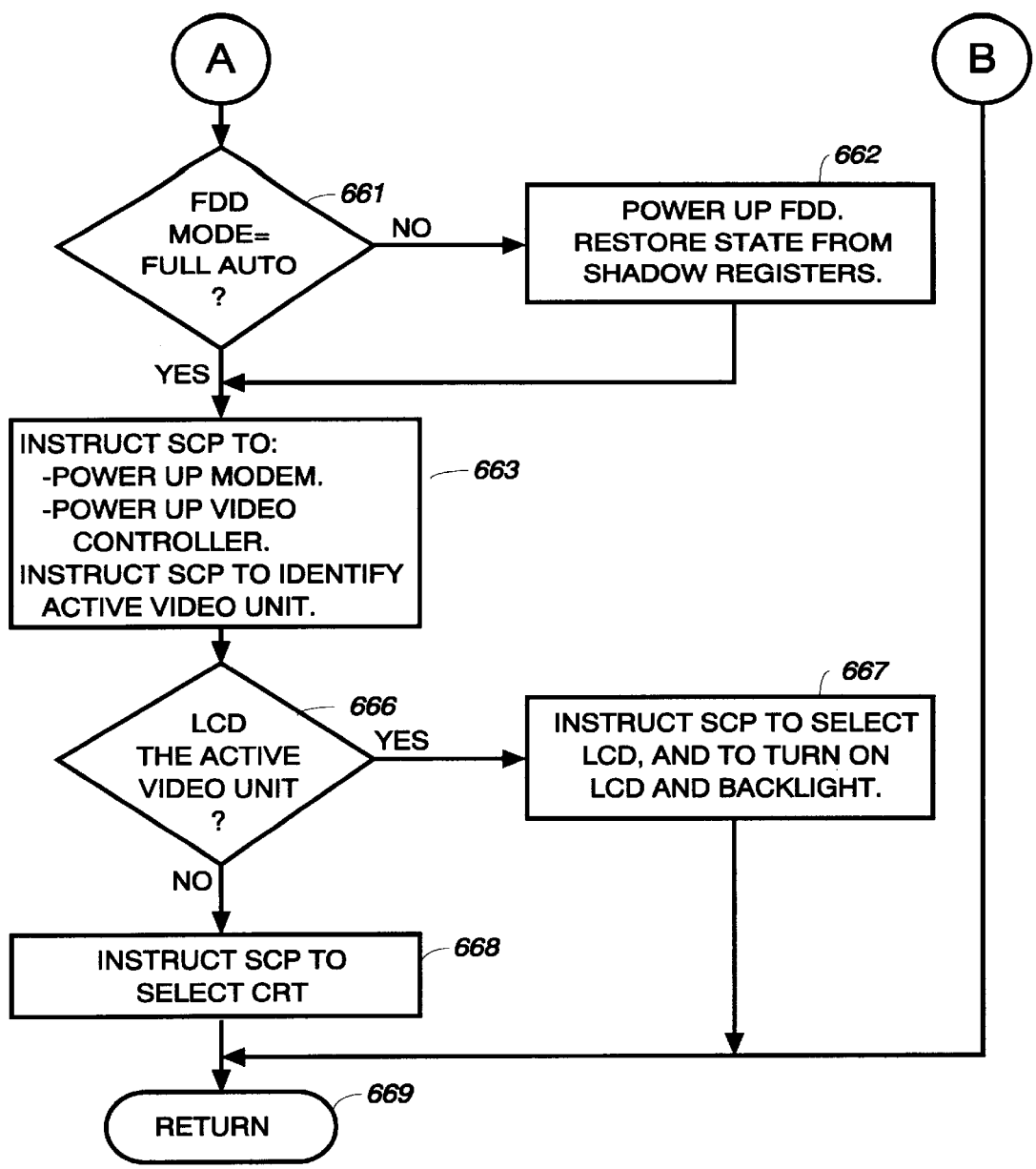
*Fig. 23b*

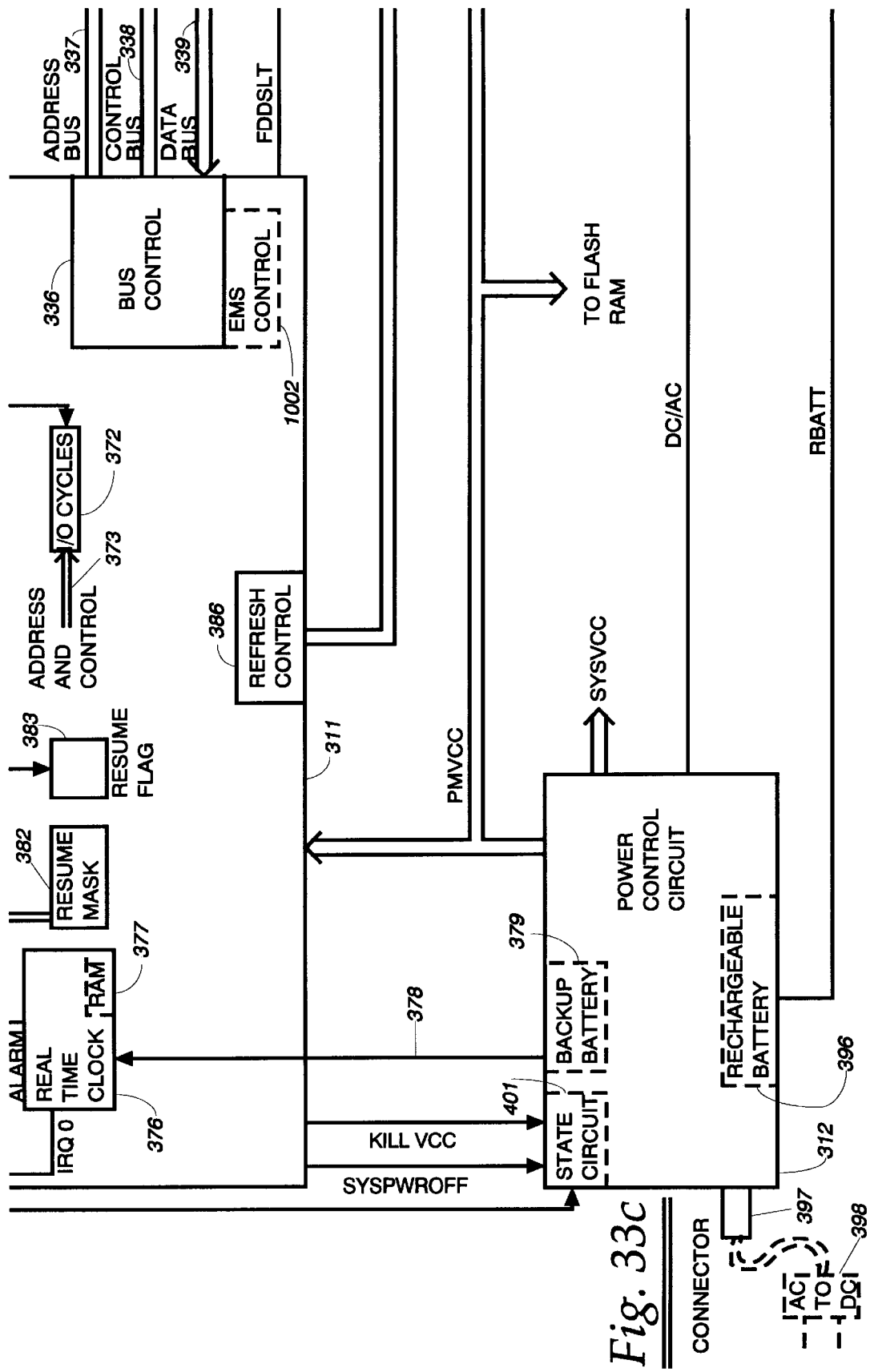

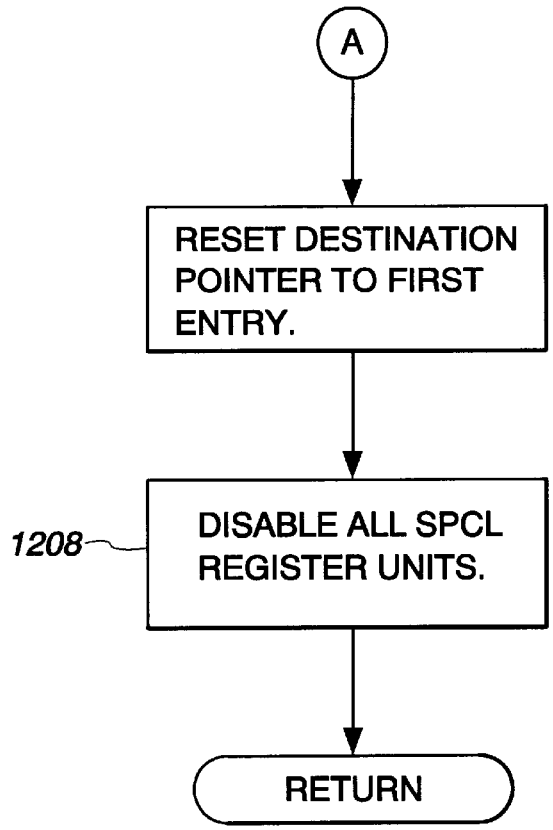
*Fig. 40b*
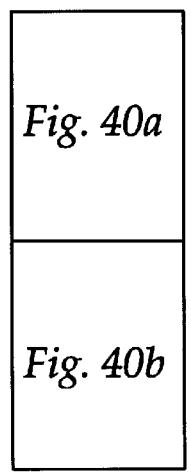

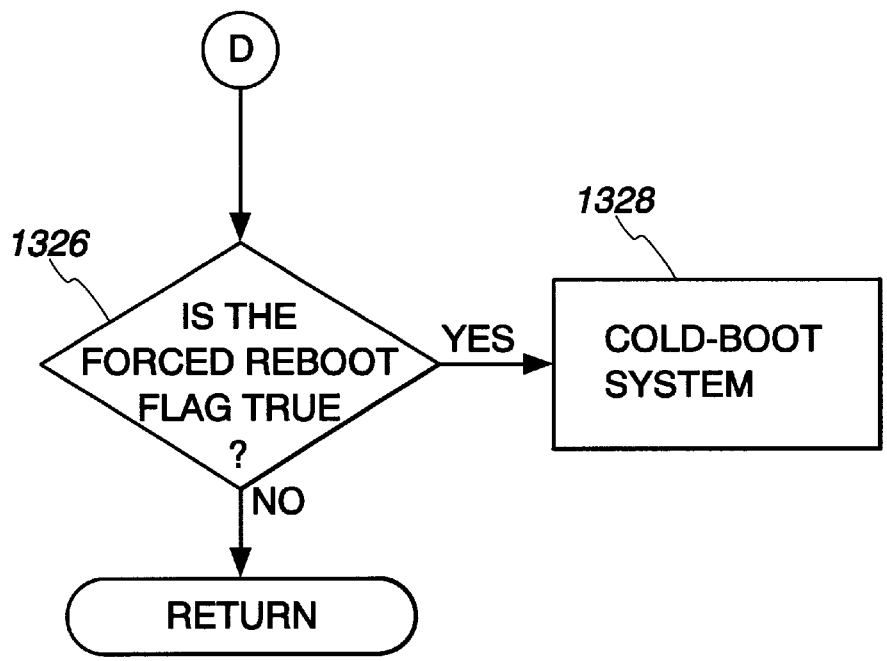
*Fig. 47c*
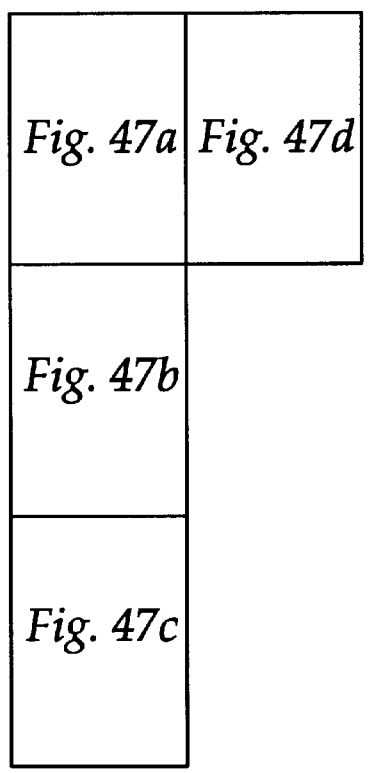

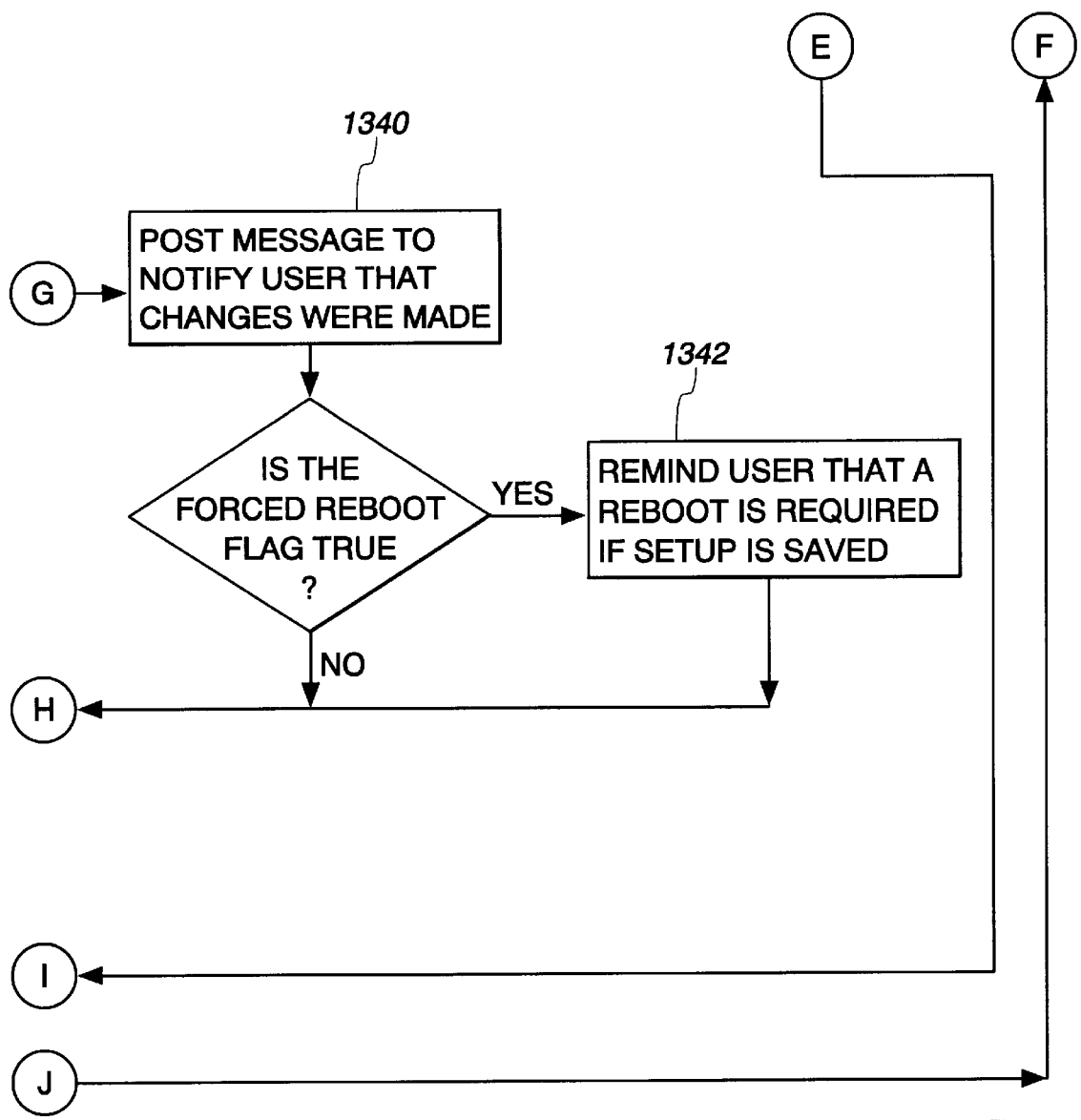
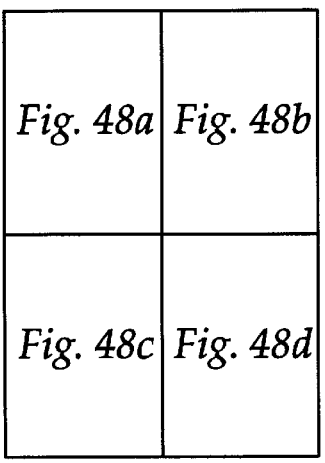
*Fig. 48d*

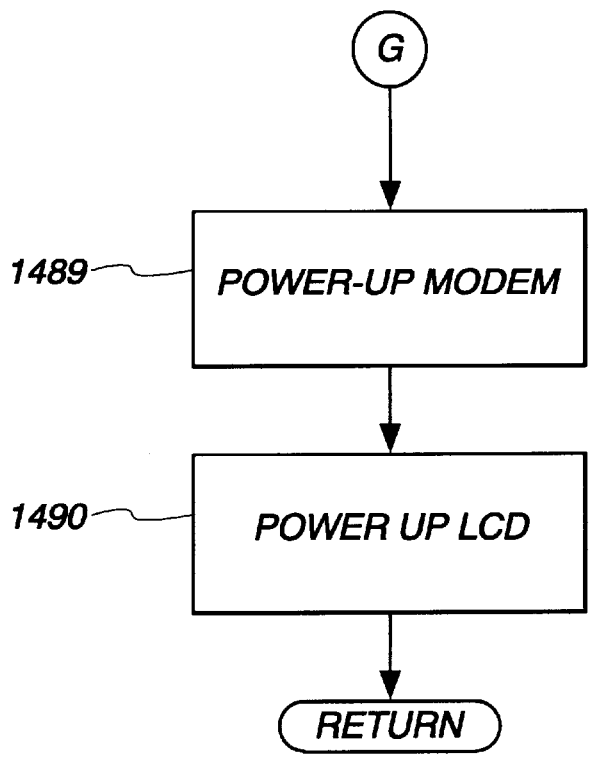
*Fig. 52e*
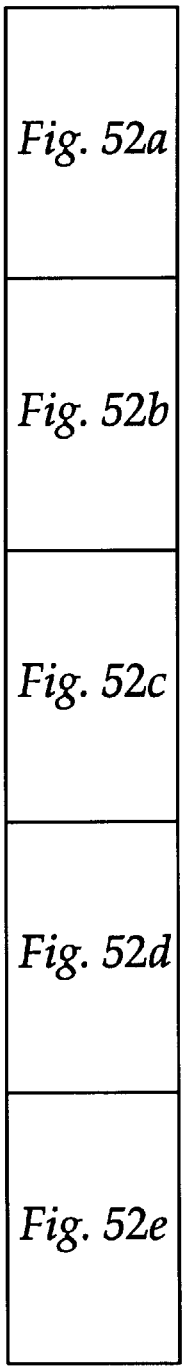

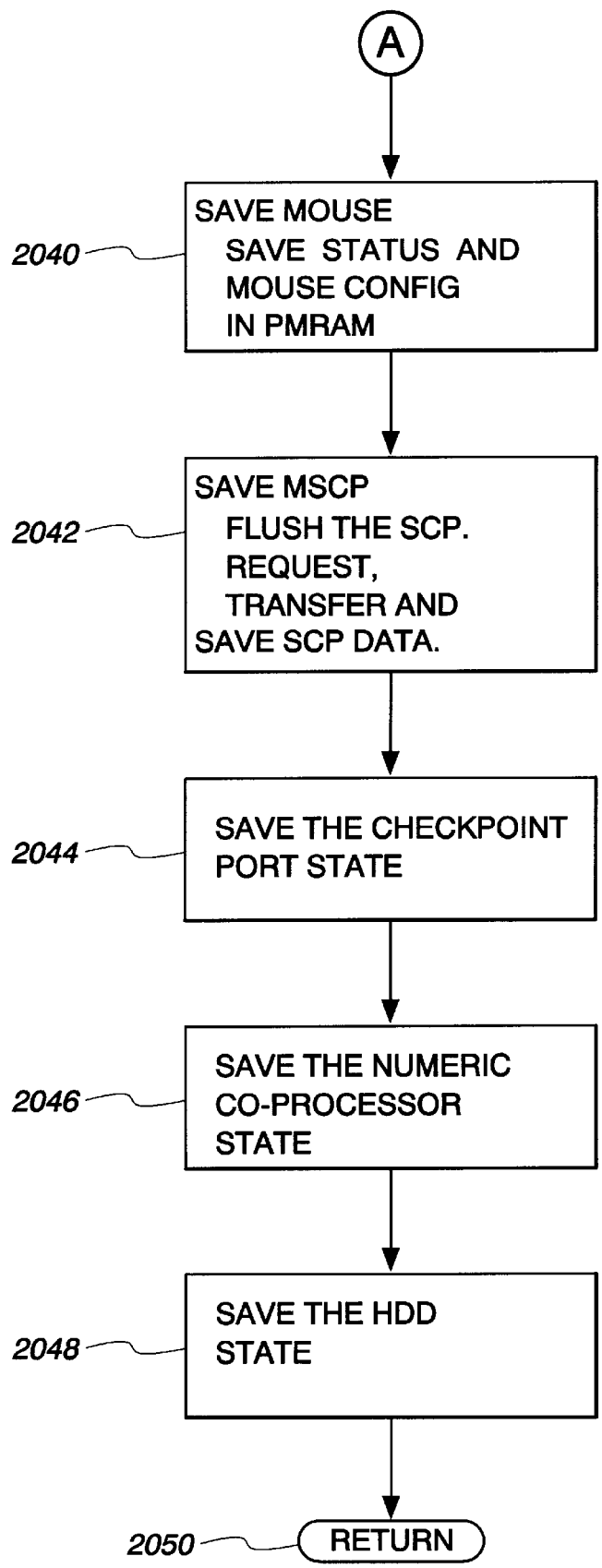
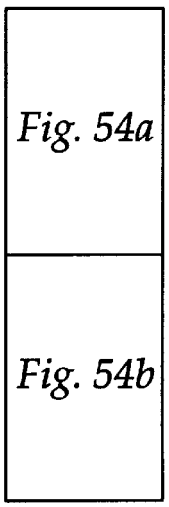
Fig. 54b
Fig. 54a
Fig. 54b

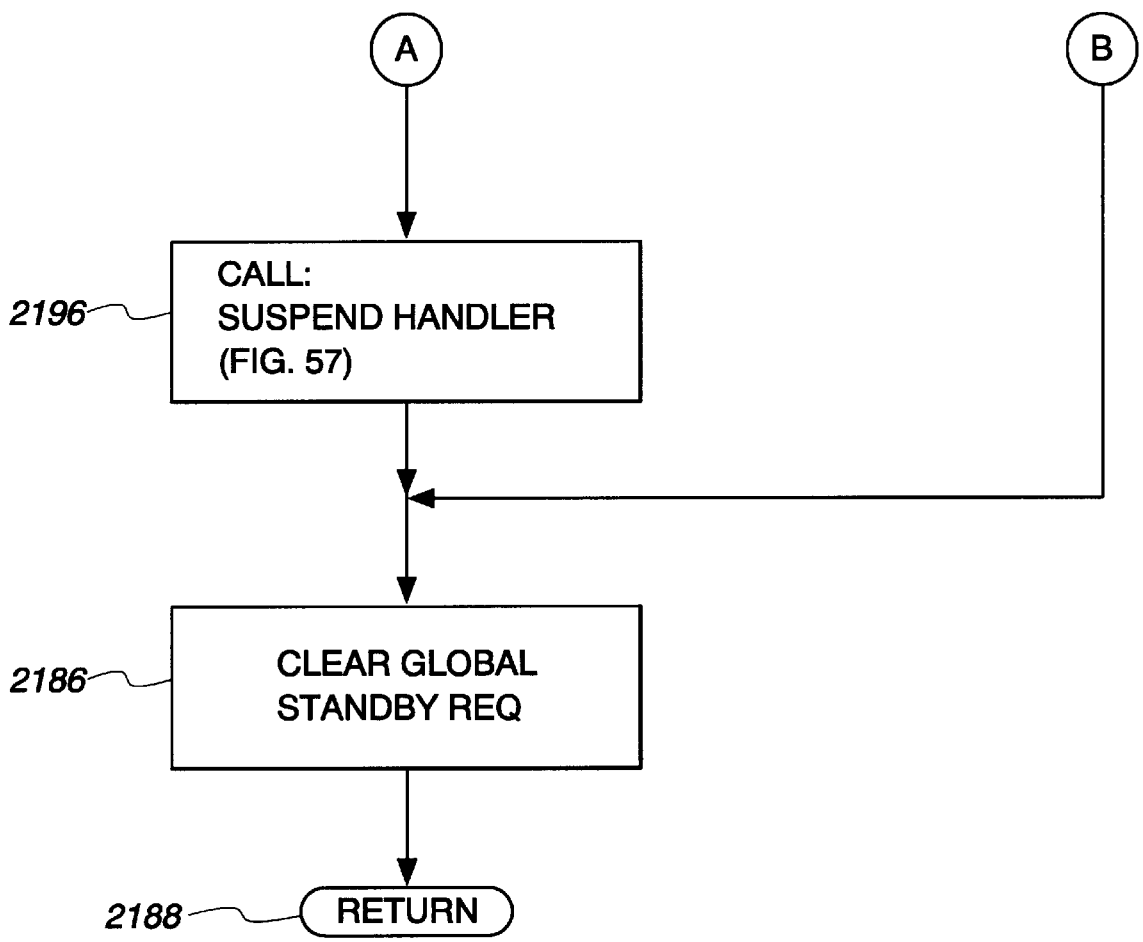
*Fig. 55b*

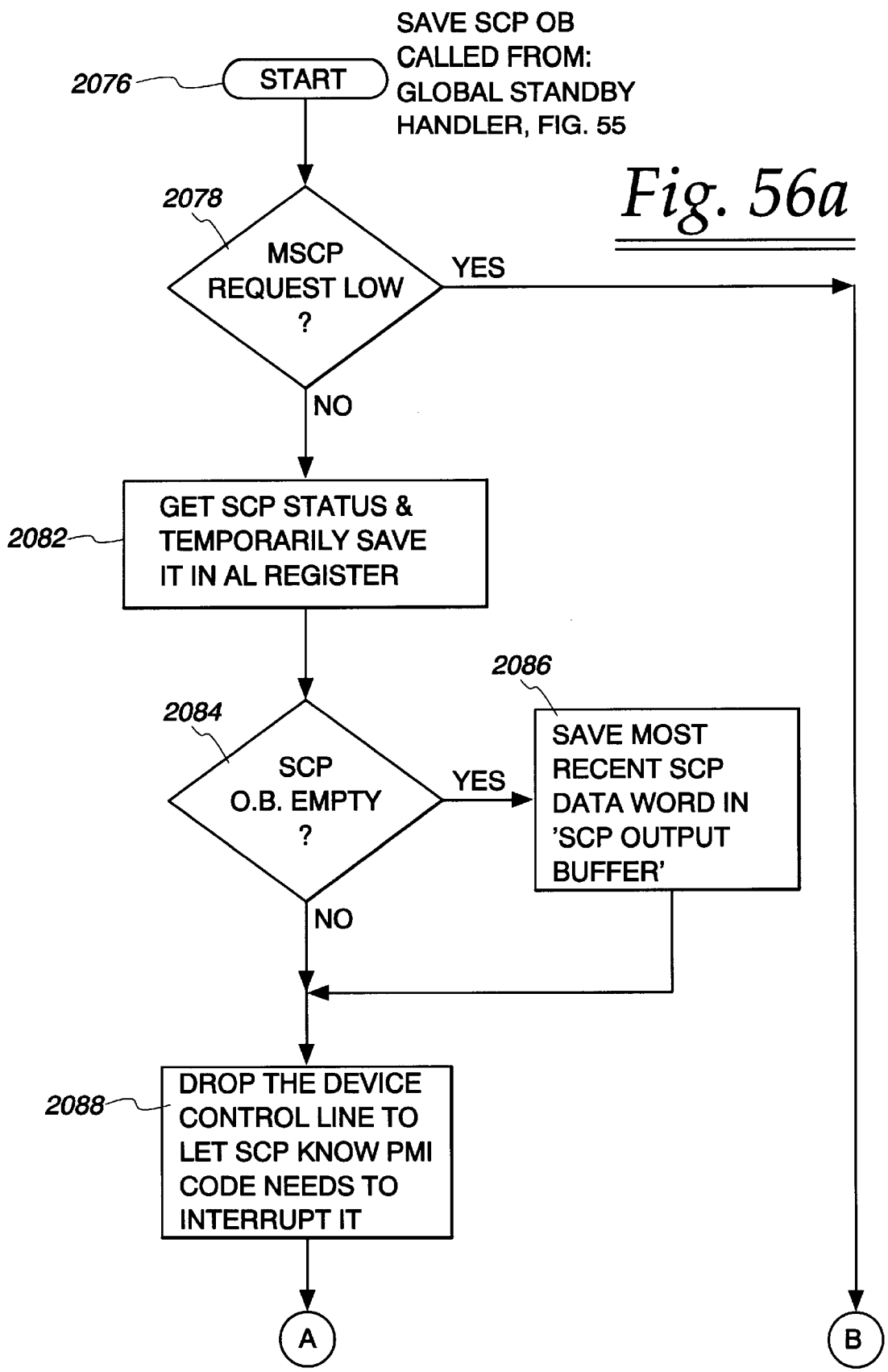

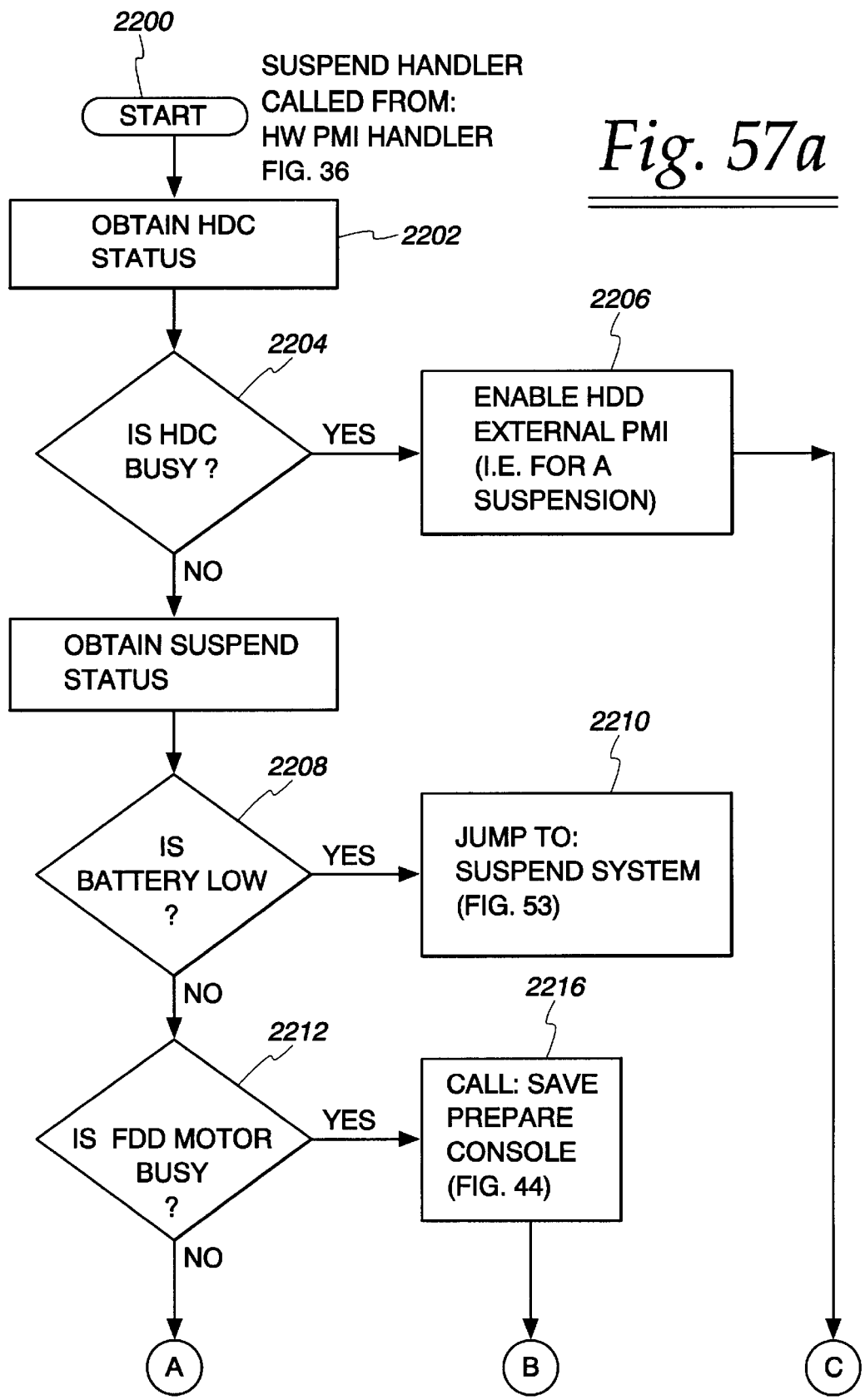

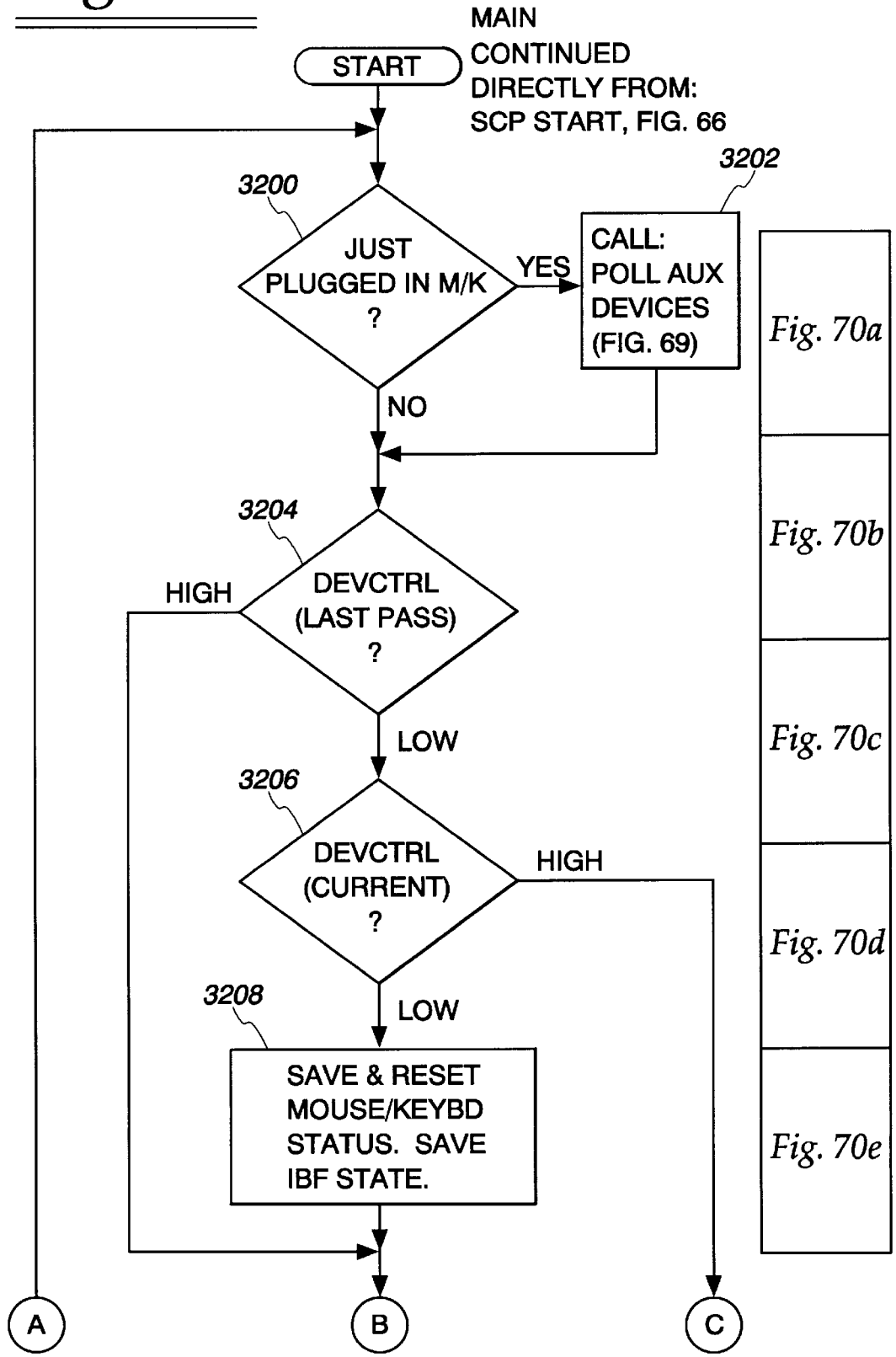

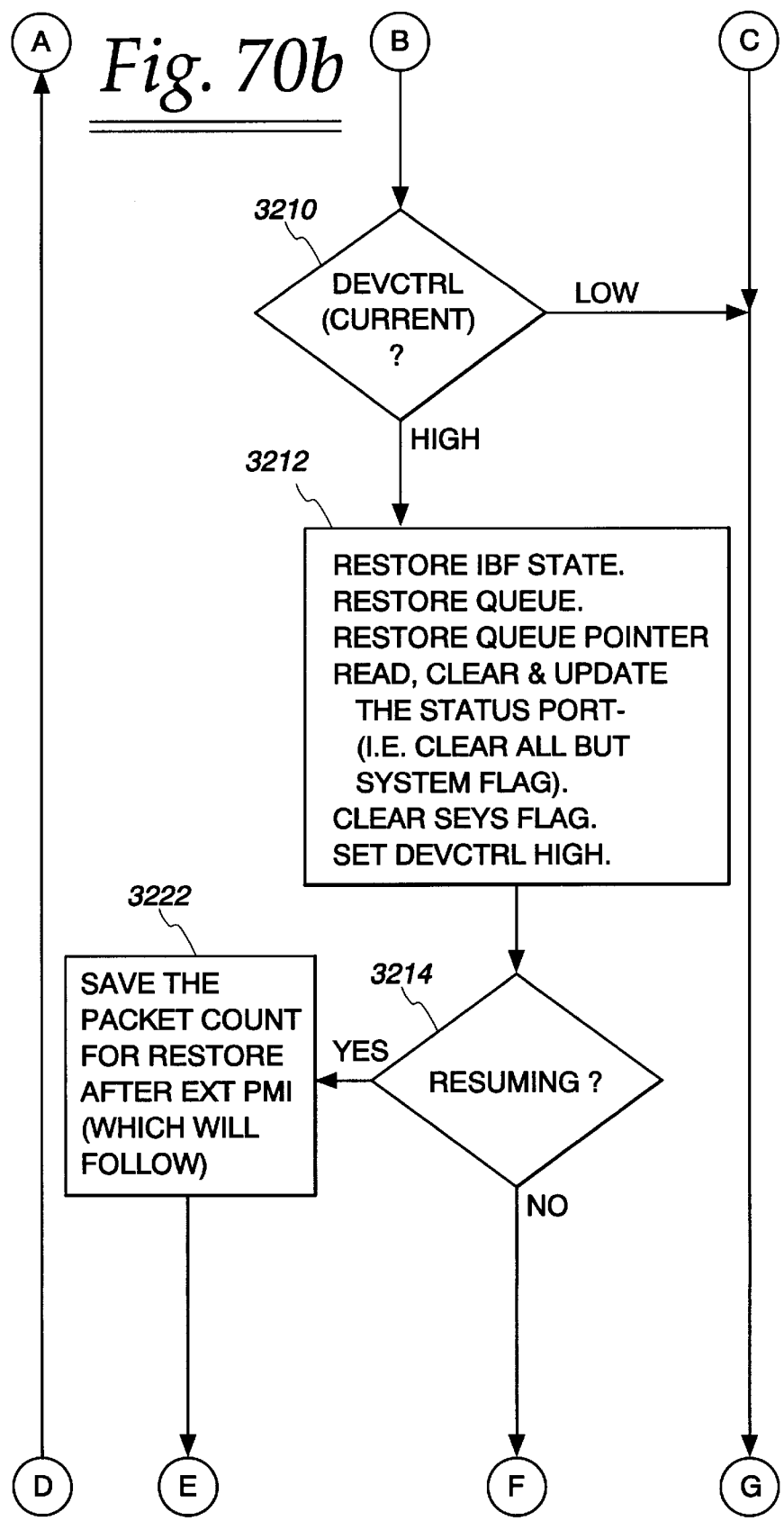

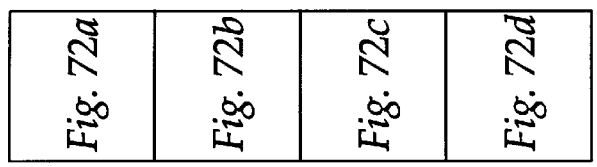
Fig. 72d
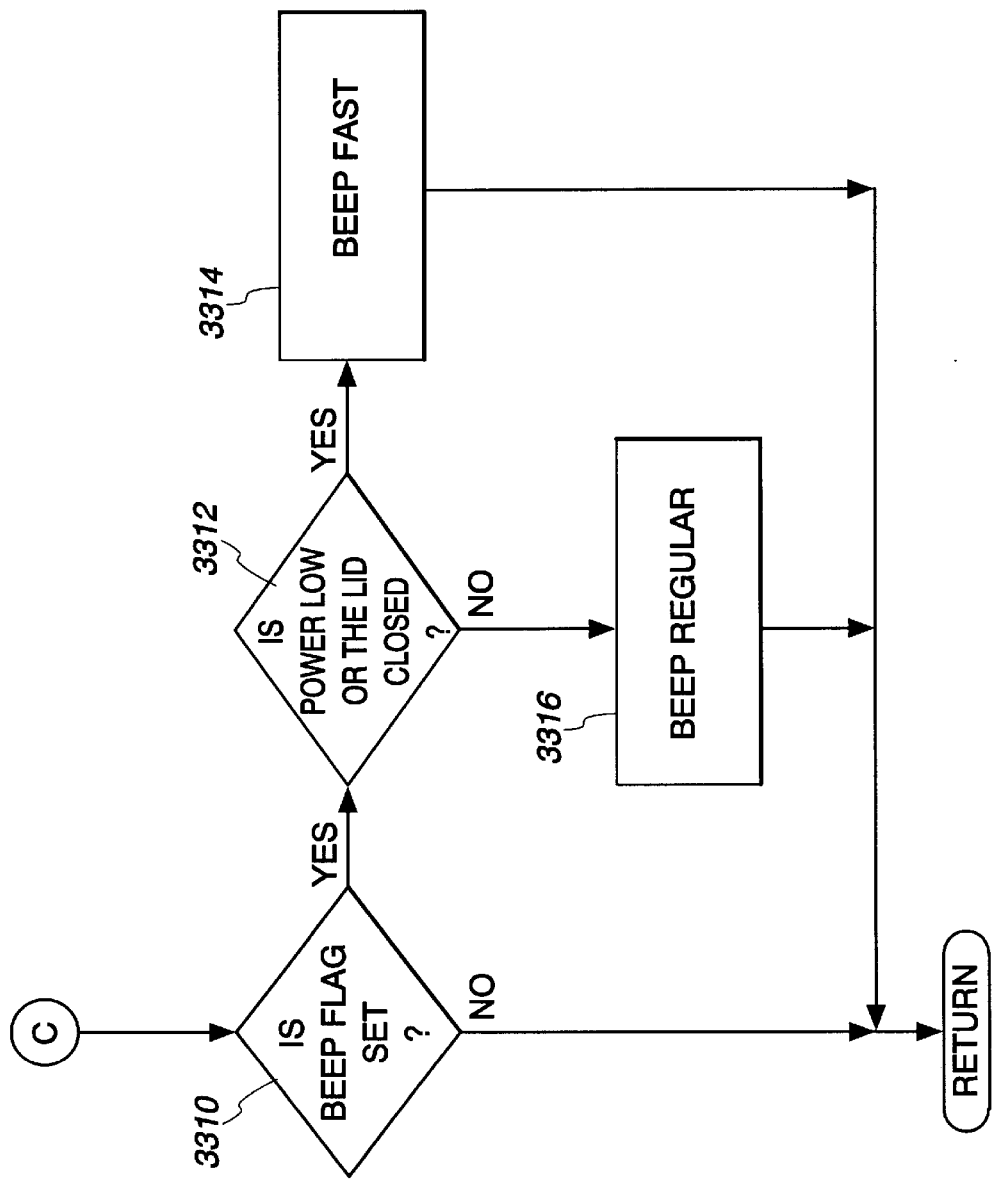

| Fig. 74a |
| Fig. 74b |
| Fig. 74c |
| Fig. 74d |
| Fig. 74e |
| Fig. 74f |
| Fig. 74g |
| Fig. 74h |
| Fig. 74i |
| Fig. 74j |
| Fig. 74k |

*Fig. 78a*

| *Fig. 78a* |
|---|
| *Fig. 78b* |
| *Fig. 78c* |

```
POINT_DEVICE_INT PROC
         PUBLIC  POINT_DEVICE_INT
         PUSH    PSW
         PUSH    ACC
PDI2:    ACALL   GET 200            ;R3 = BYTE FROM KEYBOARD
         JC      PDI10              ;IF ERROR, TRY AGAIN
         JB      AUXFLAGS.NO_RESPONSE,PDI10  ;DON'T SEND ANYTHING TO HOST

% IF STINGRAY

; TEST DEVICE RESPONSE TYPE
         JB      AUXFLAGS.KEYBD,PDI7         ;IS IT A KEYBOARD BYTE?
         JB      AUXFLAGS.MOUSE, PDI6        ;NO. IS IT A MOUSE?
         JB      AUXFLAGS.GET_RESPONSE,PDI3B ;NO. EXPECTING A COMMAND RESPONSE?
         SETB    AUXFLAGS.FIND_AUX_TYPE ;NO. FIND OUT WHATS OUT THERE
         SJMP    PDI11                       ;...AND EXIT

; ASSIGN DEVICE TYPES
PDI3B:   CJEQ    R3, #ACK,PDI11              ;EXPECTING AN ACK !
         CJNE    R3, #0ABH,PDI14             ;GOT AN AB?....MUST BE A KEYBOARD
         SETB    AUXFLAGS.KEYBD              ;YES...SET KEYBOARD BIT
         SETB    AUXFLAGS.NO_RESPONSE        ;EXPECTING ONE MORE BYTE FROM KEYBOARD
         SJMP    PDI5                        ;SET BIT AND EXIT
PDI4B:   SETB    AUXFLAGS.MOUSE              ;MUST BE A MOUSE
PDI5B:   CLR     AUXFLAGS.GET_RESPONSE       ;DONE GETTING RESPONSES
         SJMP    PDI11                       ;DON'T SEND ANYTHING TO HOST

%ELSE ; (STINGRAY)

; TEST FOR KEYBOARD ID POLLING RESPONSE
```

```
            MOV     A, KBD_MASK            ;GET KEYBOARD PORT ASSIGNMENT
            CJNE    A, DEV_MASK, PDI3A     ;DID BYTE COME FROM KEYBOARD PORT?
            JB      AUXFLAGS.KEYBD, PDI7   ;YES.. DO WE HAVE A KEYBOARD ASSIGNED?
            SJMP    PDI3C                  ;NO.. SEE IF I.D. RESPONSE
PDI3A:      JB      AUXFLAGS.MOUSE, PDI6   ;DO WE HAVE A MOUSE ASSIGNED?
PDI3C:      JB      AUXFLAGS.GET_RESPONSE, PDI3B ;NO, EXPECTING A COMMAND RESPONSE?
            SETB    AUXFLAGS.FIND_AUX_TYPE ;NO, FIND OUT WHAT'S OUT THERE
            SJMP    PDI11                  ;.. AND EXIT

; ASSIGN DEVICE TYPES
; ACC=CURRENT KEYBOARD PORT ASSIGNMENT, (IF ANY)

PDI3B:      CJEQ    R3,#ACK,PDI11          ;EXPECTING AN ACK!
            CJNE    R3,#0ABH,PDI15         ;GOT AN AB?..MUST BE A KEYBOARD
            SETB    AUXFLAGS.NO_RESPONSE   ;EXPECTING ONE MORE BYTE FROM KEYBOARD
            JZ      PDI4                   ;ANY PORT ASSIGNED YET?
            JB      AUXFLAGS.MOUSE,PDI15B  ;YES...MOUSE ASSIGNED?
PDI4:       MOV     KBD_MASK,DEV_MASK      ;NO.. SET MASK FOR THIS INTERRUPT
            SJMP    PDI5B                  ;SET BIT AND EXIT
PDI5:       JB      AUXFLAGS.FIND_AUX_TYPE,PDI5C ;DON'T ASSIGN MOUSE JUST PLUGGED IN
            JNZ     PDI5C                  ;ANY PORT ASSIGNED YET?
            MOV     A,DEV_MASK             ;NO.. GET PORT BITS FOR THIS INTERRUPT
            CPL     A                      ;COMPLIMENT FOR MOUSE
            MOV     KBD_MASK,A
            SETB    AUXFLAGS.MOUSE
            SJMP    PDI5C
PDI5B:      SETB    AUXFLAGS.KEYBD         ;LET IT BE KNOWN WE HAVE A KEYBD
PDI5C:      CLR     AUXFLAGS.GET_RESPONSE  ;DONE GETTING RESPONSES
            SJMP    PDI11                  ;DON'T SEND ANYTHING TO HOST
            %ENDIF ; (STINGRAY)

; SEND DEVICE BYTE TO DESTINATION
```

```
PDI6:    PUSH    DEV_PORT                ;SAVE DEVICE PORT
;;;;     %IF SUSPEND_RESUME
         ACALL   SEND_EXIT_STANDBY       ; EXIT STANBY IF NECESSARY
         %ENDIF  ;SUSPEND_RESUME
; COUNT BYTES SENT SO WE CAN DO A PROPER RESUME IF SUSPENDED DURING A PACKET.
........
PDI6A:   MOV     A,MOUSE_BYTE_CNT
         INC     A
         CJNE    A,#3, PDI6B             ;3 BYTES SENT?
         CLR     A                       ;YES. WRAP COUNT BACK TO 0
PDI6B:   MOV     MOUSE_BYTE_CNT,A        ;UPDATE BYTE COUNT
         CALL    UPDMSTS0                ;SEND BYTE TO HOST
         MOV     SECONDS_CNT,#MINUTE     ;RESET 1/2 SEC COUNTER
         MOV     BLMIN,BLLOD             ;RESTART THE BACKLIGHT TIMER
         CALL    SETBL                   ;UPDATE THE BACKLIGHT TIMER
         SJMP    PDI10                   ;AND EXIT
PDI7:    MOV     A,R3                    ;GET KEYBOARD BYTE
         PUSH    REG0                    ;PUT RAW TRASHES REG0
         CALL    PUTRAW                  ;BUFFER KEYBOARD DATA TO HOST
         POP     REG0
PDI10:   CLR     AUXFLAGS.NO_RESPONSE    ;CLEAR FLAG
PDI11:   ANL     EXICON,#CLR_SPUR_INT    ;CLEAR SPURIOUS KEYBOARD INTERRUPT
         POP     ACC
         POP     PSW
         RETI
         ENDPROC ;POINT_DEVICE_INT
```

Fig. 79a

```
MAIN PROC
       PUBLIC   MAIN
       JNB      AUXFLAGS.FIND_AUX_TYPE,MAIN1
       CALL     POLL_AUX_DEVICES                   ;JUST PLUGGED IN SOMETHING?
                                                   ;YES. POLL FOR AUX DEVICES

; CHECK DEVCTRL LINE FOR PMI'S

MAIN 1: JB       AUXFLAGS.DEVCTRL_ACTIVE,MAIN1A    ;WAS DEVCTRL LOW DURING PREVIOUS PASS?
        JNB      DEVCTRL, MAIN1G                   ;CHECK FOR GLITCH
        JB       DEVCTRL, MAIN1B                   ;NO. IS PMI DEVICE CONTROL LINE LOW?

MAIN 1G: CALL    MOUSE_QUIET                       ;PULL EXTERNAL DEVICE CLOCK LINE LOW?
         MOV     RESUME_MOUSE_PKT,#0               ;CLEAR RESUME PACKET FLAG
         PUSHREG <HQ_START,HQ_END,HQRSPi>          ;SAVE QUEUE POINTERS
         CALL    SAVE_IBF_STATE                    ;SAVE IBF STATES
         SETB    AUXFLAGS.DEVCTRL_ACTIVE           ;FLAG DEVCTRL LINE WENT LOW
         CLR     FLAGS2.MOUSE_PACKET               ;NO RESTORING OF MOUSE PACKETS DURING PMI

MAIN 1A: JNB     DEVCTRL, MAIN1B                   ;HAS DEVCTRL LINE BECOME HIGH?
         JNB     DEVCTRL, MAIN1B                   ;CHECK FOR GLITCH
         MOV     CMD_STATE,RESTORE_STATE           ;YES. RESTORE IBF COMMAND STATE
         MOV     HQ_READ,#HQ                       ;RESTORE NORMAL QUEUE
         POPREG  <HQRSPi,HQ_END,HQ_START>          ;RESTORE QUEUE POINTERS
         MOV     R0,#STATUS_IN                     ;READ STATUS PORT FOR SYSTEM BIT
         MOVX    A,@R0
         ANL     A,#04H
         ORL     A,#INHIBIT
         MOV     R0,#STATUS_OUT                    ;CLEAR ALL OF STATUS BUT SYSTEM FLAG
         MOVX    @R0,A
         MOV     AUXFLAGS.KEYS_OK                  ;UPDATE THE STATUS PORT
         CLR     AUXFLAGS.DEVCTRL_ACTIVE           ;CLEAR KEYS OK
                                                   ;DEVCTRL LINE IS NOW HIGH
```

; CHECK THE RESUME FLAG. IF RESUMING, ONLY SAVE THE PACKET COUNT FOR RESTORING AFTER
; THE EXT_PMI THAT WILL FOLLOW. IF NOT RESUMING, RESTORE THE PACKET COUNT IF
; THERE IS ONE SAVED AND THEN CLEAR THE SAVED PACKET COUNT.

```
         MOV     A, RESUME_MOUSE_PKT               ;GET RESUME FLAG
         JZ      MAIN1R                            ;NOT RESUMING SO RESTORE PACKET COUNT
         MOV     MOUSE_CNT_SAVE,MOUSE_BYTE_CNT     ;SAVE THE PACKET COUNT FOR LATER
```

*Fig. 79b*

| *Fig. 79a* |
| *Fig. 79b* |
| *Fig. 79c* |
| *Fig. 79d* |

```
         MOV   MOUSE_BYTE_CNT,#0      ;SHOULD HAVE NO BYTES DURING RESUME YET
         SJMP  MAIN1C
; FILL OUT WITH ZERO BYTES IF A SUSPENDED MOUSE PACKET
MAIN 1R: MOV   A,MOUSE_CNT_SAVE       ;GET PACKET BYTE COUNT AND
         JZ    MAIN1C                 ;NO PACKET TO COMPLETE
         JB    ACC.7,MAIN1B0          ;NO PACKET TO COMPLETE
         SETB  FLAGS2.MOUSE_PACKET    ;FLAG A MOUSE PACKET NEEDS RESTORING
MAIN 1B:  JNB   FLAGS2.MOUSE_PACKET,MAIN1C ;RESTORING MOUSE PACKET?
         MOV   R1,#STATUS_IN          ;YES. READ STATUS PORT
         MOVX  A,@R1
         JB    ACC.ST_OBF,MAIN2       ;WAIT UNTIL HOST IS READY
         MOV   R3,#0                  ;OUTPUT ZERO BYTES
         CALL  UPDMSTS0               ;OUTPUT ZERO BYTES IN R3 TO HOST
         MOV   R0,#MOUSE_CNT_SAVE     ;ADDRESS OF MOUSE PACKET COUNT
         INC   @R0                    ;ADVANCE BYTE COUNT
         CJNE  @R0,#3,MAIN2           ;SEND 3 BYTES YET?
         CLR   FLAGS2.MOUSE_PACKET    ;YES. CLEAR MOUSE PACKET RESTORE FLAG
MAIN 1B0: MOV  MOUSE_CNT_SAVE,#0      ;CLEAR PACKET COUNT
; TURN OFF INTERRUPTS, CHECK OBF AND FLOAT AND EXTERNAL KEYBD/MOUSE CLOCK IF EMPTY
MAIN 1C:
%IF STINGRAY
         JNB   DEVCTRL,MAIN1H         ;CHECK FOR GLITCH
         JB    DEVCTRL,MAIN1F         ;IN DEVICE CONTROL MODE?
MAIN 1H: JNB   AUXFLAGS.KEYS_OK,MAIN2 ;YES, OK FOR KEYS?
MAIN 1F: JNB   AUXFLAGS.MOUSE,MAIN1D  ;YES, IS MOUSE INSTALLED?
         JB    MODE.MD_DIAUX,MAIN2    ;YES, IS MOUSE DISABLED?
         SJMP  MAIN1E                 ;NO. FLOAT CLOCK LINE
MAIN 1D: JB    MODE.MD_DIKYBD,MAIN2   ;KEYBOARD DISABLED?
MAIN 1E: MOV   IE,#IE_DISABLE         ;NO. DISABLE ALL BUT TIMER 2
         MOV   IEA,#IEA_DISABLE       ;DISABLE ALL EXTENDED INTERRUPTS
         MOV   R0,#STATUS_IN          ;GET STATUS BYTE
```

```
           MOVX    A,@R0
           JB      ACC.ST_OBF,MAIN2        ;OUTPUT BUFFER FULL?
           SETB    MCLKO_                  ;NO, FLOAT CLOCK LINE
%ELSE ; (STINGRAY)
           MOV     A,KBD_MASK
           JB      MODE.MD_DIKYBD,MAIN1D   ;NO, GET KEYBOARD PORT BITS
           ANL     A,#P5_CLKOUT            ;KEYBOARD DISABLED?
           ORL     P5,A                    ;NO, ISOLATE CLOCK BIT
                                           ;FLOAT KEYBOARD CLOCK LINE
MAIN 1D:   JB      MODE.MD_DIAUX,MAIN2     ;IS MOUSE DISABLED?
           CPL     A                       ;NO, COMPLIMENT FOR MOUSE BITS
           ANL     A,#P5_CLKOUT            ;ISOLATE MOUSE CLOCK BIT
           ORL     P5,A                    ;FLOAT MOUSE CLOCK LINE
%ELSE ; (STINGRAY)

; CHECK FOR PENDING KEYBOARD COMMAND RESPONSES

MAIN 2:    MOV     IEA,#IEA_ENABLE         ;ENABLE ALL EXTENDED INTERRUPTS
           MOV     IE,#IE_ENABLE           ;ENABLE ALL OTHER INTERRUPTS
           MOV     A,HQRSPI                ;GET RESPONSE INDEX, COUNT BYTE
           ANL     A,#0E0H                 ;CHECK COUNT
           JZ      MAIN_2A                 ;DO WE HAVE A RESPONSE TO SEND THE HOST?
           CALL    MOUSE_QUIET             ;YES, SEND PENDING RESPONSE TO HOST
           CALL    SEND_RESPONSE           ;CONTINUE WITH SCANNING KEYBOARD
           SJMP    MAIN 3

; NO PENDING RESPONSES.  PROCESS QUEUED KEYBOARD COMMANDS RECEIVED FROM THE HOST.

MAIN 2A:   CLR     FLAGS1.RECEIVED_CMD     ;CLEAR HOST COMMAND RECEIVED FLAG
           MOV     A,HQ_START              ;CHECK HOST BYTE QUEUE
           CJEQ    A,HQ_END,MAIN3          ;COMMAND IN QUEUE?
           MOV     IE,#IE_DISABLE_HOST     ;DISABLE HOST INTERRUPTS
           CALL    MOUSE_QUIET
           CALL    HOSTCMD                 ;EXECUTE HOST COMMAND

; SCAN THE KEYBOARD AND PROCESS ANY REPEATING KEYS
```

```
MAIN 3:          MOV    IE,#IE_ENABLE              ;ENABLE ALL INTERRUPTS
                 MOV    IEA,#IEA_ENABLE            ;ENABLE ALL OTHER EXTERNAL INTERRUPTS
                 JB     AUXFLAGS.KEYS_OK,MAIN3A    ;WAS A PARTIAL SAVE PERFORMED?
                 JNB    DEVCTRL,MAIN6              ;NO.. CHECK FOR GLITCH
MAIN 3A:         JNB    DEVCTRL,MAIN6              ;IS PMI DEVICE CONTROL LINE LOW?
                 JNB    KBMODE.SCANEN,MAIN4        ;NO.. SCANNING ENABLED?
                 CALL   INTRRQST.SCANRQST,MAIN4    ;YES, SCAN REQUIRED NOW?
                 CLR    KEYSCAN                    ;YES, SCAN THE KEYBOARD
                                                   ;...AND MARK AS SERVICED
MAIN 4:          JNB    INTRRQST.RPTRQST,MAIN5     ;TIME TO CHECK FOR REPEATING KEYS?
                 CALL   REPEAT                     ;YES, CHECK FOR REPEATING KEY
                 CLR    INTRRQST.RPTRQST           ;...AND FLAG AS SERVICED

; SEND KEYBOARD SCAN CODES TO HOST

MAIN 5:          JB     FLAGS1.RECEIVED_CMD,MAIN6  ;IS A NEW COMMAND PENDING?
                 JB     CTRLFLAGS.DELAY_SEND,MAIN6 ;NO...DELAYED LONG ENOUGH SINCE LAST SEND?
                 MOV    A,RDPTR                    ;NO.. GET BUFFER READ POINTER
                 CJEQ   A,WRTPTR,MAIN6             ;ANY BYTES TO SEND?
                 CALL   MOUSE_QUIET                ;YES, STOP MOUSE FROM SENDING
                 MOV    A,#KEYBUFF                 ;GET NEXT BYTE FROM BUFFER
                 ADD    A,RDPTR
                 MOV    R0,A
                 CALL   SEND_KEY                   ;SEND BYTE TO THE HOST
                 JC     MAIN6                      ;BYTE SENT TO HOST?
                 SETB   CTRLFLAGS.DELAY_SEND       ;ASSURE 800 US DELAY BETWEEN SENDS
                 INC    RDPTR                      ;YES, REMOVE BYTE FROM BUFFER
                 MOV    A,RDPTR                    ;GET READ POINTER
                 CJLT   A,#BUFFSZ,MAIN6            ;POINTING PAST END OF BUFFER?
                 MOV    RDPTR,#0                   ;YES, WRAP TO START OF BUFFER

MAIN 6:          JNB    INTRRQST.CHECK_BATTERY,MAIN7 ;TIME TO CHECK BATTERY VOLTAGE?
                 CALL   MONITOR_POWER_SOURCE         ;YES, TAKE THE NEXT READING
                 CLR    INTRRQST.CHECK_BATTERY       ;...AND FLAG AS SERVICED

MAIN 7:
%IF CAN_IDLE
                 ORL    PCON,#IDL                  ;SLEEP 'TIL INTERRUPT
%ENDIF ;CAN_IDLE
                 AJMP   MAIN                       ;LOOP FOREVER
                 ENDPROC ;MAIN
```

| Fig. 80a |
| Fig. 80b |
| Fig. 80c |

*Fig. 80a*

```
SYSTEM_STANDBY   PROC    NEAR
        PUBLIC  SYSTEM_STANDBY
        PUSHREG <AX,CX,DX>
;SAVE/POWERDOWN DEVICES
        CALL    POWER_OFF_LCD                       ;POWER OFF LCD TO SAVE POWER
        CALL    POWER_DOWN_VIDEO
        CALL    POWER_DOWN_MODEM_FAR                ;PUT MODEM INTO SUSPENDED STATE
        MOV     AL,(CFG_BASE+FDC_PM)
        AND     AL,FDC_PM_MASK
        CMP     AL,FDC_FULL_AUTO
        JNZ     SS_20
        CALL    FDC_LSTDBY_HANDLER                  ;PUT THE FLOPPY INTO STANDBY MODE
        JMP     SS_30
SS_20:  CALL    FDC_POWER_DOWN                      ;PUT FLOPPY INTO POWER-DOWN MODE
SS_30:  AND     TOD_FLAGS,NOT VALID_TOD_FLAG        ;CLEAR FLAG
        CALL    VALIDATE TOD                        ;DOES THIS O.S. SUPPORTING TOD
        JC      SS_40                               ;NO
        OR      TOD_FLAGS,NOT VALID_TOD_FLAG        ;FLAG THAT TOD IS VALID
        CALL    SAVE_DATE                           ;YES, THEN ALSO SAVE DATE
SS_40:  CALL    SPIN_DOWN_HDD                       ;SPIN DOWN HDD
;SET SUSPEND TIMER THEN STOP CLOCK

MOV     AH,SCP_ENSTANDBY                    ;TELL SCP SYSTEM IS ENTERING STANDBY
        CALL    SCP_SEND_PM_EXTENDED                ;SEND IT TO THE SCP
```

Fig. 80b

```
        MOV     AL, AUTO_SUSP                           ;GET AUTO-SUSPEND TIMEOUT INDEX
        CALL    PMI_GET_PMRAM_BYTE_AUTO                 ;GET IT
        MOV     AH, AL                                  ;PUT IT HERE
        CALL    SCP_SEND_DATA_FAR                       ;SEND AUTO-SUSP TIMEOUT TO SCP

CALL    STOP_CPU_CLOCK                          ;STOP THE CPU CLOCK
        IN      AL, SCP_STATUS                          ;GET STATUS
        TEST    AL, SCP_RESULT                          ;IS THERE SOMETHING WAITING?
        JZ      SS_50                                   ;NO

IN      AL, SCP_DATA_IN                         ;GET IT
        CMP     AL, SUSPEND_TIMEOUT                     ;DID SUSPEND TIMER TIMEOUT?
        JNE     SS_45                                   ;NO

CALL    POWER_UP_VIDEO                          ;ENABLE THE VIDEO

MOV     CX, 30                                  ;MINIMUM TIME BEFORE VIDEO MEMORY
        CALL    DELAY_FAR                               ;...CAN BE ACCESSED.

MOV     AX, SUSP_STANDBY_ENTRY                  ;INPUT AX=ENTER FROM STANDBY
        CALL    SUSPEND_SYSTEM                          ;YES SUSPEND SYSTEM
        JMP     SS_90

SS_45:  MOV     CX, OFFH

SS_46:  IN      AL, SCP_STATUS                          ;IS SOMETHING IN OUTPUT BUFFER?
        TEST    AL, SCP_RESULT                          ;YES
        JNZ     SS_48                                   ;NO, WAIT A WHILE
        LOOP    SS_46                                   ;TIME UP.
        JMP     SS_50

SS_48:  MOV     AH, AL
        IN      AL, SCP_DATA_IN

MOV     SCP_OUTPUT_BUFFER_STATE, AL             ;SAVE STATUS
        AND     AH, SCP_RESULT OR SCP_MOUSE_DATA
        AND     MSCP_PM_FLAGS, NOT (SCP_RESULT OR SCP_MOUSE_DATA)   ;SAVE BYTE
                                                        ;ISOLATE FLAGS
        OR      MSCP_PM_FLAGS, AH                       ;SAVE FLAGS
```

```
SS_50:
;   RESTORE/POWER UP DEVICES
        TEST    TOD_FLAGS,VALID_TOD_FLAG    ;WAS TOD VALID
        JZ      SS_60                       ;NOT VALID
        CALL    ADJUST_TIME_DATE            ;ADJUST TOD STRUCTURE.
SS_60:
        MOV     AL,[CFG_BASE+FDC_PM]
        AND     AL,FDC_PM_MASK
        CMP     AL,FDC_FULL_AUTO            ;IS FDC IN FULL-AUTO MODE?
        JE      SS_70                       ;YES, IO TRAP HANDLER WILL POWER IT UP
        CALL    FDC_POWER_UP                ;NO, POWER-UP THE FDC
SS_70:
        CALL    POWER_UP_MODEM_FAR          ;PUT MODEM BACK TO NORMAL OPERATION
        CALL    POWER_UP_VIDEO              ;ENABLE THE VIDEO

MOV     CX,30                       ;MINIMUM TIME BEFORE VIDEO MEMORY
        CALL    DELAY_FAR                   ;... CAN BE ACCESSED.

SS_90:
        CALL    POWER_ON_LCD                ;RESTORE POWER TO LCD (IF SELECTED)

POPREG  <DX,CX,AX>
        RET
SYSTEM_STANDBY  ENDP
```

*Fig. 80c*

SUSPEND/RESUME CAPABILITY FOR A PROTECTED MODE MICROPROCESSOR

CROSS-REFERENCE TO RELATED APPLICATION

This application is a continuation of U.S. Ser. No. 07/752,342, filed Aug. 30, 1991, now abandoned.

This application is related to copending U.S. Ser. No. 07/703,026 filed May 17, 1991 and entitled METHOD AND APPARATUS FACILITATING USE OF A HARD DISK DRIVE IN A COMPUTER SYSTEM HAVING SUSPEND/RESUME CAPABILITY. Further, this application is a continuation-in-part of pending U.S. Ser. No. 07/705,039 filed May 17, 1991.

FIELD OF THE INVENTION

This invention relates generally to the provision of suspend/resume capability in a microprocessor and, more particularly, to the provision of such capability in a protected mode microprocessor to features implemented in a system based on such a microprocessor.

BACKGROUND OF THE INVENTION

Laptop computers are rapidly growing in importance in today's personal computer marketplace. In the past, a few laptop computers offered a feature known as suspend/resume mode (or simply resume mode). This feature is used to save the exact status of the machine whenever the system is powered down. With the use of a back-up battery, the system maintains the saved status until it is powered-up again. This enables users to resume their work as though power had never been turned off. One example of such a system is the PC/Convertible laptop computer, which was manufactured and sold by International Business Machines Corporation (IBM®).

Existing laptops which offer resume mode are based on single-tasking microprocessors such as the 8088 microprocessor made and sold by Intel Corporation of Santa Clara, Calif. In these machines, resume mode offers the above-mentioned benefit, but is limited in functionality due to the single-tasking nature of the machines; it isn't really that much work to bring up a single application, and thus resume mode only saves a few keystrokes. With the growing popularity of serious multi-tasking operating systems such as XENIX and OS/2, resume mode takes on more importance.

For example, computer users want a machine which is "customized" for their use. This customization represents the user's applications programs, interacting in a personalized way. Under the single-tasking nature of operating systems such as Disk Operating System available from Microsoft Corporation, this method of operation is primarily restricted to the use of TSRs (Terminate and Stay Resident applications). On the other hand, OS/2 and XENIX make it possible to create an entirely new "personal environment" containing all of a user's favorite programs, all on-line and all immediately available at the touch of a key.

As these operating environments become more graphics-oriented (via X-Windows and OS/2 Presentation Manager, for instance) the resume concept provides a strong metaphor. In particular, setting up a customized program environment is equivalent to arranging a desk with appropriate tools, which is a very natural behavior. In such a customized environment, resume can literally save hundreds of keystrokes: its value quickly becomes apparent.

The prime problem in implementing resume mode in contemporary laptops is existing processor architectures. In this regard, the Intel 80286/386/486 series of processors offer a number of significant capabilities, and foremost among these capabilities is protected mode. Unfortunately, protected mode programs permit unrestricted operation only by the operating system kernel. Conversely, suspend/resume mode implementations need the ability to freely address system input/output and memory in order to save the state of the machine. This conflict implies that it is necessary to build resume mode code into the kernel of every protected mode program which might be "resumed". This clearly is not an adequate solution, because many pre-existing programs which necessarily lack this feature would be incompatible with the resulting machine.

The Intel 8088 processor does not have protected mode capability. Consequently, the approach used in the current 8088-based laptops mentioned above is to assert the non-maskable interrupt (NMI) to gain control of the processor. While this works well on the 8088, in protected mode processors such as the popular 80286/386/486 it would cause a number of problems:

Once the controller has generated an NMI, external logic must identify the occurrence of the NMI vector fetch cycle. This cannot be based on an absolute address, since the loadable interrupt descriptor table register allows virtually any NMI vector location.

Assuming that the NMI cycle can be detected, it is necessary to come up with a suitable execution (service routine) address for the processor. While operating in protected mode, the global and local descriptor table registers essentially make addresses unknowable to the control circuitry.

Even if a valid address is somehow discerned, its protection rights will probably be inappropriate (such as trying to run code from a stack segment).

In addition, the paging circuitry in the 80386 and 80486 effectively scrambles the processor address lines.

Executing useful code within the hypothetical service routine is exceptionally difficult; even simple techniques such as PUSHing the CPU registers onto the stack may be inappropriate, because the stack may not point to valid memory.

It is important to note that these problems are very similar to those encountered by the designer of an in-circuit emulator (ICE). In both systems, it is necessary to interrupt program execution at an arbitrary point in time without affecting the state of the user's "virtual" machine. After gaining control of the target, free access to the system's input/output and memory is required. While ICEs offer this capability, the associated parts count and cost are ridiculously prohibitive for a portable computer.

A further problem with systems based on protected-mode processors is that it is normally not possible to change certain features of the system configuration while running an application program under existing multi-tasking operating systems. One must exit an application program and operating system, make necessary system configuration adjustments, and then re-enter the multi-taking operating system in the application program, which is tedious and time-consuming.

A further consideration is that some operating systems maintain time and date information separate from the time and date information maintained in hardware, and while the hardware will automatically keep its time and date accurate during a suspend, the time and date in the operating system may become static at the point suspend is entered.

A further consideration is that, while the system is in the suspend mode, a user may remove a floppy disk which was present in a floppy disk drive of the system at the time was powered down, and may even replace it with a different disk. When the interrupted application program is resumed at the end of the suspend mode, there is the danger that it will not realize that the original disk has been replaced with a new disk, and attempt to write data to the new disk with the assumption that it is really the original disk, thereby destroying information on the new disk which the user did not wish to lose.

It may be desirable for a battery-operated system to automatically enter suspend mode when the system is not being actively used in order to conserve battery power, but this can be annoying to the user, and is not absolutely necessary where the system is temporarily operating on AC power.

While separate switches can be used to turn system power on and off and to place the system in suspend mode, this adds to the cost of the hardware and presents the risk that the user may inadvertently actuate the power-off button and thus lose the current operational state of the system in a situation where the user basically intends to always enter and leave suspend mode without losing the existing state of the system.

A further consideration is that, when a user loans his system to another user and the latter changes the system configuration, the configuration set by the original user is lost and the original user is thus faced with the tedious task of attempting to restore his configuration when the system is returned to him.

A further problem is that a user may wish to leave his system for a brief period of time without exiting the application program or turning the system off, and yet want to prevent others from using the keyboard (or other input device) to make alterations or to examine information in the computer system.

A further factor is that conventional floppy disk drives often have internal registers which can be written but cannot be read. If such a disk drive is turned off in order to save power during a suspend mode, the contents of the internal register must be restored when the disk drive is turned back on at the end of suspend mode. However, it is not possible to read the register before suspend mode is enter in order to determine its contents. The desire of users to have a computer system which is compatible with pre-exiting disk drives makes it impractical to simply design a new drive in which all the registers are readable.

A further consideration is that it is often desirable to be able to upgrade the firmware in a computer system from time-to-time in order to obtain new features, but sometimes upgraded firmware is compatible only with more recent versions of the hardware. Unfortunately, the current state of the hardware must normally be determined by dissembling the unit and studying a revision code on the circuit board in order to determine whether upgraded firmware will be compatible with the board, which is a tedious and time consuming process.

When implementing suspend mode, maintaining power to the main memory is commonly viewed as necessary in order to avoid losing the current state of the application program which has been temporarily interrupted, but the maximum duration of the suspend interval is less than it might otherwise be as a result of the fact that a battery powering the system will lose power faster when it has to maintain the main memory than when it does not.

One object of the present invention is to provide a system which is configured around a protected mode processor and is capable of properly carrying out a suspend and resume even when a restricted mode of operation is in effect.

A further object is to provide a system in which system configuration information can be changed even under a multi-tasking operating system without exiting an application program.

A further object is to provide a system which can ensure that time and date information in the active operating system is accurate following a suspend and resume.

A further object is to provide a system which can carry out a suspend and resume operation while reducing the risk the error due to the removal or exchange of a floppy disk present in a floppy disk drive of the system at the time of the suspend.

A further object is to provide a system which has respective sets of configuration parameters for use when the system is respectively operating under AC and DC power, and an arrangement for automatically switching between these respective configurations when the system is switched between AC power and DC power.

A further object is to provide a suspend/resume system having a single button which is deactuated to place the system in either a suspend mode or a power off mode, the system having an internal arrangement which specifies the effect of this button.

A further object is to provide a system having a multi-level configuration, so that after a first user loans the system to a second user and the second user changes the overall configuration, the first user can quickly and easily restore the configuration which was in effect at the time the system was loaned to the second user.

A further object is to provide a system which uses a conventional floppy disk drive without physical modification and which is capable of properly reconfiguring the floppy disk drive following a suspend and resume operation.

A further object is provide a system in which software or firmware can directly determine the current revision status of certain hardware in the system.

A further object is provide a system capable of carrying out a suspend and resume operation without maintaining power to the main system memory.

BRIEF DESCRIPTION OF THE DRAWINGS

Preferred embodiments of the present invention will be described in detail hereinafter with reference to the accompanying drawings, in which:

FIGS. 4A and 4B is a block diagram of a computer system embodying the present invention;

FIGS. 9A and 9B is a block diagram of a computer system which is a further alternative embodiment of the system of FIG. 4;

FIGS. 13A–13D are respective portions of a block diagram of a further embodiment of a computer system which embodies features of the present invention;

FIGS. 16A–26C are flowcharts showing respective portions of a program executed by a main processor of the computer system of FIG. 13;

FIGS. 33A–33D is a block diagram of a further embodiment of a computer system which embodies features of the present invention;

FIGS. 78A–80C depict assembly language source code for selected procedures executed by the processors in the embodiment of FIGS. 33A–33D.

DETAILED DESCRIPTION

Figure 1A:
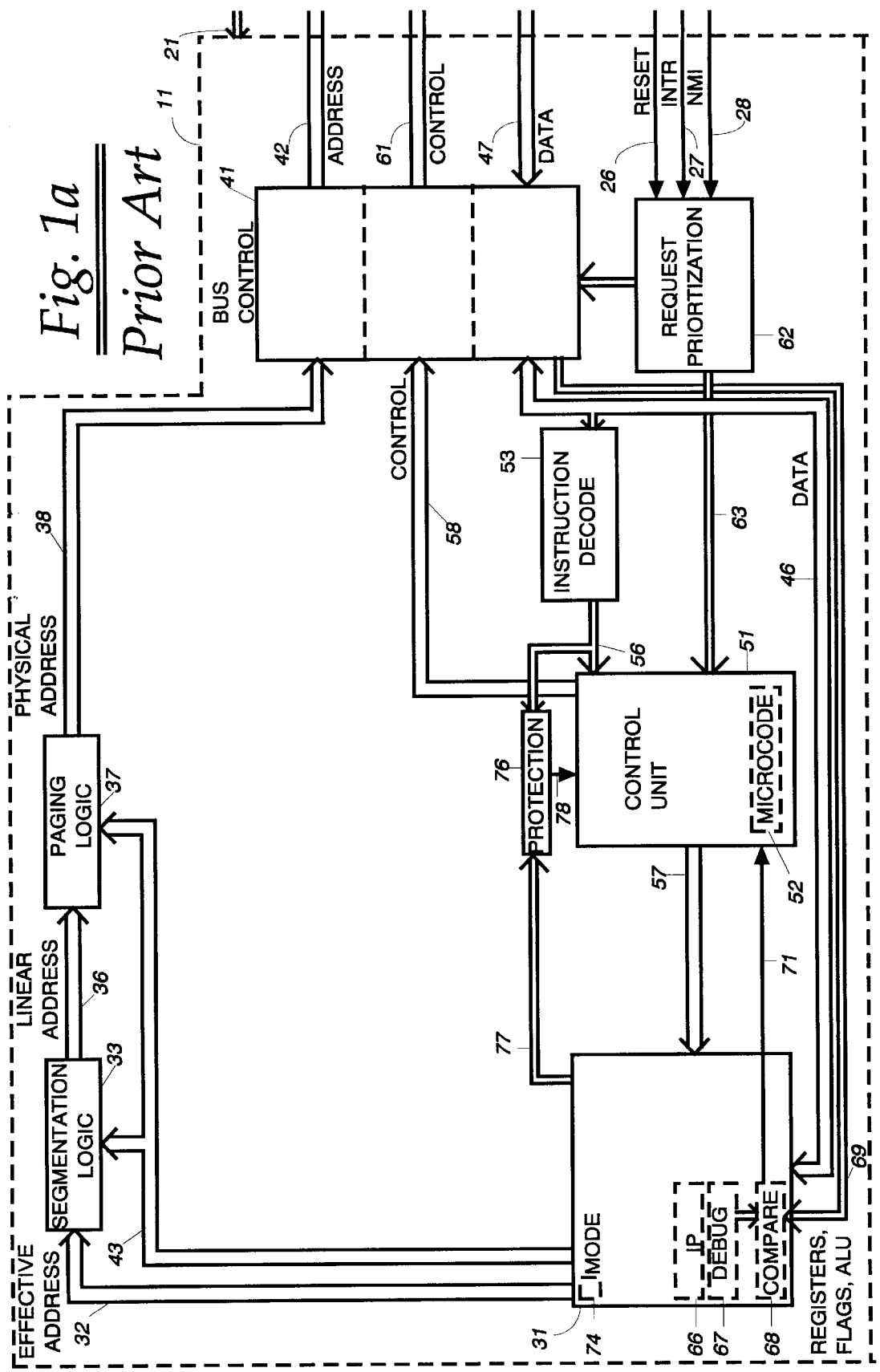
FIGS. 1A and 1B is a block diagram of a conventional computer system.
Figure 1B:
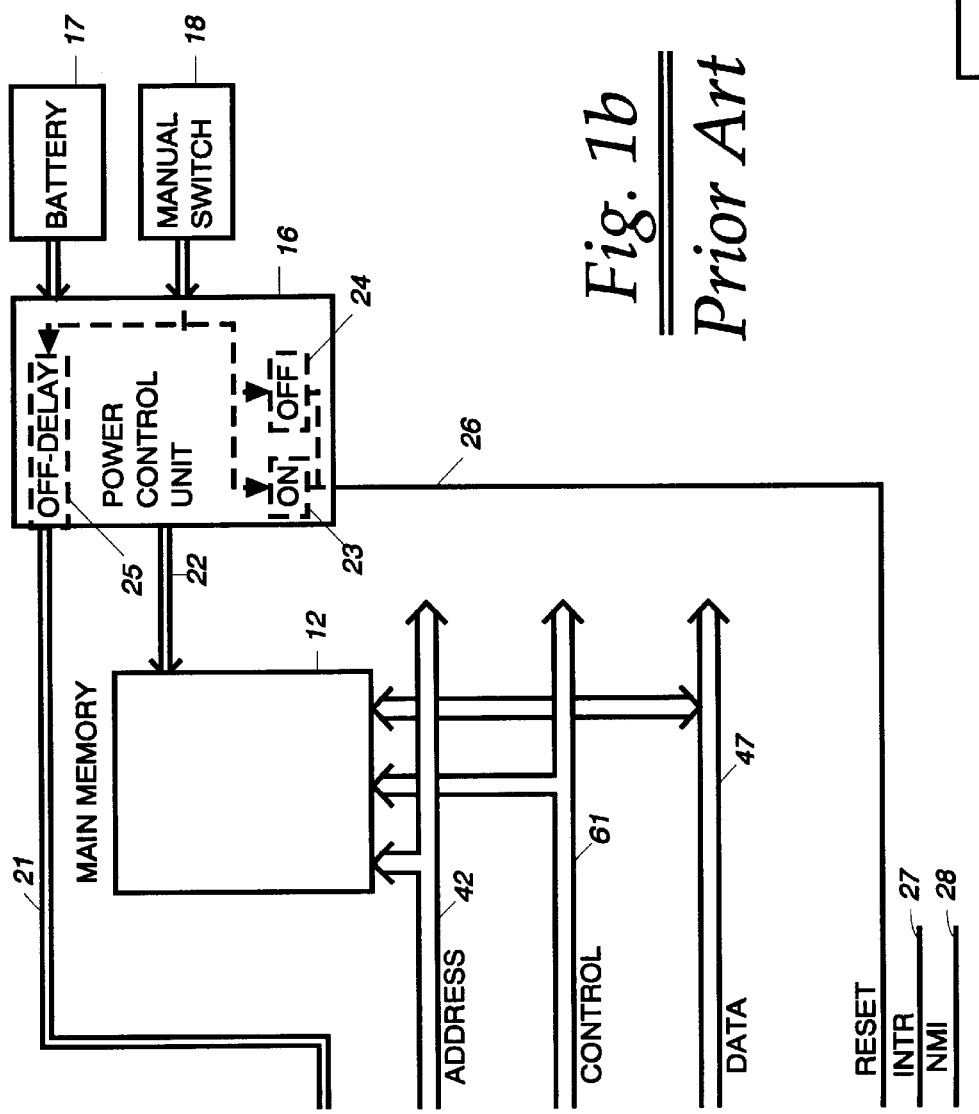

FIGS. 1A and 1B represent a block diagram of a conventional portable computer system 10 of the type commonly referred to as a "laptop" personal computer, which includes a processor 11, a main memory 12, a power control unit 16, a rechargeable battery 17, and a manually operable power control switch 18. The system 10 also includes a conventional keyboard and liquid crystal display (LCD), but these components are not essential to an understanding of the present invention and have therefore not been illustrated and described.

The main memory 12 is implemented with dynamic random access memory (DRAM). The main memory 12 is volatile, or in other words loses all information stored in it when power to it is turned off. During operation, the main memory 12 typically contains a series of instructions which constitute the program being executed by the processor 11, as well as data used by the program. The main memory 12 may in fact simultaneously store instructions and data for each of several different applications programs, for example a word processor, a spreadsheet, and a database manager.

While the manual switch 18 is actuated, the power control unit 16 supplies power at 21 to the processor from the battery 17, and supplies power at 22 to the main memory from the battery 17. In a conventional and not-illustrated manner, the power from the battery 17 is filtered, regulated and otherwise electrically conditioned, and is converted to various voltages required by respective system components.

The power control circuit 16 also includes a circuit 23 which, when the switch 18 is turned on, produces a reset signal for a predetermined period of time on a line 26 which is connected to the processor 11. After sufficient time has elapsed for power to have stabilized throughout the system, the circuit 23 deactuates the reset line 26. When the manual switch 18 is turned off, a circuit 24 produces a signal which is supplied to the reset line 26 and which is maintained until power in the processor 11 has dissipated, in order to prevent the processor 11 from processing data while it loses power and thus possibly generating and storing erroneous results. The power supplied at 22 to the main memory is not turned off in response to deactuation of the switch 18, but instead remains on so that information in the main memory 12 will not be lost. For example, in a laptop computer which does not have a floppy disk drive or a hard disk drive, maintaining the power at 22 to the main memory ensures that applications programs do not have to be tediously reloaded through a serial or parallel port each time the system is turned on. The power supplied at 21 to the processor 11, on the other hand, is turned off by a circuit 25 a short time interval after the manual switch 18 is deactuated, this time delay ensuring that the reset signal generated by circuit 24 has taken effect throughout the system before the supplied voltages begin to drop.

The processor receives two interrupt signals INTR and NMI on respective lines 27 and 28, the latter being a non-maskable interrupt which is handled with a higher priority than the former.

The processor 11 is a microprocessor implemented as a single monolithic integrated circuit, or as two or three monolithic integrated circuits which are designed specifically to cooperate with each other. The internal processor architecture shown in FIG. 1 is entirely conventional, and is therefore described only briefly herein for purposes of facilitating an understanding of the present invention. One conventional and commercially available microprocessor having this general type of architecture is the Model 80386-SX manufactured by Intel Corporation of Santa Clara, Calif.

The processor 11 includes a section 31, which contains all of the internal registers and flags of the processor, as well as an arithmetic logic unit (ALU). The majority of the registers and flags are not individually depicted, because they are conventional and their depiction is not essential for an understanding of the present invention.

During system operation, the processor 11 uses information in its registers and in instructions it is executing to periodically generate an effective address at 32, which is used by segmentation logic 33 to generate a linear address 36, which in turn is used by paging logic 37 to generate a physical address 38, the physical address 38 being supplied through a bus control unit 41 to an address bus 42 coupled to the main memory 12. The segmentation and paging functions performed by the circuits 33 and 37 are conventional and therefore not described in extensive detail. For purposes of the present invention, it is sufficient to understand that each circuit typically modifies the address presented to it through translation or mapping. Consequently, it is common for the physical address at 38 to be different from the linear address at 36, and for the linear address 36 to in turn be different from the effective address at 32. The section 31 includes special registers which control the segmentation and paging functions, and control signals derived from these registers are supplied at 43 to the circuits 33 and 37.

The section 31 containing registers and flags is coupled by data lines 46 through the bus control unit 41 to a bidirectional data bus 47, the data bus 47 being coupled to the main memory 12.

The processor 11 includes a control unit 51, the operation of which is controlled by a microcode program 52. As is conventional, when the processor 11 is to execute one of the instructions of the program stored in memory 12, the execution of the instruction is implemented by carrying out several substeps or sub-instructions defined by the microcode 52. As a program instruction from the memory 12 is read into the processor 11 across data bus 47, the operation code is supplied from the lines 46 to an instruction decode circuit 53, which in turn supplies at 56 to the control unit 51 decoded information regarding the particular instruction so that the control unit 51 will carry out the substeps in the microcode 52 which together constitute execution of the program instruction. The control unit 51 provides control signals at 57 to the section 31 containing the registers, flags and ALU, for the purpose of manipulating the registers, flags and ALU in an appropriate manner for each instruction being executed. The control unit 51 also produces additional control signals at 58, which are supplied through the bus control unit 41 to a control bus 61, which is coupled to the main memory 12. A request prioritization circuit 62 coordinates the handling of respective signals such as the reset signal 26, the INTR interrupt signal 27, and the NMI interrupt signal 28.

One of the registers present in the section 31 is an instruction pointer 66, which contains an address corresponding to the next program instruction in memory 12 which is to be executed. The section 31 also includes several debug registers, one of which is shown at 67 and is connected to a comparator 68. The comparator 68 compares an address present in the debug register 67 to information received at 69 from the bus control unit 41 regarding addresses being accessed via the buses 42, 47 and 61. If the comparator 68 determines that an address being accessed across these buses is identical to the address stored in register 67, the comparator 68 generates an exception signal on a line 71 connected to the control unit 51, and in response to the signal 71 the control unit 51 shifts program execution to a different program portion in the main memory 12 which is an exception handling routine.

The processor 11 is capable of operating in two or more modes, namely an unrestricted mode and one or more restricted modes. In the unrestricted mode, the program in the main memory 12 which the processor 11 is currently executing has generally unrestricted capability to access all of the registers and flags of the processor 11, to access all of the locations of the main memory 12, and to execute each of the instructions which the processor 11 is capable of executing. In contrast, in a restricted mode, the program being executed will typically be prevented by the processor 11 from changing certain registers and/or flags, from accessing certain portions of the main memory 12, and from executing certain instructions, such as instructions which would change the registers or flags the program is not permitted to change. For processors which have more than one restricted mode, the various modes represent progressively stricter levels of restriction regarding the capabilities of the processor which the currently-executing program is permitted to utilize.

As an example of where a restricted mode and an unrestricted mode might be utilized, assume that the main memory 12 has four portions which respectively contain program instructions for an operating system and for three different application programs, such as a word processor, a spreadsheet and a database manager. Assuming that the operating system is operating in the unrestricted mode, as a part of the process of turning control over to the word processing program, the operating system would set the registers controlling the segmentation and paging circuits 33 and 37 so that these circuits are permitted to access the portions of the main memory 12 which contain the instructions and data for the word processing program, but are prevented from accessing the portions of main memory 12 storing the operating system, spreadsheet and database manager. When control is returned from the word processing program to the operating system, the unrestricted mode in which the operating system executes is restored, and thus the operating system can change the control registers for the segmentation and paging circuits 33 and 37 so they permit accesses only to the instructions and data of the spreadsheet program, while turning control over to the spread sheet program and simultaneously instituting a restricted mode.

The section 31 includes a mode register 74 in which the processor maintains an indication of the current operational mode. A reset signal on line 26 forces the mode register 74 to the unrestricted mode. When the mode register 74 indicates that restrictions are in effect, a protection circuit 76 looks for violations of these restrictions. For example, the protection circuit 76 monitors the decoded signals 56 from the circuit 53, in order to determine whether an instruction which is about to be executed is a prohibited instruction for the current level of restriction. Similarly, the protection circuit 76 monitors line 77 from the section 31 in order to detect any attempted access to a register, flag or memory address which is prohibited by the restrictions currently in effect. If the protection circuit 76 detects any violation, it produces an exception signal at 78 which, like the exception signal 71, causes the processor 11 to shift program execution to a special program section provided in the memory 12 to handle protection violations.

Figure 2:
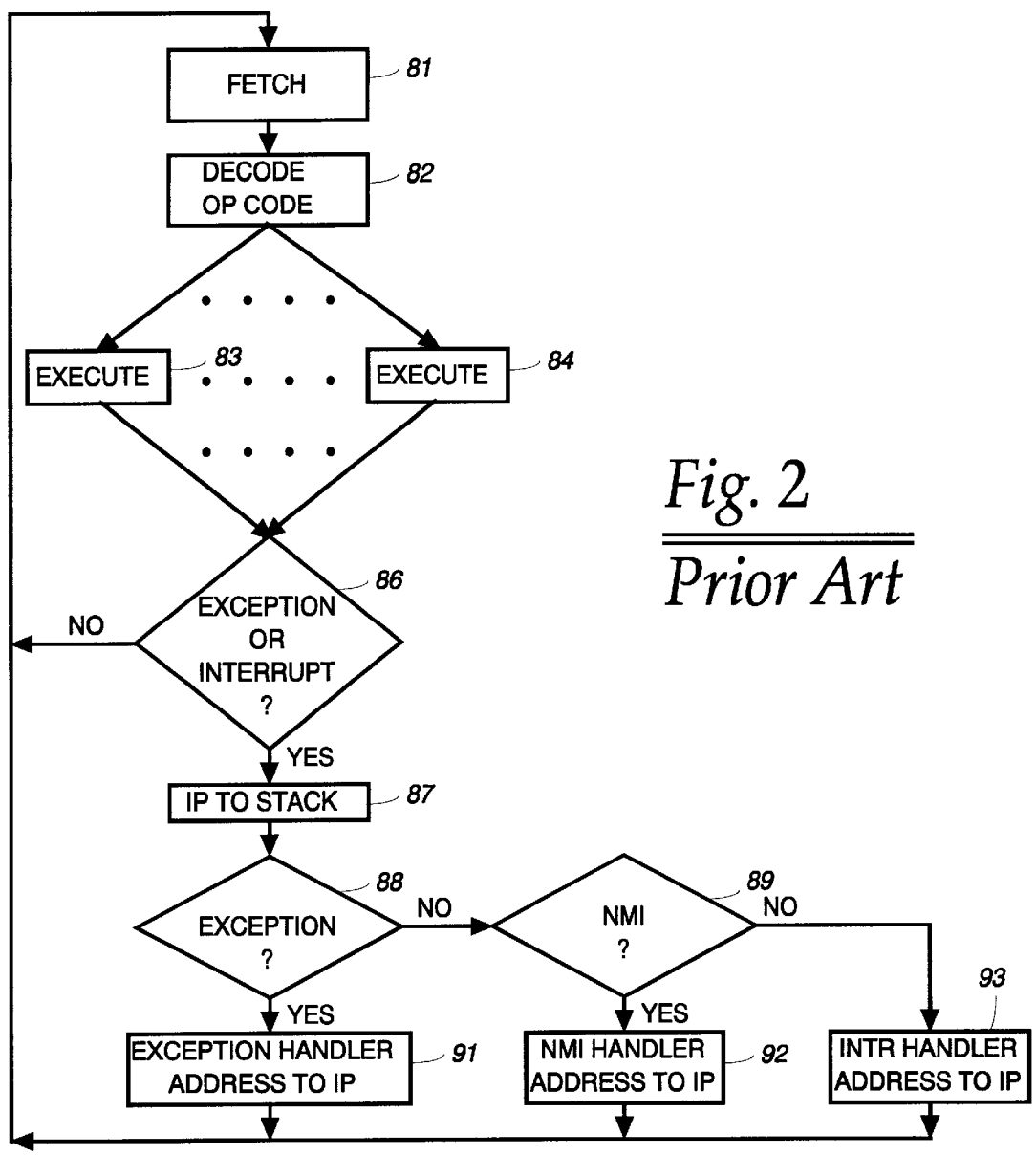
FIG. 2 is a flowchart of conventional microcode embedded in a processor of the embodiment of FIG. 1.

FIG. 2 is a flowchart showing in a simplified and conceptual form a portion of the microcode 52 of the control unit 51. In block 81, the control unit 51 produces at 57 and 58 in FIG. 1 the control signals which cause a program instruction to be fetched from the main memory 12 to the processor 11. Then, at block 82, the operation code of the instruction is decoded by the circuit 53. Then, depending on the particular instruction, a respective separate portion of the microcode is executed in order to effect execution of the specific program instruction, two of these portions being shown diagrammatically at 83 and 84. Then, at 85, the control unit 51 checks to see if an exception has just occurred at 71 or 78 or if an interrupt has just occurred at 27 or 28. If not, the next program instruction is fetched at 81. Otherwise, the instruction pointer register 66 is saved on a stack in the memory at 87, and then at 88 and 89, control is shifted to one of three microcode portions 91–93 which each load into the instruction pointer the starting address of a respective program portion in the memory 12 which will handle the respective condition which has occurred. Control then returns to 81, where the instruction fetched is the first instruction of the handler routine.

Those of ordinary skill in the art will recognize that it is possible to carry out the fetch 81 and decode 82 of the next instruction which is expected to be executed while the processor is carrying out execution of the current instruction at 83 or 84. Thus, the separate block of FIG. 2 are not intended to imply that the events shown therein must occur at different points in time, but are merely intended to illustrate the basic sequence of events which typically occurs in a cyclic manner within the microcode controlled control unit.

Figure 3:
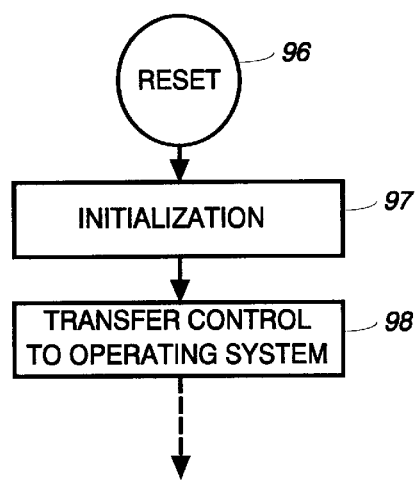
FIG. 3 is a flowchart of a conventional program used in the embodiment of FIG. 1.

FIG. 3 is a flowchart of the events which happen when power to the system is turned on. In particular, the circuit 23 (FIG. 1) of the power control unit 16 generates a reset signal on line 26, which resets the processor 11 so that it starts at 96 in FIG. 3. When the reset signal terminates, the processor 11 begins operation at a predetermined address in the memory 12, which is the start of a short routine causing it to carry out some system initialization, as shown in block 97 of FIG. 3. Then, control is shifted to the resident operating system at 98, which typically gives the user an opportunity to manually select, load and start one of several different application programs.

As evident from the foregoing discussion, the protection capabilities of the processor 11 are highly advantageous in multi-tasking situations where instructions and data for different application programs are simultaneously present in respective portions of the memory 12. This essentially permits an operator to build a customized or personalized computing environment in which each of his or her favorite application programs are all loaded and ready to run, and thus the user can quickly and conveniently switch between them with a minimal number of keystrokes. Various multi-tasking operating environment programs are now available, including for example WINDOWS from Microsoft and OS/2 PRESENTATION MANAGER from International Business Machines.

A desirable extension of this concept of a personalized operating environment is the implementation in association with it of what is commonly called suspend/resume capability, which has previously been implemented only in systems where the processor did not have a protection mechanism with a restricted mode and thus always operated in an unrestricted mode, namely systems intended for use with single-tasking programs such as Disk Operating System (DOS) available from Microsoft and from International Business Machines.

According to the basic suspend/resume concept, when the system is to be powered down, the exact status of the system is saved in a memory and is maintained through use of a back-up battery until the system is powered-up again, at which point the status is restored and execution resumes from the point at which it was terminated when the power was turned off. Thus, if a user was in his word processing program when he turned the power off, then when the power is turned back on he will find himself looking at the same screen displaying the same document with the cursor at the same location as at the point in time when power was turned off.

As to existing microprocessors which have protected mode capability and are thus suitable for use in multi-tasking environments, such as the processor 11 of FIGS. 1A and 1B, the basic problem in implementing suspend/resume is that, when power is turned off, an application program will typically be executing under a restricted mode which prevents the unrestricted access needed to registers, I/O and memory in order to store the entire current state of the system. For example, certain registers cannot be accessed and saved because of the restricted mode which is in effect, and unrestricted addressing of the I/O and memory may not be possible as a result of the restricted mode which is in effect. With respect to addressing, it should be understood that if a program is attempting to store the state of the system at a known address in memory, the segmentation and paging circuits 33 and 37 may scramble the known address so that the state of the machine is actually stored at an unknown address different from the known address, and when the system was subsequently turned back on it would have no way of knowing the unknown address the information had been stored. The protection mechanism, of course, prevents the control registers for the paging and segmentation circuits 33 and 37 from being changed in order to avoid the problem. In short, saving the state of a processor requires some capability for unrestricted system access at a point in time when a restricted mode is in effect to facilitate execution of an application program, whereas existing protection mechanisms have been very carefully designed to absolutely prevent any such unrestricted access so that it is completely impossible for one application program to inadvertently alterer any portion of the instructions or data of another application program.

As mentioned above, the foregoing discussion of FIGS. 1A–3 relates entirely to a hardware and software arrangement which is conventional. The present invention involves an improvement of this conventional arrangement which permits suspend/resume capability to be implemented in a multi-tasking processor environment which utilizes a protection mechanism having restricted mode capabilities. Such an arrangement which embodies the present invention is shown in FIGS. 4A–6, and is described in detail below.

Figure 4A:
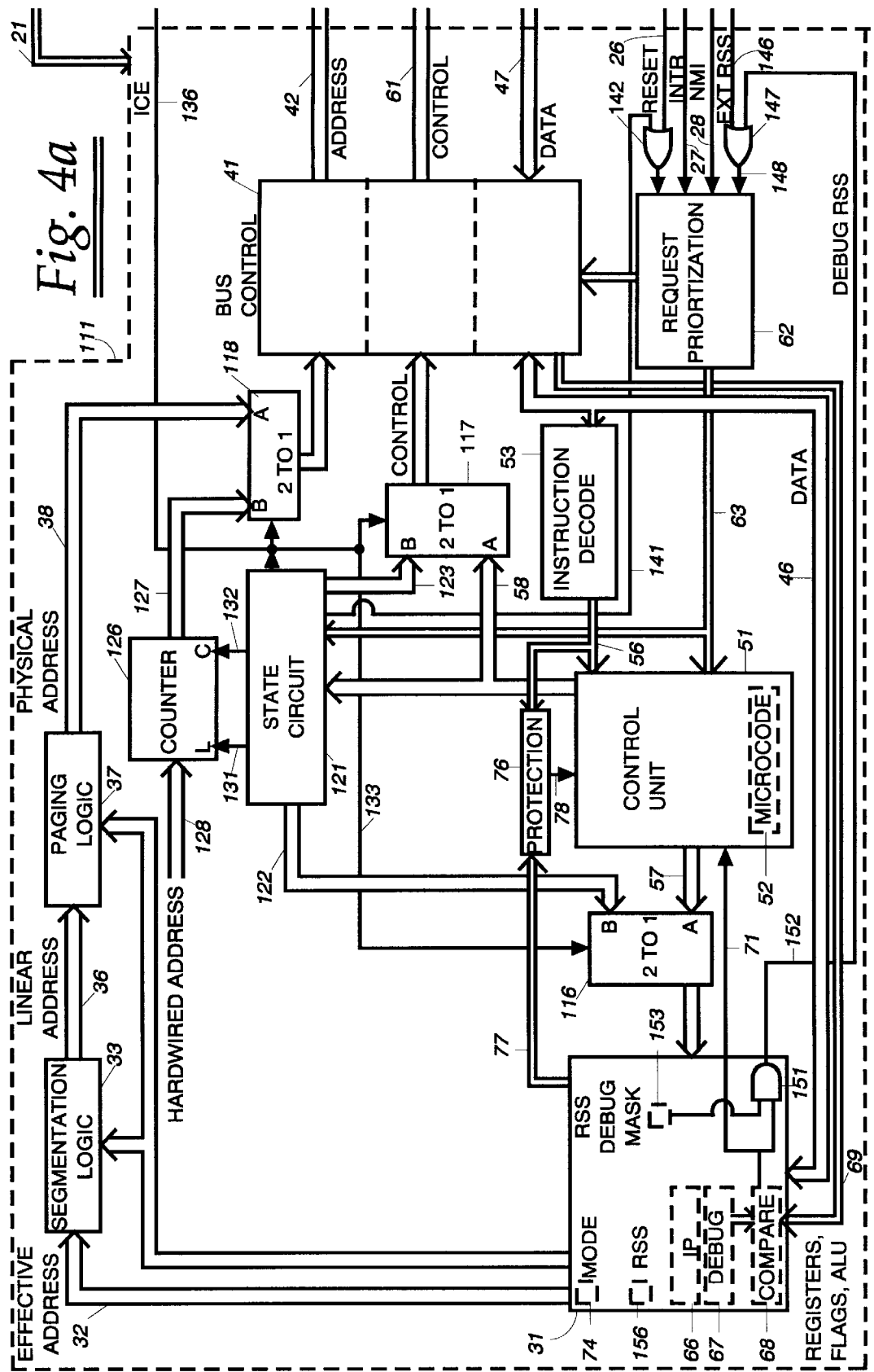

FIGS. 4A and 4B represent a computer system 110, in which elements equivalent to elements of FIGS. 1A and 1B are designated with the same reference numerals used in FIGS. 1A and 1B. The memory 12, power control unit 16, battery 17 and manual switch 18 are all identical to those in FIGS. 1A and 1B. The processor 111 includes all of the elements present in the processor 11 of FIGS. 1A and 1B, as well as some additional elements which are discussed in detail below.

More specifically, the processor 111 includes a two-to-one selector 116 having two inputs ports A and B, the control signals 57 from the control unit 51 being connected to the input port A, and the outputs of the selector 116 being connected to register section 31 in place of the signals from control unit 51. The control signals 58 from the control unit 51 are connected to the A input port of a further two-to-one selector 117, the outputs of this selector being connected to the bus control unit 41. The physical address lines 38 from the paging circuit 37 are connected to the A input port of a third two-to-one selector 118, the outputs of this third selector being connected to the bus control unit 41.

A state circuit 121 has control outputs 122 which are coupled to the B input port of the selector 116, and has control outputs 123 which are connected to the B input port of the selector 117. A binary counter 126 has outputs 127 which are connected to the B input of the selector 118, and the inputs of the counter 128 are hard-wired so as to constantly present to the input of the counter a predetermined address. The state circuit 121 produces a load control line 131 which, when pulsed, causes the counter 126 to be loaded with the hard-wired address present at 128, and has a count control line 132 which, when pulsed, causes the counter 126 to increment. The state circuit 121 also generates a select control signal 133 which is connected to a control input of each of the two-to-one selectors 116, 117 and 118. The two-to-one selectors 116–118 each supply to their output lines the signals present at the A input port thereof when the select control line 133 is deactuated, and each supply to their output lines the signals present at the B input port thereof when the select line 133 is actuated. The select control line 133 is also connected to an external pin 136 on the integrated circuit package for the processor 111, to serve as an ICE signal for a purpose discussed later.

It will be noted that, when the select line 133 is actuated, the control unit 51 is functionally disconnected from the rest of the processor 111. In particular, the state circuit 121 can control the register, flag and ALU section 31 through the selector 116, and supplies control signals to the bus control unit 41 through the selector 117. Further, the segmentation and paging circuits 33 and 37 are effectively bypassed, because addresses are supplied from the counter 126 through the selector 118 to the bus control unit 41.

The state circuit 121 also produces a reset output line 141 which is connected to one input of a two-input OR gate 142, the output of the OR gate 142 being connected to the reset input of the prioritization circuit 62, the other input of the gate 142 having applied thereto the reset signal produced on line 26 from the power control unit 16.

At the power control unit 16, the output of circuit 24 is not connected to the reset line 26 as it was in the embodiment of FIGS. 1A and 1B. Instead, the output of circuit 24 drives a new line 146, which serves as an external request for a state save (EXTRSS) of the processor. This EXTRSS line 146 is connected to one input of a two-input OR gate 147, the output 148 of which serves as a new input to the circuit 62 and is effectively treated by the processor 111 like a non-maskable interrupt having a higher priority than either of the pre-existing interrupts INTR and NMI on lines 27 and 28. When an RSS interupt is being serviced, the pre-existing interrupts INTR and NMI are ignored, and if present are serviced after the RSS has been serviced. The register section 31 includes a request state save (RSS) debug mask 153, which is preferably a single unused bit in a pre-existing internal control register of the processor. This mask bit 153 is connected to one input of a two-input AND gate 151, the other input of which is coupled to the exception signal 71 from the comparator 68, the output 152 of gate 151 being coupled to the other input of the OR gate 147.

The register section 31 also includes an RSS register 156, which is preferably two unused bits of a pre-existing internal control register of the section 31. One of these bits is called the RSS flag, and as described in more detail below, the state circuit 121 automatically sets this flag each time an interrupt occurs at the new RSS interrupt input 148. At the point in time when this flag is set, the other bit of this register is loaded with the state of line 152, to provide a software-testable indication of whether the interrupt at 148 was produced by a signal from gate 151 or, alternatively, by a signal from circuit 24 in the power control unit 16. The RSS register 156 is not changed by a reset signal from gate 142.

Figure 5:
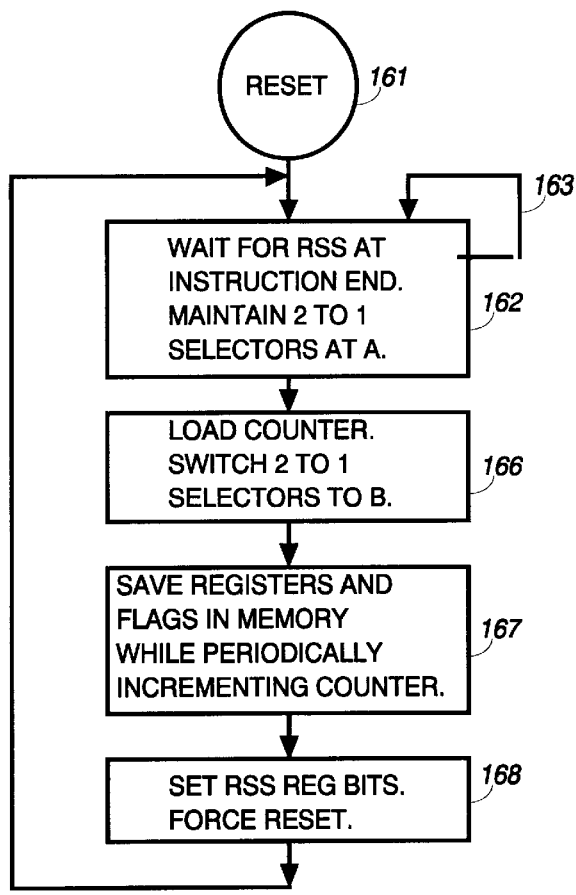
FIG. 5 is a state diagram for a state machine which is a component of the embodiment of FIG. 4.

FIG. 5 is a state diagram showing diagrammatically the operation of the state circuit 121. Those of ordinary skill in the art are thoroughly familiar with techniques for building a state circuit which will implement the state diagram shown in FIG. 5, for example the techniques taught in the book "Switching and Finite Automata Theory" by Zvi Kohavi, published in 1970 by McGraw-Hill Book Company of New York. Thus, the internal structure of the state circuit 121 is not illustrated and described in detail, but the state diagram of FIG. 5 is described below in detail.

In particular, following a power-up reset signal on line 26 (FIGS. 4A and 4B), the state circuit proceeds from initial state 161 to state 162, where it monitors the signals 63 from the circuit 62 and the signals 58 from the control unit 51, looking for a request state save (RSS) interrupt at 148 at the end of execution of a program instruction by the control unit 51, while simultaneously maintaining the signal 133 in a deactuated condition so that the two-to-one selectors 116–118 each supply their A input port to their output. So long as this condition of interest does not occur, the state circuit 121 remains in state 162, as shown diagrammatically at 163. However, when an RSS interrupt is eventually found to exist at the end of execution of a program instruction, the state circuit 121 transitions from state 162 to state 166, where it produces a pulse on output line 131 to load the hard-wired address 128 into the counter 126, while activating the select control line 133 to switch each of the two-to-one selectors 116–118 so that each is supplying the signals from its B input port to its outputs.

The state machine 121 then unconditionally transitions to state 167, where it generates control signals at 122 and 123 which cause the registers and flags of the section 31 to be successively supplied across data lines 46, through bus control unit 41 and across data bus 47 to the main memory 12, where they are stored in a portion 169 of the main memory 12 reserved for this purpose. The portion 169 of memory 12 begins at the hard-wired address defined at 128. As the registers and flags are being successively supplied to the memory, the state circuit 121 periodically pulses the line 132 in order to increment the counter 126 and thereby present a series of progressively increasing addresses to the memory 12, so that the register and flag information is stored in successive locations of the memory 12.

When all of the registers and flags have been stored in portion 169 of memory 12, the state machine 121 transitions unconditionally in FIG. 5 from block 167 to block 168, where it produces control signals at 122 which affect the two bits of the RSS register 156, in particular by forcibly setting the RSS flag bit and by loading into the other bit the state of line 152. Simultaneously, the state circuit 121 actuates line 141 in order to force a reset by means of gate 142. The purpose of the reset is to put the processor into a known state, which includes putting it into the unrestricted mode of operation. The reset, of course, forces the state circuit 121 back to state 163, where it deactuates the line 133 in order to switch the two-to-one selectors back to their A input ports. This reset forces the mode register 74 to a state selecting the unrestricted mode, but has no effect on the RSS register 156. The reset also causes the control unit 51 to respond in exactly the same manner as it would to a power-up reset, in particular by executing an instruction at a predetermined address in the memory 12, which is the first instruction of a software routine present in the memory 12.

Figure 6:
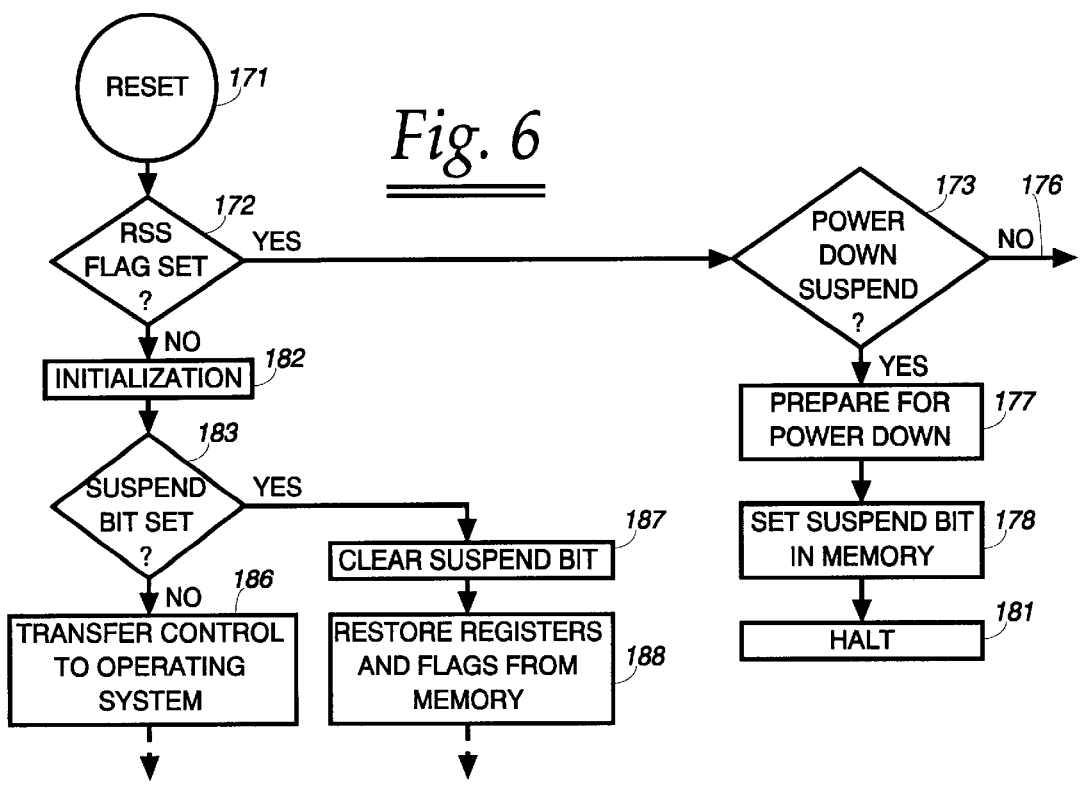
FIG. 6 is a flowchart of a program executed by the computer system of FIG. 4.

A flowchart of this software routine is shown in FIG. 6, and is a modified version of the conventional routine shown in FIG. 3. In particular, following the reset, this routine proceeds from 171 to 172, where it checks the RSS register 156 to see if the RSS flag bit is set. If it is, then the software routine proceeds to block 173, where it checks the other bit of the RSS register 156 in order to determine the source of the RSS condition. If the bit is set because the line 152 was actuated, then control would proceed at 176 to an appropriate software routine to handle the debug RSS.

On the other hand, if the RSS interrupt was caused by actuation of line 146 by power control unit 116 in order to indicate that the switch 18 has been deactuated and that power to the processor 111 is being turned off, control proceeds from block 173 to block 174, where the processor does any housekeeping necessary to prepare for a power loss. In particular, the entire state of the processor itself has already been saved, but the processor may need to save the states of peripherals which may be present, or take some other appropriate action. Then, at 178, the processor sets a suspend bit 179 in a reserved location of the main memory 12, in order to indicate that the suspend portion of a suspend/resume operation has been performed, so that when power is again turned on the system will know that it can perform the complementary resume operation. The processor 111 then halts at 181, and waits for the power control circuit 16 to terminate the power supplied to the processor at 21. After terminating power at 21, the power control unit 16 continues to supply power from battery 17 to main memory 12, in order to maintain all of the data stored in main memory 12.

When power is subsequently turned back on, the power control unit 16 will produce a power-up reset on line 26 in the usual manner, so that the control unit 51 again causes program execution to begin at 171 in FIG. 6. Due to the power loss, the RSS flag bit of the register 156 will not be set, and thus control will proceed from block 172 to block 182, where the usual system initialization is carried out. Then, at block 183, the suspend bit at 179 in the main memory 12 is checked. In the event this bit were not set, because no suspend operation had been done when the power was turned off, control would proceed to block 186 where the operating system would be started in the usual manner. However, where it is found at 183 that the suspend bit is set, control proceeds to block 187 where the suspend bit is cleared, and then to block 188 where the processor executes a series of instructions which successively restore the register and flag states saved in portion 169 of the memory 12 to the various registers and flags in the section 31. The last register to be restored is the instruction pointer register, because loading the instruction pointer register with its saved value will cause the next instruction fetched to be the next instruction to be executed in the application program which was interrupted by the power loss. Thus, the application program continues running from the point at which it was interrupted, as if it had never been interrupted at all.

Referring again to FIGS. 4A and 4B, it was mentioned above that the signal 133 produced by the state circuit 121 to control the two-to-one selectors 116–118 is also connected to an external pin ICE at 136 of the physical package for the integrated circuit of the processor 111. This facilitates use of an in-circuit emulator with the processor 111. The pin 136 is actuated at the point in time where the state circuit 121 disables the outputs of the control unit 51 in order to control saving of the current status of the processor 111 in the portion 169 of memory 12. Consequently, when a not-illustrated in-circuit emulator recognizes that the signal on pin 136 has been actuated, it can disconnect the busses 42, 47 and 61 of the processor from external devices such as the memory 12, and couple these busses to its own control RAM. Then, as the processor performs the state-save process, the register and flag information will be recorded in the emulator RAM. The in-circuit emulator can then easily examine and/or change the information in the emulator RAM.

The gate 151 has been provided in order to enhance the debugging capabilities provided by an in-circuit emulator. In particular, the emulator can adjust the information in its RAM corresponding to the debug register 67 to specify an address in a software program at which execution is to be stopped, and can also set the bit in its RAM corresponding to the debug mask register 153, and can then cause the CPU register and flag status to be restored so that the processor 111 continues with the application program. When an access is made to the address specified in debug register 67, the comparator 68 actuates its output 71 which, through gate 151, produces an RSS interrupt at 148 to cause the state circuit 121 to perform the state-save operation, during which the in-circuit emulator causes the state-save information to be directed to its own RAM in the manner described above. The emulator will then have readily available in its RAM the status of all registers and flags in the processor 111 at the point in time when the processor attempted to access the address of interest. In this manner, the in-circuit emulator could single-step through the instructions of a program, while permitting a programmer to freely and easily examine the status of all of the internal registers and flags of the processor 111 despite the fact that they are physically embedded within a monolithic integrated circuit.

It will be noted that the embodiment of FIGS. 4A and 4B requires no change at all to the microcode 52 of the control unit 51, the microcode 52 being identical to that for the embodiment of FIG. 1.

Figure 7A:
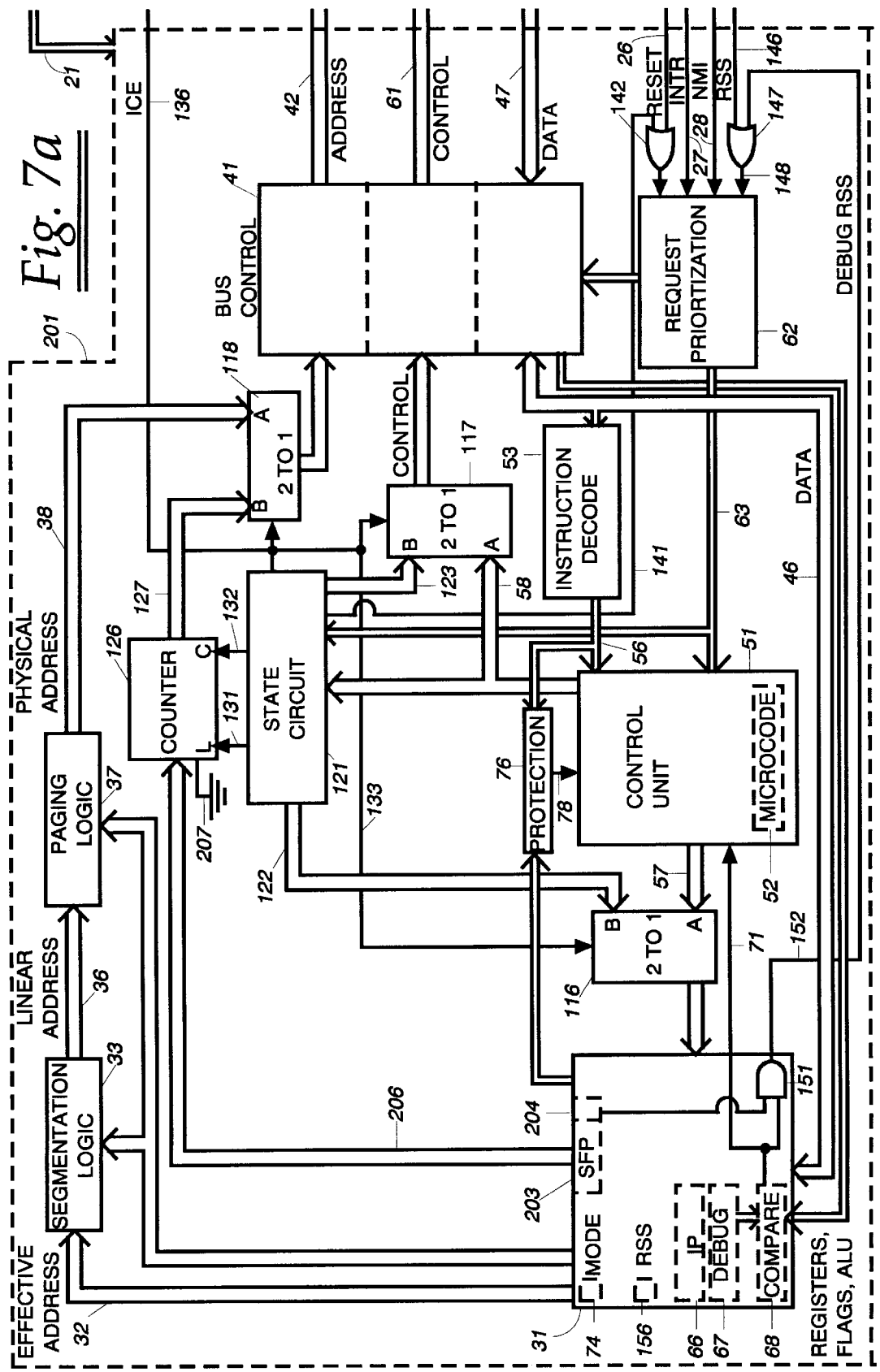
FIGS. 7A and 7B is a block diagram of an alternative embodiment of the computer system of FIG. 4.
Figure 7B:
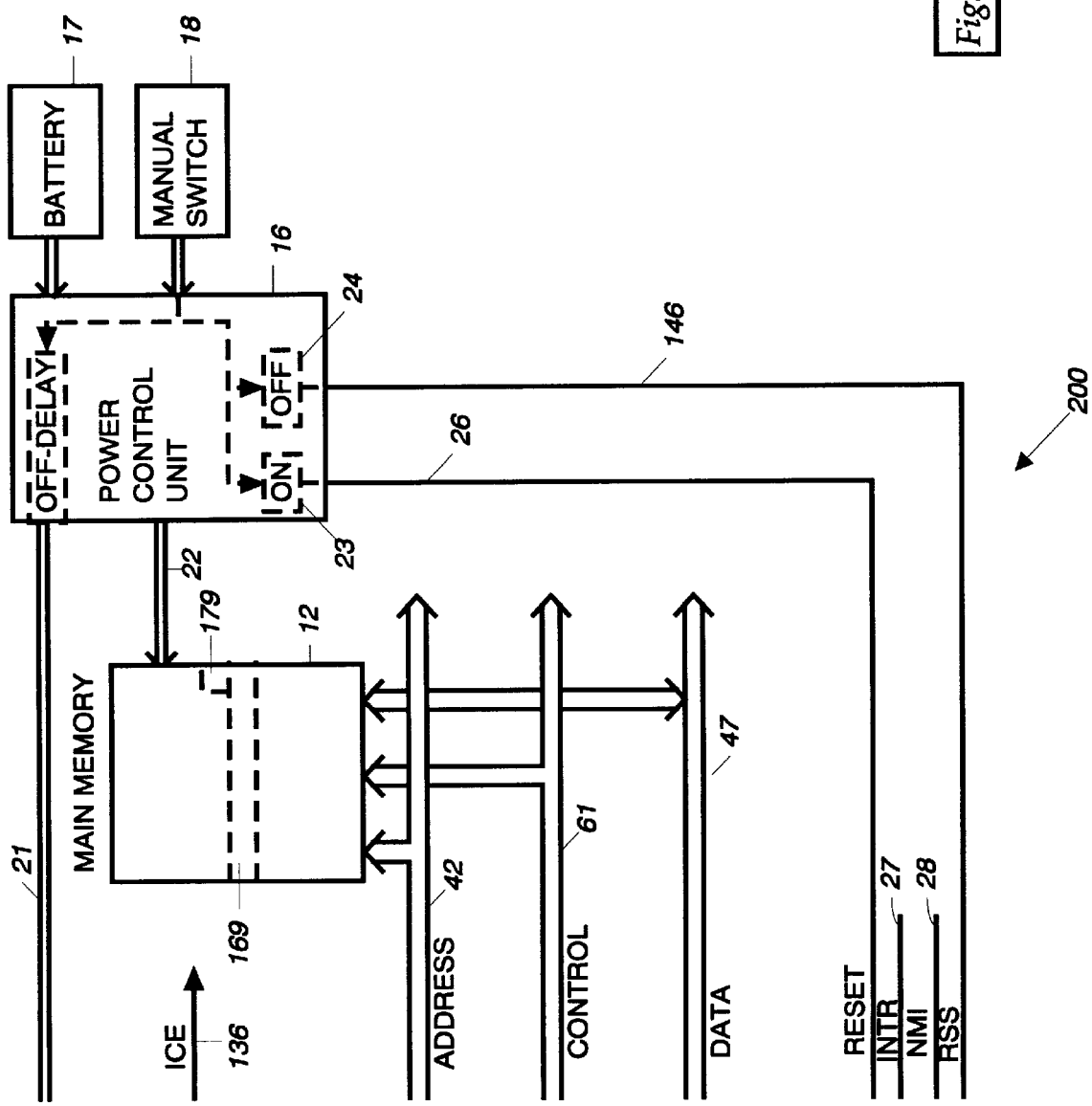

Use of the hard-wired address at 128 might be inconvenient in some applications, and for those applications it would be desirable to be able to selectively specify the beginning address of the portion 169 of the memory 12. FIGS. 7A and 7B is a modification of the embodiment of FIGS. 4A and 4B which provides this feature. FIGS. 7A and 7B is identical to FIGS. 4A and 4B except as described hereinafter, and elements in FIGS. 7A and 7B equivalent to those in FIGS. 4A and 4B have been designated with the same reference numerals.

In FIGS. 7A and 7B, a new save frame pointer (SFP) register 203 has been provided in the register section 31, the least significant bit 204 of this register being used as the mask bit which can enable and disable the gate 151. All outputs of the register 203 except the least significant bit are connected at 206 to the inputs of the counter 126, the least significant input bit of the counter being connected to ground at 207. Thus, by properly loading the SFP register 203, the portion 169 of the memory 12 can be selectively placed almost anywhere which is convenient within the memory 12, except that the starting address must always be on an even-byte boundary as a result of the fact that the least significant bit of the starting address is grounded at 207.

Figure 8:
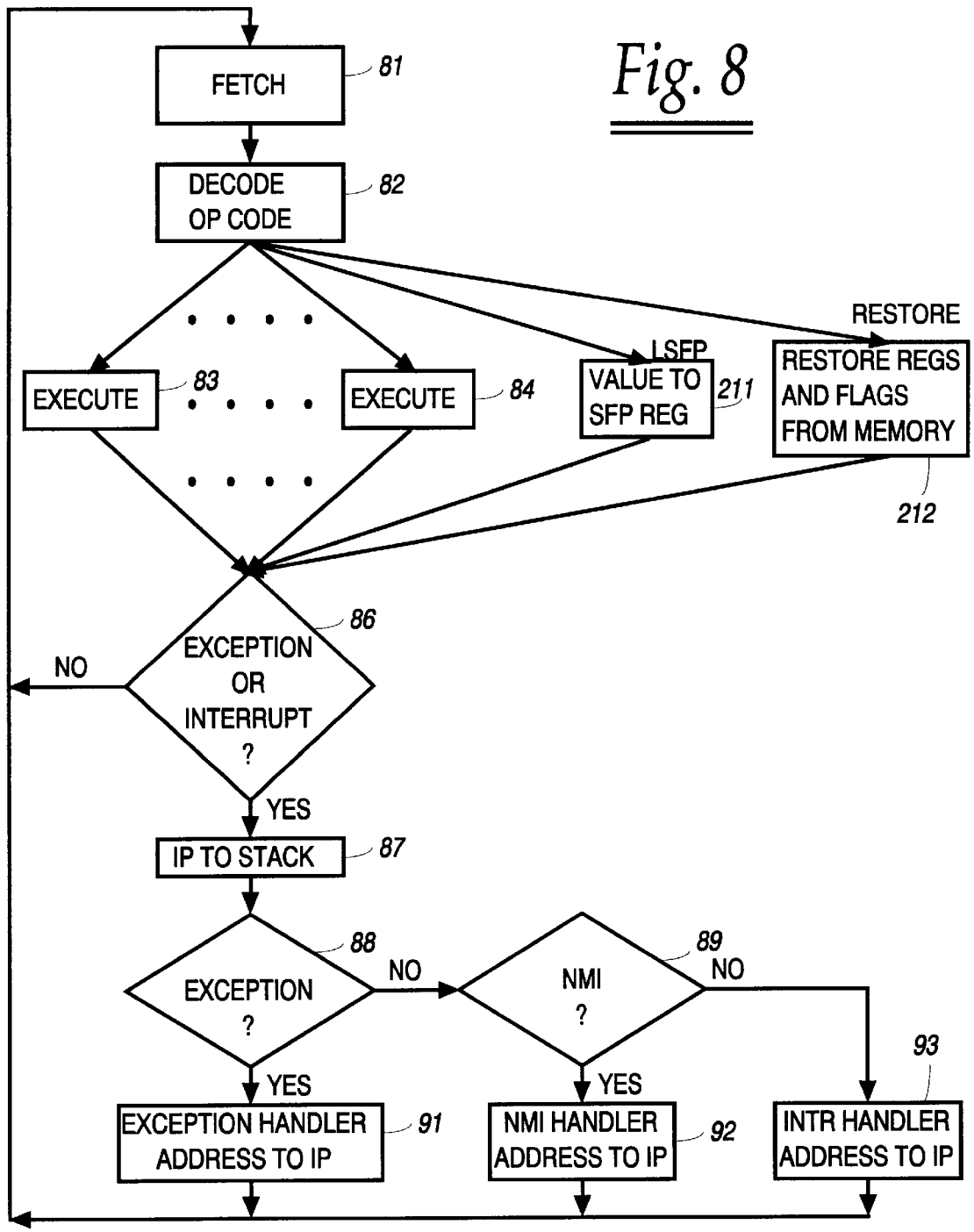
FIG. 8 is a flowchart of microcode embedded in a processor of the embodiment of FIG. 7.

In order to load the special new SFP register 203, a new load save frame pointer (LSFP) program instruction is provided, which of course necessitates a modification to the microcode 52. The modified microcode for the embodiment of FIGS. 7A and 7B is shown in FIG. 8. FIG. 8 includes all of the blocks depicted in the conventional microcode of FIG. 2, and they are labelled with the same reference numbers. In addition, however, FIG. 8 includes a new block 211 corresponding to execution of the new LSFP instruction. Further, FIG. 8 includes a second new block 212 which corresponds to execution of an additional new instruction RESTORE. The RESTORE instruction automatically extracts the stored processor status from portion 169 of the memory 12 and restores it to all registers and flags in the section 31 of processor 201. This is much faster and more efficient than executing a long series of software program instructions which progressively restore the states of the respective registers and flags of the processor. The operation of the embodiment of FIGS. 7A and 7B is essentially the same as that described above for FIG. 4 in association with FIGS. 5 and 6, recognizing that the initialization sequence in block 182 of FIG. 6 would include execution of the new LSFP instruction in order to initialize the SFP register 203 of FIGS. 7A and 7B, and that the block 188 of FIG. 6 would be carried out simply by executing the new RESTORE instruction 212 (rather than a long series of pre-existing instructions) in order to restore the saved state of the processor to its registers and flags.

Figure 9B:
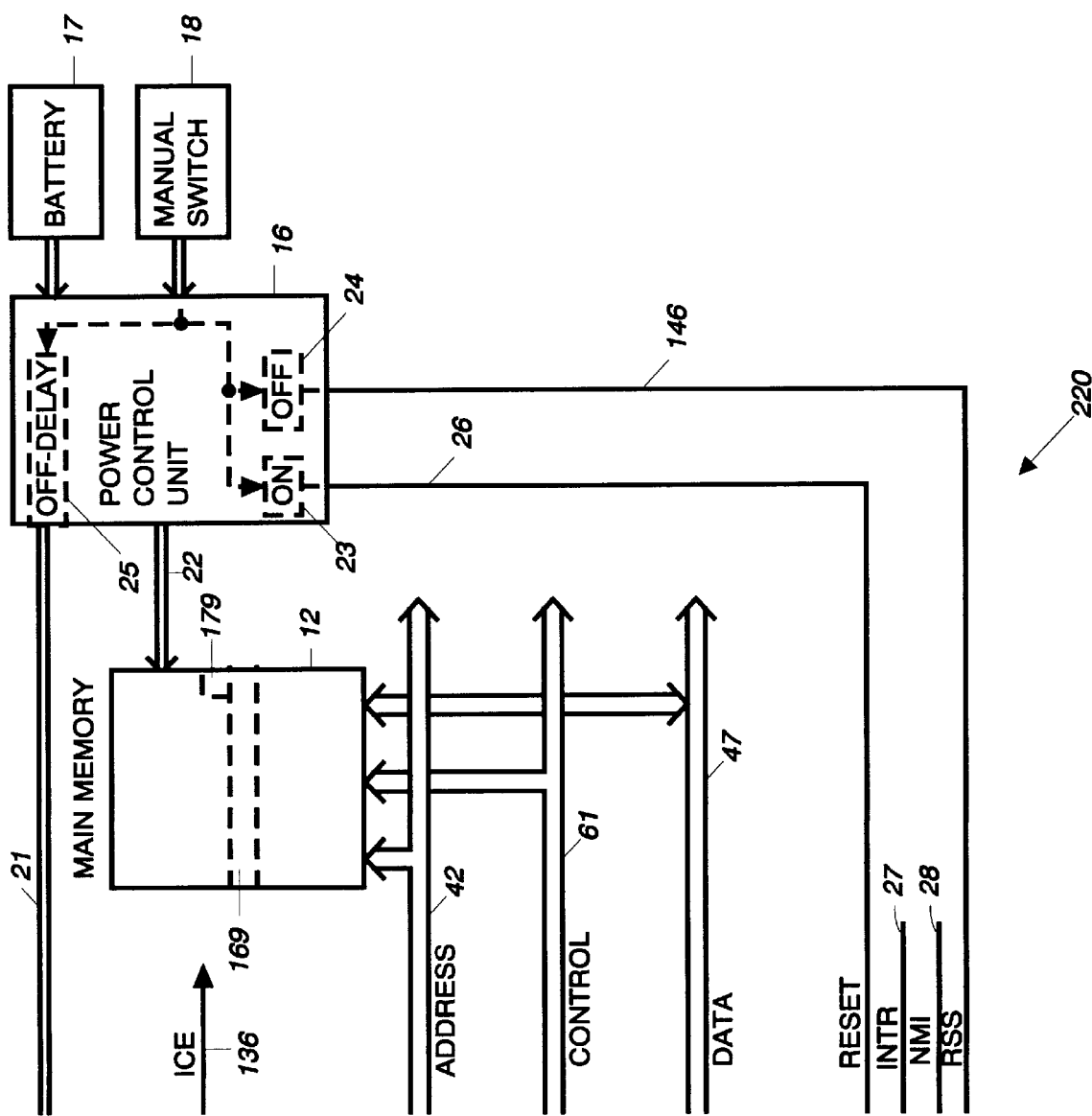

By modifying the microcode 52 somewhat more extensively, it is possible to have the state save operation controlled directly by the control unit 51, thereby avoiding the need to provide the state circuit 121 to control the state save. This approach is implemented in another modified version of the embodiment of FIGS. 4A and 4B, as depicted in FIGS. 9A and 9B. Elements in FIGS. 9A and 9B which are the same as elements in FIGS. 4A and 4B have been designated with the same reference numerals. However, it will be noted that certain elements such as the state circuit 121 and the two-to-one selectors 116 and 117 are not present in the embodiment of FIGS. 9A and 9B. The two-to-one selector 118 and the counter 126 remain, in order to permit the control unit 51 to bypass the address manipulation functions produced by the segmentation and paging circuits 33 and 37. The load counter and increment counter control lines 131 and 132 are produced directly by the control unit 51, as is the select control line 133 for the two-to-one selector 118.

Figure 10:
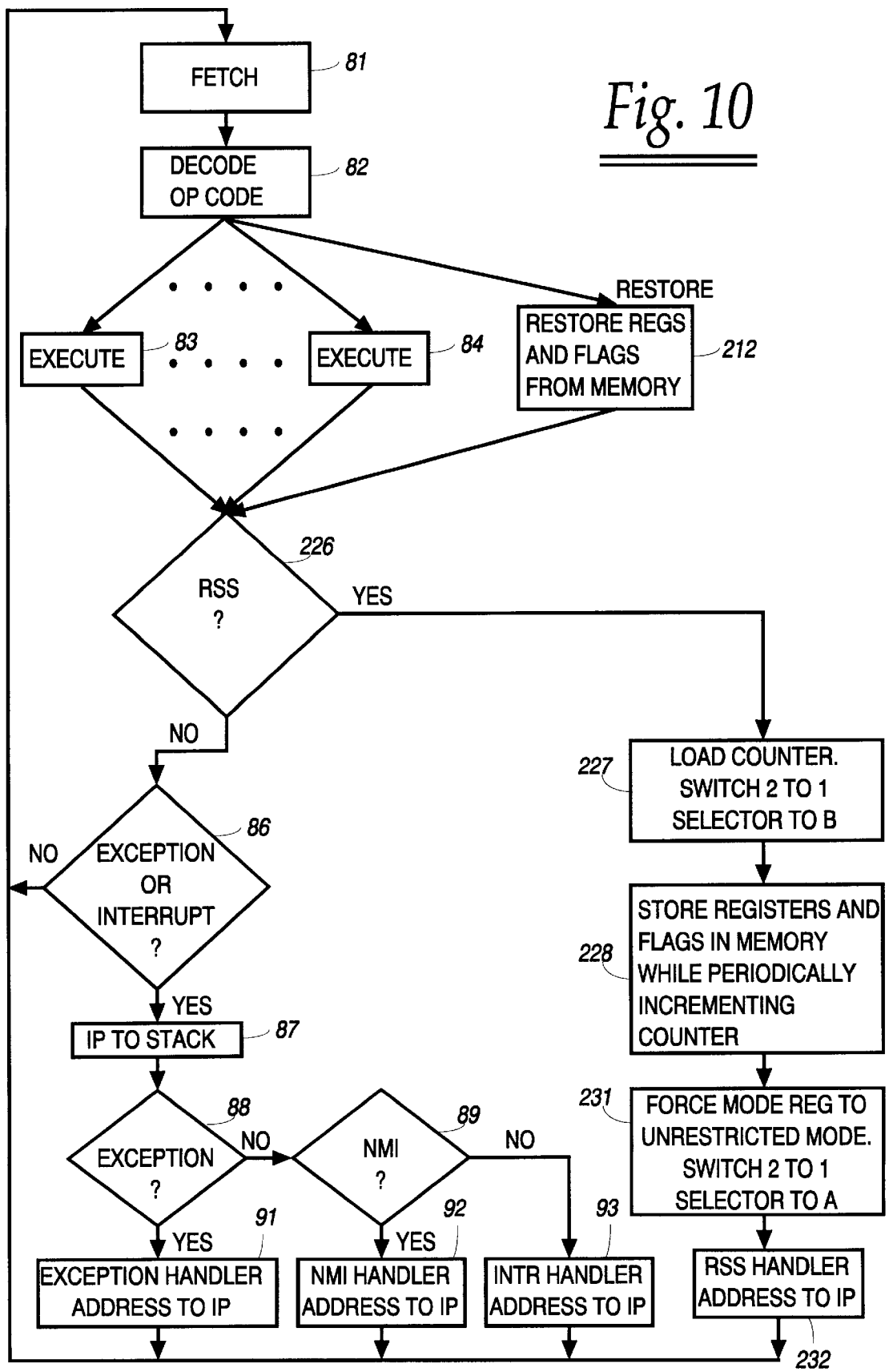
FIG. 10 is a flowchart of microcode which is embedded in a processor of the embodiment of FIG. 9.

The revised microcode for the embodiment of FIGS. 9A and 9B is shown in FIG. 10. Many of the blocks in FIG. 10 are equivalent to blocks in FIG. 8, and have therefore been designated with the same reference numerals. FIG. 10 does, however, include some new blocks. In particular, following execution of each program instruction, a check is made at 226 to see if an RSS interrupt has just occurred at 148 in FIGS. 9A and 9B. If not, control moves to block 86, and proceeds in the same manner as described above for FIG. 2. On the other hand, if it is determined at 226 that an RSS interrupt has just occurred, control proceeds to block 227, where the microcode causes control unit 51 to produce a pulse on line 131 which loads the counter 126 with the hard-wired address 128, and to actuate the control line 133 in order to switch the two-to-one selector 118 so that its outputs are supplied with signals from its B input port. Then, control proceeds to block 228, where the microcode causes the control unit 51 to successively route the registers and flags from the section 31 across data lines 46, through bus control unit 41 and across data bus 47 to memory 12, while periodically producing pulses on line 132 in order to increment the counter 126, so that the registers and flags are stored at successive locations in the portion 169 of memory 12. Then, the microcode proceeds to 231, where it forcibly resets the mode register 74 so that it selects an unrestricted mode. At the same time, it also deactuates the control line 133 to switch the two-to-one selector 118 back to its A input port. Then, at 232, it loads the instruction pointer 66 with a predetermined address in the memory 12 which contains the first instruction of a software routine for handling the RSS interrupt, and then returns to block 81 where this first instruction of the software routine is fetched.

Figure 11:
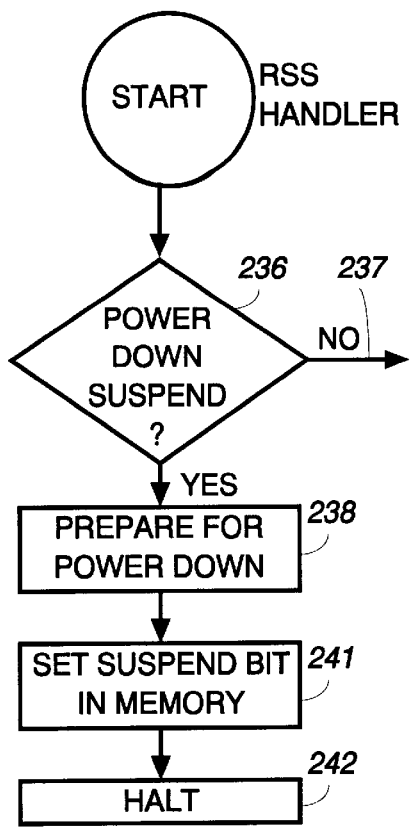
FIGS. 11 and 12 are flowcharts of respective portions of a program executed by the system of FIG. 9.

A flowchart of this software routine is shown in FIG. 11. This routine begins at 236 by checking the RSS register 156 to determine if the RSS interrupt was caused at 152 by a debug exception or at 146 by a power-down signal. In the event of a debug exception, a branch is made at 237 to a routine to handle the debug exception. Otherwise, control proceeds from block 236 to block 238, where the processor 221 does housekeeping preparation for a power-down, such as saving the states of peripherals. Then, at 241, the software sets the suspend bit 179 in the memory 12. Then, at 242, the processor halts and waits for the power supplied at 21 to be terminated.

Figure 12:
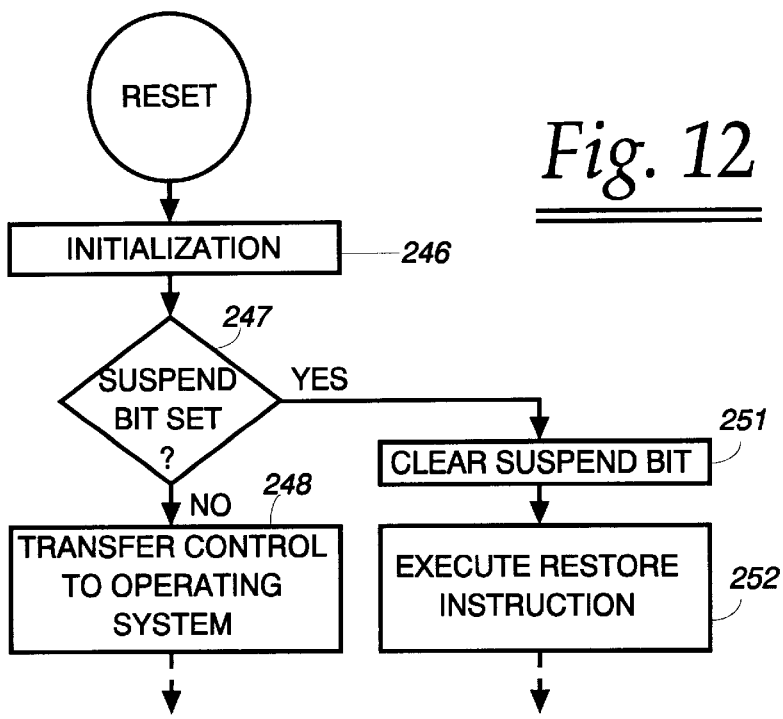

When power is subsequently turned back on, the power-up reset at 26 will cause the control unit 51 to execute a program instruction at a predetermined location in the main memory 12, which is the first instruction of a routine shown in FIG. 12. In this routine, the processor carries out any necessary initialization functions at 246, and then at 247 checks the suspend bit 179 in the memory 12. If the suspend bit is not set, then at 248 it transfers control to the operating system in the usual manner, after which the operating system will typically allow a user to manually select, load and start a desired application program. On the other hand, if it is determined at block 247 that the suspend bit 179 in memory 12 is set, then control proceeds to block 251, where the suspend bit 179 is cleared. Then, at block 252, the RESTORE instruction is executed so that the saved register and flag status is loaded from the portion 169 of memory 12 into the respective registers and flags of the section 31 of processor 221. Since this includes restoration of the value in the instruction pointer, the next instruction fetched will be the next instruction which the application program interrupted by the RSS interrupt and power-down would have executed if it had not been interrupted. The application program thus continues running from the point at which it was interrupted, as though it had not been interrupted and power had not been turned off and turned back on.

Figure 13A:
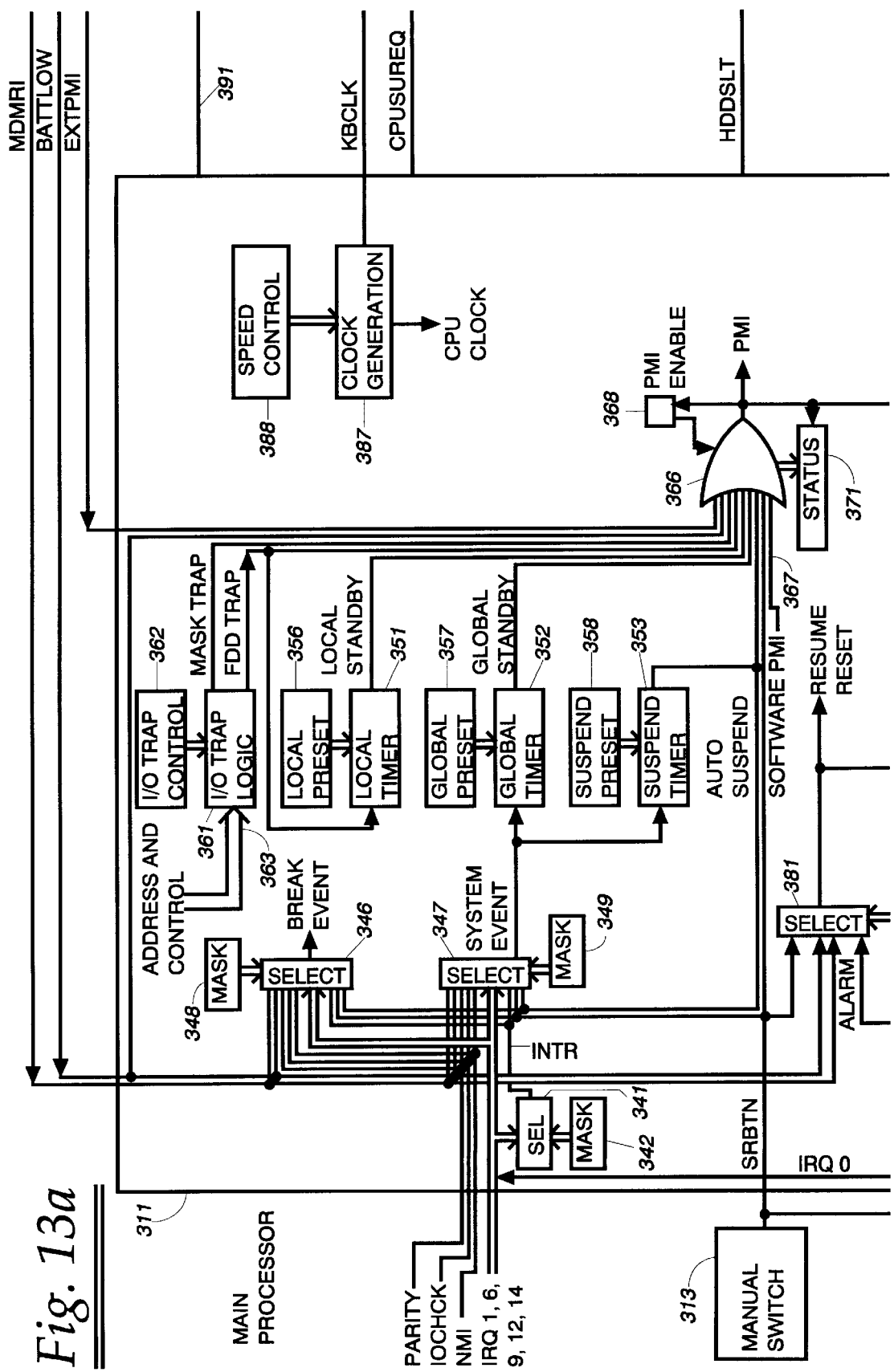
Figure 13B:
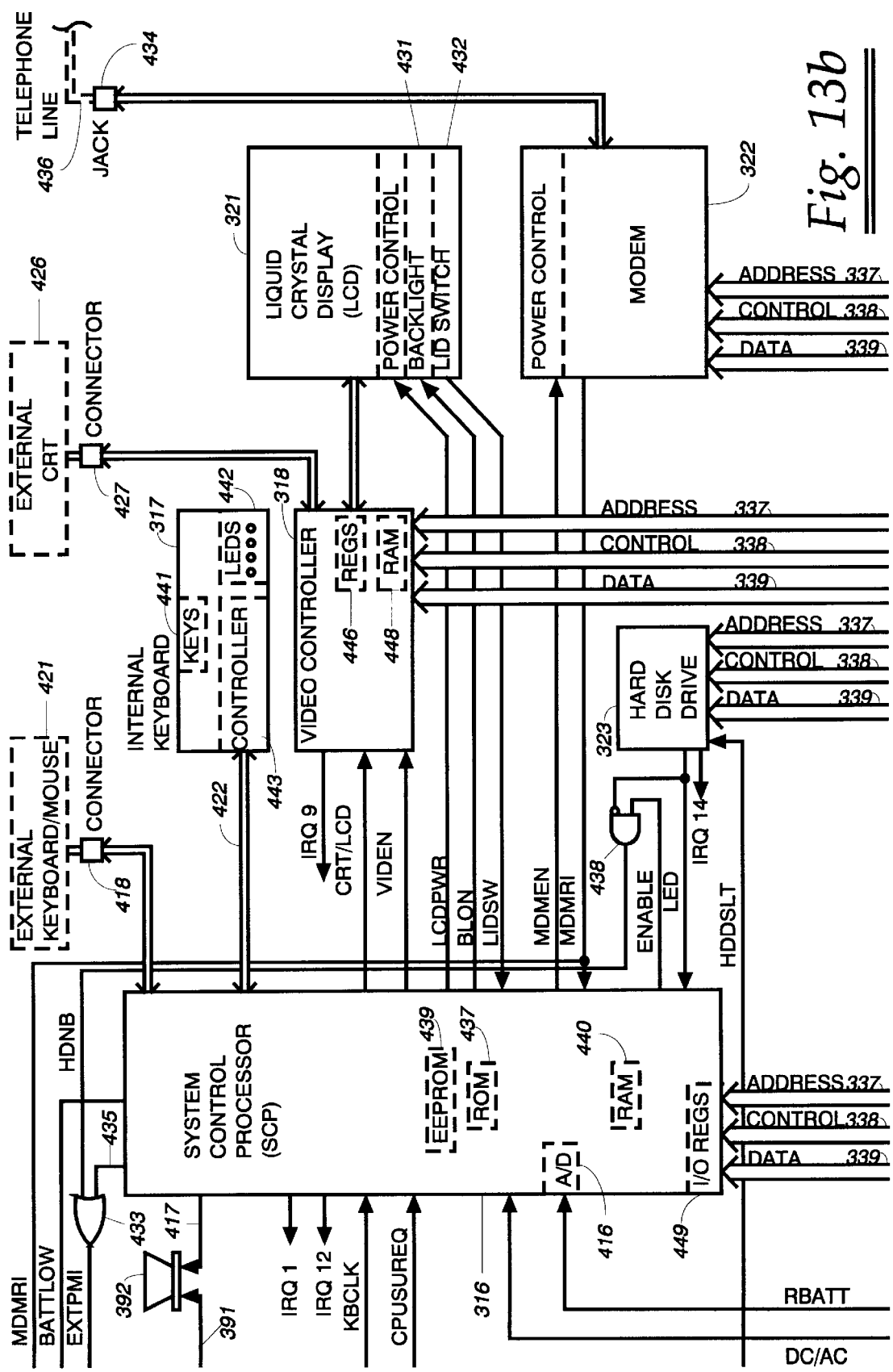
Figure 13C:
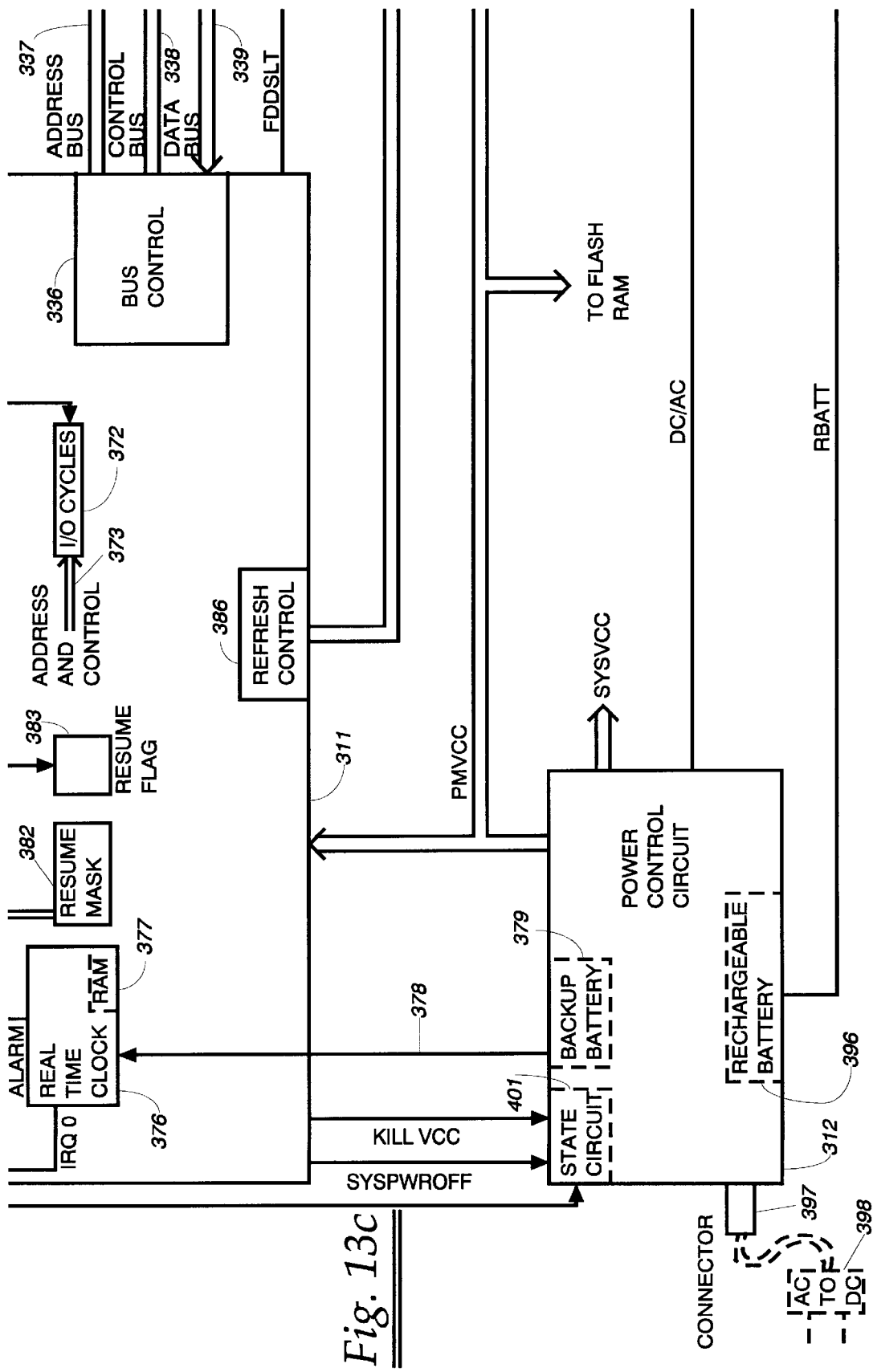

FIGS. 13A and 13B are a block diagram of a "notebook" type laptop computer system 310 which embodies features of the present invention. These figures are referred to collectively as FIG. 13. The computer system 310 includes a main processor 311, a power control circuit 312, a manually operable power control switch 313, a system control processor (SCP) 316, an internal keyboard 317, a video controller circuit 318, a monochrome liquid crystal display (LCD) unit 321, a modem 322, a hard disk drive (HDD) 323, a main memory 326 implemented with dynamic random access memory (DRAM) chips, a floppy disk drive (FDD) 327, a read only memory (ROM) 328, and a flash RAM 331.

A microprocessor suitable for use in the system 310 of FIG. 13 is the Intel 386-SL, which implements the features of the invention discussed above in association with FIGS. 4–12, which was developed by Intel Corporation of Santa Clara, Calif. under a license from the Assignee of the present invention, and which was first disclosed to the industry within the past few months. It will be recognized that other functionally equivalent microprocessors may be developed could also be used for the main processor 311. Since detailed information regarding the Intel 386-SL is available from Intel, the entire internal architecture thereof has not been shown and described in detail here. The processor 311 includes circuitry functionally equivalent to all of the circuitry shown in FIG. 9, and in particular has an unrestricted mode and at least one restricted mode. In FIG. 13, only features which are important to an understanding of the present invention are depicted and described.

More specifically, the processor 311 includes a bus control circuit 336, which controls an address bus 337, a control bus 338 and a bidirectional data bus 339 coupling the processor 311 to other major component of the system. The processor 311 also includes an interrupt selector 341 having respective inputs to which are coupled six interrupt signals IRQ 0, 1, 6, 9, 12 and 14. An IRQ mask register 342 can be loaded by software with a mask having six bits which each correspond to a respective one of the six interrupt lines. When each mask bit is a binary "1", the selector 341 actuates its single INTR output line whenever the associated interrupt line is actuated, whereas if the mask bit is a binary "0", the selector 341 ignores the associated interrupt line.

A break event selector 346 and a system event selector 347 each have a plurality of inputs, and different signals are coupled to respective inputs of both of the selectors 346 and 347. These signals include the six IRQ interrupt signals, and the INTR signal from the interrupt selector 341. The other signals include a modem ring indicator signal MDMRI generated by the modem 322, a battery low warning signal BATTLOW generated by the SCP 316, a parity signal PARITY which can be controlled by a device such as the main memory 326 which carries out parity checking, an input/output (I/O) channel check signal IOCHCK which can be controlled by I/O devices, a non-maskable interrupt NMI which has a higher priority than the IRQ interrupt signals, the output signal SRBTN from the manual switch 313, and an AUTO SUSPEND signal which will be described in more detail later. Associated with each of the selectors 346 and 347 is a respective mask register 348 or 349 which is loaded by software, and each of the selectors 346 and 347 in the associated mask register 348 or 349 functions in a manner similar to that described above for the selector 341 and associated mask register 342. The break event selector 346 produces a BREAK EVENT output signal, and the system event selector 347 produces a SYSTEM EVENT output signal.

The processor 311 includes three hardware timers 351–353, in particular a local timer 351, a global timer 352, and a suspend timer 353. Associated with each timer is a respective preset register 356–358, which is controlled by software and can be set to enable or disable the associated timer. Further, each preset register includes a numerical value which defines the time interval which the associated timer is to measure. The SYSTEM EVENT signal is connected to each of the timers 352 and 353, and each time this signal is actuated it causes each of these timers which is enabled to restart the timing of its specified time interval.

When a user is actively using the system, the SYSTEM EVENT signal will be actuated so frequently that the timers 352 and 353 will typically not be able to time out the full specified time interval. On the other hand, if the user walks away from the system for a period of time, the SYSTEM EVENT signal may remain deactuated for a long period of time, in which case the timers 352 and 353 may time out. When the timer 352 times out, it actuates an output signal GLOBAL STANDBY, and when the timer 353 times out it actuates the signal AUTO SUSPEND. Although the timer 353 is a hardware timer provided to time a suspend interval, in the preferred embodiment this hardware timer is kept disabled, and the suspend interval is timed by software in the SCP in a manner described in more detail later. The local timer 351 operates in a similar manner to the timers 352 and 353 and produces an output signal LOCAL STANDBY if it times out, but the signal used to restart the timer 351 is a different signal FDD TRAP, which is discussed below.

The processor 311 includes an I/O trap logic circuit 361 which receives address and control information at 363 from the bus control unit 336, and which is controlled by an I/O trap control register 362. The register 362 is set by software and, in the preferred embodiment, defines a range of I/O addresses assigned to control registers in the floppy disk drive 327, and the I/O address assigned to the system event mask register 349. Whenever the I/O trap logic 361 detects that one of these addresses is being accessed, it actuates its FDD TRAP output signal if the floppy drive is being accessed and its MASK TRAP signal if the mask register is being accessed, the FDD TRAP signal having the effect of restarting the local timer 351, as mentioned above.

The BATTLOW signal, the FDD TRAP signal, the MASK TRAP signal, the LOCAL STANDBY signal, the GLOBAL STANDBY signal, the AUTO SUSPEND signal and the SRBTN signal are all connected to respective inputs of an OR gate 366. A further input of the gate 366 is connected to an external power management interrupt signal EXTPMI from the SCP 316, and another input is connected at 367 to a power management interrupt signal which can be selectively actuated by software. A flip-flop 368 disables the output of the gate 366 when it is set, and can be controlled by software. When any one of the inputs to the gate 366 is actuated, the gate 366 generates at its output a power management interrupt signal PMI, which is functionally comparable to the RSS interrupt discussed above in association with FIGS. 4A–12.

In response to actuation of the PMI signal, the PMI enable flip-flop is automatically set, and a status register 371 is automatically loaded with an image of the logical states of the inputs to the gate 366, so that software can subsequently examine the register 371 and identify one or more of the inputs to gate 366 which were responsible for generating the PMI interrupt signal. In addition, a circuit 372 receives address and control information at 373 from the bus control unit 336, and is effectively a first-in/first-out (FIFO) memory which stores the last several I/O bus cycles performed by bus control 336. In response to actuation of the PMI signal, the circuit 372 stops storing this information, and thus contains a static indication of the most recent I/O cycles.

The processor 311 also includes a real time clock (RTC) circuit 376, which includes a small amount of RAM 337 which is accessible to software. The RAM 337 contains the date, the time-of-day, and a certain amount of system configuration information. When the computer system 310 is completely turned off, the real time clock circuit 376 nevertheless receives a small amount of power at 378 from a back-up battery 379 in the power control circuit 312, so that the real time clock circuit 376 can keep the date and time information in RAM 337 accurate. The interrupt signal IRQ0 is generated by the real time clock circuit 376, and in particular is actuated in a periodic manner, so that an operating system or application program which maintains its own time or date can keep that time and date updated. The real time clock circuit 376 can also be programmed by software to actuate an ALARM output at a specified date and time.

The ALARM signal is connected to one input of a resume selector 381, the other three inputs of which are connected to the SRBTN signal from manual switch 313, the BATTLOW signal from SCP 316, and the modem ring indicator signal MDMRI from the modem 332. A resume mask register 382 which can be set by software is used to selectively mask the ALARM signal, the MDMRI signal, or the BATTLOW signal. It is not possible for the mask register 382 to directly mask the SRBTN signal from the switch 313. However, if the BATTLOW signal is actuated and is not masked by the mask register 382, it will mask all three of the signals SRBTN, ALARM and MDMRI. Summarizing, if the BATTLOW signal is masked or is not masked but is deactuated, the selector 381 will produce a RESUME RESET signal at its output in response to actuation of the signal SRBTN, and also in response to actuation of either of the signals ALARM and MDMRI when not masked by the register 382. The RESUME RESET signal is a special reset of the processor 311, which will be discussed again later. The processor 311 includes a hardware resume flag 383, which is forcibly set by the RESUME RESET signal and is forcibly cleared by other types of reset signals. The RESUME flag 383 can be tested and cleared by software.

The processor 311 also includes a refresh control circuit 386, which controls the refresh of the DRAM chips in the main memory 326. The refresh control circuit 386 can be set to refresh the memory chips at different rates, the power consumption of DRAM chips being lower for lower refresh rates than for higher refresh rates.

The processor 311 also includes a clock generation circuit 387 which generates a CPU clock signal, and a keyboard clock signal KBCLK which is supplied to an interrupt input of the SCP 316. A speed control register 388 can be set by software to select one of a range of frequencies for the CPU clock signal, or to completely stop the CPU clock signal. Power consumption within the processor 311 is dependent on its clock speed, and in particular is lower for lower clock speeds.

The processor 311 outputs a signal 391 which is connected to a conventional piezo speaker 392 and, when actuated, can cause the speaker 392 to beep. In addition, the processor generates a signal CPUSUREQ which is connected to the SCP and is described in more detail later. Further, the processor generates two signals FDDSLT and HDDSLT which, when deactuated, turn off or at least reduce power to the floppy disk drive 327 and hard disk drive 323, respectively. The processor also generates two control signals SYSPWROFF and KILLVCC which are connected to the power control circuit 312 and are described in more detail below.

As mentioned above, the power control circuit 312 includes a back-up battery 379. In addition, the power control circuit 312 has a rechargeable battery 396, and has a connector 397 to which can be releasably connected a conventional external AC to DC convertor 398 adapted to be plugged in to a standard wall socket. When the convertor 398 is present and supplying power to the power control circuit 312, the power from the convertor 98 is used by the circuit 312 to provide power needed throughout the entire system 310, and to simultaneously recharge the rechargeable battery 396. When no convertor 398 is connected to the connector 397, power required throughout the system 310 when the system is on is drawn from the rechargeable battery 396. In the event no convertor 398 is present and the rechargeable battery 396 either becomes discharged or is removed for replacement, the back-up battery 379 is used to supply enough power to maintain the system in at least a low power mode.

Figure 14:
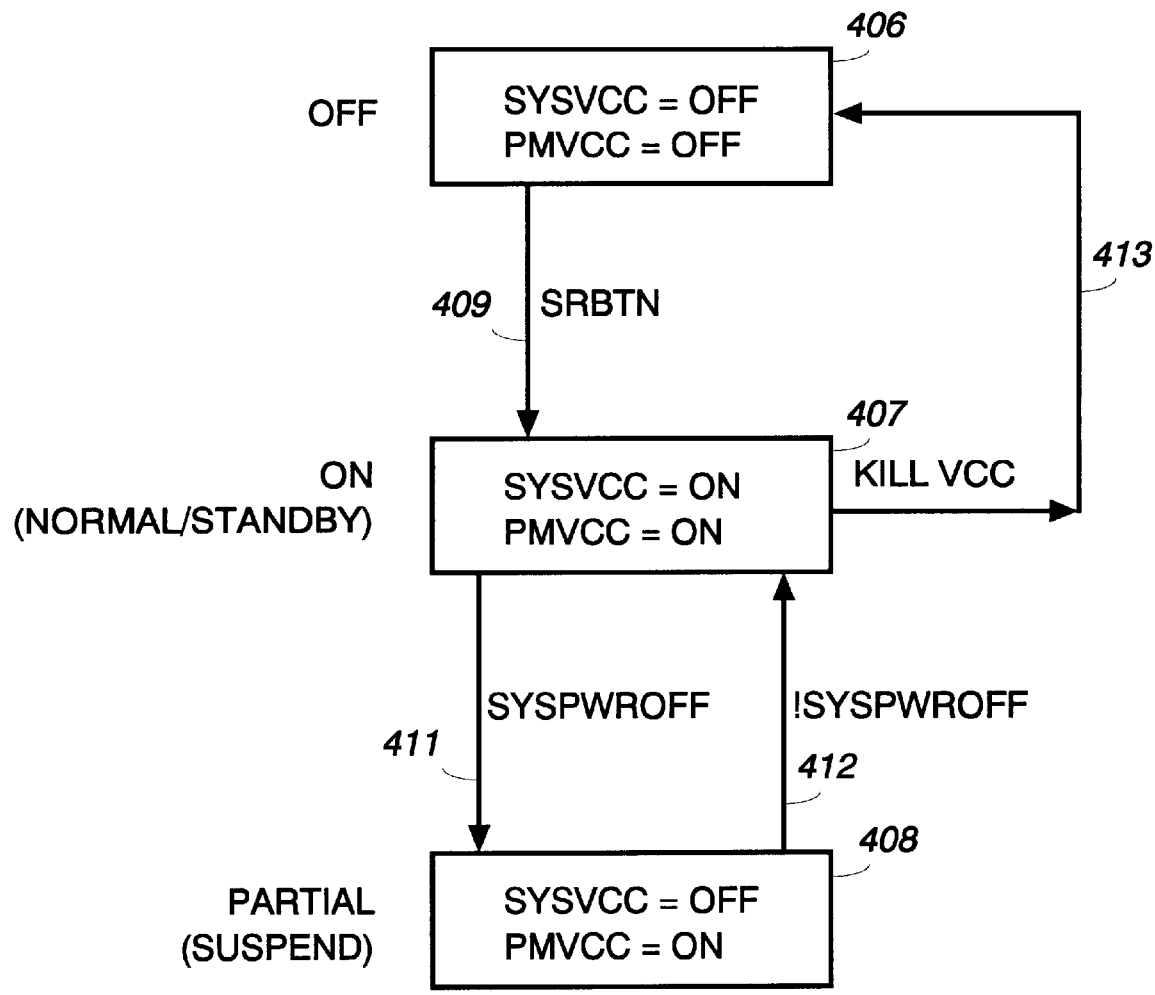
FIG. 14 is a state diagram for a state machine which is a component of the system of FIG. 13.

The power control circuit 312 has a power output PMVCC on which it supplies power to the processor 311, main memory 326, and flash RAM 331, and has a power output SYSVCC on which it supplies power to other system components. The supply of power to these two power outputs is controlled by a state circuit 401. FIG. 14 is a state diagram showing the basic operation of the state circuit 401 of the power control circuit 312. The state diagram includes three states 406–408. The state 406 represents a situation where the computer system 310 of FIG. 13 is entirely off. In this state, SYSVCC and PMVCC are both off, and only the real time clock circuit 376 in the processor 311 and the state circuit 401 in the power control circuit 312 are receiving power. The second state 407 corresponds to normal operational modes of the computer system 310, and also corresponds generally to a global standby mode in which certain system components are placed in a low power mode and the processor 311 stops operating in order to conserve power, as described in more detail later. In this state SYSVCC and PMVCC are both on, the real time clock circuit drawing its power from PMVCC rather than from the battery 379. The third state 408 corresponds generally to a suspend mode of the type discussed above in association with FIGS. 4A–12. In state 408, the power output PMVCC is turned on, but the power output SYSVCC is turned off in order to conserve power.

Starting from a condition in which the system is off and the state circuit 401 is in state 406, when a user manually actuates the switch 313 in order to turn the system on, the state machine 401 proceeds at 409 to state 407, where it turns on both SYSVCC and PMVCC. If at some point in time the processor 311 intends to enter a suspend mode, it will actuate the signal SYSPWROFF to the state circuit 401, which will cause the state circuit 401 to transition at 411 to state 408, where it keeps PMVCC on but turns off SYSVCC. Since SYSVCC is used to supply power to virtually all components other than the processor 311, memory 326 and RAM 331, the power consumption of components normally powered by SYSVCC is reduced to zero. Meanwhile, PMVCC maintains the information in main memory 326 during the suspend mode, and also provides power to the processor 311 and RAM 331 so that it will be able to wake up from the suspend mode. When the processor 311 does wake up from the suspend mode, it deactuates the signal SYSPWROFF, so that the state machine 401 transitions from state 408 back to state 407 and turns the supply SYSVCC back on, thereby repowering the peripheral components of the system so that they can be used again. If it is determined at some point that the system is to be turned completely off, then the processor 311 ultimately actuates the signal KILLVCC to the state machine 401, which causes the state machine to transition at 413 from state 407 back to state 406, where it turns off both SYSVCC and PMVCC.

The power control circuit 312 produces a signal DC/AC to the system control processor (SCP) 316, to indicate whether the system is running on AC power from the convertor 398 or on DC power from battery 396 (or battery 397). The terminal voltage of rechargeable battery 396 is also supplied in the form of an analog signal RBATT to the SCP 316, so that the SCP 316 can monitor the state of the battery charge. In particular, the SCP 316 has an analog-to-digital (A/D) convertor 416, which converts the analog terminal voltage from battery 396 into a digital signal that can be analyzed by the SCP 316. When the SCP determines that the voltage is too low, it actuates the above-mentioned BATTLOW signal to the main processor 311.

Turning to the SCP 316, the SCP in the preferred embodiment is based on an Intel 87C51GB processor, but it will be recognized that there are other commercially available processors which could be used for the SCP. The SCP generates a speaker control signal 417 which is connected to the speaker 392 and can be used to cause the speaker 392 to beep. In addition, the SCP generates the signals IRQ1 and IRQ12, which as mentioned above are connected to interrupt inputs of the main processor 311. Further, the SCP 316 is coupled to an external connector 418, to which can optionally be coupled a conventional external keyboard or mouse 421. The SCP 316 is also coupled at 422 to the internal keyboard 317. The SCP outputs to the video controller 318 a signal CRT/LCD, which indicates whether the video controller 318 should consider the active display unit to be the liquid crystal display unit 321 or a conventional external CRT 426 which can be optionally wired to a connector 427 coupled to the video controller 318. The SCP 316 sends the video controller 318 a signal VIDEN which, when disabled, causes the video controller 318 to turn itself off or to at least reduce its power consumption.

The SCP sends to the liquid crystal display unit 321 a signal LCDPWR, which turns on and off the power to the liquid crystal display in the unit 321. The display includes a backlight 431 which illuminates the liquid crystal display. The display unit 321 is provided on a lid of the laptop computer which, in a conventional manner, can be moved between positions covering and exposing the keys of the internal keyboard 317, and a lid switch 432 is provided to indicate whether the lid is open or closed. The SCP 316 generates a signal BLON which turns on and off the backlight 431 of the display unit 321, and receives from the lid switch 432 a signal LIDSW which indicates whether or not the switch is actuated and thus whether or not the lid is open or closed.

The SCP 316 also generates a signal MDMEN which causes a power control section of the modem 322 to shut off power to the modem 322, or to at least place the modem in a low power consumption state. The SCP 316 receives from the modem 322 the previously-mentioned modem ring indicator signal MDMRI, which is actuated when an incoming telephone call reaches the modem through a telephone jack 434 to which the modem 322 is coupled, the jack 434 of the system 310 being adapted to be optionally coupled to a standard telephone line 436.

The hard disk drive 323 produces an output signal LED which is used in a conventional manner to control a conventional and not-illustrated light emitting diode in order to provide the computer user with a visual indication of the activity of the hard disk drive. This LED signal is connected to the SCP and to one input of a two-input AND gate 438, the hard disk not busy output HDNB of which is connected to an input of an OR gate 433 and indicates that the hard disk is not busy. The other input of the gate 438 is coupled to an ENABLE output signal of the SCP 316, and thus the SCP can selectively enable and disable the gate 438. The SCP also produces an output signal at 435 which is connected to a second input of the OR gate 433, and the output of the OR gate 433 serves as the previously-mentioned EXTPMI signal to the main processor 311. The hard disk drive 323 also generates the interrupt signal IRQ14, which as mentioned above is coupled to the main processor 311.

The internal keyboard 317 includes a set of keys 441 which form a standard laptop computer keyboard, four light emitting diodes (LEDs) 442 which are visible to the system user and provide typical status information, and a controller circuit 443 which interfaces the keys 441 and LEDs 442 to the SCP 316.

The video controller 318 includes control registers 446, and a video RAM 448 which is coupled to the buses 337–339 and is a 128 KB memory arranged as 64K by 16 bits.

The SCP 316 includes an electrically programmable read only memory (EEPROM) 439, in which it stores configuration information, a password, an extended set-up information, as discussed in more detail later. Further, the SCP includes a ROM 437 which stores a program executed by the SCP, and a RAM 440 in which the SCP can store and retrieve information during system operation. The SCP also includes several I/O registers, which can be used to pass data between the main processor 311 and the SCP 316.

The flash RAM 331 is a conventional semiconductor device which can be electrically modified, but is not volatile and will retain the information stored in it when power to it is turned off. The flash RAM 331 is 128 KB, and contains the basic input/output system (BIOS) program, as well as factory configuration settings. The ROM 328 contains a program which is normally not used, but which can be used to control the system while the flash RAM 331 is reloaded in the event an unusual circumstance causes the contents of the flash RAM to be lost.

The conventional floppy disk drive 327 includes a floppy disk controller (FDC) circuit 451, which controls the floppy disk drive and can also generate the interrupt signal IRQ6 to the processor 311.

The main memory 326 includes a portion PMRAM 453, which is functionally equivalent to the portion 169 of memory 12 in FIGS. 9A and 9B. The bus control unit 336 of processor 311 automatically prevents software from accessing the PMRAM section 453 of the main memory 326, except in two specific situations. First, the service routine for the power management interrupt PMI is stored in the PMRAM section 463 of the main memory 326, and in response to a PMI the bus control unit 336 automatically permits access to the PMRAM 453 so that the state of the processor 311 can be stored there and so that the service routine there for the PMI can be executed. Second, software running in the unrestricted mode of the processor 311 can selectively enable and disable the capability to access to the PMRAM 453, so that the PMRAM can be initialized.

Figure 15:
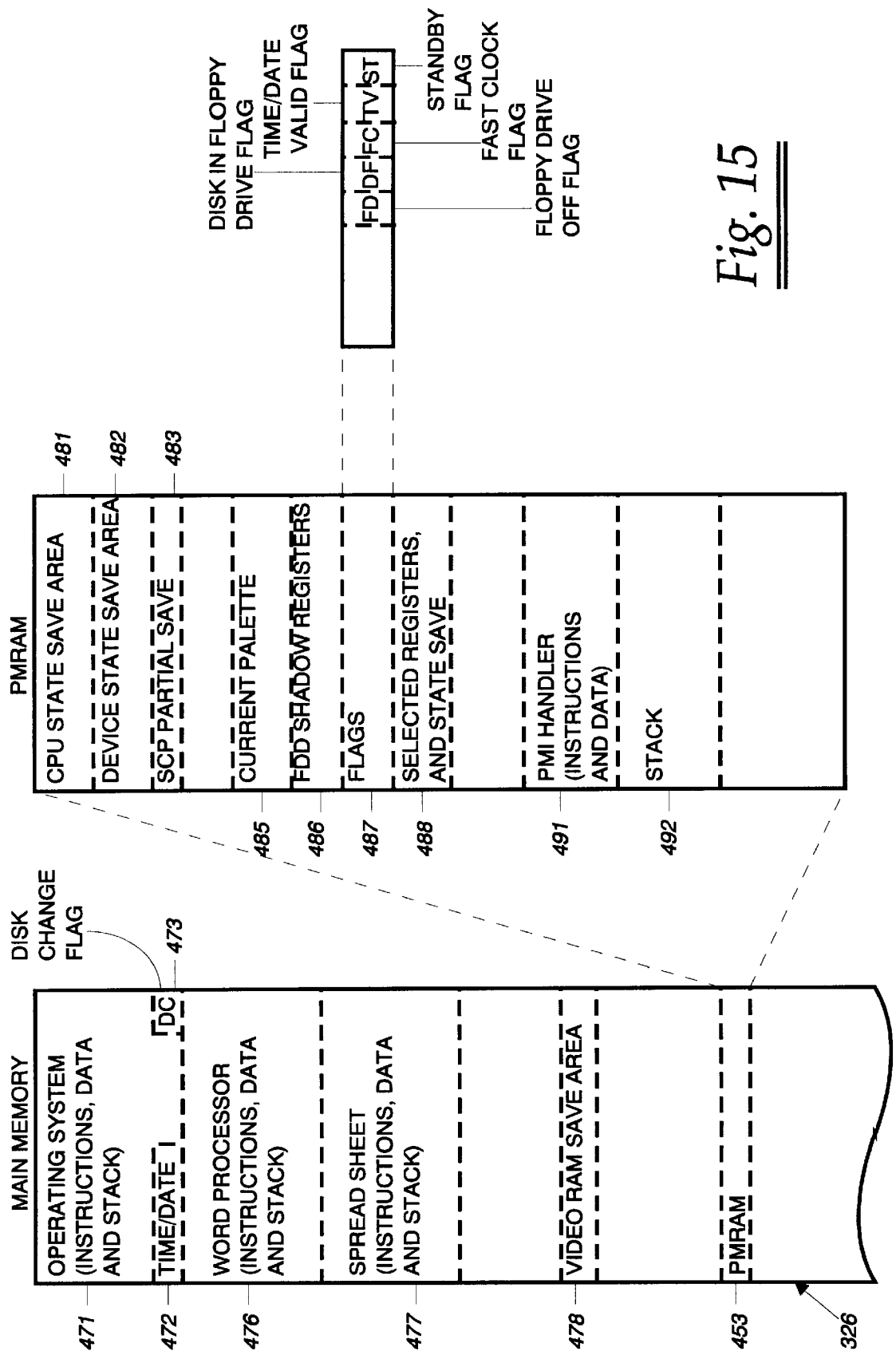
FIG. 15 is a diagram showing the organization of a main memory which is a component of the system of FIG. 13.

FIG. 15 is a diagrammatic representation of some of the information stored in the main memory 326. The organization of this information shown in FIG. 15 is exemplary, and it will be recognized that the format in which the information is stored could be reorganized without departing from the present invention. Further, there may be additional information which is stored in the main memory 326 but is not essential to an understanding of the present invention, and which is therefore not illustrated and described in detail.

A portion 471 of the main memory is used to store an operating system, for example Disk operating System (DOS) available from Microsoft Corporation. The operating system maintains time and date information at 472, and also maintains a disk change (D/C) flag 473 which is used to indicate that a disk has been changed.

Two additional portions 476 and 477 in the main memory each contain a respective application program, the portion 476 containing the stack, instructions and data for a word processor, and the portion 477 containing the stack, instructions and data for a spreadsheet. A further portion 478 of the main memory is used to store an image of the video RAM 448, as will be described in more detail later.

The PMRAM portion 453 of the main memory includes a state save portion 481, where the processing unit 311 automatically saves its state in response to a PMI interrupt. A further portion 482 is used to save information regarding other devices, and a portion 483 is used for a partial state save of the SCP 316 which will be discussed later. A portion 485 is used to record the current palette being used for the LCD 321, as will be described later, and a portion 486 serves as shadow registers which are used to maintain an image of all control registers within the floppy disk drive 327, as also described later. A byte 47 is used for several one-bit flags, including a fast clock (FC) flag which is set to indicate that the user has selected a fast clock speed for the processor 311, a floppy off (FO) flag which is set to indicate that the power to the floppy disk drive is off, a disk in floppy drive (DF) flag which can be set to indicate that a disk is present in the floppy disk drive, a time/date valid TV flag which is set if the current operating system supports time and date information, and a standby (ST) flag which is set under certain circumstances to indicate to the processor whether it is to enter standby mode or suspend mode when a particular event occurs.

The software routine which handles the power management interrupt (PMI) is also stored in the PMRAM portion 453 of the main memory 326, as shown at 491 in FIG. 15. A portion 492 of the PMRAM serves as a stack area for use by the PMI handler routine. FIGS. 16A–26C are flowcharts showing the operation of the PMI handler routine and a reset handler routine.

Figure 16A:
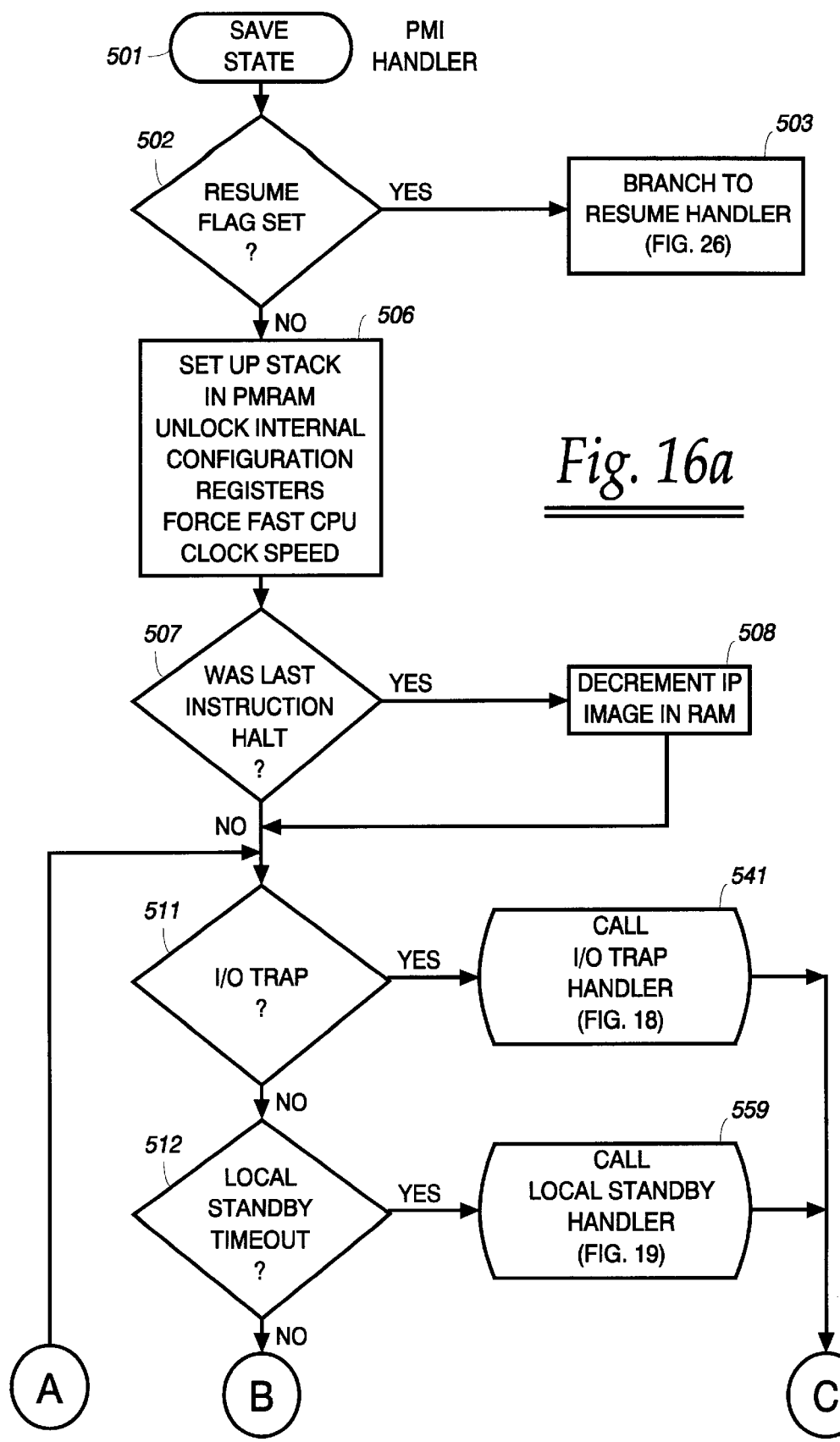
Figure 16B:
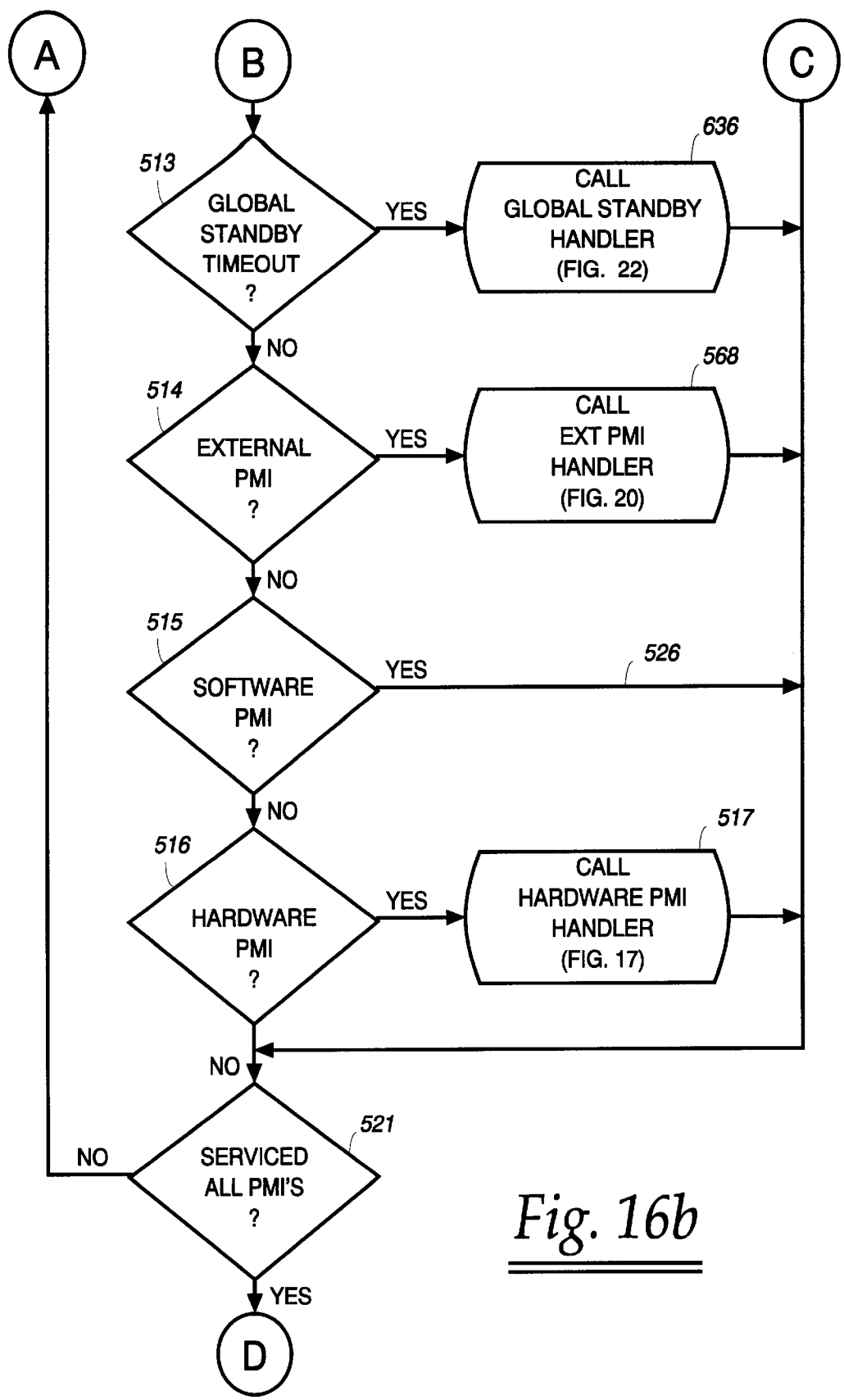

Beginning with FIGS. 16A–16C, a PMI from any source causes the hardware of the processor 311 to automatically save its state in the state save area 481 of the PMRAM portion 453 of the main memory, as shown diagrammatically at 501 in FIG. 16. Then, the processor 311 automatically begins execution of the PMI handler routine 491 in the PMRAM at a predetermined point, which is shown at 502 in FIGS. 16A–16C. Regardless of the source of the PMI, the first thing the PMI handler does is to check the resume flag 383 (FIGS. 13A–13D) in the processor 311 in order to see whether the processor 311 is in the process of resuming from a suspend state. If a resume is in progress, then at block 503 control is transferred to a resume handler, which will be discussed later.

In the case of any other PMI, control proceeds to block 506, where the processor sets itself up to use the stack 492 in the PMRAM, because the PMI handler routine must always be capable of proper operation, and has no way of knowing whether the current stack in the interrupted application program is a valid and usable stack.

Then, the processor 311 unlocks certain internal configuration registers so that they can be altered, such as the control register 388 which can be used to change the speed of the CPU clock. Then, the processor changes the register 388 in order to force the CPU to run at a fast clock speed, so that the PMI routine will execute as fast as possible.

Control then proceeds to block 507, where the processor checks to see whether the last instruction executed before the PMI was a HALT instruction. If it was, then the image of the instruction pointer register saved at 481 in the PMRAM is decremented at 508, so that when the PMI handler is exited the instruction which is fetched and executed is the HALT instruction rather than the instruction which follows the HALT instruction, in order to be certain that the processor again enters the HALT mode. Then, control proceeds to block 511, where the processor begins a successive check of the six possible sources of a PMI, as represented by the six blocks 511–516. Each of these will be discussed in more detail in a moment.

After detecting and servicing the source of the PMI, control proceeds to block 521, where the processor checks to see whether one or more other sources of the PMI are pending. If so, control returns to block 511, so that the processor can again scan for the particular source of each PMI, and service it. When it is determined at block 521 that every pending PMI has been serviced, control proceeds to block 522, where the processor restores the speed control register 388 to select the CPU clock speed which was in effect at the time the PMI occurred. The FC flag shown in FIG. 15 indicates to the processor whether this was a fast or slow clock speed. Then, the processor restores the protection level (if any) which was in effect for the internal configuration registers, including the speed control register 388. The processor can determine the level of protection which was in effect by examining the image of the CPU state which is present at 481 in the PMRAM. Then, the processor enables the PMI, and clears an internal bit automatically set within the processor 311 by the PMI to prevent the processor from responding to a reset during servicing of the PMI. Then, at 523, the processor executes an instruction which ends the PMI handler routine by restoring the internal state of the processor from the state save area 481, which of course causes the processor to resume execution of the interrupted application program.

As previously explained, a software instruction can generate a PMI as shown diagrammatically at 367 in FIGS. 13A–13D, but in the preferred embodiment this capability is used only to reenter the PMI handler when the system is in the process of resuming from a suspend mode, and in that case control is routed from block 502 to block 503 as discussed above, and should never proceed to block 515. Consequently, a software PMI should not normally be detected at block 515 in FIGS. 16A–16C. Nevertheless, since it is possible that some other program may execute a software instruction which generates a software PMI, block 515 will intercept this condition, but transfers control at 526 directly to block 521, thereby handling the software PMI without doing anything at all.

Block 516 checks for a hardware PMI, the sole source of which in the preferred embodiment is the manual switch shown at 313 in FIGS. 13A–13D. In particular, deactuation of this switch produces a PMI which is detected at block 516, and causes control to proceed to block 517, where a subroutine call is made to a hardware PMI handler routine, which is illustrated in FIG. 17.

Figure 17:
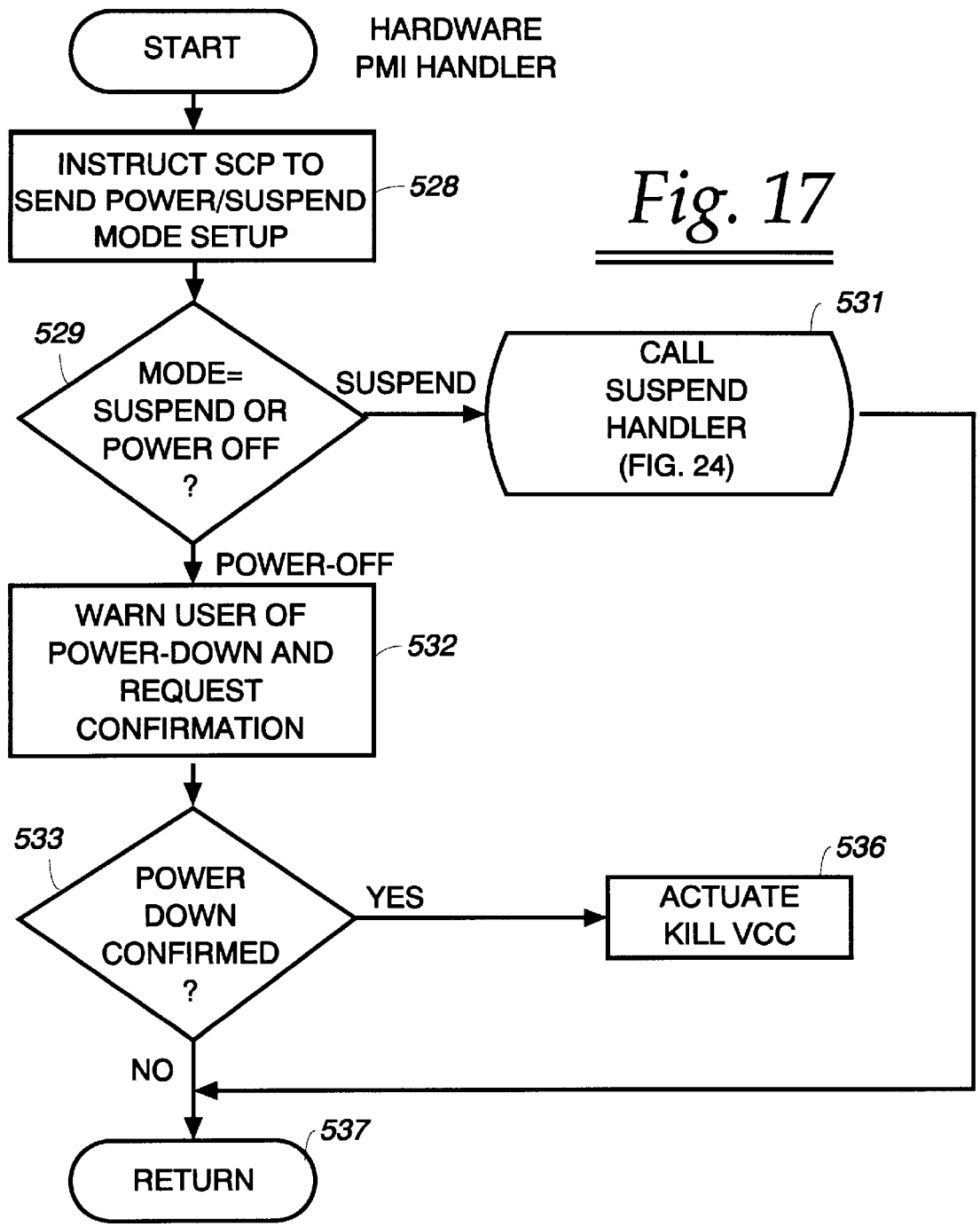

Referring to FIG. 17, the processor begins at 528 by instructing the SCP 316 to send it a portion of the set-up information stored in EEPROM 439, in particular a bit which can be set by the user as part of the system configuration, and which specifies whether deactuation of the switch 313 is to cause the system 310 to completely turn itself off, or to enter the suspend state in which it is capable of resuming the interrupted application program. Whenever the processor needs to send a command to the SCP while servicing a PMI instruction, it first actuates the CPUSUREQ signal to the SCP so that the SCP will stop sending information to the processor and thus the interface will be clear. Once the command is accepted, the processor may deactuate the CPUSUREQ signal. Control proceeds to block 529, where the processor checks the information received back from the SCP. If the user has specified that deactuation of the switch 313 is to place the system in suspend mode, the system proceeds to block 531, where it calls a suspend handler which will be described in detail later.

On the other hand, if the user has specified that in response to deactuation of the switch 313 the system is to be turned off, control proceeds from block 529 to block 532, where the processor 511 causes the video circuitry to display a warning which reminds the user that power will be turned completely off and requesting confirmation to proceed. This is because turning power off will cause the loss of everything in the main memory 326, and it is thus important to be certain that the user is not assuming that the system will be entering suspend mode, where this information would be maintained. The user response is checked at block 533, and if the user confirms that power is to be turned off then control proceeds to block 536 where the processor actuates the KILLVCC line so that the power control circuit 312 turns SYSVCC and PMVCC off in the manner described above in association with FIG. 14. On the other hand, if it is determined at block 533 from the user response that the user did not want the power turned off, then control proceeds to block 537, where a return is made from the hardware PMI handler without taking any action at all.

Referring again to FIGS. 16A–16C, if it is determined at 511 that the source of the PMI interrupt is an I/O trap condition, this means that one of the signals MASK TRAP or FDD TRAP shown in FIGS. 13A–13D has been actuated and created the PMI. Block 511 therefore transfers control to block 541, where a subroutine call is made to an I/O trap handler routine, which is shown in FIG. 18.

Figure 18:
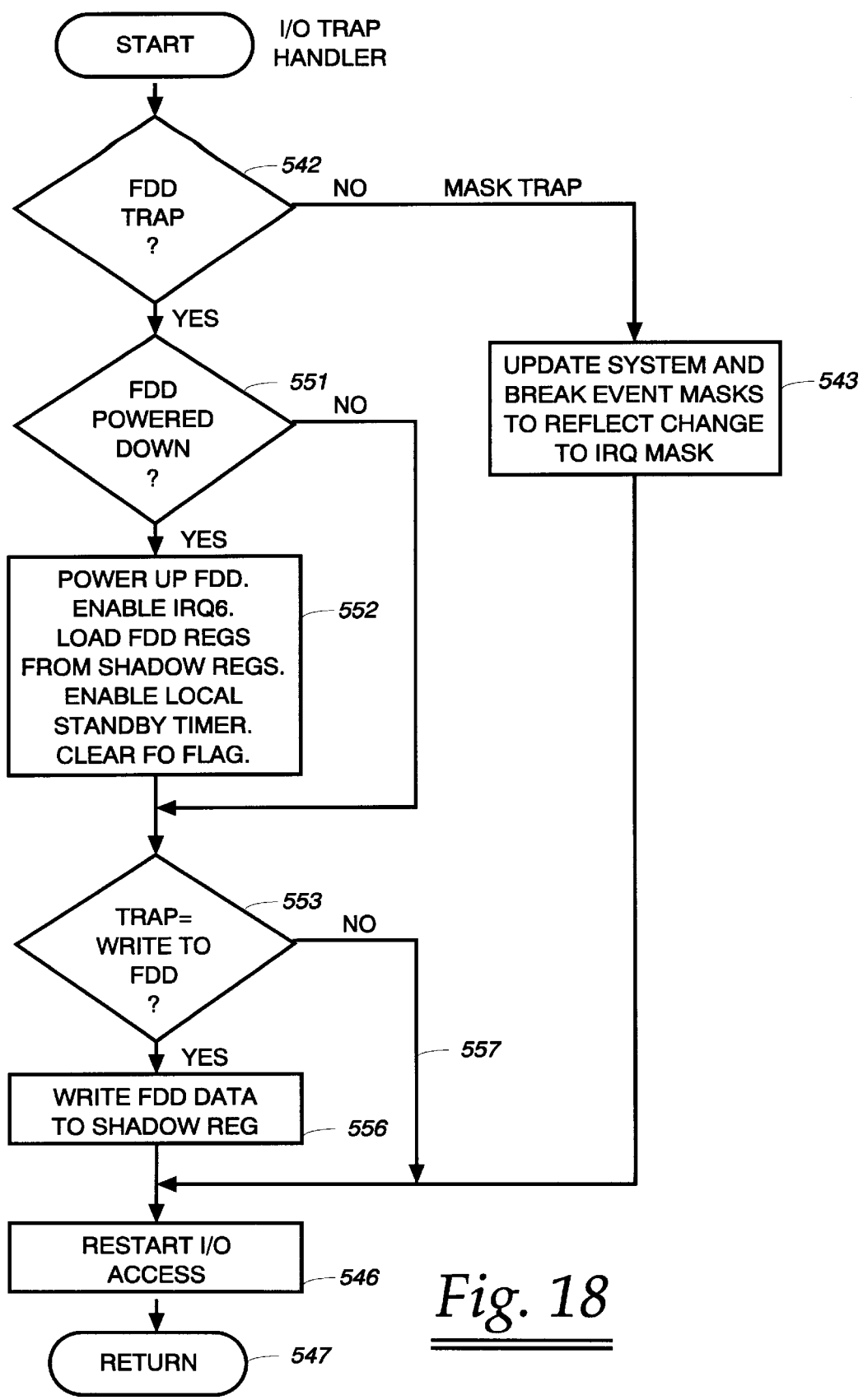

Referring to FIG. 18, this routine begins at block 542 by checking the status register 371 (FIGS. 13A–13D) in order to determine whether the source of the interrupt was the FDD trap signal. If it was not, then it must have been the MASK TRAP signal, and control proceeds to block 543. The occurrence of the MASK TRAP signal means that the processor hardware has detected an access to the mask register 342 which controls the enabling and disabling of the various IRQ interrupt lines. If the purpose of the access to the MASK register 342 is to mask an IRQ interrupt, then at block 543 the system also updates the mask in system event mask register 349 to mask this IRQ interrupt. This avoids a system problem, because if the IRQ interrupt signal becomes actuated but is masked at 342, the normal interrupt servicing routine will not recognize the interrupt and thus the signal will remain actuated. If this IRQ interrupt is not masked at 349, then the continuously actuated signal will have the effect of preventing the SYSTEM EVENT line from changing, as a result of which the timers 352 and 353 will not be restarted and will time out even when the system is actually very active. Therefore, by conforming the mask register 349 to the mask register 342 at block 543, the disabled IRQ interrupt signal will be prevented from inhibiting the SYSTEM EVENT signal, and thus other active inputs to the selector 347 will be able to cause the SYSTEM EVENT signal to actively change in response to system activity so that the timers 352 and 353 are properly restarted by system activity.

After the processor sets the mask at block 543, control proceeds to block 546, where the processor restarts the I/O access to the mask register 342. In particular, the PMI trap interrupt intercepted the access to the mask register 342, and thus this mask register was not in fact actually changed. However, and as previously discussed, the I/O cycles which would have accessed this register have been captured at 372 (FIGS. 13A–13D), and thus in block 546 the processor uses this information to restart the I/O access to register 342 so that it properly completes. Then, at block 547, control is returned to the main routine of FIGS. 16A–16C.

On the other hand, if it was determined at block 542 that the PMI was caused by the FDD TRAP signal, then control proceeds to block 551. This means that an I/O access to a control register of the floppy disk drive 327 has been intercepted. As will be described later, the system turns the floppy disk drive 327 off if a specified period of time elapses without any system access to the floppy disk drive. Thus, it is possible that the intercepted access to the floppy disk drive was an attempt to access the floppy drive while it does not have any power. Accordingly, at block 551, the processor checks the FO flag (FIG. 15) in order to determine whether the floppy disk drive is powered down. If it does have power, then block 552 is skipped. Otherwise, block 552 is entered in order to bring up the floppy disk drive.

In particular, the processor 11 actuates the FDDSLT line to restore normal power to the floppy disk drive 327, and enables interrupt IRQ 6 which is used by the floppy disk drive in a conventional manner during normal operation. Then, the processor loads control registers in the controller circuit 451 of the floppy disk drive 327 from the shadow registers 486 in the PMRAM. As will be described in a moment, the shadow registers contain an image of the internal state of the floppy disk drive just before its power was turned off. Then, the processor enables the local standby timer 351 (FIGS. 13A–13D), which as described in more detail later as the timer used to monitor the length of time since the last access to the floppy disk drive so that a decision can be made as to when it should be powered down.

Finally, the processor clears the FO flag (FIG. 15) to indicate that the floppy disk drive is currently up and running.

Control then proceeds from block 552 to block 553. As just mentioned, the shadow registers 486 (FIG. 15) are an image of the control registers in the floppy disk drive 451. Every time any program stores anything in these control registers, the same information must be stored in the shadow registers 486 so that the shadow registers contain an accurate image of the actual registers in the floppy disk drive. Thus, at block 553, the processor checks to see whether the intercepted I/O access to the control registers of the floppy drive constitute a write of information into a register, as opposed to a read of information from the register. If it is determined that control information is being written into the floppy disk drive, then at 554 the same information is written into the shadow register area 486. On the other hand, if data is being read from the floppy disk drive, then block 556 is skipped at 557. In either case, control ultimately proceeds to block 546, where the I/O access to the floppy drive is restarted as discussed above so that the hardware completes the interrupted I/O access. Then, at 547, control returns to the routine of FIGS. 16A–16C.

Figure 19:
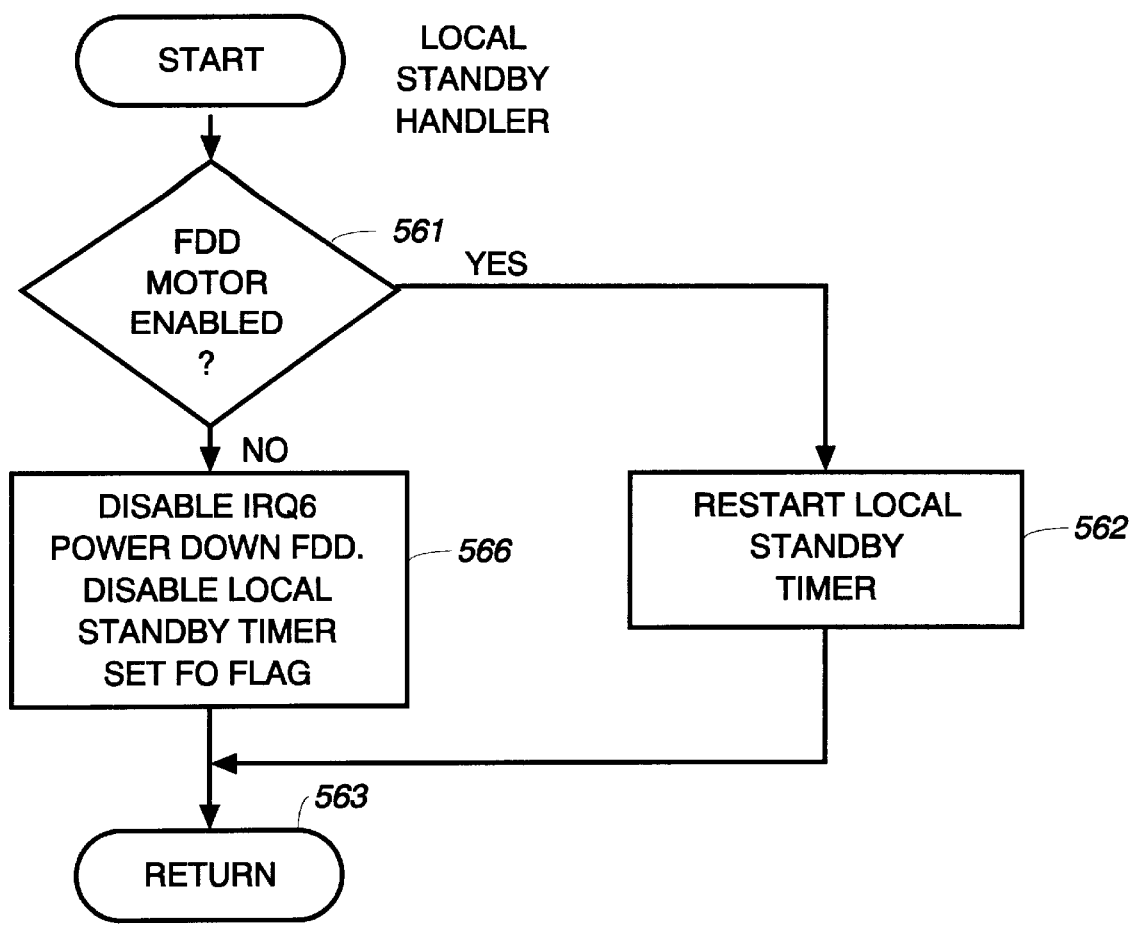
Figure 20A:
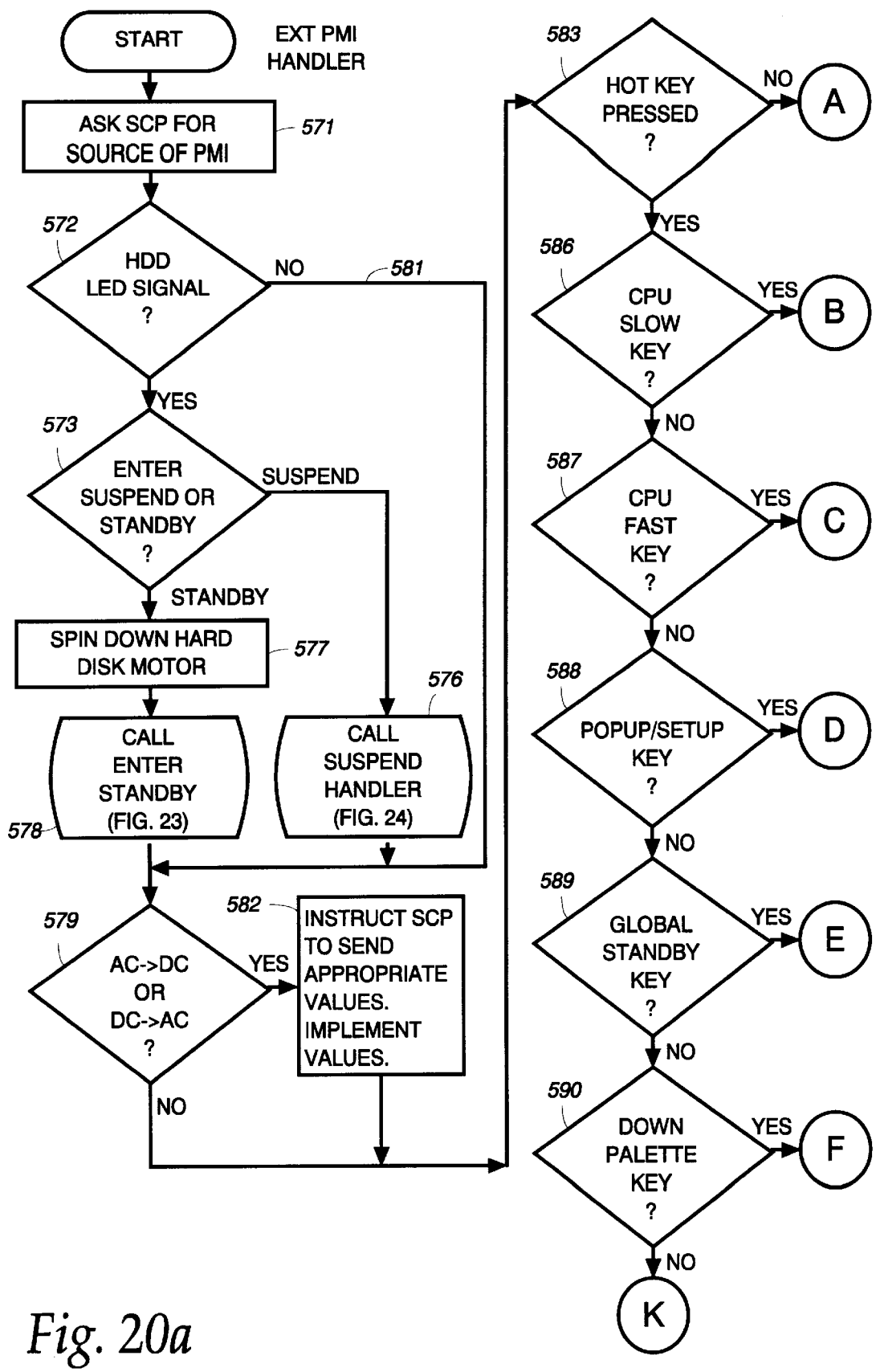
Figure 20B:
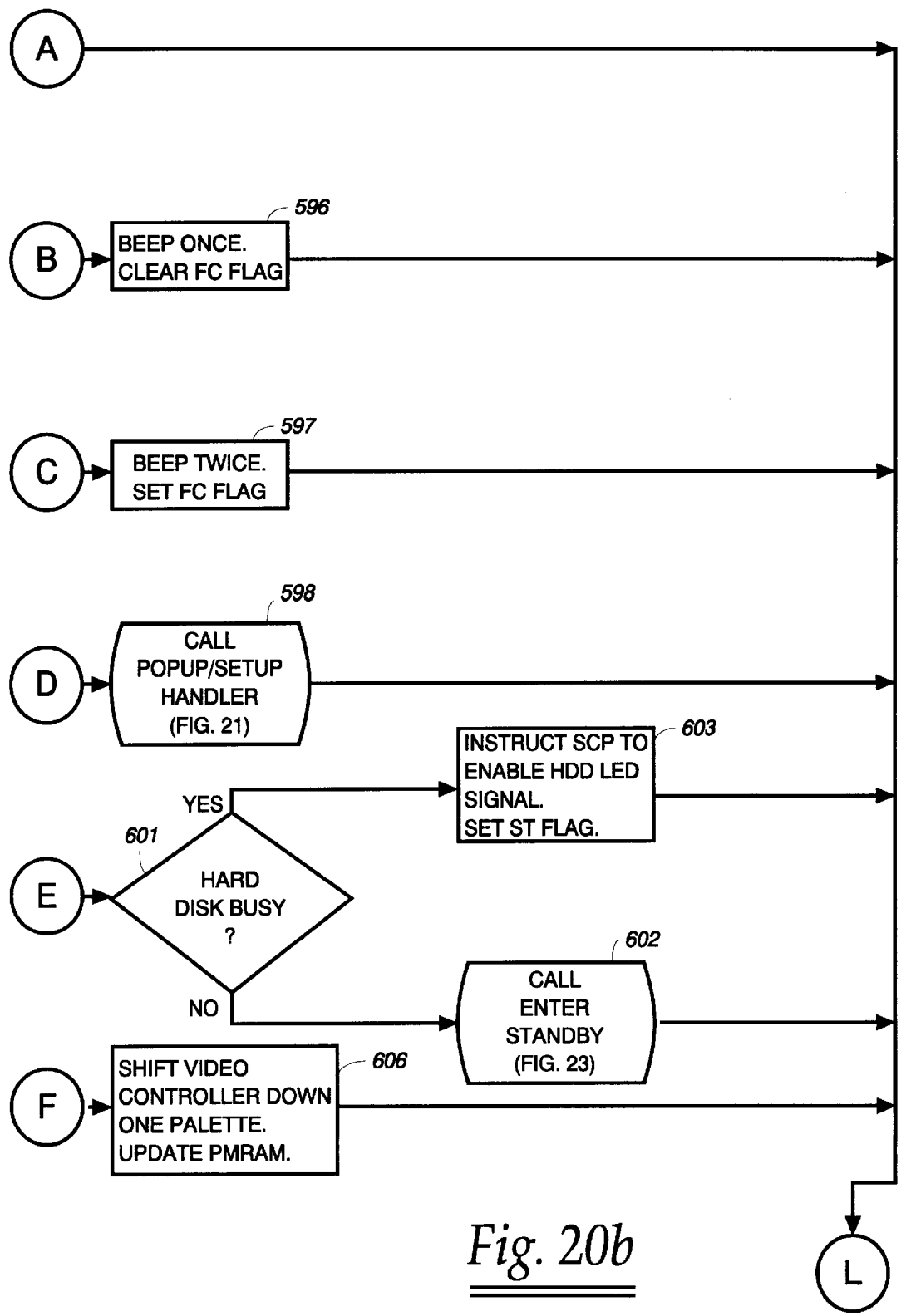
Figure 20C:
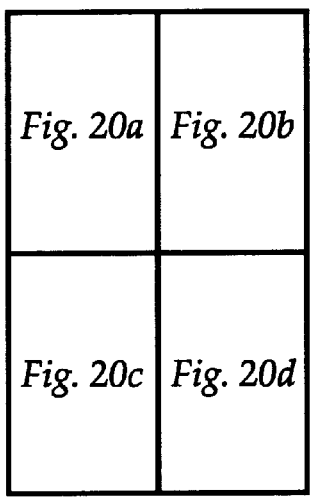
Figure 20:
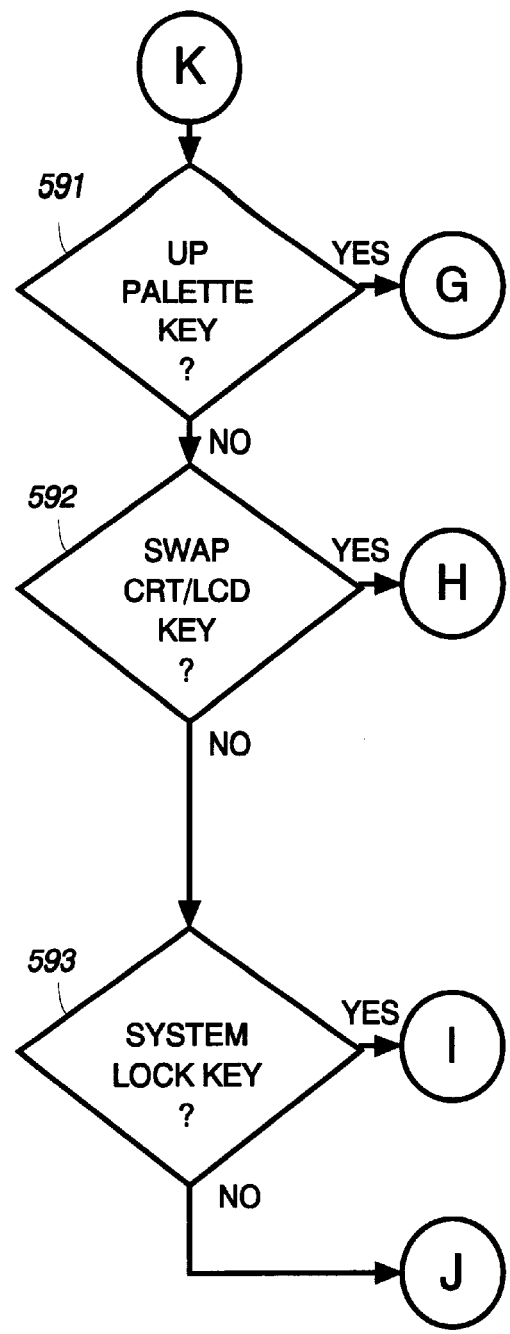
Figure 20D:
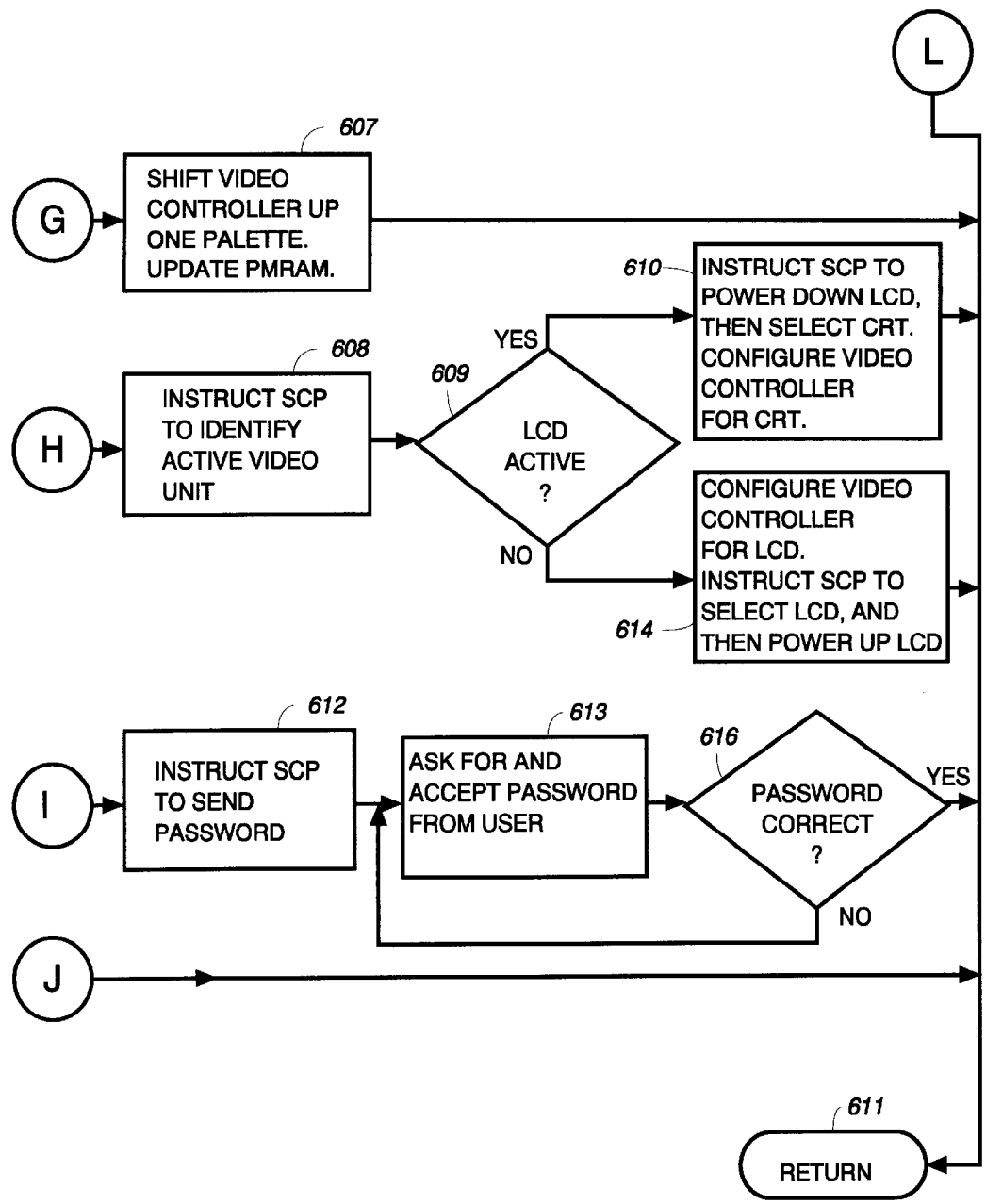

In FIGS. 16A–16C, if it is determined at block 512 that the local standby timer 351 has expired, then control proceeds to block 559, where a subroutine call is made to a local standby handler routine, which is shown in FIG. 19. Referring to FIG. 19, the fact that the local standby timer has timed out is an indication that the floppy disk drive has not been accessed for a specified period of time and is thus probably not currently in use and can be turned off in order to conserve power. However, it is first important to make sure that the floppy disk drive motor is not running, because power should preferably not be shut off while the motor is running. Therefore, at block 561, the processor reads a register in the floppy disk drive 327, which in a conventional manner includes an indication of whether the motor is currently enabled. If it is, control proceeds to block 562, where the processor simply restarts the local standby timer 351 at 562 and then returns at 563 to the routine of FIGS. 16A–16C. Typically, however, the motor will not be running, and control will thus usually proceed to block 566, where the floppy disk drive will be powered down in order to conserve power. In particular, the processor disables interrupt IRQ 6, which is used by the floppy drive, and then deactuates the FDDSLT signal so that the floppy disk drive turns itself off or at least enters a low power state. Then, the processor disables the local standby timer 351, and sets the FO flag (FIG. 15) in order to indicate that power to the floppy drive is currently off. Then, the processor returns at 563 to the calling routine shown in FIGS. 16A–16C.

In FIGS. 16A–16C, it may be determined at block 514 that the source of the PMI was created by the SCP 316 using the line EXTPMI, in which case control proceeds to block 568, where a subroutine call is made to the EXTPMI handler routine shown in FIGS. 20A–20D. There are three possible reasons why the SCP may have initiated a PMI. Therefore, at 571 in FIGS. 20A–20D, the processor begins by asking the SCP 316 to send a byte indicating which of the three conditions was the reason for the PMI. Upon the receipt of this byte, the processor proceeds to block 572, where it checks for the first of these conditions.

In order to discuss this first condition, it is important to understand that, if the system has attempted to enter either the global standby mode or the suspend mode, and if it found that the hard disk drive 323 was still busy, then as described in more detail below and in the previously-mentioned copending application, the SCP will actuate the ENABLE line to the gate 438, and then return to the interrupted application program. Then, the instant the hard disk drive 323 finishes what it is doing and deactuates the LED line which controls its light emitting diode, the gate 438 will actuate the HDNB line to gate 433 which in turn will actuate the EXTPMI line.

Consequently, at block 572, the processor 311 checks the information received from the SCP in order to see whether the reason for the PMI was the signal from the hard disk. If it was, then control proceeds to 573, where the processor checks the ST flag (FIG. 15) in order to determine whether it was previously attempting to enter suspend mode or global standby mode when it found that it had to wait for the hard disk. If the flag is not set because the system was attempting to enter the suspend mode, then control proceeds to block 576, where a subroutine call is made to the suspend handler routine, which will be described in more detail later. On the other hand, if it is determined at 573 that the system is attempting to enter global standby mode, then at 577 the processor instructs the hard disk 323 to spin down its motor, and control then proceeds to block 578 where a subroutine call is made to a routine which causes the processor to enter the global standby mode, as discussed in detail later. Upon termination of the suspend mode or the global standby mode, control proceeds from block 576 or 578 to block 579. Also, if it had been determined at block 572 that the source of the PMI was not a signal from the hard disk, then control would have proceeded at 581 directly to block 579.

In 579, the processor checks for the second condition which may have caused the SCP 316 to initiate the PMI. In particular, the SCP monitors the DC/AC signal from the power control circuit, which indicates whether the system is currently receiving DC power from the battery 396 or is receiving AC power from the converter 398. When the SCP detects that a change has been made from AC power to DC power, or from DC power to AC power, it actuates the EXTPMI signal to the main processor. If it is determined at block 579 that this is the reason for the PMI, then control proceeds to block 582. A feature of the system is that the SCP maintains configuration data for use under AC power which is different from the configuration information it maintains for use under DC power. For example, when operating on AC power, power consumption is less of a concern, and thus the user may elect to keep the floppy disk drive 327 powered up all the time when operating under AC power, and to allow the system to automatically power it down when not in use as described above only when operating under DC power. Accordingly, at block 582, the main processor instructs the SCP to send it appropriate configuration values, namely AC values if a switch has been made to AC mode and DC values if a switch has been made to DC mode. Then, the processor implements these values in the system configuration, for example by reloading the preset registers 356 and 357 with their AC preset values rather than their DC preset values. The processor sends two timer preset values back to the SCP for use in a suspend timer and a backlight timer maintained by the SCP, as described later. Control then proceeds to block 583. Control also proceeds directly from block 579 to block 583 if it is determined at block 579 that the source of the PMI was not a change between AC and DC power.

In block 583, the processor checks for the third of the conditions which would cause the SCP to initiate a PMI. In particular, some of the keys 441 of the internal keyboard 317 can be pressed simultaneously, and the SCP is capable of detecting these special multi-key or hot key combinations. When the processor detects one of several special multi-key combinations, it actuates the EXTPMI line to the main processor, so that any program in progress is immediately interrupted, a special function is carried out, and then the program in progress is resumed. If it is found at 583 that one of the special multi-key or hot key combinations has been pressed, control proceeds to block 586, which is the first in a sequence of eight blocks 586–593 checking for each of the special multi-key combinations which can cause the SCP to initiate a PMI. This information is in a coded field in the byte sent by the SCP at 571 to indicate the reason for the PMI.

In block 586, the processor checks to see if the multi-key or hot key combination was one which indicates that the user wants the CPU to run at a slow clock speed. In a situation where the user is operating on battery power and is running a program which does not require fast processor speed, intentionally reducing the processor speed will reduce power consumption and thus permit the user to operate the system longer before the battery requires recharging. Thus, in block 596, the processor actuates line 391 (FIGS. 13A–13D) to cause the speaker 392 to beep once, and then clears the FC flag (FIG. 15) in order to indicate that the selected CPU speed is a slow speed. The processor does not immediately change the clock speed because, as mentioned above in association with blocks 506 and 522 in FIGS. 16A–16C, the PMI handler routine always executes at a fast clock speed. The slower speed selected in block 596 by clearing the FC flag will be implemented in block 522 as the processor prepares to leave the PMI handler routine.

On the other hand, if the hot key is not a request for slow CPU operation, then control proceeds from block 586 to block 587, where a check is made to see if the hot key is a request for fast CPU operation. If it is, control proceeds to block 597, where the processor causes the speaker 392 to beep twice and then sets the FC flag in order to indicate that a fast processor speed is desired.

If it is determined in block 587 that the hot key is not a request for a fast processor speed, then control proceeds to block 588, where a check is made to see if the hot key is a request for a pop-up/set-up screen, which permits the user to change system set-up information in the middle of an application program. If this is the hot key pressed, then control proceeds to block 598, where a subroutine call is made to a pop-up/set-up handler routine. This handler routine will be described after the other hot keys shown in FIGS. 20A–20D have been described.

If the actuated hot key is not the pop-up/set-up key, then control proceeds to block 589, where a check is made to see if the hot key pressed is a user request that the system enter the global standby mode. A user might want to enter global standby mode when he knows that he will not be using the system for a short period of time and wants to conserve power, but does not want to enter full suspend mode. If it is found that the user has requested intentional entry to global standby, then control proceeds from block 589 to block 601, where the processor reads a status register in the hard disk drive 323 in order to see if the hard disk drive 323 is busy. If the hard disk drive is not busy, then control proceeds directly to block 602, where a subroutine call is made to a routine which guides the system into standby mode, this routine being described in detail later.

On the other hand, if the hard disk is busy, then the entry to standby mode must wait until the hard disk is not busy. Therefore, control would proceed from block 601 to block 603, where the processor instructs the SCP to actuate the ENABLE signal in order to enable the gate 438, as previously mentioned. The processor also sets the ST flag (FIG.

15) in order to indicate that, when the hard disk is no longer busy, the system should enter global standby mode rather than suspend mode, in particular as already discussed above in association with block 572 of FIGS. 20A–20D. Thus, after block 603, the PMI handler routine will continue and will eventually return control to the interrupted application program, and then when the hard disk drive 323 ultimately finishes what it is doing and deactuates its LED control line, a further PMI will be generated and will cause the system to eventually reach previously-described blocks 572, 573, 577 and 578 in order to enter the standby mode.

If it is determined at block 589 that the hot key pressed is not the request to intentionally enter the global standby mode, the processor proceeds to block 590, where a check is made to see if the hot key is a request by the user for a change in the palette used for the LCD 321 (FIGS. 13A–13D). In this regard, the LCD 321 in the preferred embodiment is a monochrome display rather than a color display, and the flash RAM 331 contains 16 predefined palettes which represent respective variations of the gray scale capabilities of the monochrome LCD 321. Since most application programs are written to operate with color displays, the screens they produce can sometimes be somewhat difficult to read when presented on a monochrome display. However, the screens may be easier to read with some gray scale palettes than with others.

The present system permits a user to quickly run through an adjustment of palettes while within an application program, where he can immediately see the effect of each palette. In pre-existing systems, it was typically necessary to exit the application program, adjust the palette selection in the set-up data, and then re-enter the application program to see the effect of the new palette, which is obviously tedious and time consuming when there are several possible palettes which need to be tried. Thus, if it is determined at 590 that the user wants to shift down one palette in the table of 16 palettes, control is transferred to block 606, where the processor retrieves an identification of the current palette stored at 485 in the PMRAM, obtains the next lower palette from the table of 16 palettes in the flash RAM 331, configures the registers 446 of the video controller 318 to implement this new palette, and records an identification of this new palette at 485 in the PMRAM.

If it is determined at 590 that the hot key is not a request to shift down a palette, control proceeds to block 591 where a check is made to see if the request is to shift up one palette. If so, control proceeds to block 607, where the processor carries out a sequence similar to that in block 606 except that it shifts up one palette in the table rather than down one palette.

If it is determined at block 591 that the actuated hot key is not a request to shift up a palette, then control proceeds to block 592, where a check is made to see if the hot key pressed is a request that the current display device be swapped, in particular from the LCD 321 to an external CRT 426 if the LCD is currently active, or from the external CRT to the LCD if the CRT is active. If the user has requested this change, then control proceeds from block 592 to block 608, where the processor instructs the SCP to identify the active video unit. The response from the SCP is examined at 609, and if the LCD is active control proceeds to block 610, where the processor instructs the SCP to deactuate the line LCDPWR to power down the LCD, and to set the CRT/LCD line to select the CRT. Then, the processor configures the video controller for operation with the CRT. On the other hand, if the CRT is found to be active at 609, then control proceeds to block 614, where the processor configures the video controller for operation with the LCD, and then instructs the SCP to set the CRT/LCD line to select the LCD, and to actuate the LCDPWR line to power up the LCD.

If it is determined at block 592 that the actuated hot key is not a request for a display swap, then control proceeds to block 593, where a check is made to see if the hot key pressed is a request to temporarily lock up the system. If it is not, then control proceeds to block 611, which is the common return from the EXTPMI handler to the calling routine of FIGS. 16A–16C. Otherwise, control proceeds from block 593 to block 612, where the processor 311 instructs the SCP 316 to send a system password which is stored in the EEPROM 439 of the SCP. Then, at block 613, the processor uses the display to ask the user to enter a password, waits for a line of information, and accepts the line of information entered by the user on the keyboard. Then, at block 616, the system compares the passwords from the user and the SCP, in order to see whether they are the same. If they are not, the system continues to loop through blocks 613 and 616. Otherwise, control proceeds from block 616 to the return at 611. By using this hot key, the user can essentially leave his system when it is up and running while preventing another from using it while he is gone, because the system will not respond unless the correct password is entered. When the user returns, he enters the correct password, and then can return to whatever he was doing.

Referring back to block 598 in FIGS. 20A–20D, the pop-up/set-up handler is shown in FIG. 21, and will now be described. Execution begins at block 618 in FIG. 21, where the processor instructs the SCP to do a partial state save, in response to which the SCP sends the processor two bytes containing mode information. For example, the mode information indicates whether the interrupted application program currently has the keyboard disabled. Obviously, the keyboard needs to be enabled where the PMI handler needs to obtain input from the user through the keyboard, and thus this mode information is saved so that the SCP can change its mode of operation to meet the needs of PMI handler, and after meeting these needs the original mode information is restored as described below so that the system will be returned to the interrupted application program in the same mode it was in when the application program was interrupted. After receiving the two bytes of mode information at 618 from the SCP, the processor stores them at 483 (FIG. 15) in the capital PMRAM. Then, the processor instructs the SCP to send the current password. If it is determined at block 621 that the password is active, the user enters the password and it is checked at blocks 622 and 623 in a manner similar to that described above in association with blocks 613 and 616 of FIGS. 20A–20D. If the user enters a password which is not correct, then the portion of the handler which permits the user to change set-up information is skipped at 626. However, if the password is found to be correct at 623, or is found not to be active at 621, control proceeds to block 627, where the user is presented with a menu or menu system which permit the user to specify a set-up parameter to be changed and to then enter a new value for that parameter. At block 628, the processor accepts and saves this parameter. The types of parameters which can be entered include an AC value and a DC value for the preset time period for each of the timers 351 and 352, an AC value and a DC value for the suspend timer and backlight timer which are implemented in the software of the SCP (as described later), a user indication of whether the mask for the resume mask register 382 should permit a resume reset in response to an ALARM signal from the real time clock 376 or a modem ring signal MDMRI from the modem, a user indication of whether deactuation of the manual switch 313 should place the system in a suspend condition or a power-off condition, a user indication of whether the LCD or an external CRT should be used as the active display, and a user specification of a new password. Other set-up information which is conventional and not pertinent to the present invention can also be entered. As each item is entered, the processor 311 sends it to the SCP 316 with a command instructing the SCP to store the information in the EEPROM 439. At 631, the processor can loop to continue to accepting information at 627 and 628 so long as the user wants to change set-up values. When the user is done, control proceeds to block 632, where the processor 311 instructs the SCP 316 to accept and restore the two mode bytes which the SCP sent to the processor 311 at block 618, and then follows the command with the two bytes. Then, at 633, a return is made to the calling routine.

Referring once more to FIGS. 16A–16C, if it is determined at block 513 that the source of the PMI is a time out of the global standby timer 352 (FIG. 13), control proceeds from 513 to block 636. Time out of this timer means that there has been little or no activity in the system for a predetermined period of time, and therefore the system is going to automatically transition to a global standby mode in which the processor 311 places the number of system components in a reduced power mode and then halts itself in order to conserve power, or to the suspend mode.

Figure 22:
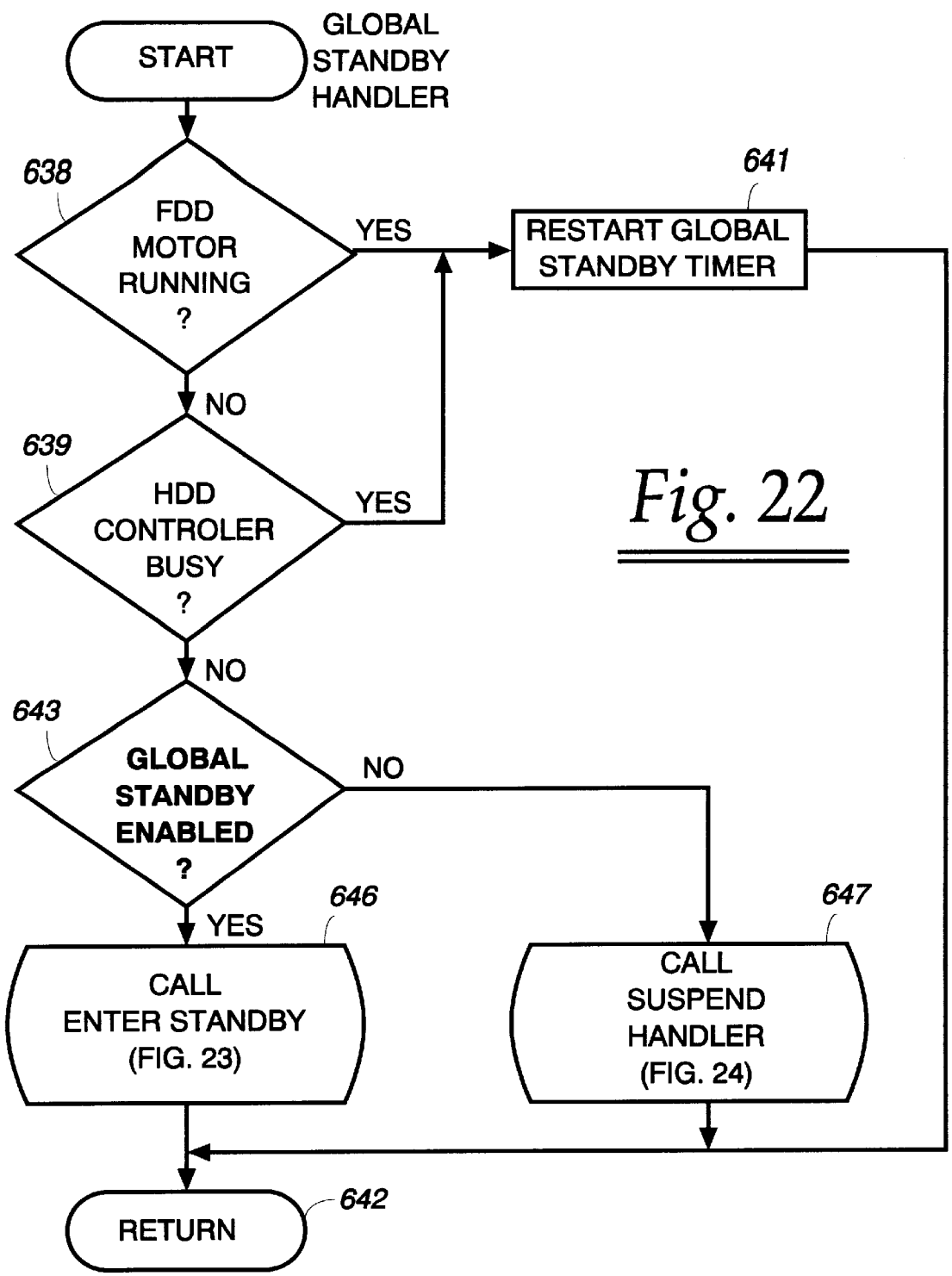

At block 636, a subroutine call is made to a global standby handler routine, which is shown in FIG. 22. A condition for entering global standby mode is that the hard disk drive 323 be quiescent. Therefore, the processor reads status information from the hard disk drive 323 in a conventional manner, and checks this information at 638 and 639 of FIG. 22 in order to determine whether the floppy disk motor is running or the hard disk controller circuitry is busy. If the motor is running or the circuitry is busy, then control proceeds to block 641, where the global standby timer 352 is restarted, and then at 642 a return is made to the calling routine without any entry to the standby mode or suspend mode.

More typically, the floppy disk and hard disk will not be busy, and thus control will proceed through blocks 638 and 639 to block 643, where the processor 311 checks the set-up information in the SCP in order to see whether the user has specified that time out of the global timer 352 is to be interpreted to mean that the system enters standby mode, or proceeds directly suspend mode. In particular, if the user has specified a standby preset, then a timeout of timer 352 means the system will enter standby mode. On the other hand, if the user has not specified a standby preset but has specified a suspend preset after which the system is to enter suspend mode, then the suspend preset is used for timer 352, and when it expires the system enters suspend mode. If the system is to go to suspend mode, then control proceeds to block 647, where a subroutine call is made to the suspend handler which places the system in suspend mode, as described in more detail later. On the other hand, the more common determination at 643 is that the user intends the system to go to standby mode, and thus control would proceed to block 646, where a subroutine calls is made to the previously-mentioned routine which guides the system into global standby mode. This routine will now be described in association with FIGS. 23A–23B.

Figure 23A:
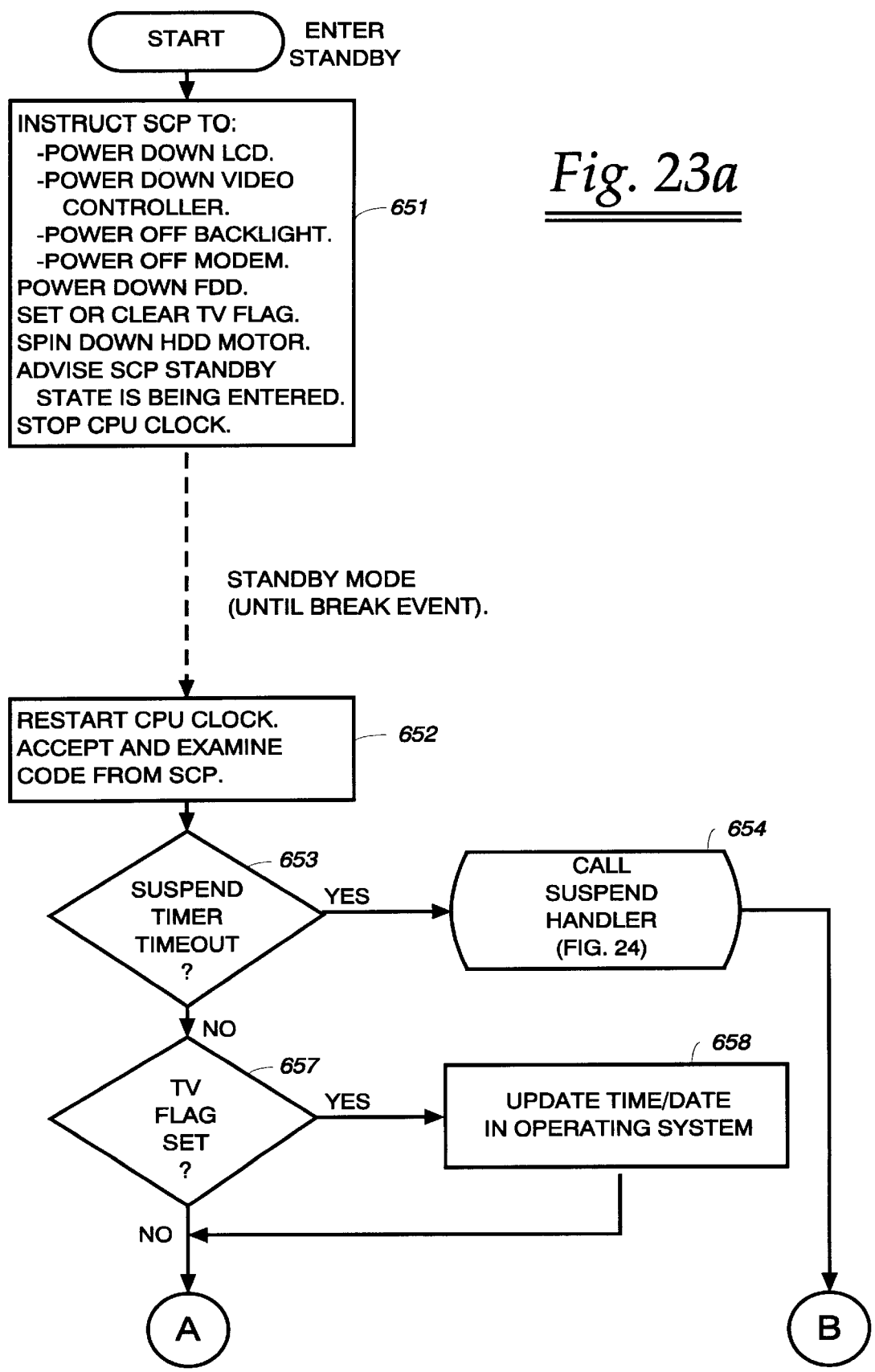

In FIGS. 23A–23B, the system begins by sending commands to the SCP which instruct it to deactivate the LCD-PWR line in order to power down the LCD display if the display is not already powered down, to deactivate the VIDEN line in order to power down the video controller, to deactivate the BLON line in order to power down the backlight for the LCD display, and to deactivate the MDMEN line in order to turn off the modem 322. Then, the processor 311 deactivates the FDDSLT line in order to power down the floppy disk drive. Then, the processor either sets or clears the TV flag (FIG. 15) in order to indicate whether or not the operating system 471 (FIG. 15) supports time and date information. Then, the processor 311 sends a command to the hard disk drive 323 which tells it spin down its motor, and sends a command to the SCP which advises the SCP that the processor 311 is entering the standby state, after which the processor 311 stops its clock. Thus, the processor 311 essentially stops operating. It remains in this state until some form of system activity causes the selector 346 to actuate the BREAK EVENT signal.

While the processor 311 is in this inactive state, the SCP 316 remains fully active, and in fact has the responsibility of waking up the main processor 311 in the event certain things occur. In particular, if a key on the keyboard 317 is pressed, then SCP will actuate interrupt signal IRQ1, as it normally does for a standard key press. The IRQ1 interrupt signal is connected to the selector 346, and will actuate the BREAK EVENT signal to wake up the processor 311. Also, the SCP 316 monitors the modem ring signal MDMRI from the modem 322, and will wake up the processor 311 in the event there is an incoming ring signal from a telephone line connected to the jack 434. Further, if the user has specified a suspend timer preset, the SCP will maintain a software timer starting from the point in time when the main processor 311 enters the standby mode. The basic philosophy is that, if the system has been in global standby mode for the specified time period with no activity sufficient to wake it up, it will automatically proceed to the suspend mode when the time interval expires in order to further conserve power. Of course, the user can specify that this timer is not to be active, in which case the system will simply remain in the standby mode. However, for purposes of explaining the present invention, it will be assumed that the user has enabled the suspend timer function, and that the SCP therefore maintains this timer in software. In the event this timer in the SCP expires, or in the event the SCP detects a modem ring signal, the SCP generates a false keystroke signal by actuating the interrupt signal IRQ1 in order to actuate the BREAK EVENT signal in the processor 311 and thus wake the processor up. Whereas in the case of a real keystroke the SCP sends the processor a coded representation of the particular key pressed, in the case of suspend timer expiration or a modem ring signal, the SCP sends one of two respective codes which do not correspond to any existing key on the keyboard and which the processor 311 is programmed to recognize as representing the timer expiration or the modem ring signal.

Thus, when the BREAK EVENT signal is eventually actuated in order to wake the processor up, the hardware of the processor 311 automatically restarts the CPU clock, and then the processor 311 proceeds at 652 with the software routine of FIGS. 23A–23B, in which it accepts and examines the code from the SCP. If it is determined at 653 that the code is an indication that the software suspend timer maintained by the SCP during standby has expired, then control proceeds to block 654, where a subroutine call is made to the routine which handles entry into the suspend mode, and thus the system proceeds automatically from standby mode into suspend mode. On the other hand, if it is determined at 653 that the BREAK EVENT signal was caused by any other condition, such as an actual keystroke on the keyboard or a modem ring indicator signal, then the processor 311 needs to return to the normal operational mode, and therefore proceeds to block 657.

In block 657, the processor 311 checks the TV flag (FIG. 15), which it set before entering standby in order to provide an indication of whether the operating system maintains time and date information. If the flag is set to indicate that it does, then control proceeds to block 658, where the processor 311 extracts up-to-date time and date information from the real time clock circuit 376 (FIGS. 13A–13D), and updates the time/date information at 472 (FIG. 15) in the operating system.

Control then proceeds to block 661, where the processor 11 checks the shadow register information at 486 (FIG. 15) for the floppy disk drive, in order to determine the operational mode the floppy disk drive was in before the floppy disk drive was powered down for the standby state. The floppy disk drive can be operated in an ALWAYS ON mode in which it is never turned off except for standby and suspend, an AUTO ON mode in which it is left off when the system is powered up but will be turned on and then remain on if it is accessed at any point, and a FULL AUTO mode in which it is turned on and off as needed as a function of the extent to which it is being accessed, as already described above. With respect to the FULL AUTO mode, the I/O trap logic 361 and the local timer 351 are set to disable the FDD TRAP and the LOCAL STANDBY signals except when the floppy disk drive is being operated in the full-auto mode. If the floppy disk drive is not being operated in the FULL AUTO mode, then control proceeds from block 661 to block 662, where the processor 311 actuates the line FDDSLT in order to restore the power to the floppy disk drive 327, and restores the state of the floppy disk drive from the shadow registers stored at 486 (FIG. 15) in the main memory. In either case, control proceeds to block 663, where the processor 311 instructs the SCP 316 to actuate the line MDMEN in order to restore power to the modem 322, and to actuate the line VIDEN in order to restore power to the video controller 318. The processor 311 then asks the SCP to identify whether the active video unit is the LCD 321 or an external CRT 426. If the reply from the SCP indicates that the active unit is the LCD, then control proceeds to block 667, where the processor 311 instructs the SCP to set the line CRT/LCD to select the LCD, and to actuate the signal BLON in order to turn on the backlight to the LCD. On the other hand, if the external CRT is the active unit, then control proceeds from block 666 to block 668, where the processor 311 instructs the SCP to set the line CRT/LCD to select the external CRT 426. In either case, control returns at 669 to the calling routine.

Subroutine calls to the suspend handler routine which guides the system into suspend mode have previously been mentioned in association with block 531 in FIG. 17, block 576 in FIGS. 20A–20D, block 647 in FIG. 22, and block 654 in FIGS. 23A–23B. The suspend handler routine will now be described in association with FIGS. 24A–24B. As previously mentioned, suspend mode is not entered while the hard disk is busy. Therefore, the processor 311 begins at 671 in FIGS. 24A–24B by reading in a conventional manner certain status information from the hard disk drive 323 in order to determine whether it is busy. If it is, control proceeds to block 672, where the processor instructs the ScP to actuate the ENABLE signal to the gate 438, and then clears the ST flag (FIG. 15) in order to indicate that, when the processor 311 is signalled that the hard disk is no longer busy, the processor will decide at block 573 in FIGS. 20A–20B to enter the suspend mode at block 576 rather than the standby mode at block 578, as already described in association with FIGS. 20A–20B. From block 672, control proceeds to 673, where a return is made from the suspend handler routine without entry into the suspend mode.

On the other hand, if the hard disk is not busy at block 671, then control proceeds to block 676, where the processor 311 reads the current status of the hard disk drive 323 and saves it in the portion 482 of the PMRAM (FIG. 15). The precise manner in which this occurs is the subject of the above-mentioned copending application. The precise manner in which information is obtained from the hard disk drive 323 is not essential to an understanding of the invention which is of interest here, and details of the manner in which this information is obtained from the hard disk are therefore not included here. After this information has been obtained from the hard disk and stored in the memory, the processor 311 deactuates the line HDDSLT in order to place the hard disk drive in a reduced power mode.

Control then proceeds to block 677, where the processor checks the BATTLOW line from the SCP in order to determine the state of the battery power. If it is determined that the battery power is waning, then control proceeds directly to block 678, which is described in a moment and causes the system to proceed into suspend mode. On the other hand, if the battery power is sufficient, then control proceeds to block 681, where the processor checks to see if the floppy disk drive is busy. If it is, then control will proceed to block 682, where the processor 311 actuates line 391 (FIGS. 13A–13D) in order to cause the speaker 392 to beep, and warns the user on the display that the floppy disk drive is active. Then, at 673, control is returned to the calling routine without entry into the suspend mode. On the other hand, if it is determined at block 681 that the floppy disk drive is not busy, then control proceeds to block 678 to begin the final sequence of entry into the suspend mode.

In block 678, the processor 311 extracts from its stack 492 (FIG. 15) an indication of the point from which the suspend handler routine was called, in particular in the form of the value of the instruction pointer which has been saved on the stack and which indicates the point to which program control is to be returned. The processor 311 saves this in the main memory for use during a subsequent resume, as described later. Then, at block 683, the processor 311 checks to see whether it is carrying out an automatic entry to suspend mode from standby mode, in particular through block 654 in FIGS. 23A–23B. If it is, then the processor 311 has already addressed whether or not the operating system supports time and date information as part of its entry into the standby mode. On the other hand, if it is not entering suspend mode directly from standby mode, it proceeds to block 686, where it either sets or clears the TV flag (FIG. 15) in dependence on whether or not the current operating system supports time and date information. In either case, control then proceeds to block 687.

In block 687, the processor 311 takes the CPU state saved at 481 (FIG. 15), and creates a copy of it at 488. This is because a further PMI interrupt will be intentionally induced during a resume from the suspend mode in a manner described later, at which point the hardware will necessarily overwrite the information saved at 481. Since this information is needed to resume the interrupted application program, a copy of it is temporarily saved at 488. In addition, the processor 311 saves at 488 some selected internal registers which are not automatically saved at 481 in response to a PMI. This is because the PMI handler routine can service most PMI interrupts without altering these selected registers, and thus in order to speed up handling of most PMI interrupts the processor 311 does not save the selected registers. On the other hand, these registers must be saved in order to enter suspend mode, because the portion of processor 311 which contains them will be powered down during suspend mode and the contents of these registers would thus be lost. Therefore, before entering suspend mode, they are saved at 488.

Figure 24A:
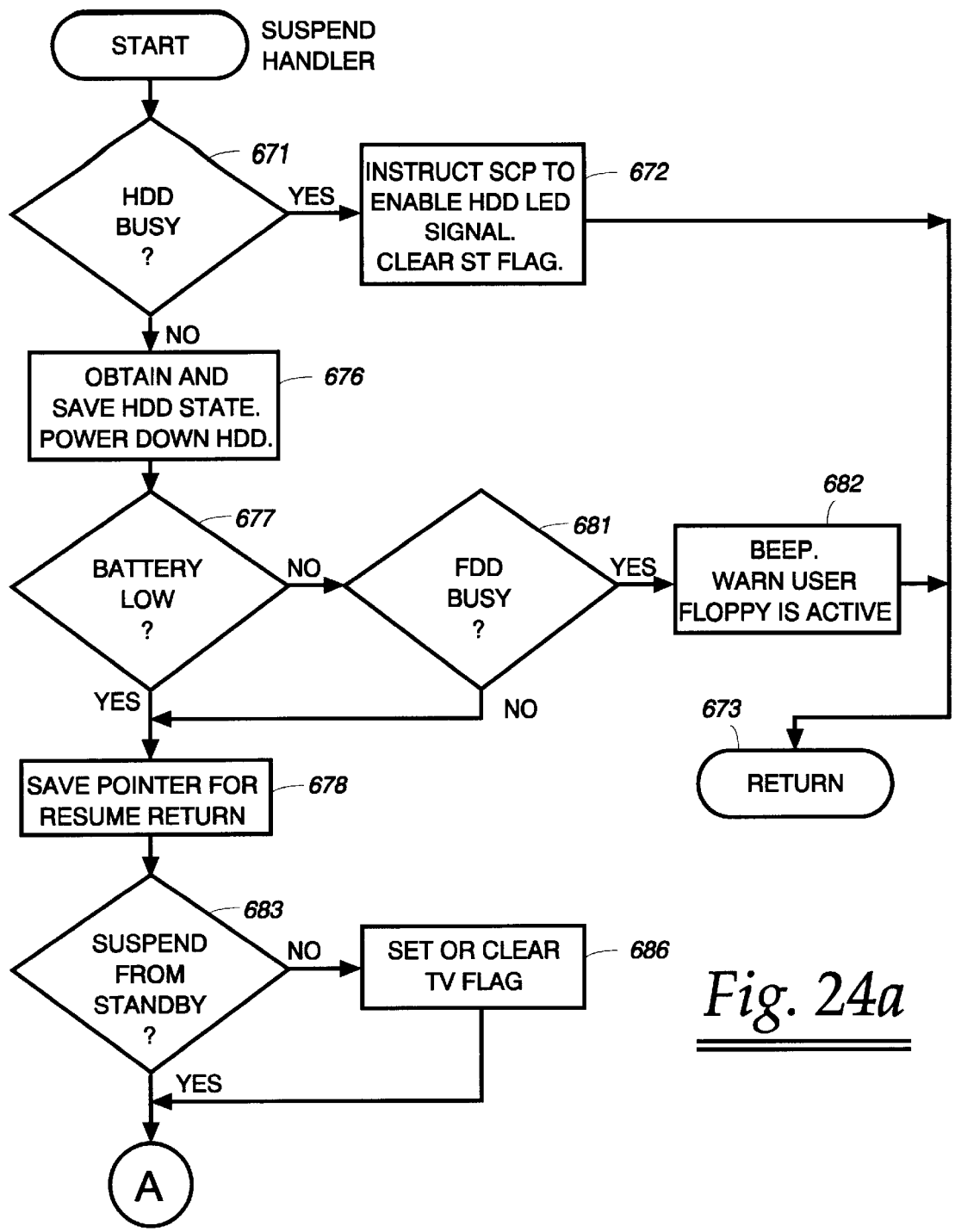
Figures 24, 24B:
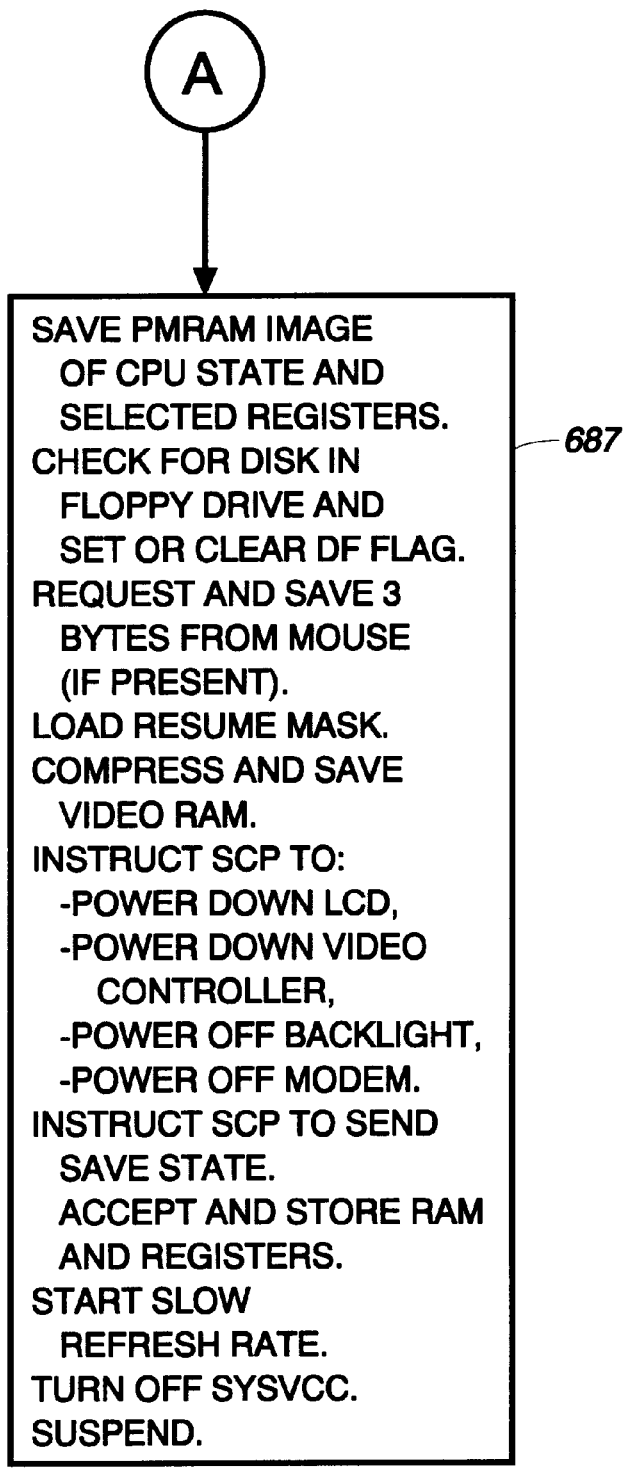

Continuing with block 687 in FIGS. 24A–24B, the processor reads status information from the floppy disk drive in order to determine whether a floppy disk is present in the floppy disk drive, and sets the DF flag (FIG. 15) if a disk is present or clears the flag if a disk is not present. This is so that when operation resumes it will know if a disk should be present in the drive, because it is possible that a user might remove the disk while the system is in suspend mode or, worse yet, replace the disk with a different disk. If the interrupted application program were in the middle of writing data to the disk when the suspend occurred, it would have no way of knowing at resume that the disk had been changed, and might complete its task of writing data to the floppy disk drive without knowing that it was writing the data on to the wrong disk.

Then, still at block 687, the processor reads 3 bytes of status information in a conventional manner from the mouse 421 (if one is present), and stores the bytes at 482. An external keyboard, on the other hand, has no such status information which must be saved, but instead is always maintained in exactly the same configuration and mode as the internal keyboard. Then, the processor 311 configures and loads into mask register 382 (FIGS. 13A–13D) the resume mask which determines the events which will wake the processor up from the suspend mode. Then, the processor reads the video RAM 448 from the video controller 318, compresses the video information using a conventional data compression technique, and then stores the compressed data in the portion 478 (FIG. 15) of the main memory. Then, the processor 311 sends a series of commands to the SCP which instruct the SCP to deactuate the line LCDPWR in order to power down the LCD display, to deactuate the line VIDEN in order to power down the video controller, to deactuate the line BLON to turn off the backlight for the LCD display, and to deactuate the line MDMEN in order to power down the modem. Then, the processor 311 sends the SCP a command which instructions the SCP to send the processor 311 the contents of its RAM 440 and certain internal registers. The processor 311 accepts this information from the SCP, and stores it at 482 (FIG. 15) in the PMRAM. Then, the processor 311 sets the refresh control circuit 386 (FIGS. 13A–13D) to carry out extremely slow refresh to the main memory, and then deactuates the signal SYSPWROFF to the power control circuit 312 so that the power control circuit turns off the SYSVCC power to the SCP, keyboards, video controller, hard disk drive, LCD display, modem, floppy disk drive, and ROM 328. The power control circuit 312 is, of course, still supplying PMVCC power to the main memory 326, the processor 311, and flash RAM 331. Finally, the processor 311 executes a software instruction which causes it to enter suspend mode, as a result of which the processor 311 stops operating and internally turns off power to most of its circuits, with the exception of circuits such as the real time clock 376 which must continue to maintain time and date information, the resume control circuitry 381–383 which must be capable of detecting conditions causing operation to resume, and the refresh control circuit 386 which is maintaining the data in main memory 326.

If the user has specified that an ALARM signal from the real time clock 376 or a modem ring indicator signal MDMRI from the modem 322 is to be capable of waking up the processor, then the processor will have configured the resume mask 382 so that either of these events will produce a RESUME RESET signal. However, the most common cause for a resume is manual actuation of the switch 313 by a user.

Figure 25A:
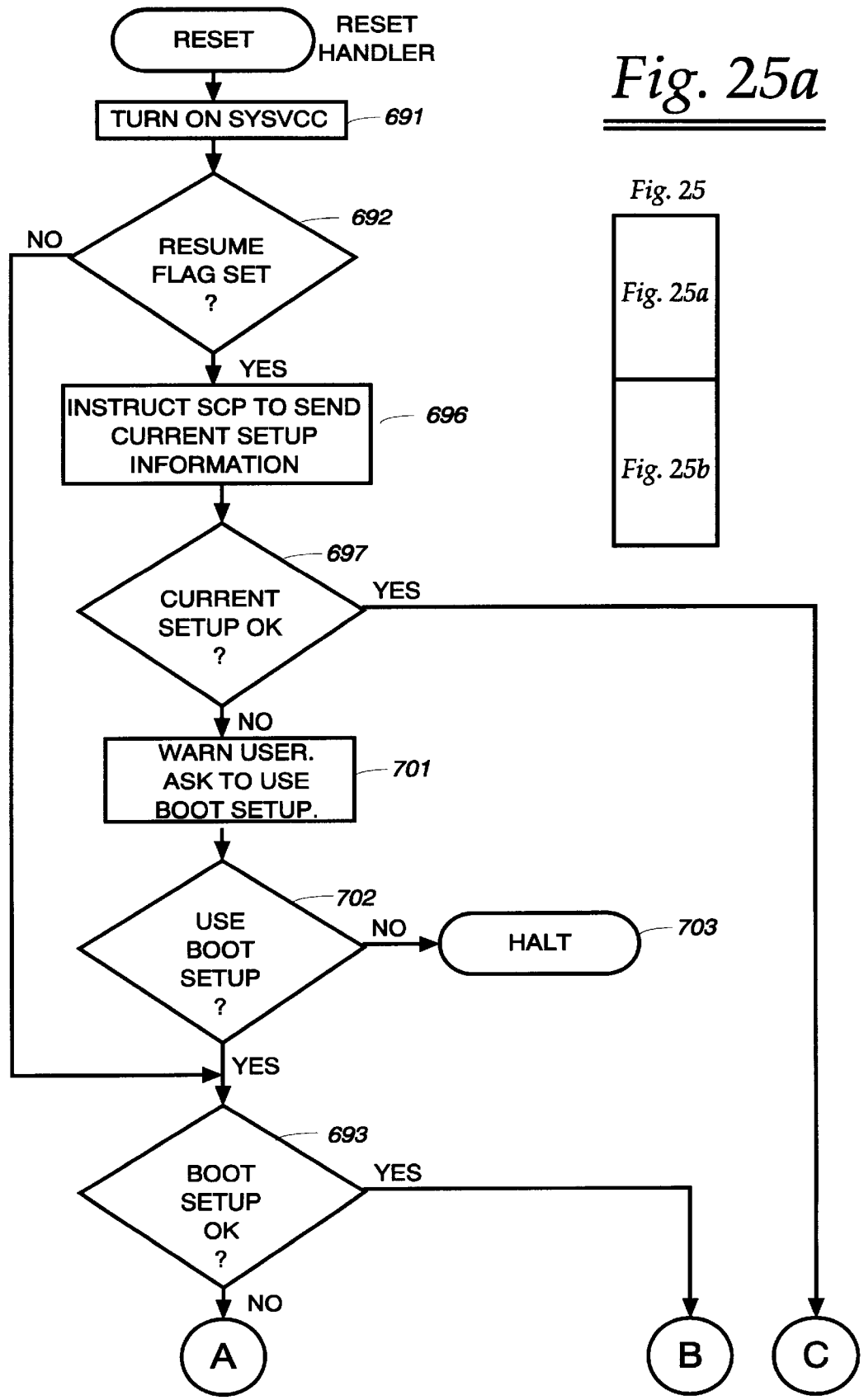
Figure 25B:
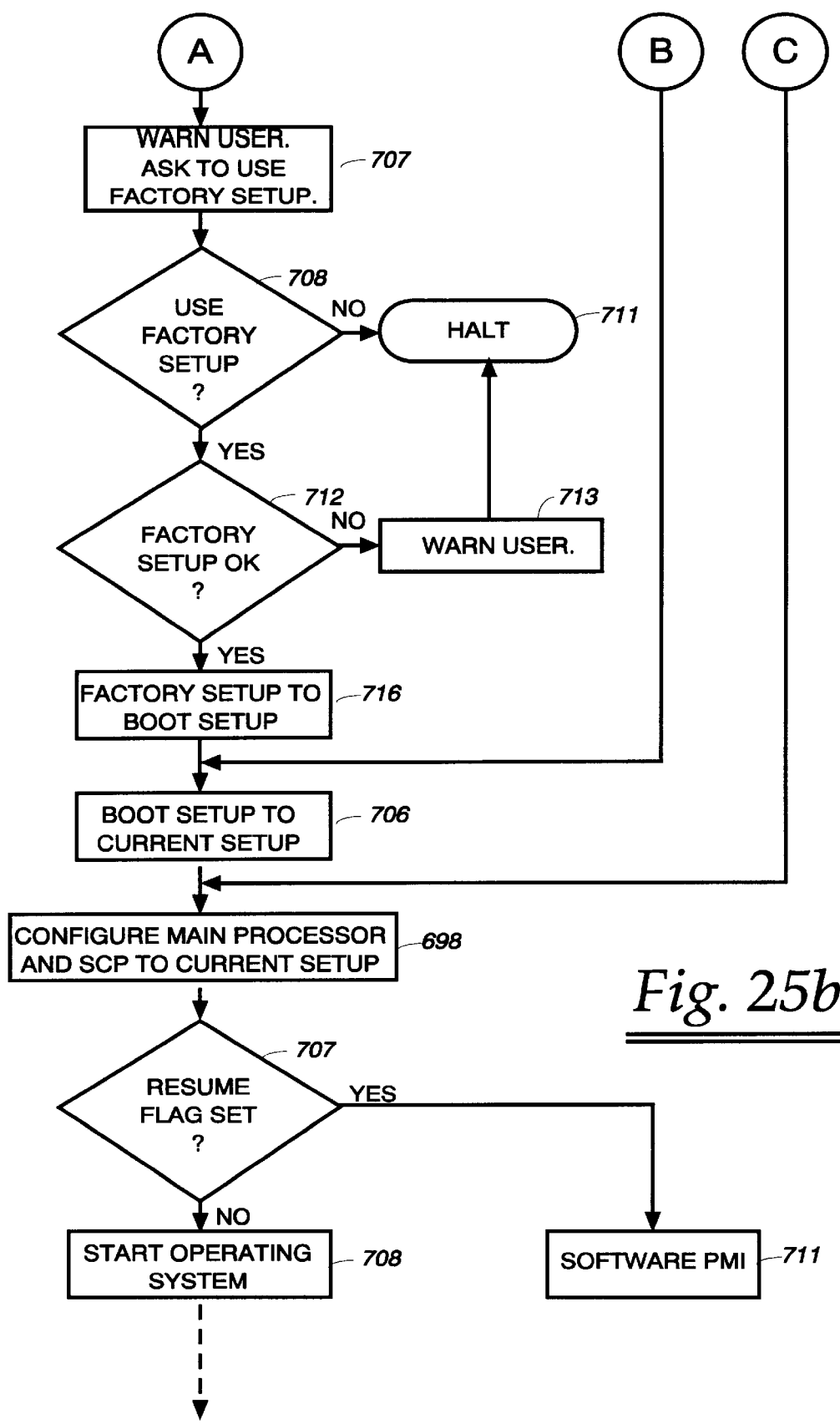

The RESUME RESET signal sets the resume flag 383, whereas this flag is automatically reset by any other reset signal. Further, the RESUME RESET causes the processor 311 to internally restore power throughout its internal circuitry, and the processor automatically brings the refresh control circuitry 386 back to a normal state so that the main memory 326 can be accessed. In response to any type of reset, the processor 311 automatically goes to a predetermined location in the flash ram 331 and executes the first instruction of a reset handling routine stored there. This routine is shown in FIGS. 25A–25B. The processor 311 may begin by doing some internal diagnostics, but this is conventional and therefore not illustrated in FIGS. 25A–25B. For purposes of the present invention, the first significant step performed by the processor 311 is to deactuate SYSP-WROFF in order to cause the power control circuit 312 to turn system power SYSVCC back on, so that the SCP, keyboard, video controller, LCD display, modem, hard disk drive and floppy disk drive again have access to a source of power.

Then, at 692, the processor checks the resume flag 383 (FIGS. 13A–13D). If it is set, then the processor will attempt to configure the system using the set-up information stored in the EEPROM 439 of the SCP. If it is not set, then the system is performing a cold boot and will attempt to configure itself using the set-up information stored in the RAM 377 of the real time clock circuit 376. More specifically, if the resume flag is set to indicate that the system is resuming from suspend mode, then control will proceed from block 692 to block 696, where the system will attempt configuration using the current set-up information stored in the EEPROM 439 of the SCP.

In particular, at block 696, the processor 311 instructs the SCP to send current set-up information to it. It performs a checksum on this information and compares it at 697 to a checksum value present in the set-up information itself in order to determine if the set-up information is valid. If it is, then control proceeds directly to block 698, where the system will configure itself using this set-up information. On the other hand, if it is determined at block 697 that the current set-up information is not valid, then control proceeds to block 701, where the system warns the user that the current set-up information is not valid and asks for authorization to use the boot set-up information stored in the real time clock circuit 376. If the user refuses, then block 702 transfers control to block 703, where the system halts. The user would have the option of restarting the system with a conventional set-up disk in order to configure it in a desired manner.

Typically, the user would approve use of the boot set-up information, and control would thus proceed from block 702 to block 693, where the processor 311 would run a checksum on the boot set-up information in the real time clock circuit 376 and compare the checksum to a checksum stored in the real time clock circuit 376. If the checksum was accurate, then control would proceed directly to block 706, where as described below the 10 system would be configured using the boot set-up information. Otherwise, control proceeds to block 707, where the processor 311 warns the user that the boot set-up information is not valid and asks for authorization to use the factory default set-up information stored in the flash RAM 331. If the user refuses permission, then at 708 control is transferred to block 711, where the system halts.

Otherwise, control proceeds to block 712, where the processor runs a checksum on the factory default set-up 20 information in the flash RAM 331 and compares the result to a checksum stored in the flash RAM. If an error is detected, control proceeds to 713, where the user is warned that the system has no usable set-up information, and then the processor halts at 711. However, if the factory default set-up information is found to be accurate at block 712, then control proceeds to block 716, where the factory default set-up information is copied from the flash RAM to the RAM 377 in the real time clock circuit 376. Then, at block 706, the set-up information in the real time clock circuit 376 is sent to the SCP, and the SCP stores it in the EEPROM 439 for use as the current set-up information. Then, at block 698, the processor 311 configures the system according to the set-up information which is stored in the SCP.

Then, at block 707, the processor again checks the resume flag 383 in order to determine if a resume is being performed. If it is not, then control proceeds to block 708, where the processor starts the operating system in a conventional manner. Otherwise, control proceeds from block 707 to block 711, where the processor 311 executes a software instruction which generates a PMI interrupt in order to invoke the previously-described PMI handler routine. Thus, the software PMI causes the processor to continue with the PMI handler routine shown in FIGS. 16A–16C. In particular, at previously-described block 502, the system checks the resume flag again in order to determine whether the PMI handler has been entered as a function of resuming from a suspend state, or for some other reason. Since in this case the flag will be set, control proceeds to block 503, where a branch is made to a resume handler routine which is shown in FIGS. 26A–26C.

Figure 26A:
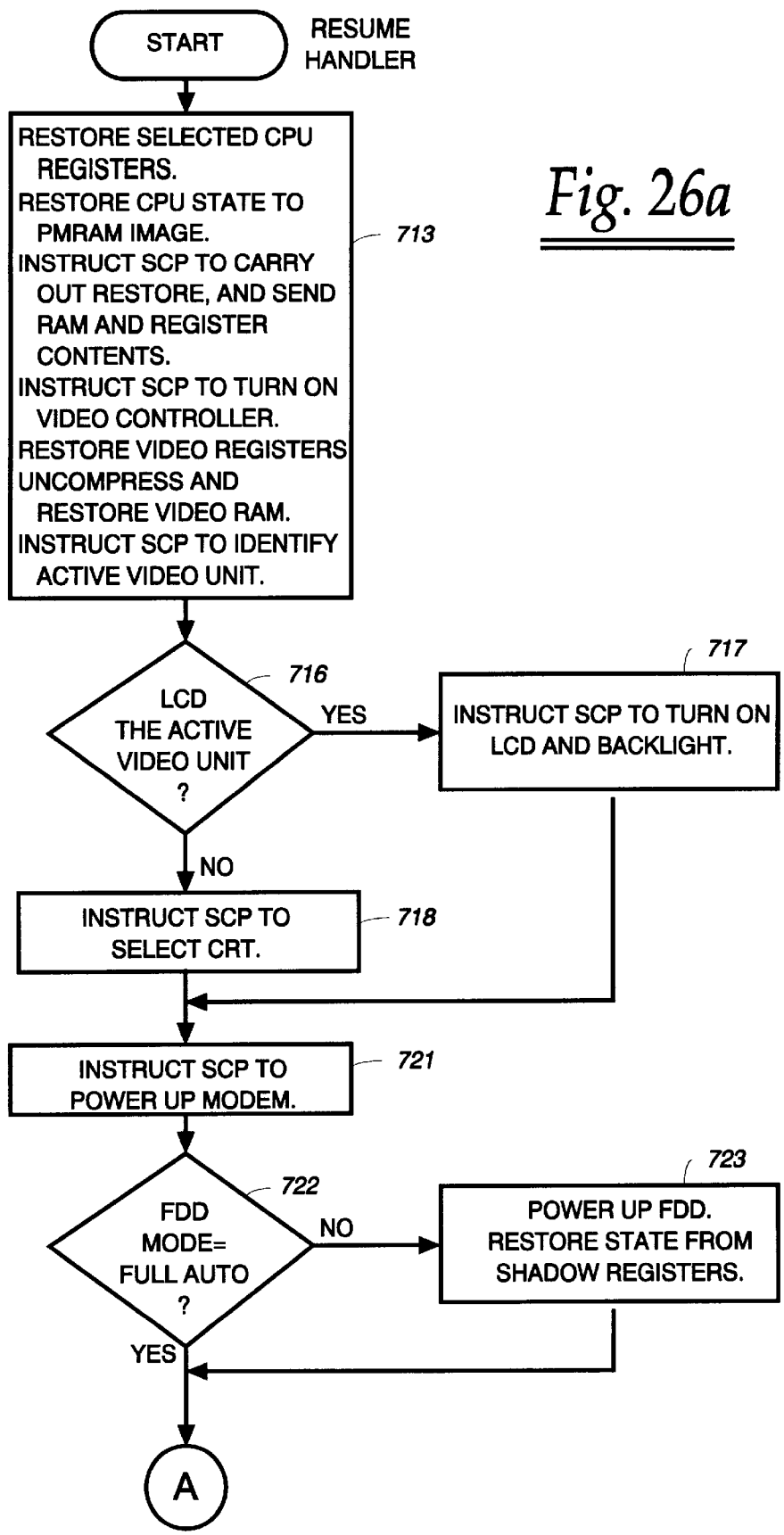
Figure 26B:
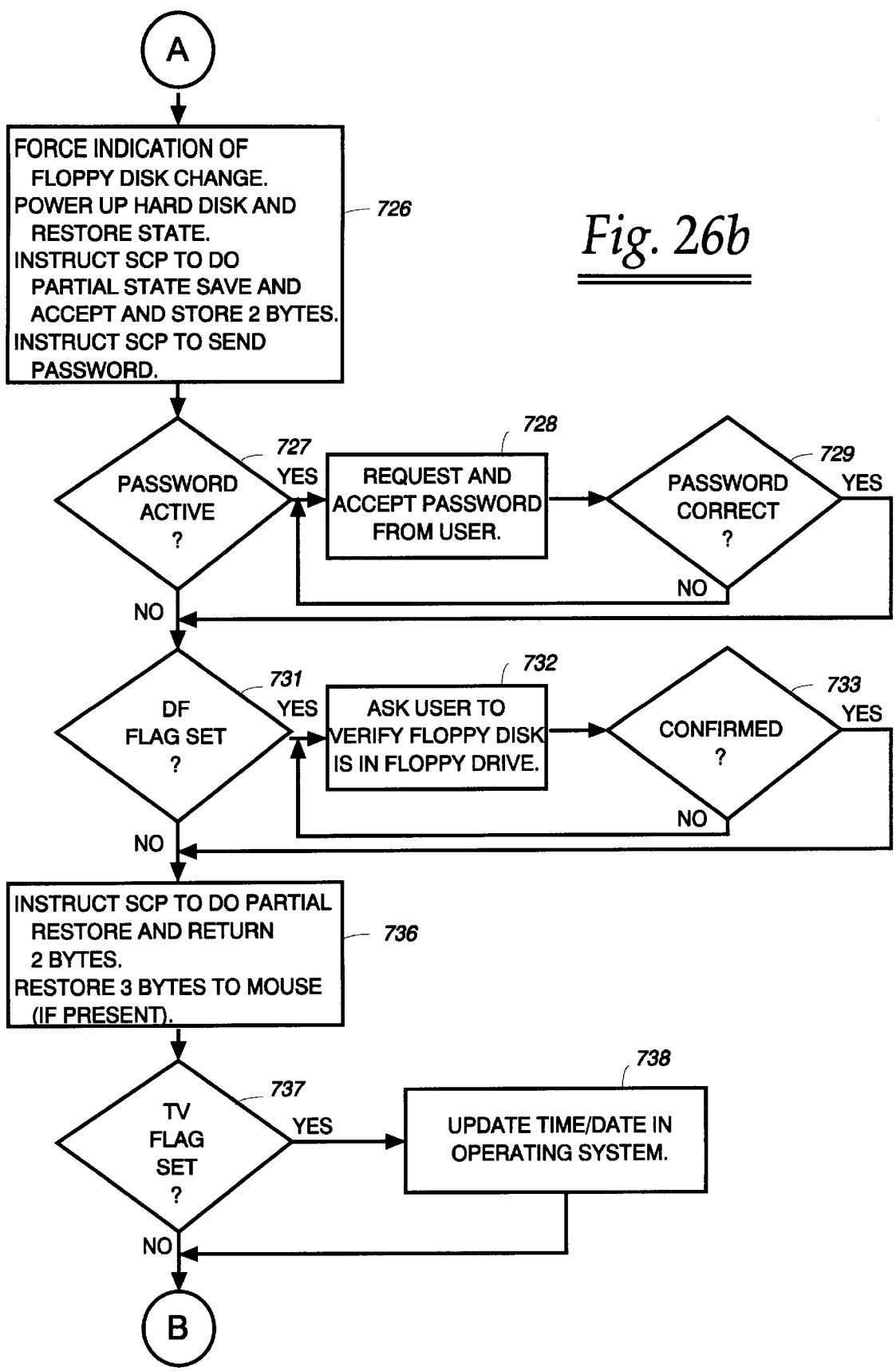
Figure 26C:
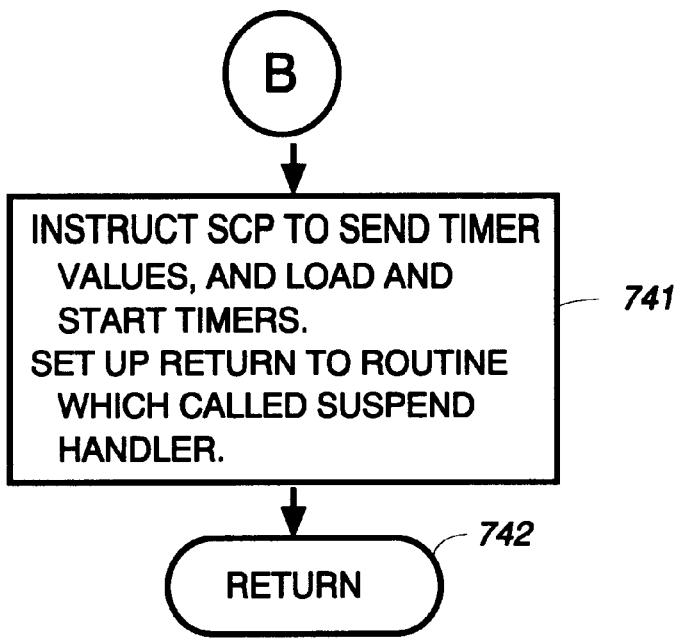
Figure 26:
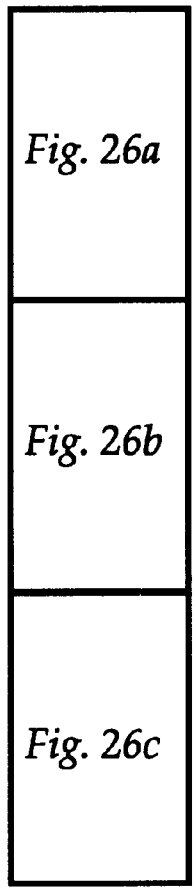

At block 713 in the resume handler routine of FIGS. 26A–26C, the processor 311 begins by extracting from portion 488 (FIG. 15) of the main memory the states of selected registers which it stored there, and restoring these values directly to the registers in the processor itself. Then, the processor transfers from the portion 488 to the portion 481 the states of the remaining processor registers, thereby overriding the information stored at 481 by the software PMI used to reenter the PMI handler, so that at the end of the resume handler the hardware will be able to find and restore these register states to the registers of the processor 311 when the PMI handler is terminated and the interrupted application program is resumed. Then, still at 713 in FIGS. 26A–26C, the processor instructs the SCP to carry out restoration of its state, and sends the SCP the contents of the SCP registers and RAM stored by the processor 311 in the main memory prior to entering suspend mode.

Then, the processor instructs the SCP to actuate the VIDEN signal in order to turn on the video controller. Then, the processor restores the configuration of the video registers 446, and then uncompresses and restores the video RAM from the state of the video RAM saved at 478 in the main memory. Then, the processor 311 instructs the SCP to identify from the set-up information in EEPROM 439 the active video unit. Then, if the processor finds at block 716 that the LCD display is the active video unit selected by the user, it proceeds to block 717 where it instructs the SCP to actuate the LCDPWR signal in order to power up the LCD, and to actuate the BLON signal in order to turn on the backlight for the LCD display. On the other hand, if it is determined at 716 that the user has selected the external CRT 426 as the active video unit, control proceeds to block 718 where the processor instructs the SCP to set the CRT/LCD signal to select the CRT. In either case, at block 721 the processor then instructs the SCP to actuate the MDMEN line in order to power up the modem 322. Then, at block 722, the processor checks the shadow register information at 486 in order to determine if the floppy disk drive is being operated in FULL AUTO mode. In not, then at block 723 the processor actuates the FDDSLT line in order to power up the floppy disk drive, and sends the shadow registers stored at 486 to the floppy disk drive in order to restore the configuration of its control registers.

Control ultimately proceeds to block 726, where the processor sets the DC flag 473 (FIG. 15) in order to force an indication to the operating system that a floppy disk change has occurred. This will force the operating system to reread certain standard tables from the disk to an image of the disk in memory, thereby ensuring that if a user has changed the disk while the system was in suspend mode, the image of these tables in memory will at least correspond to the tables of the disk which is actually present in the disk drive, as opposed to tables on a disk which is no longer present in the disk drive.

Then, still in block 726, the processor 311 actuates the line HDDSLT in order to power up the hard disk, and then sends the hard disk the information regarding the state of the hard disk which the processor obtained from the hard disk and stored before entering the suspend mode. This restores the hard disk to the state it was in before operation of the system was suspended. Then, the processor instructs the SCP to do a partial state save as previously discussed in association with block 618 of FIG. 21. Then, the processor instructs the SCP to send it the current password, and then if it is determined at 727 that the password is an active password, the processor requests and accepts a password from the user at 728 and then compares the passwords at 729. If they do not compare, the processor remains at 728 and 729, in order to prevent an unauthorized user from using the system.

If they do compare, control proceeds to 731, where the processor checks the DF flag (FIG. 15) in order to determine whether a disk was present in the floppy drive when the system was turned off. If a disk was present, then control proceeds to block 732, where the processor uses the active video unit to ask the user to verify that the same floppy disk is still in the floppy drive or has been reinserted in the floppy drive. A check is made at 733 to be sure that the user has confirmed that this floppy disk is present. If it is not, control remains at blocks 732 and 733. Once user confirmation is obtained, control proceeds to block 736, where the processor instructs the SCP to do a partial restore, and sends it the two bytes which were received at block 726. Also, if a mouse 421 is present, the processor takes from portion 482 of the main memory the 3 bytes obtained from the mouse before the suspend, and loads them back into the mouse in a conventional manner.

Then, at block 737, the processor checks the TV flag (FIG. 15) in order to determine whether the operating system supports time and date information. If it does, then in block 738 the processor reads up-to-date time and date information from the real time clock 376 (FIGS. 13A–13D), and uses it to update the time and date information maintained at 472 (FIG. 15) in the portion 471 of the main memory used for the operating system.

Then, at 741, the processor instructs the SCP to send it the set-up information stored in the EEPROM 439 for the timers 351 and 352, and uses this information to configure the registers 356 and 357 for the timers 351 and 352 so that the timers start running (or to disable the timers if the timers will not be used). Then, at 741, the processor uses the pointer saved at block 678 in FIGS. 24A–24B to modify its stack 492 so that, when it immediately thereafter does a subroutine return at 742, the processor 311 will return to the point from which the suspend handler subroutine was called before the processor entered the suspend mode, or in other words to one of the blocks 531, 576, 647 and 654 respectively appearing in FIGS. 17, 20A–20D, 22 and 23A–23B. Following the subroutine return, the system continues execution of the PMI handler routine from the point at which execution was placed on hold so that the system could enter and resume from the suspend mode. When execution of the PMI routine is eventually completed, the processor 311 will exit from the PMI handler at blocks 522 and 523 of FIGS. 16A–16C in the manner previously described, so that execution of the interrupted application program resumes as though there had been no interruption at all.

Figure 27:
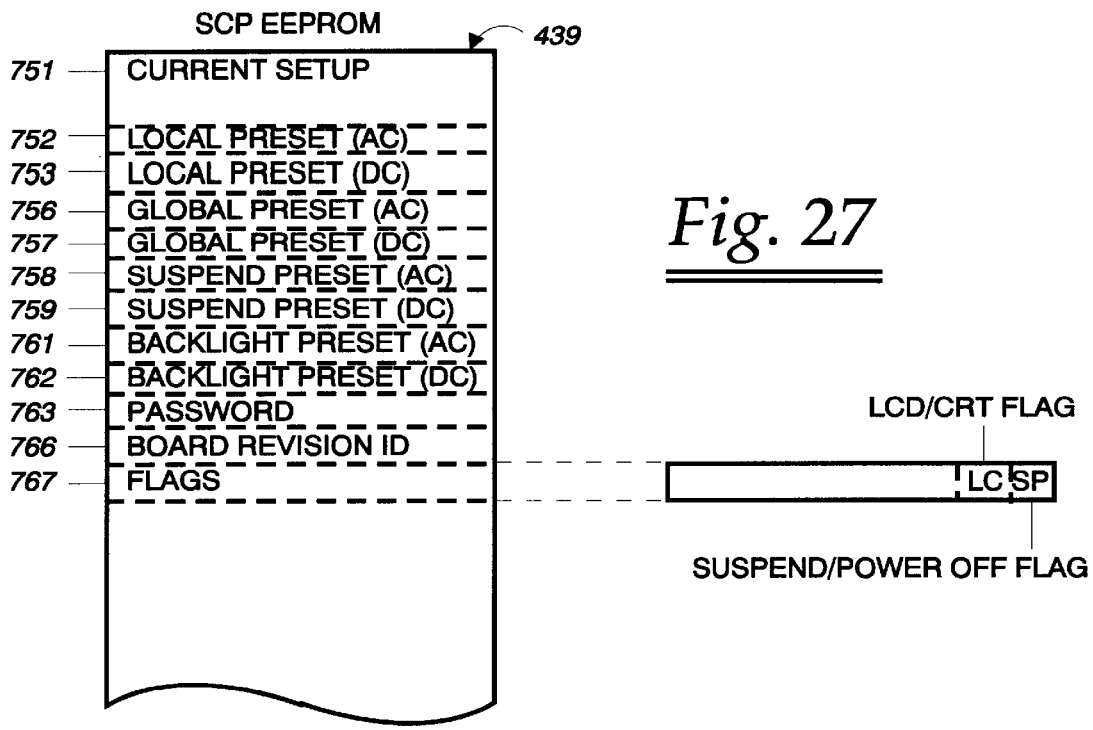
FIGS. 27 and 28 are diagrams representing the organization of respective memories used in an auxiliary processor which is a component of the system of FIGS. 13A–13D.

Turning now in more detail to the system control processor (SCP) 316, FIG. 27 is a diagrammatic view of a portion of the information stored in the EEPROM 439 of the SCP. A portion 751 of this device is used to store current set-up information of the type commonly found in conventional and commercially available personal computers. In addition, portions 752 and 753 store two different values of a preset time for the local timer 351, one value being used when the system is operating on AC power and the other being used when the system is operating on DC power. Similarly, portions 756 and 757 store respective AC and DC values for use in the global standby timer 352, portions 758 and 759 store respective AC and DC values of a suspend timer preset for the suspend timer maintained in software by the SCP, and portions 761 and 762 contain respective AC and DC preset values for a backlight timer maintained by the SCP. A portion 763 contains the current system password, and a portion 766 contains a value representing a board revision number of the main circuit board on which the processor 311 and SCP 316 are mounted. A further portion 767 contains some flags, including an LC flag which indicates whether the LCD 321 or the external CRT 426 is presently the active display device, and an SP flag which indicates whether manual deactuation of the switch 313 is to place the system in suspend mode or the power off state.

Figure 28:
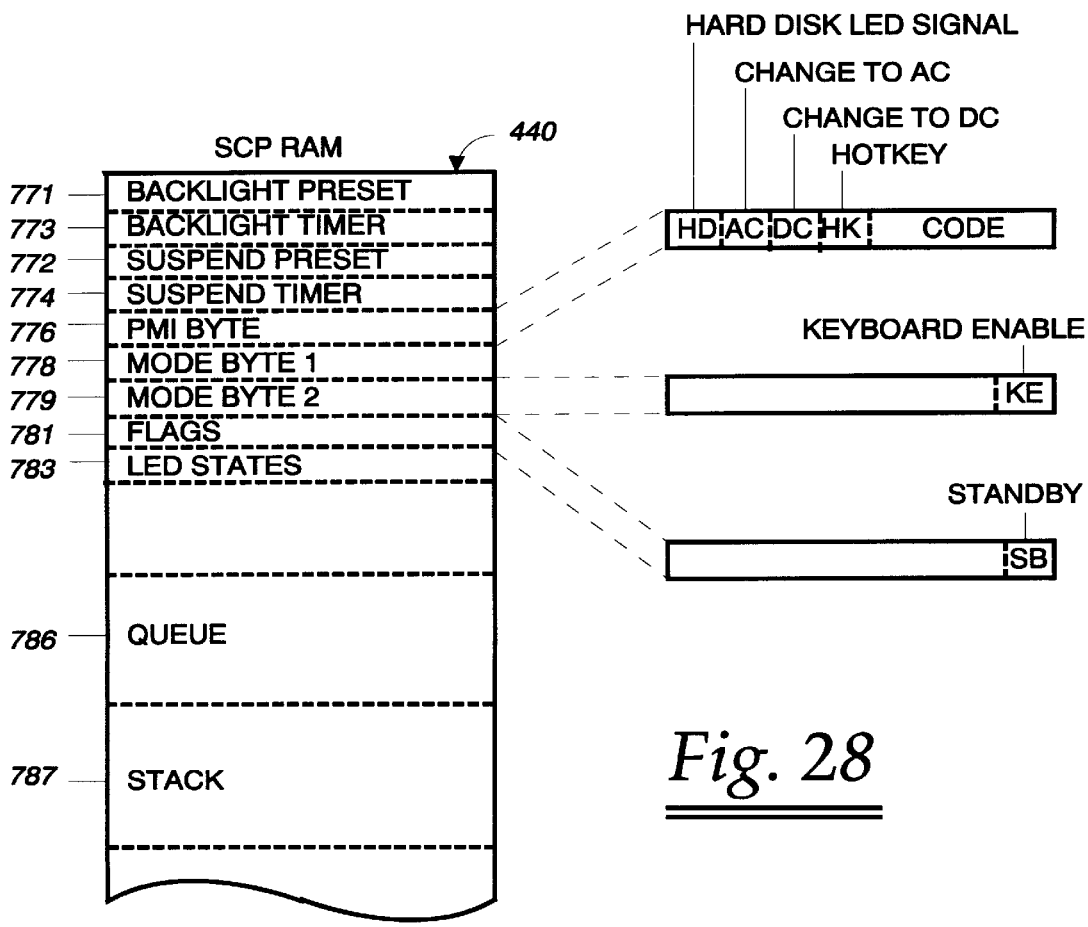

FIG. 28 is a diagrammatic view of the SCP RAM 440 and some of the information stored therein. In particular, a portion 771 stores a preset for the backlight timer. This is the value which is currently specified for use in operating the timer, and in particular is the AC back light preset stored at 761 in the EEPROM if the system is operating under AC power, and is the DC backlight preset stored at 762 if the system is operating under DC power. Similarly, the SCP RAM stores at 772 a suspend preset which is one of the AC and DC suspend presets stored at 758 and 759 in the EEPROM. The SCP RAM also includes locations 773 and 774 which respectively serve as the backlight timer and the suspend timer. Each timer is started by storing in the associated location the appropriate preset, which is a positive number representing the time interval to be timed. The number of each timer is then periodically decremented by software in a manner described later, and the timer expires when the value in the location reaches zero.

The SCP RAM 440 also includes a PMI byte 776. When the main processor asks the SCP to identify the source of an external PMI, the SCP sends the main processor the PMI byte 776. This byte includes an HD bit which is set to indicate that the hard disk IED signal was the source of the PMI, and AC bit which indicates that the power supply has just changed to AC power, a DC bit which indicates that the power supply has just changed to DC power, and a HK bit which indicates that a hot key multi-key combination has been pressed on the keyboard and was the reason for the PMI. In addition, the PMI byte includes a code which identifies the most recent hot key actuated on the keyboard.

The RAM also includes two mode bytes 778 and 779, which control modes in which the SCP and the keyboard operate. For purposes of understanding the present embodiment, a single bit from one of these bytes is shown, which is a keyboard enable (KE) flag. This KE flag indicates whether or not information is to be accepted from the keyboards. Certain application programs may temporarily cause this flag to be cleared in order to prevent the user from entering information on the keyboard.

The RAM 440 also includes a portion 781 containing an additional flag, in particular a standby (SB) flag which is set to let the SCP know that the main processor is currently in standby mode. The RAM 440 also includes a portion 783 which has bits corresponding to each of the four LEDs 442 on the keyboard 317, and these bits each indicate whether the associated LED on the keyboard should presently be on or off for purposes of normal operation. The RAM 440 also includes a queue area 786, which is discussed below, and the usual stack area 787.

Each time power to the SCP is turned on, including the situation where the system is resuming from the suspend mode, the hardware of the SCP automatically causes it to execute a program instruction stored at a predetermined location in the ROM 437, which is the first instruction of the firmware program which controls the SCP. FIGS. 29, 30, 31A–31B, 32A–32E are flowcharts of this firmware program. Following a power-up reset at 801, block 802 represents the first portion of the firmware program, in which the SCP configures itself to a default set-up. This includes turning power on to the video controller 318 and LCD 321, and turning on the backlight 431 for the LCD. This default configuration is carried out even if the system is resuming from a suspend mode which was entered while the active display unit was the external CRT 426 rather than the LCD 321. If the active display is in fact to be the external CRT 426, then it is up to the main processor 311 to send commands to the SCP to appropriately reconfigure it, in a manner described below.

After the SCP configures itself to a default set-up configuration, control proceeds from block 802 to block 803, where the SCP checks to see if the KE flag (FIG. 28) is set to indicate that the keyboards are enabled and information can be accepted from them. If so, then control proceeds to block 806, where the SCP scans only the internal keyboard in order to determine if a key has been pressed. If one has, then control proceeds to block 807, where the SCP restarts the backlight timer 773 (FIG. 28) by taking the current backlight preset stored at 771 and storing it in the backlight timer location at 773. Thus, so long as keys are being pressed the timer will be periodically restarted before it can expire and thus will keep the backlight on, whereas if the backlight timer expires the SCP will turn off the backlight in a manner described below in order to conserve power.

Then, still at block 807, the system forcibly disables the suspend timer 774, even if this timer is already disabled, for example by storing a negative number in location 774. The fact that a key has been pressed means that, if the main processor 311 did happen to be in the suspend mode, the SCP would be waking it up in order to pass it the keystroke, and thus the suspend timer necessarily needs to be stopped because the main processor will be exiting standby mode and it is no longer necessary to measure the period of time it has been in standby mode. For similar reasons, the SB flag (FIG. 28) is forcibly cleared to indicate that the main processor is not in the standby mode.

Then, at block 808, a check is made to see if the key which has been pressed is a hot key, or in other words one of several specific predefined multi-key combinations. If not, then at 811 a code representing the particular key pressed is placed in the queue section 786 of the SCP RAM 440, from which it will be sent in due course to the main processor. On the other hand, if it is determined at 808 that the key which has been pressed is a hot key, then control proceeds to block 812, where the SCP updates the PMI byte 776 (FIG. 28) by setting the HK bit to indicate that a hot key has been pressed and by placing in the code section of the PMI byte a unique code corresponding to the particular hot key. Then, the SCP places an unused code in the queue, which will have the effect of waking up the processor if it is in the standby mode but which in any case will be discarded by the processor 311 if it ultimately reaches the processor 311. Then, still in block 812, the SCP produces an output signal which actuates the EXTPMI line in order to produce a PMI in the main processor.

Control ultimately proceeds to block 816, where the SCP checks to see if the queue 786 is empty. If it is not, then it contains information waiting to be sent to the main processor, and control proceeds to block 817, where the SCP checks to see if the CPUSUREQ line from the main processor is actuated to indicate that the main processor is about to send a command to the SCP. If it is actuated, the SCP does not send information from the queue, in order to keep the interface to the main processor clear so that the interface will be available for any information which the SCP needs to send back to the main processor in response to the command, while also avoiding the possibility that information from the queue being sent to the main processor at about the same time that the main processor issues a command will be misinterpreted by the main processor as being a response to the command. If it is determined at 817 that the CPUSUREQ line is not actuated, then at block 818 the SCP takes a code from the queue and places it in an output register in the interface to the main processor, and then generates an IRQ 1 interrupt signal in order to indicate to the main processor that the output register contains information for the main processor. In the event the main processor happens to be in standby mode, the IRQ 1 interrupt signal will wake it up from the standby mode, as already described above in association with the discussion of the main processor. The processor then loops at 819 through blocks 803 and 818, which constitutes the main loop of the program in the SCP.

This main loop can be interrupted by different events, one of which is an attempt by an external keyboard or mouse 421 to send information to the SCP. In response to an interrupt caused by such an attempt to send information, the SCP executes the interrupt service routine shown in FIG. 30. In this routine, the SCP first checks the KE flag at 821 in order to determine whether the user is currently allowed to input information. If the flag is not set, then control proceeds to 822, where a return is made from the interrupt handler without accepting the information. Typically, however, it will be determined at 821 that the information can be accepted, and therefore it will be accepted at block 823, and then at block 826 the system will determine whether it is dealing with an external keyboard or mouse, and if the device is a keyboard the SCP will proceed to block 827 where it places a code representing the actuated key in the queue 786. Hot keys are recognized only for the internal keyboard and not an external keyboard. If a hot key actuation were received from an external keyboard, it could be discarded. All valid codes are thus placed directly in the queue. Then, the SCP restarts the backlight timer, disables the suspend timer and clears the SB flag, for reasons similar to those discussed above in association with block 807, and then returns at 822 to the interrupted routine.

On the other hand, if it is determined at 826 that the external device is a mouse, control proceeds to block 828, where the code received from the mouse is placed in an output register, and then the SCP actuates interrupt line IRQ 12, which is reserved for use with a mouse and indicates to the processor that information from a mouse is being sent to the processor. Then, the SCP restarts the backlight timer, disables the suspend timer and clears the SB flag, and returns at 822.

Figure 29:
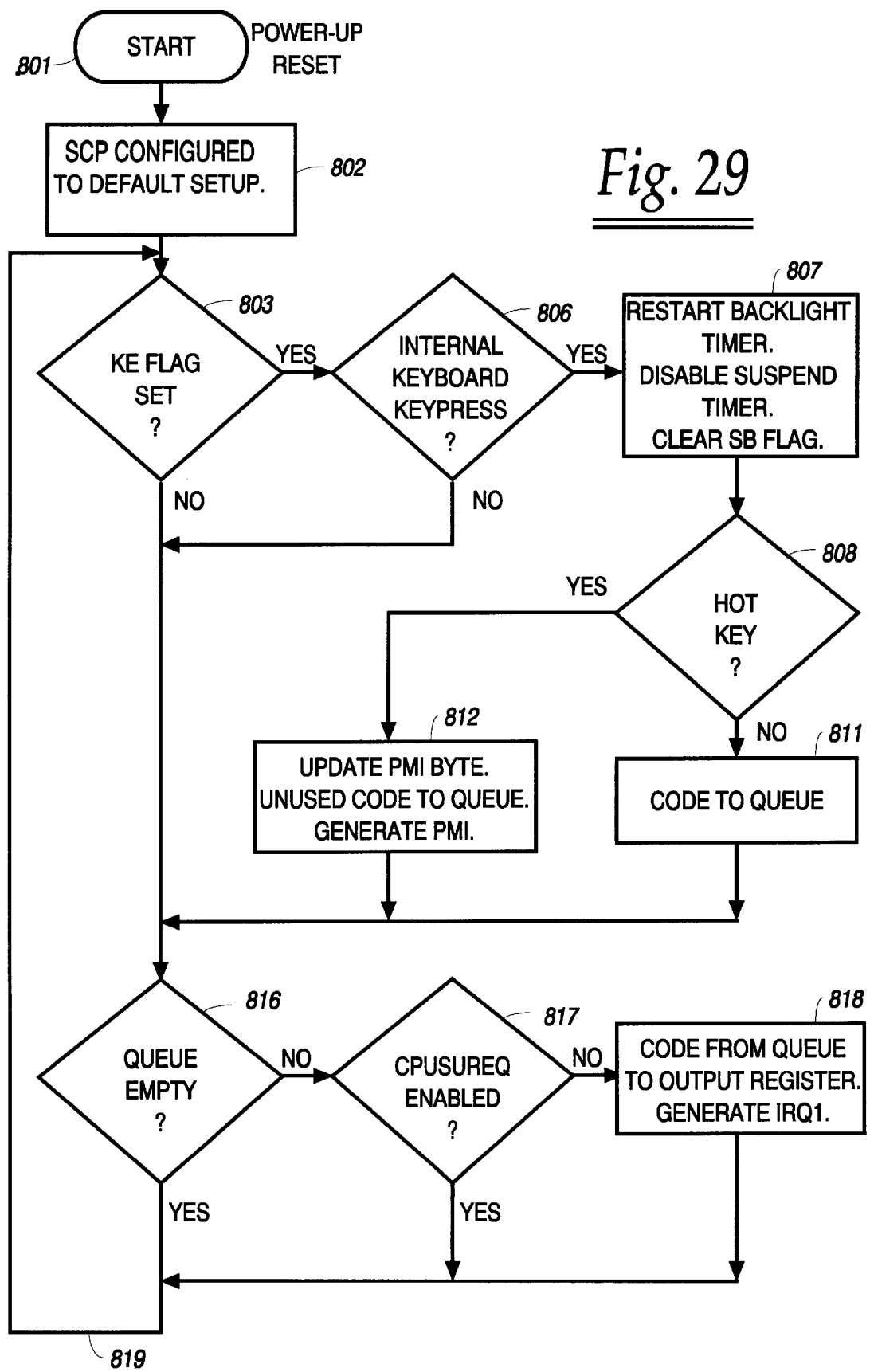
FIGS. 29–31B, 32A–32E are flowcharts showing respective portions of a program executed by the auxiliary processor.
Figure 30:
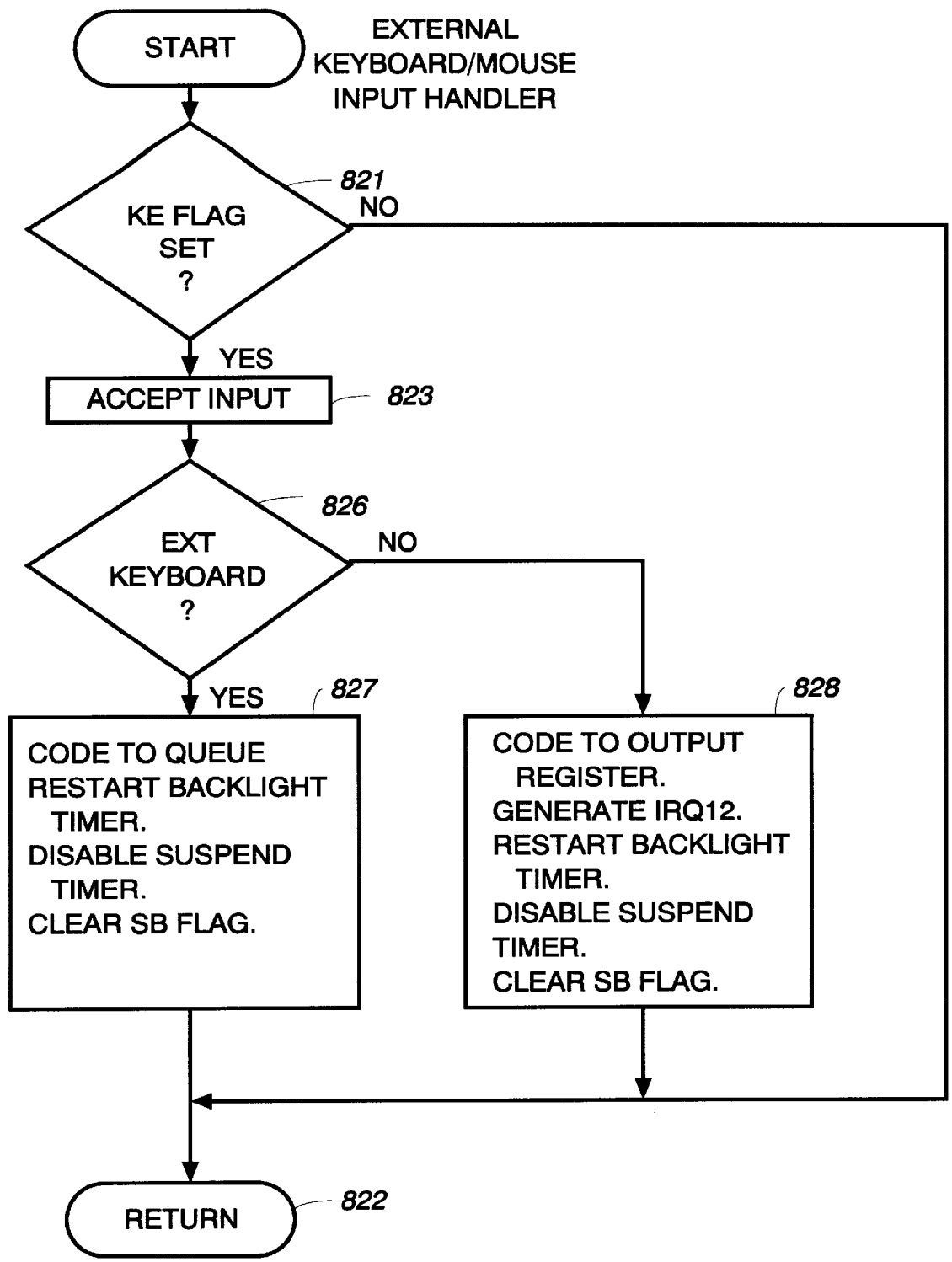
Figure 31A:
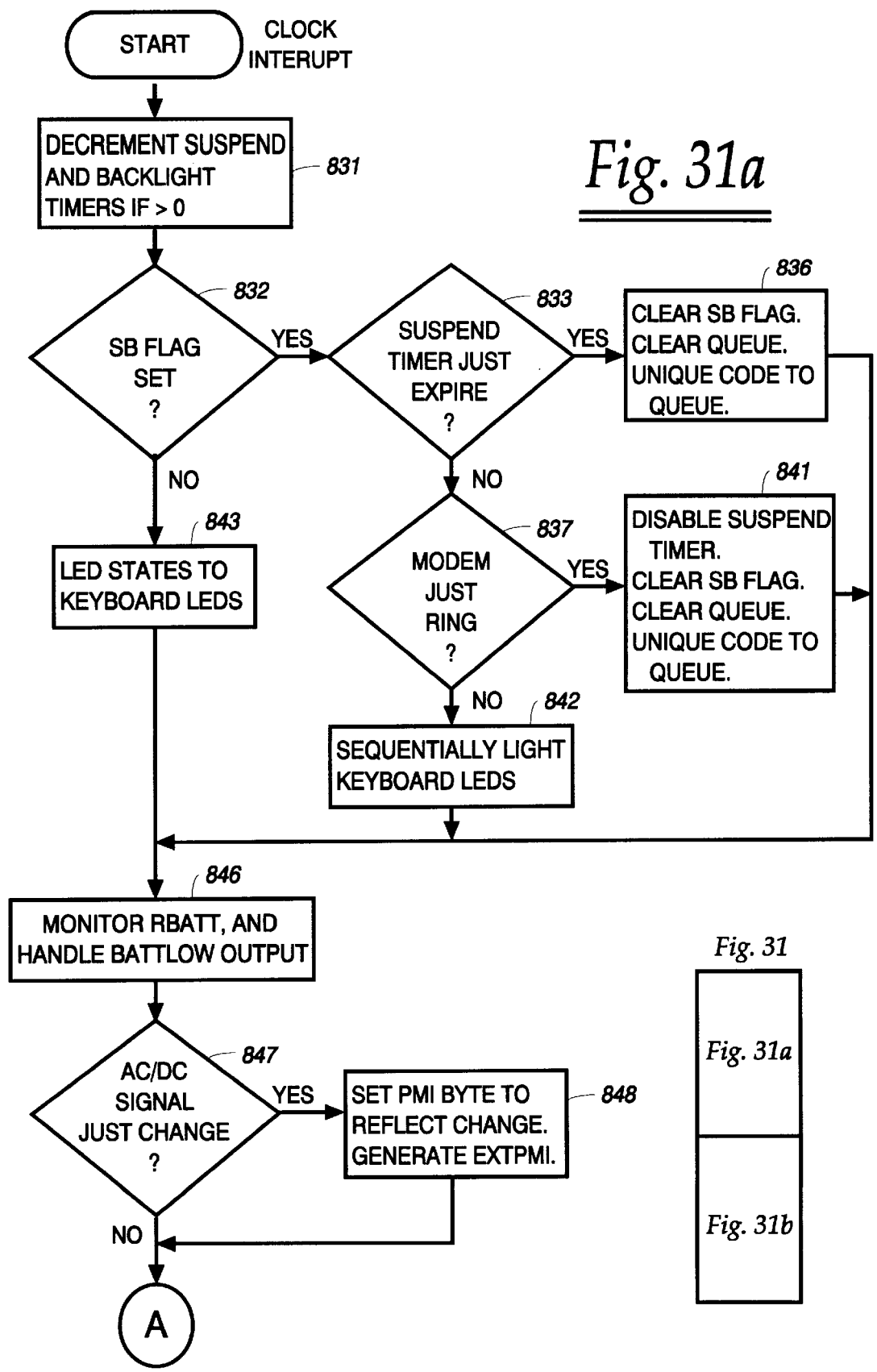
Figure 31B:
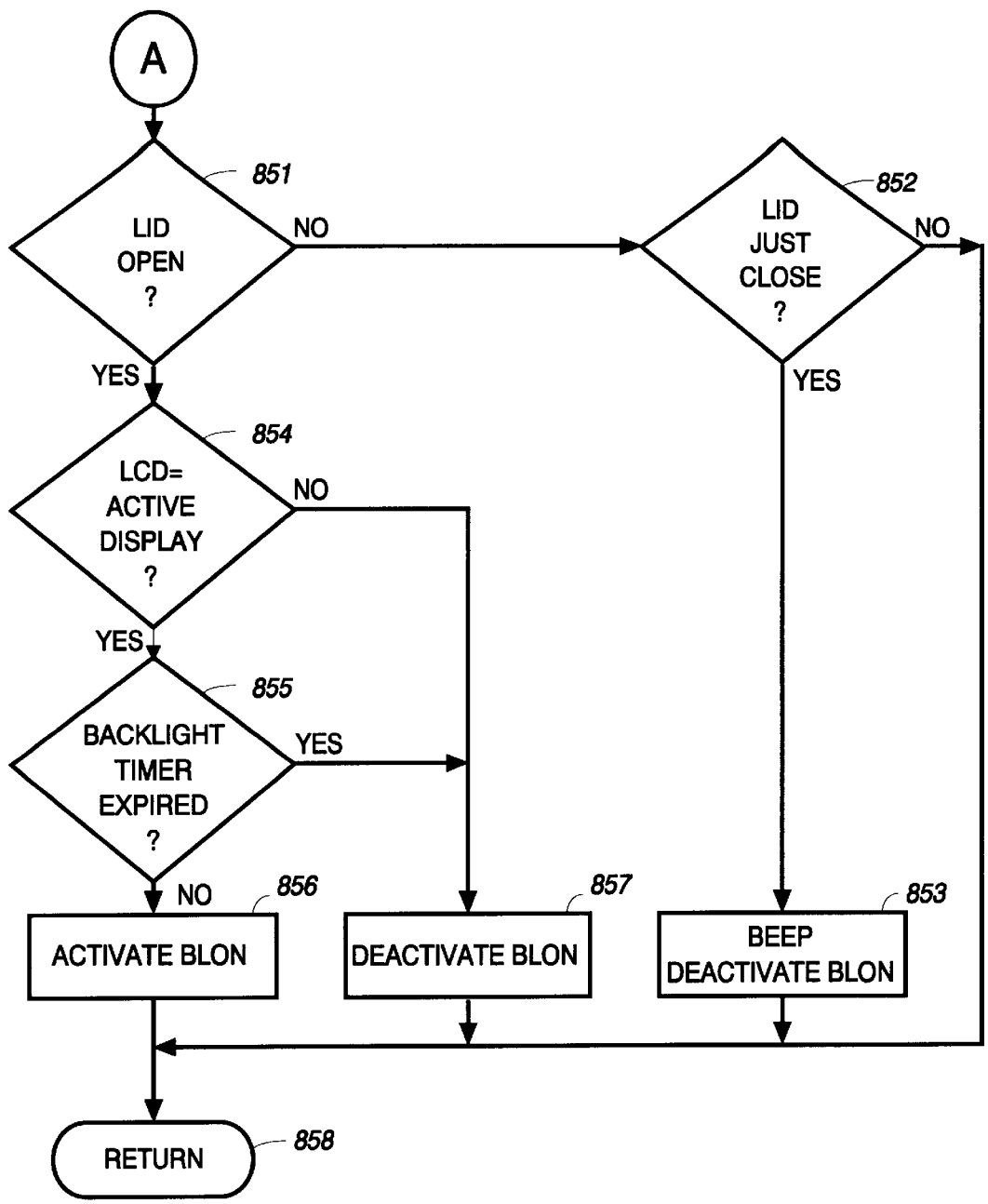
Figure 32A:
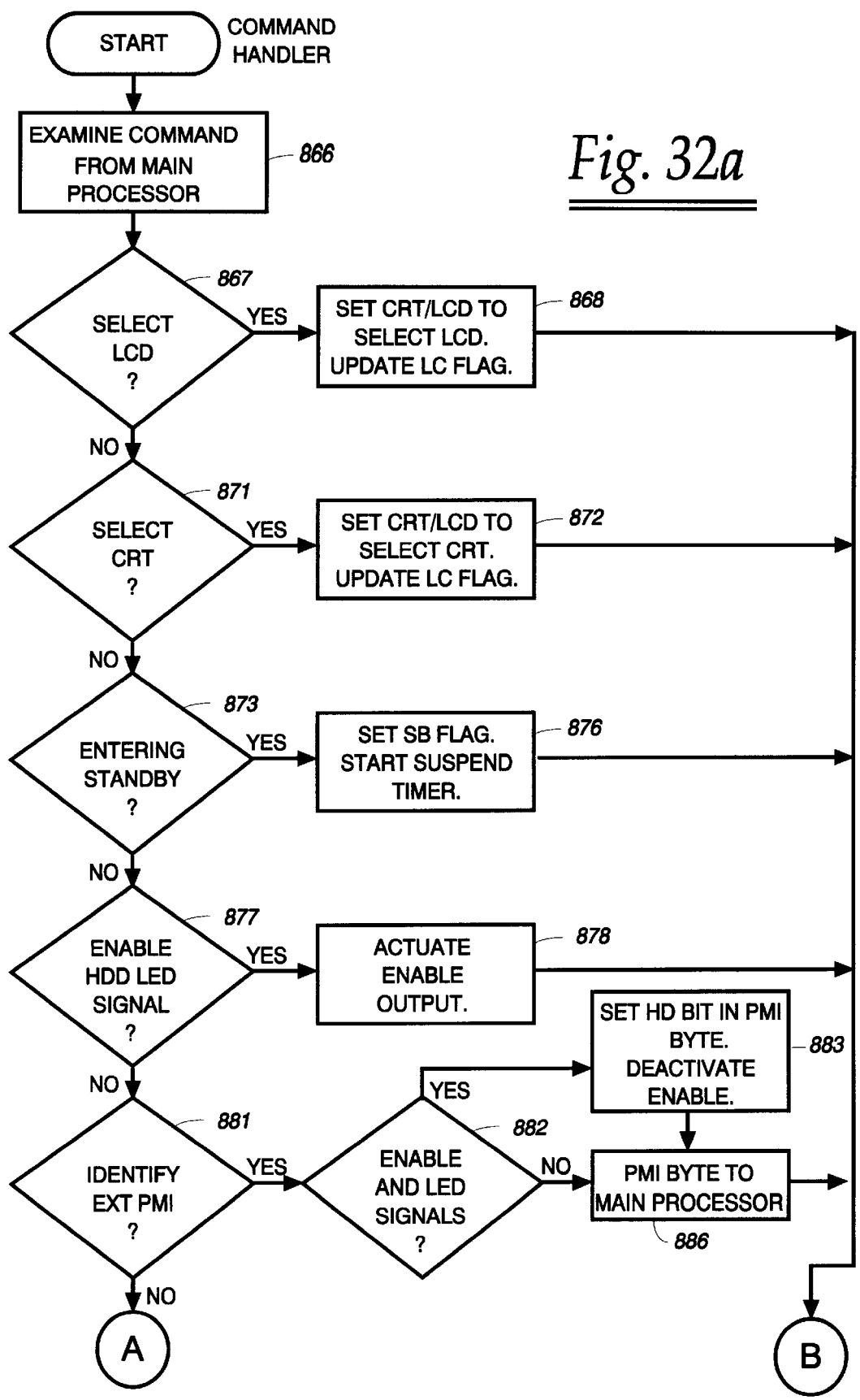
Figure 32B:
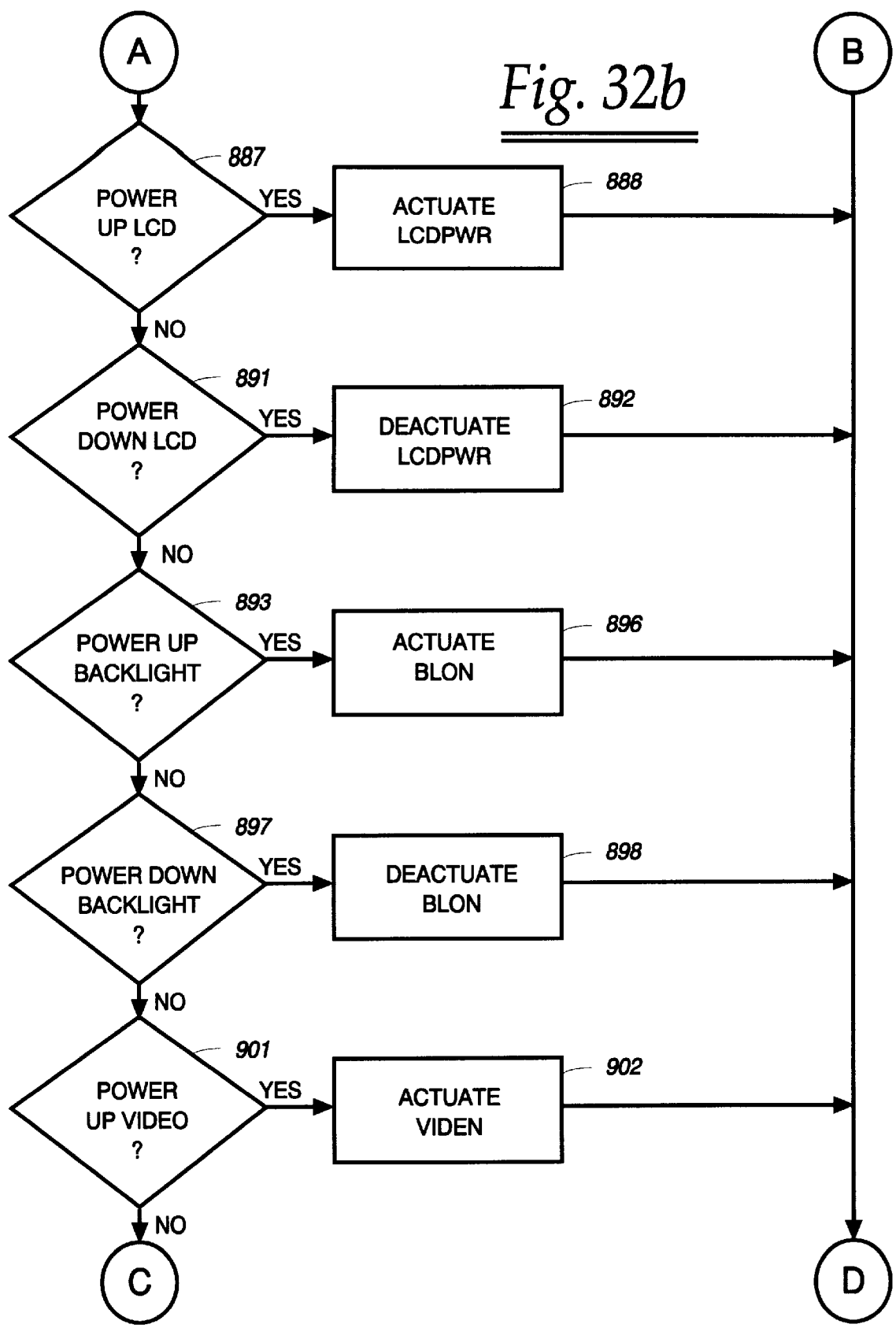
Figure 32C:
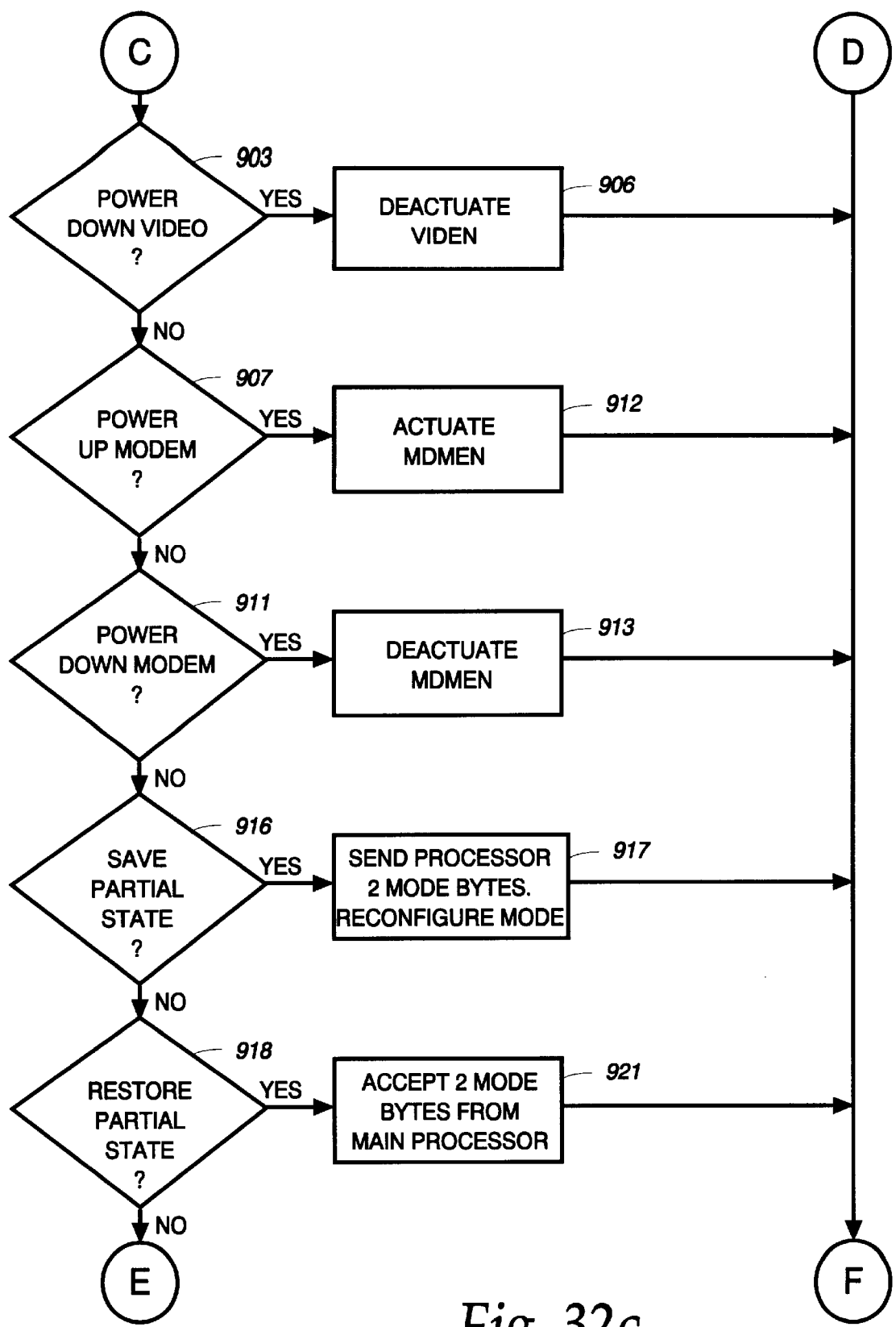
Figure 32D:
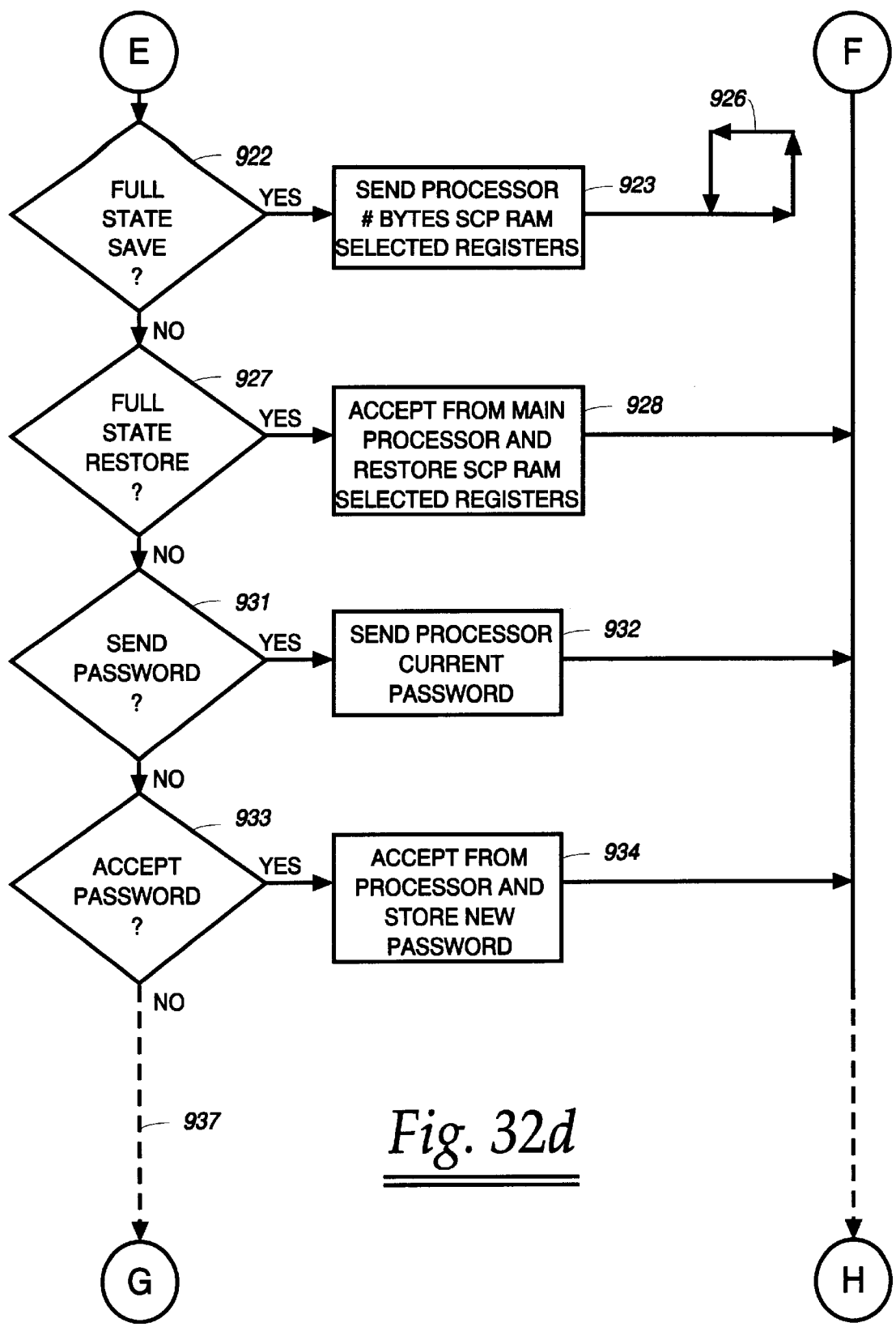
Figure 32E:
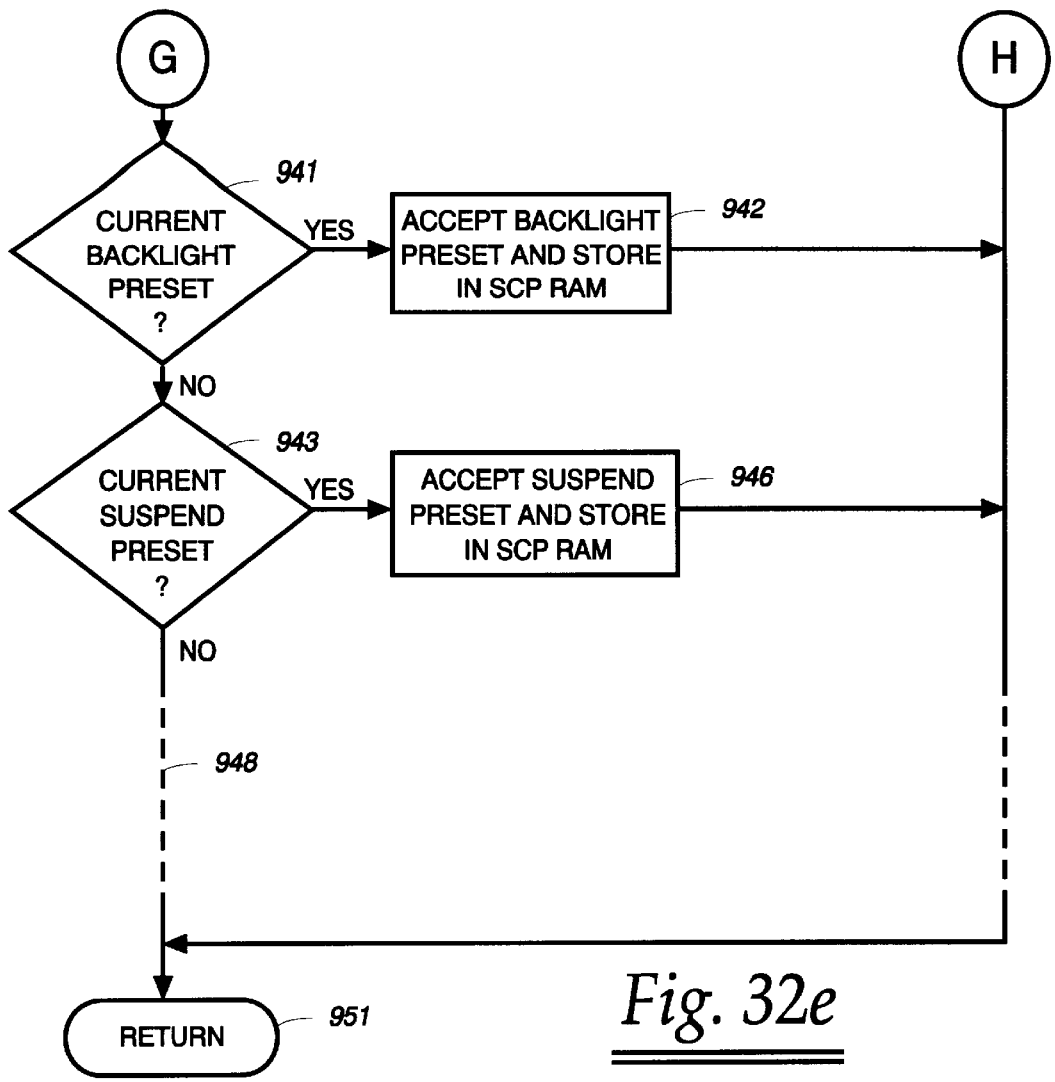
Figure 32:
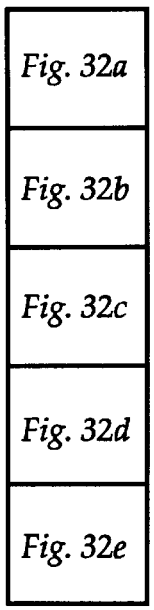

Another source of interrupts to the main routine shown in FIG. 29 are pulses of the keyboard clock signal KBCLCK received from the clock generation circuitry in the main processor. This interrupt occurs at regular intervals and thus each occurrence of this interrupt represents the elapse of an amount of time equal to this interval. The occurrence of this interrupt is therefore used to keep track of time, as well as to perform some housekeeping functions. The firmware service routine for this interrupt is shown in FIG. 31, where the SCP begins at 831 by decrementing the numbers in each of the timer locations 773 and 774 if they are greater than zero. As mentioned above, the expiration of each timer occurs when the positive value in it is decremented to a value of zero.

Then, at 832, the system checks to see if the SB flag is set, or in other words whether the main processor is currently in standby mode. If the main processor is in standby mode, then control proceeds to block 833, where the SCP checks to see if the suspend timer has just expired, or in other words whether the value in location 774 has just been changed from one to zero at block 831. If it has, then the system has remained inactive for a predetermined period of time while the main processor was in standby mode, and therefore the main processor is to be shifted to suspend mode in order to further conserve power until the user again begins using the system. Thus, at block 836, the SCP clears the SB flag in order to indicate that the main processor is no longer in standby mode, because the SCP is going to break the main processor out of standby mode so that the main processor can enter suspend mode. Then, the SCP clears the queue 786, so that the queue can be used to send the main processor a unique code which is not used by the keyboard and which indicates that the suspend timer has expired and that the main processor should transition from standby to suspend mode.

On the other hand, if it is determined at block 833 that the suspend timer has not yet expired, then at block 837 the SCP checks to see if the modem ring signal MDMRI from the modem 322 has just been actuated in order to indicate that there is an incoming call. If it has, then control proceeds to block 841, where the SCP turns off the suspend timer 774 and then takes the same actions described above in association with block 836, except that the unique code placed in the queue is a different unique code not used for the keyboard which will be interpreted by the main processor to mean that the modem ring signal has occurred.

If it is determined at 837 that no ring signal is being received from the modem, then control proceeds to block 842, where the four LEDs 442 on the keyboard are controlled in a manner which causes them to be sequentially lit, which serves as a visual indication to the user of the system that the main processor is in standby mode. In contrast, if it had been determined at block 832 that the SB flag was not set and that the main processor thus was not in standby mode, control would have proceeded directly to block 843, where the LED states stored at 783 in the SCP RAM would have been used to set the LEDs 442 in the keyboard 317 to their normal operational states.

In any event, control ultimately proceeds to block 846, where the SCP reads the value of the RBATT signal from the power control circuit 312 through the A/D converter 416, and then analyzes the state of the signal. The SCP preferably analyzes the rate of change of this signal over time, because an inherent characteristic of the rechargeable battery 396 is that its terminal voltage will drop very slowly while it has a strong charge, and will then begin dropping much more quickly a short period of time before the battery reaches a state where it would not have enough power to operate the system. Consequently, when it is determined that the rate of change of this signal has exceeded a predetermined reference value, the SCP actuates the BATTLOW signal to the main processor 311 as an indication that the battery power is getting low. However, it will be recognized that a detailed analysis of the RBATT signal is not necessary, and that the SCP could alternatively just determine whether the RBATT signal had dropped below a predefined voltage, and then actuate the BATTLOW signal to the main processor 311.

Thereafter, at block 847, the SCP checks the DC/AC signal from the power control circuit 312 in order to determine whether this signal has just changed from one state to another state. If it has, then control proceeds to block 848, where the SCP sets either the AC bit or DC bit in the PMI byte 776 to indicate the current source of system power is AC or DC. Then, the SCP outputs a signal at 435 which actuates the EXTPMI signal in order to generate a PMI in the main processor.

At block 851, the ScP checks the LIDSW switch from the lid switch 432 for the lid on which the LCD display 321 is mounted. If the lid is closed, then control proceeds to block 852, where the SCP checks to see if the lid has just been closed. If the lid was already closed then block 853 is skipped, but if the lid has just been closed control proceeds to block 853, where the SCP actuates line 417 to cause the speaker 392 to beep, and then deactuates the BLON line in order to turn the backlight 431 off. It should thus be noted that if the lid is closed during system operation the system does not automatically enter standby mode or suspend mode, but instead simply beeps to warn the user that the system is still active, and turns off the backlight for the LCD in order to conserve power.

If it was determined at block 851 that the lid is open, then at 854 the SCP checks to see if the LCD is currently the active display, and if it is checks at 855 to see if the backlight timer has expired, and if the backlight timer has not expired proceeds to block 856 where it ensures that the BLON signal is actuated in order to turn on the backlight 431. On the other hand, if the LCD display is not active or the backlight timer has expired, then at block 857 the SCP deactuates the BLON signal to turn off the backlight. Thus, if the user does not press any key for a predetermined period of time specified by the backlight preset at 771, the backlight is automatically turned off in order to conserve power, but will be automatically turned back on when the user again presses a key. After appropriately controlling the backlight, the SCP proceeds to 858, where control is returned to the calling routine.

A further event which can interrupt the SCP from the main routine shown in FIG. 29 occurs when the main processor sends a command to the SCP, the loading of this command into an interface register automatically generating an interrupt to the SCP. The interrupt routine which handles the command is shown in FIGS. 32A–32E, which will be collectively referred to herein as FIGS. 32A–32E. At 866 in FIGS. 32A–32E, the SCP examines the command which the main processor has sent it. At 867, if the command indicates that the SCP is to select the LCD as the active video display, control proceeds to block 868, where the SCP sets the CRT/LCD output to select the LCD 321, and then updates the LC flag (FIG. 27) to reflect this setting. On the other hand, if it were determined at 867 that the command was not to select the LCD, but it was determined at 871 that the command was to select the external CRT 426 as the active display unit, then control would proceed to block 872, where the SCP would set the CRT/LCD line to select the CRT, and update the LC flag. Otherwise, control would proceed to block 873, where the SCP would check to see if the command was an indication that the main processor was entering standby mode, in which case the SCP would proceed to block 876, where it would set the SB flag to indicate that the main processor was in standby mode, and would take the preset value from location 772 (FIG. 28) and place it in location 774 if it is a positive number, in order to start the suspend timer.

If it were determined at 877 that the command was to enable the LED signal from the hard disk, the SCP would actuate its ENABLE output to the gate 438 at block 878. Otherwise, if it were determined at block 881 that the command was a request for the SCP to identify the reason for generation of a PMI through actuation of the EXTPMI signal, control would proceed to block 882, where it would check to see if the ENABLE signal to the gate 438 and the LED signal from the hard disk 323 were both actuated, in which case it would proceed to block 883 and set the HD bit in the PMI byte 776. In either case, at 886 it would send the PMI byte to the main processor.

If the SCP proceeded directly from block 881 to block 887, and determined there that the command was to power up the LCD, then at block 888 it would actuate the LCD-PWR line to the LCD 321. Otherwise, it would proceed to block 891, and if it determined there that the command was to power down the LCD, at block 892 it would deactuate the LCDPWR line to the LCD.

If the SCP proceeded directly from block 891 to block 893 and determined there that the command was to power up the backlight, it would proceed to block 896 and actuate the line BLON in order to turn on the backlight. Otherwise, it would proceed to block 897, and if it determined there that the command was to power down the backlight, it would proceed to block 898 where it would deactuate the BLON line in order to turn off the backlight.

In a similar manner, if the SCP proceeded from block 897 to block 901 or 903 and determined that the command was to power up or power down the video controller, it would proceed to one of blocks 902 and 906 and either actuate or deactuate the VIDEN signal in order to appropriately control the power to the video controller. Likewise, if the SCP proceeded to block 907 or 911 and determined that the command was to power up or power down the modem, it would proceed to one of the blocks 912 and 913 and actuate or deactuate the MDMEN signal in order to appropriately control the power to the modem.

If the processor proceeded through blocks 907 and 911 to block 916 and determined that the command was to do a partial state save, control would proceed to block 917, where the SCP would send the main processor the two mode bytes 778 and 779 (FIG. 28), and then set the location 778 and 779 in the RAM 440 to a default configuration which would ensure that information could be sent from the keyboard through the SCP to the main processor, and thus for example the KE flag would be set to indicate that the keyboard is enabled. Otherwise, the SCP would proceed to block 918, and if it determined there that the command was to do a partial restore of the SCP, it would accept two mode bytes from the main processor at 921 and place those mode bytes into locations 778 and 779 of the RAM 440.

If the SCP proceeded through blocks 916 and 918 to block 922, and determined there that the command was to effect a full state save of the SCP, it would proceed to block 923, where it would send the main processor a value representing the total number of bytes to be sent to the main processor, followed by the entire contents of the SCP RAM 440, and selected internal registers of the SCP. Then, the SCP would enter a continuous loop at 926 (for example by executing an instruction which performs an unconditional branch to itself), and wait for the main processor to turn off the power to the SCP as a part of the process of placing the system in the suspend mode.

If the SCP proceeded from block 922 to block 927, and determined that the command was to effect a full restoration of the state of the SCP, it would proceed to block 928, accept information from the main processor, and place this information in the SCP RAM and selected registers of the SCP. If the SCP proceeded to block 931 and determined that the command was to send the main processor the current password, the SCP would proceed to block 932, and would take the password stored at 763 (FIG. 27) in the EEPROM 439 and send it to the main processor. Otherwise, the SCP would proceed to block 933, and if it determined there that the command was to accept a new password from the main processor, it would proceed to block 934, where it would accept a new password from the main processor and store it in the location 763 of the EEPROM.

In a similar manner, each of the other items stored in the EEPROM 439 are capable of being sent to the main processor and updated by the main processor in response to respective commands. This is handled in a manner similar to that shown above for the password at blocks 931–934, and thus these separate commands are not all illustrated, but instead a broken line at 937 is provided to diagrammatically represent their existence. If the command is not any of these, then at 941 the SCP checks to see if the command is an instruction to accept a preset value for the backlight timer, in which case at 942 the SCP accepts the preset value and stores it at 771 in the SCP RAM 440. Similarly, if it is determined at 943 that the command is to accept a suspend timer preset, then at 946 the SCP accepts the suspend timer preset and stores it at 772 in the RAM 440.

There are other commands which are not pertinent to an understanding of the present embodiment and which are thus not illustrated and described in detail, but a broken line has been provided at 948 in order to diagrammatically represent their existence. Upon completing the execution of each command, control proceeds to block 951, which transfers control back to the calling routine.

In the embodiment disclosed in FIGS. 13A–32E, power is supplied to the main memory 326 during suspend in order to maintain the information stored there. In a variation, a portion of the hard disk 323 is reserved, the entire contents of the main memory are written to the reserved portion of the hard disk after the status of all devices had been saved to the main memory, then both the hard disk and main memory are powered down, and then the processor enters the suspend state. Upon resuming, steps with the opposite effect are carried out in reverse order to restore the system. This is slower than the approach taken in the preferred embodiment, but uses less power and thus allows the system to remain in suspend longer on a single battery charge. By using conventional compression techniques on the data from the main memory being stored on the disk, the amount of space required on the disk could be reduced, but the time required to enter and exit from suspend mode would increase as a result of the extra time required for compression and uncompression of the data.

ALTERNATIVE EMBODIMENT

FIGS. 33A–74K show a system which is an alternative embodiment of the system shown in FIGS. 13A–34. FIGS. 33A–33D shows a block diagram of the system which is similar to the block diagram of FIGS. 13A–13D. Elements which are the same as those in FIGS. 13A–13D are designated with the same reference numerals, and only the differences are described below and designated with different reference numerals.

More specifically, FIGS. 33A–33D includes a hardware timer 1000 in the hard disk drive 323, and the provision in the main processor 311 of an expanded memory specification (EMS) control circuit 1002 coupled to the bus control unit 336. The concept of EMS memory is an industry standard and is conventional, and is therefore not described in detail here. The preferred embodiment does not necessarily include EMS memory, but conventional EMS memory could be attached to the buses 337–339, and would function in a conventional manner in conjunction with the control unit 1002. FIGS. 33A–33D also shows a conventional cache memory 1004 coupled to the main processor 311, and a slot 1006 which is coupled to the main processor 311 and into which a conventional numeric co-processor chip can optionally be plugged.

In addition, the system control processor (SCP) 316 outputs to the modem 322 a modem reset line MDMRST. Also, the SCP outputs a flash enable signal FLSHEN to the flash RAM 331, which enables and disables the flash RAM 331 from being altered by the processor 311, and outputs to the floppy disk drive 327 a force disk charge signal FRCDC which forcibly sets within the drive a bit in a status register indicating that a disk charge has occured. Further, the SCP has two hardware timers 1008 and 1010 which are each driven in a conventional manner from a not-illustrated oscillator, the timer 1008 producing an interrupt signal (INT) which interrupts the SCP once each millisecond, as described in more detail later. The SCP also includes a watch dog timer (WDT) 1012, which is a conventional watch dog timer circuit which resets the SCP if it is not periodically accessed by the SCP.

The main processor 311 in FIGS. 33A–33D has a conventional carry flag 1014 which is associated with its not-illustrated arithmetic logic unit, which can be set and cleared by certain instructions, and which can be tested by software. Further, the processor 311 includes a power-off timer 1016 which is driven by an internal processor clock and which can create a power management interrupt (PMI) through the gate 366 when it expires. In the preferred embodiment, the timer 1016 is always disabled, and thus should never generate a PMI. The SCP 316 outputs a reset CPU signal RC to the main processor 311.

Figure 33A:
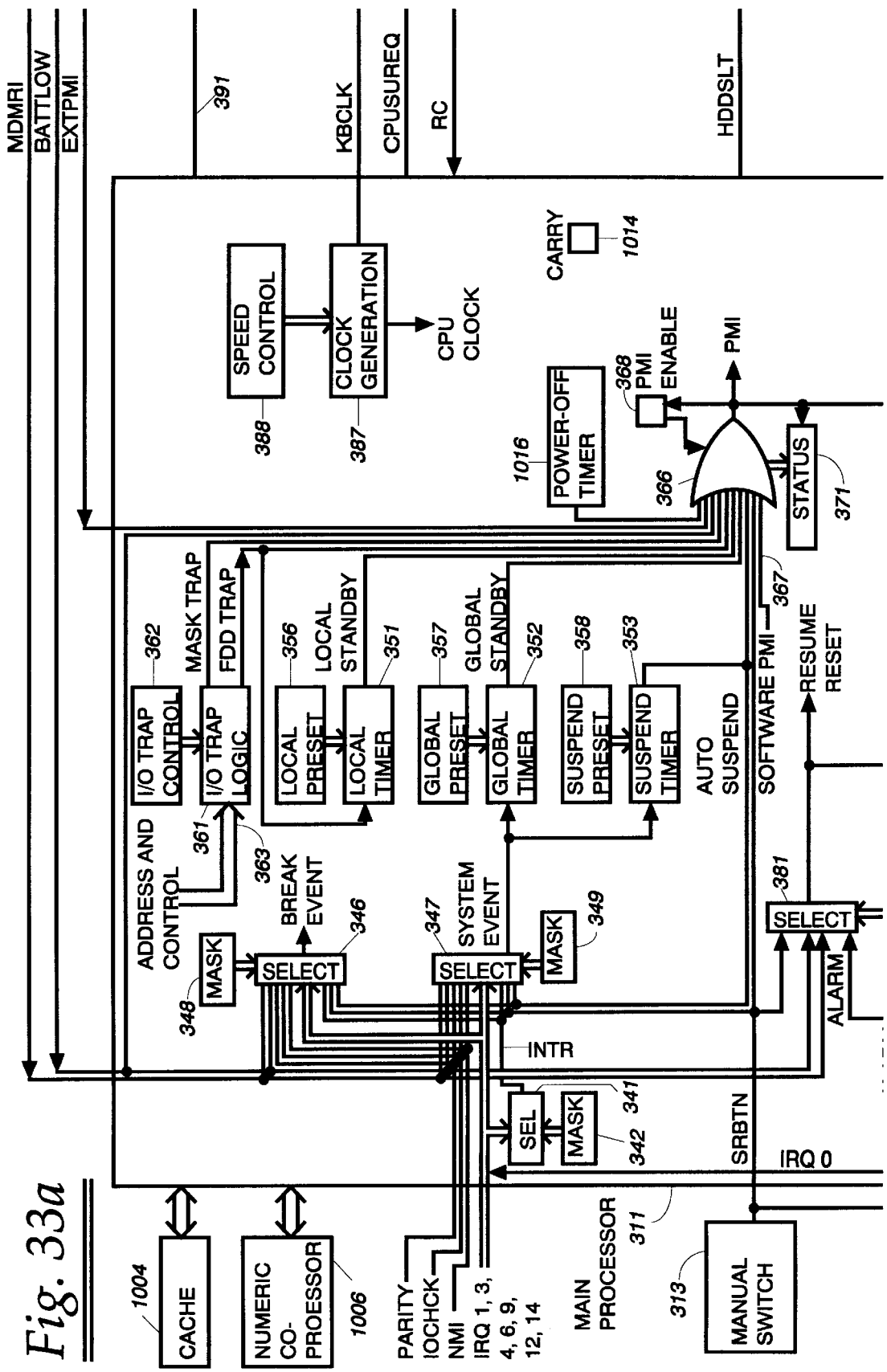
Figure 33B:
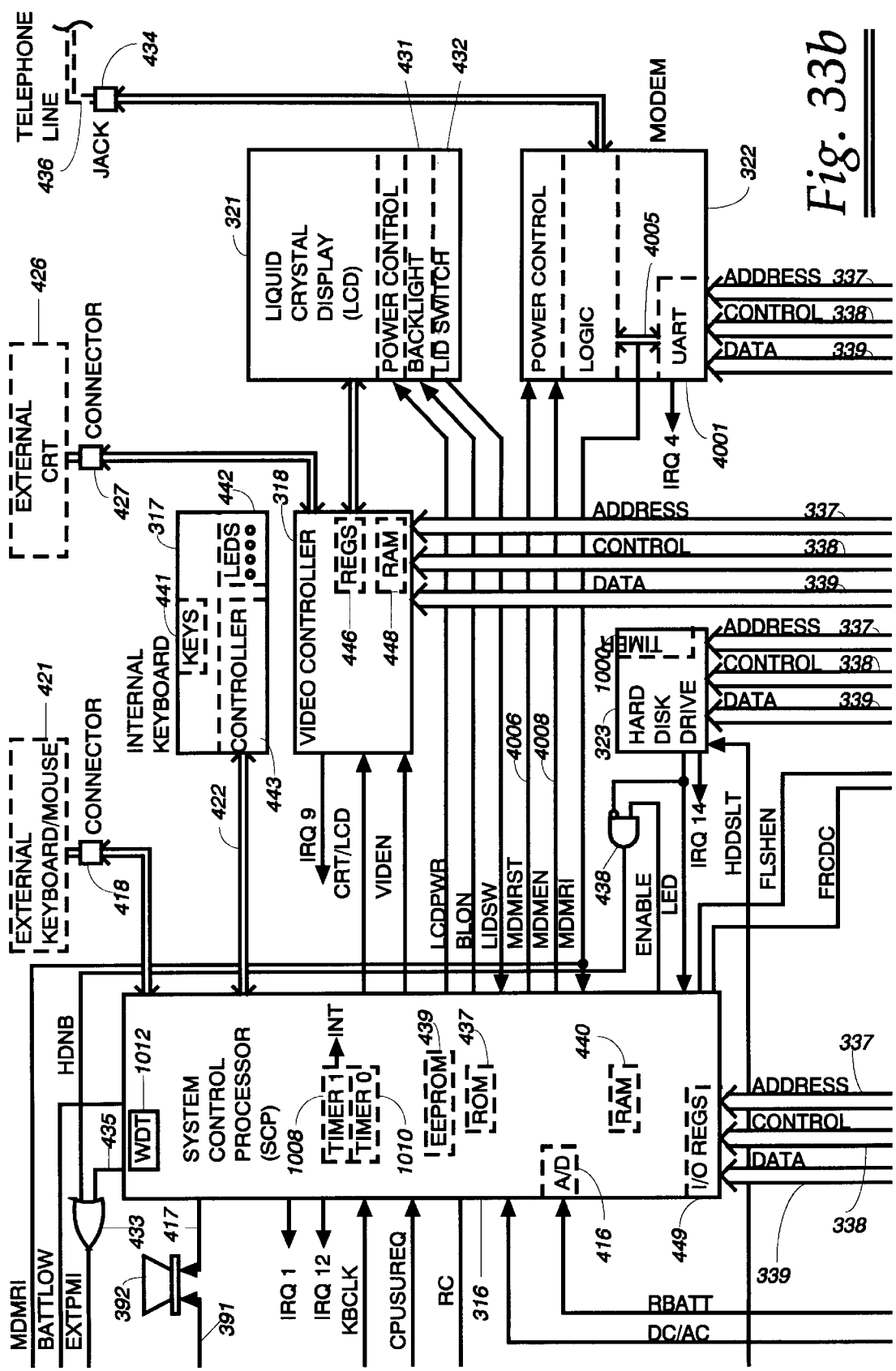
Figure 33D:
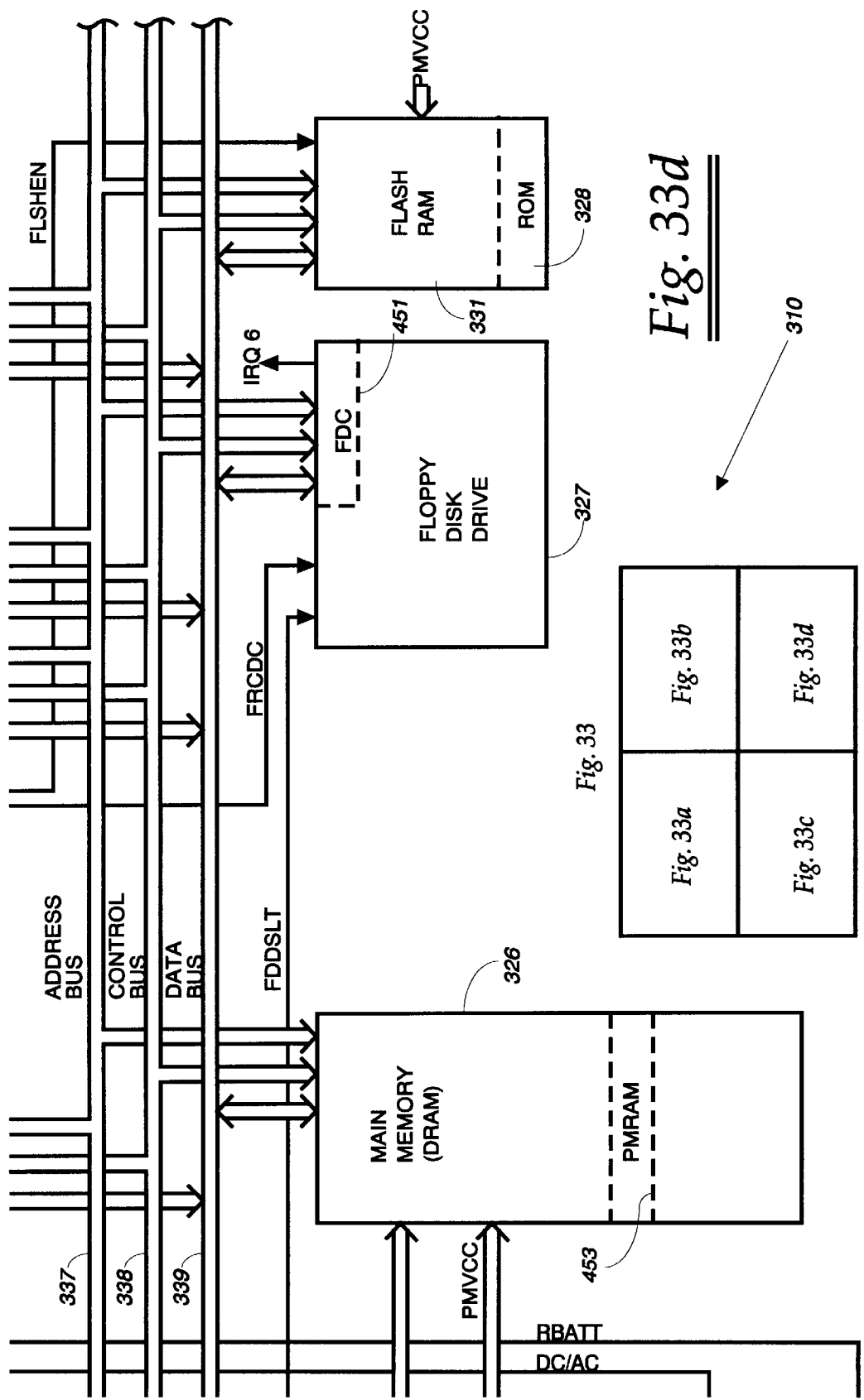
Figure 34:
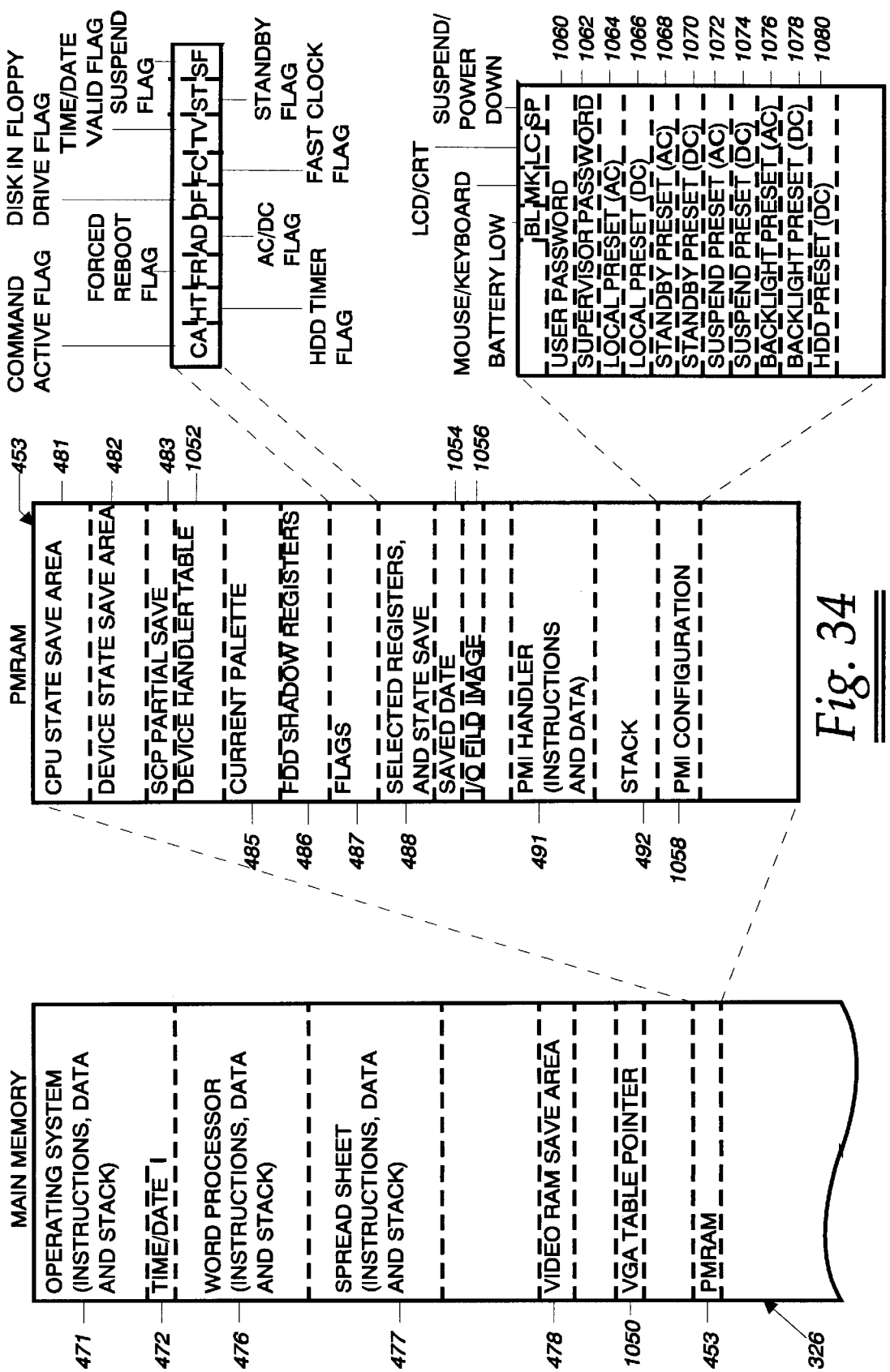
FIG. 34 is a diagram showing the organization of a main memory which is a component of the system of FIGS. 13A–13D.

Turning to FIG. 34, FIG. 34 is generally similar to FIGS. 13A–13D, and the same reference numerals have been used for similar elements. New elements are designated with different reference numerals and are described below. In particular, the main memory 326 includes a VGA table pointer 1050. The PMRAM portion 453 of the main memory 326 includes a device handler table 1052, a location 1054 where a date can be saved, and several locations 1056 where an image of recent I/O cycles obtained from circuit 372 in FIGS. 33A–33D can be stored. A PMI configuration section 1058 includes a BL flag to identify a low battery condition, a MK flag to indicate whether an external input device coupled to the system is a mouse or a keyboard, an LC flag to indicate whether the active display unit is the LCD or the CRT unit, and an SP flag to indicate whether operation of the manual switch 313 (FIGS. 33A–33D) is to cause the system to enter suspend mode or to completely power down.

The PMI configuration section 1058 also includes several locations which contain a user password 1060, a supervisor password 1062, respective local timer presets 1064 and 1066 for AC and DC operation, respective standby timer presets 1068 and 1070 for AC and DC operation, respective suspend timer presets 1072 and 1074 for AC and DC operation, respective backlight timer presets 1076 and 1078 for AC and DC operation, and a hard disk drive (HDD) timer preset 1080 for DC operation. During AC operation, the hard disk timer 1000 is disabled so that the hard disk motor runs continuously during normal system operation.

The flags location 487 in the PMRAM includes some additional flags, namely a suspend flag SF which indicates that the system is attempting to enter suspend mode, an AD flag which indicates whether the system is currently operating under AC or DC power, an FR flag which indicates that a forced reboot of the system is to be carried out, an HT flag which indicates that the preset 1080 in the hard disk timer 1000 was changed while the hard disk was busy and needs to be updated when the hard disk has completed its task, and a CA flag which indicates that a command is active, as described in more detail later.

FIGS. 35A–62D are flow diagrams of a program for the main processor 311 of FIGS. 33A–33D.

FIGS. 35A–62D are flowcharts of a program for the main processor 311 of FIGS. 33A–33D.

Figure 35A:
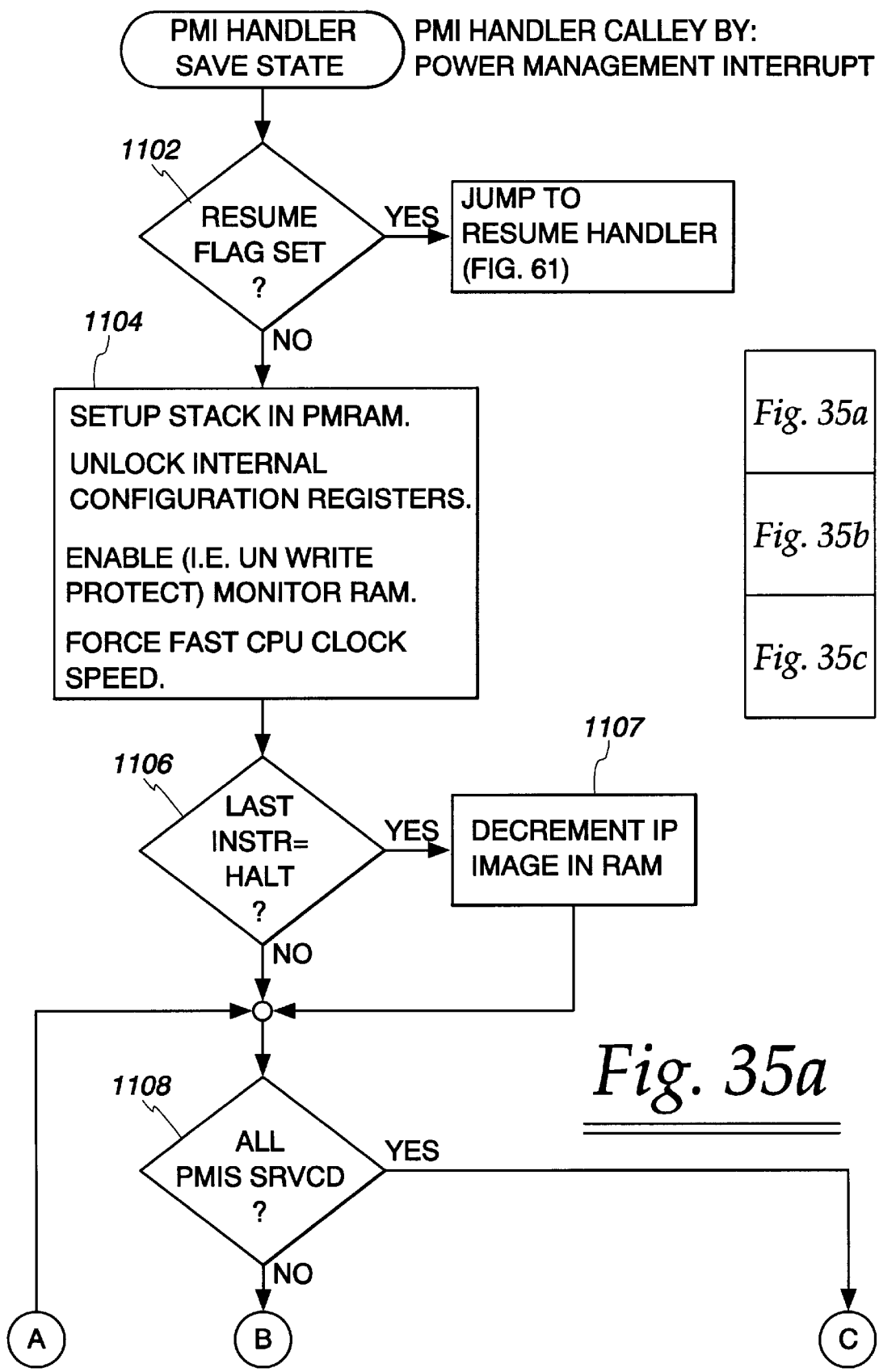
FIGS. 35A–62D are flowcharts showing respective portions of a program executed by a main processor of the computer system of FIGS. 33A–33D.
Figure 35B:
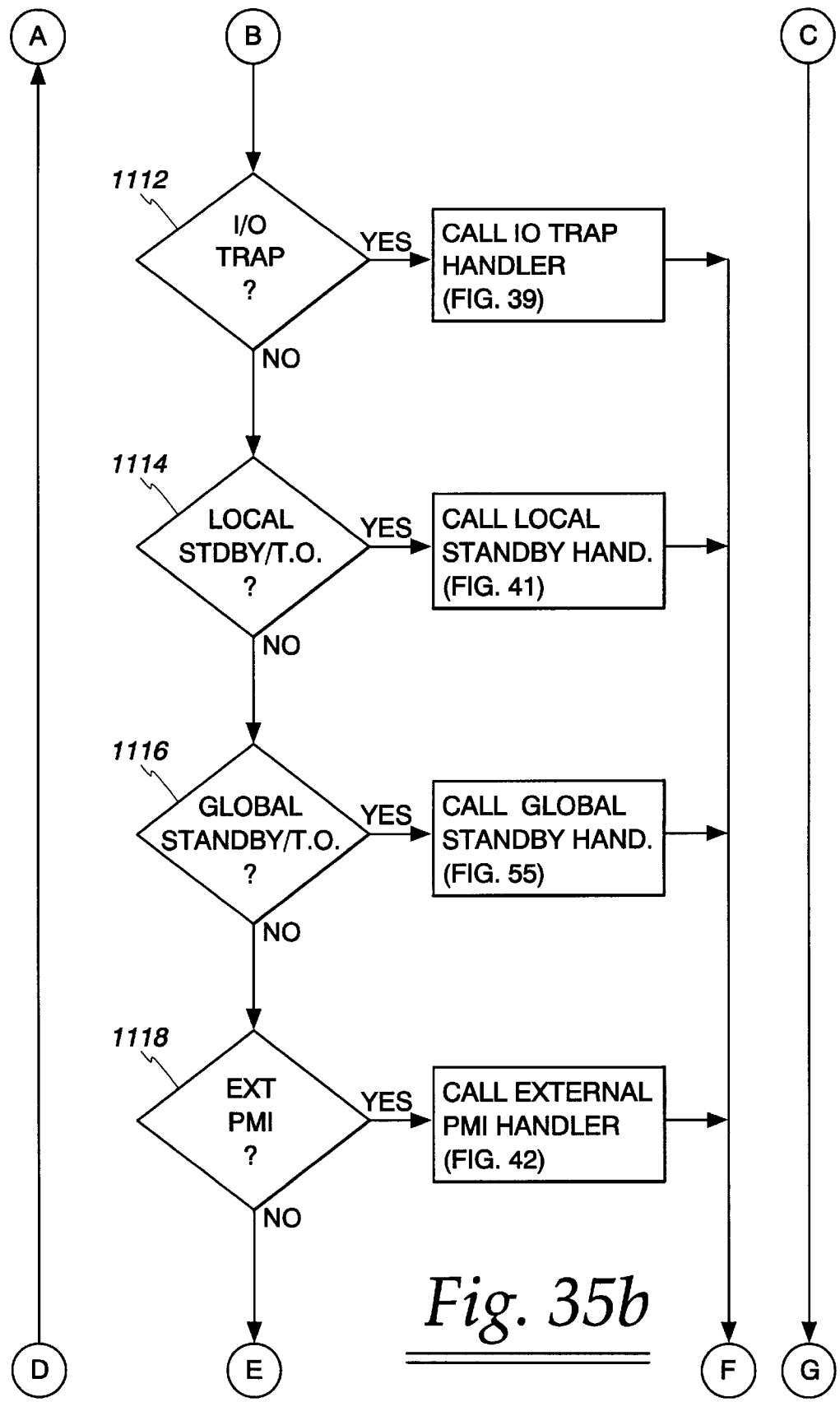
Figure 35C:
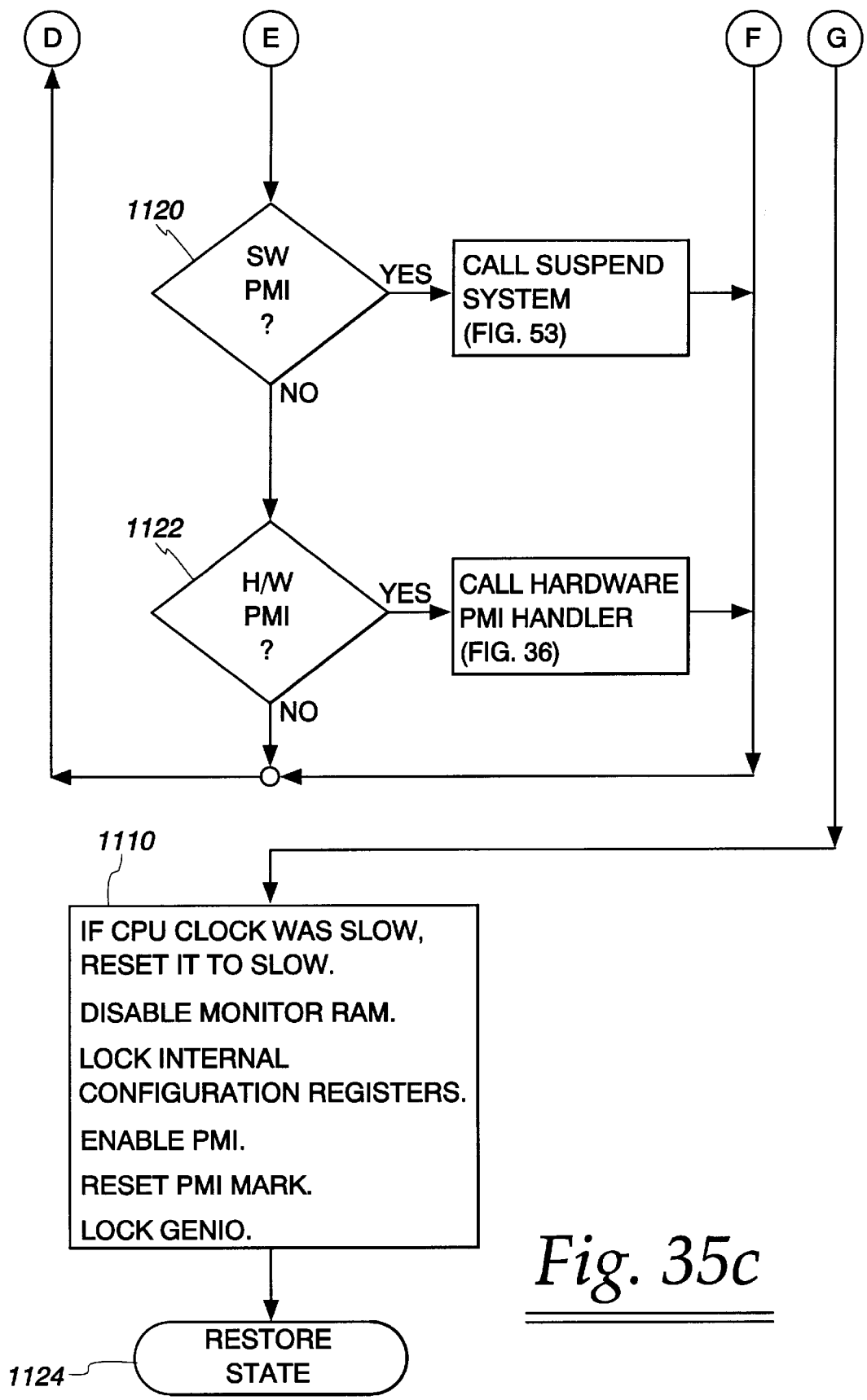

FIGS. 35A–35C presents an overview block diagram of the power management interrupt handler. This is the routine that responds to a power management interrupt provided to the main processor 311. The routine first determines what type of power management interrupt has occurred and then calls upon an appropriate subroutine to process the interrupt.

First, at block 1102, the resume flag is checked to see if it is set, because if it is then the system is returning from the suspend state. If set, the program control jumps immediately to the resume handler routine, which is set forth in FIGS. 61A–61B. There is no need to save the registers, since the system is returning from suspend state and must restore all of the working registers in that case.

If the resume flag was not set, then program control continues at block 1104. First, a stack for the main processor 311 is set up in PMRAM (FIG. 34). The main processor 311 internal configuration registers are then unlocked, and then the monitor RAM is enabled for writing. Then, the CPU clock speed is increased to maximum speed for the duration of the power management interrupt so the service routine will execute as quickly as possible.

Next, at block 1106, the processor checks to see if the last instruction executed was the halt instruction. If so, then at 1107 the instruction pointer image stored in the PMRAM is decremented to ensure that the processor, upon completion of the PMI service routine, executes the halt again and thus remains at the halt condition which it was in before.

Figure 39:
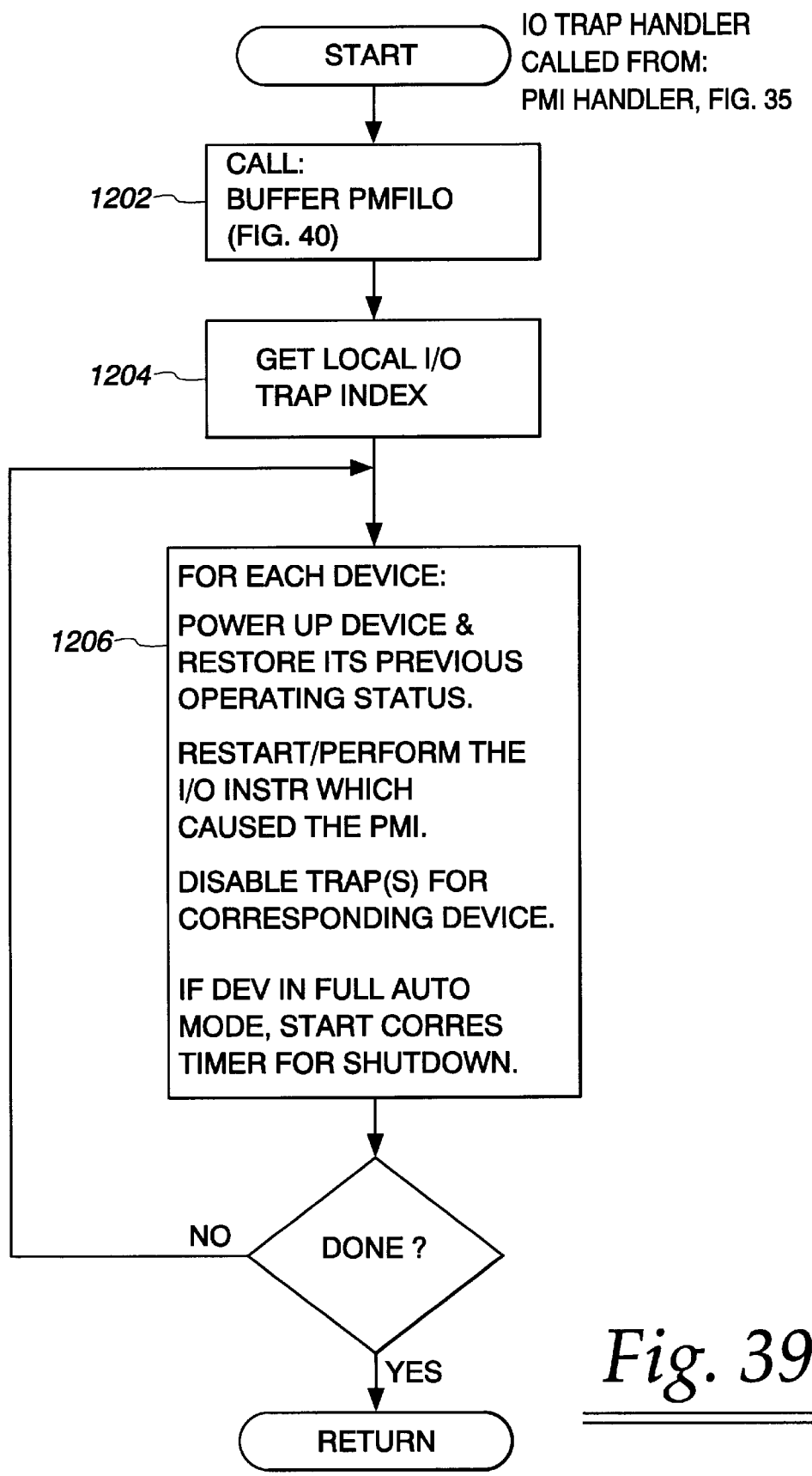

Next, the power management interrupt handler routine checks the status register 371 (FIGS. 33A–33D) to determine the cause of the power management interrupt, and then branches to an appropriate subroutine. At 1108, the system first checks to see if all power management interrupts have been serviced. If so, then program control proceeds to block 1110. If not, then first a test is made for an input/output trap operation at 1112. If so, then the input/output trap handler routine in FIG. 39 is placed into operation. At 1114 and 1116, checks are made to see if either a local or a global standby time out has occurred. If so, then the appropriate one of the local standby handler (FIG. 41) or the global standby handler (FIGS. 55A–55B) is called upon to service the interrupt. At 1118 a check is made to see if this was an external power management interrupt and, if so, the external PMI handler shown in FIGS. 42A–42C is placed into operation. Finally, at 1120 and 1122, checks are made to see if this is either a software or a hardware power management interrupt and, if so, the suspend system routine (FIGS. 53A–53D) is called upon to service a software power management interrupt or the hardware PMI handler routine (FIG. 36) is called upon to handle a hardware power management interrupt. After the appropriate handler has run to completion, program control branched back to block 1108 to see if all the PMI interrupts have been serviced. If so, then program control continues at block 1110.

At 1110, if the main processor 311 CPU clock was running at slow speed when the PMI occurred, it is reset to the slow speed. The monitor slush RAM is disabled for writing, and the internal configuration registers are locked to protect them from software alteration. Then, the power management interrupt is enabled. The system resets the PMI_MARK flag to enable CPU resets and locks the Genesis IO (GENIO) to prevent certain internal registers from being changed. Finally, at block 1124, the state of the system is restored and the power management interrupt is terminated. The main processor 311 then recommences normal execution of the interrupted application program, and the application program is in general unaware that any interruption has occurred.

Figure 36:
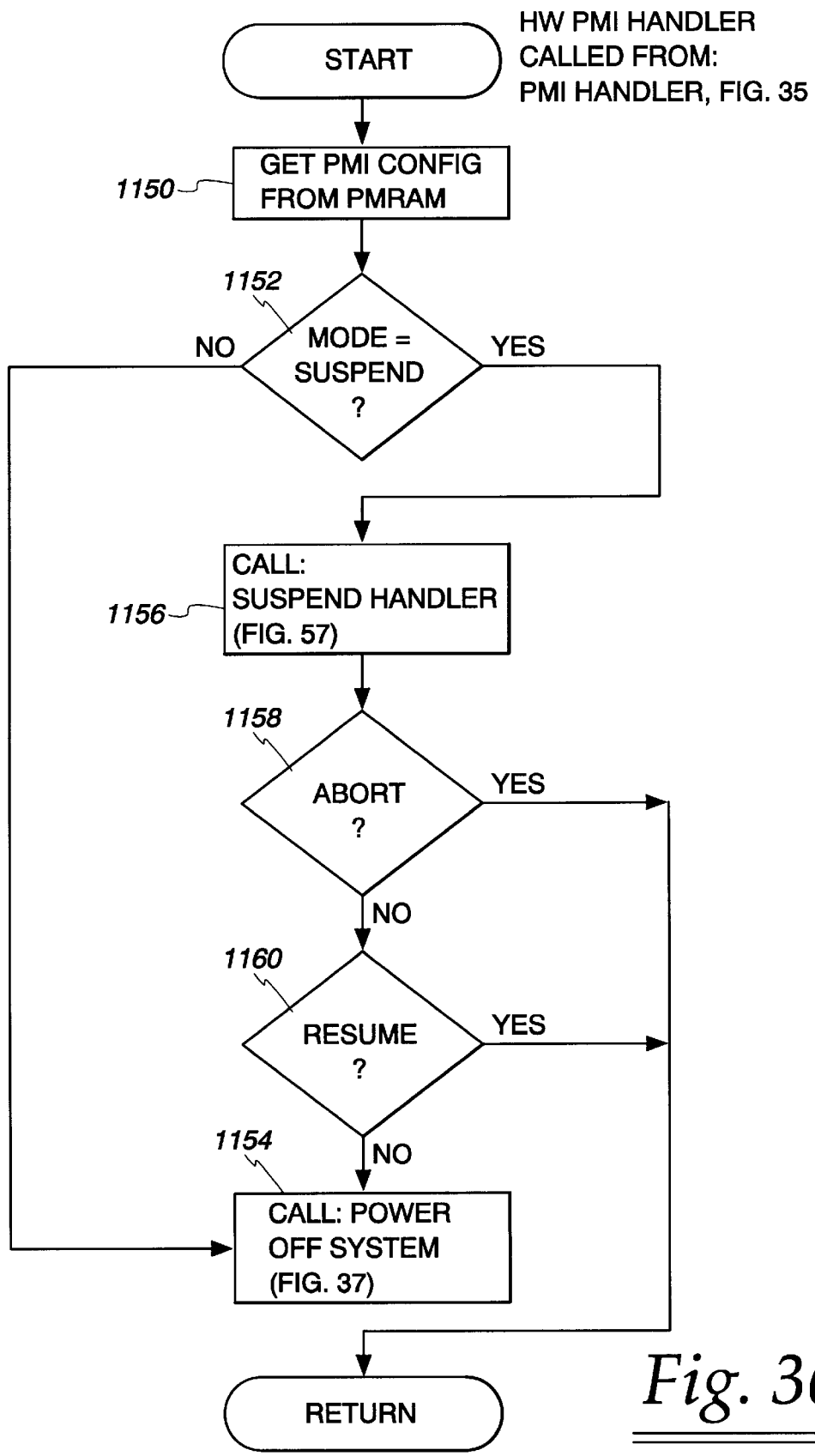
Figure 37:
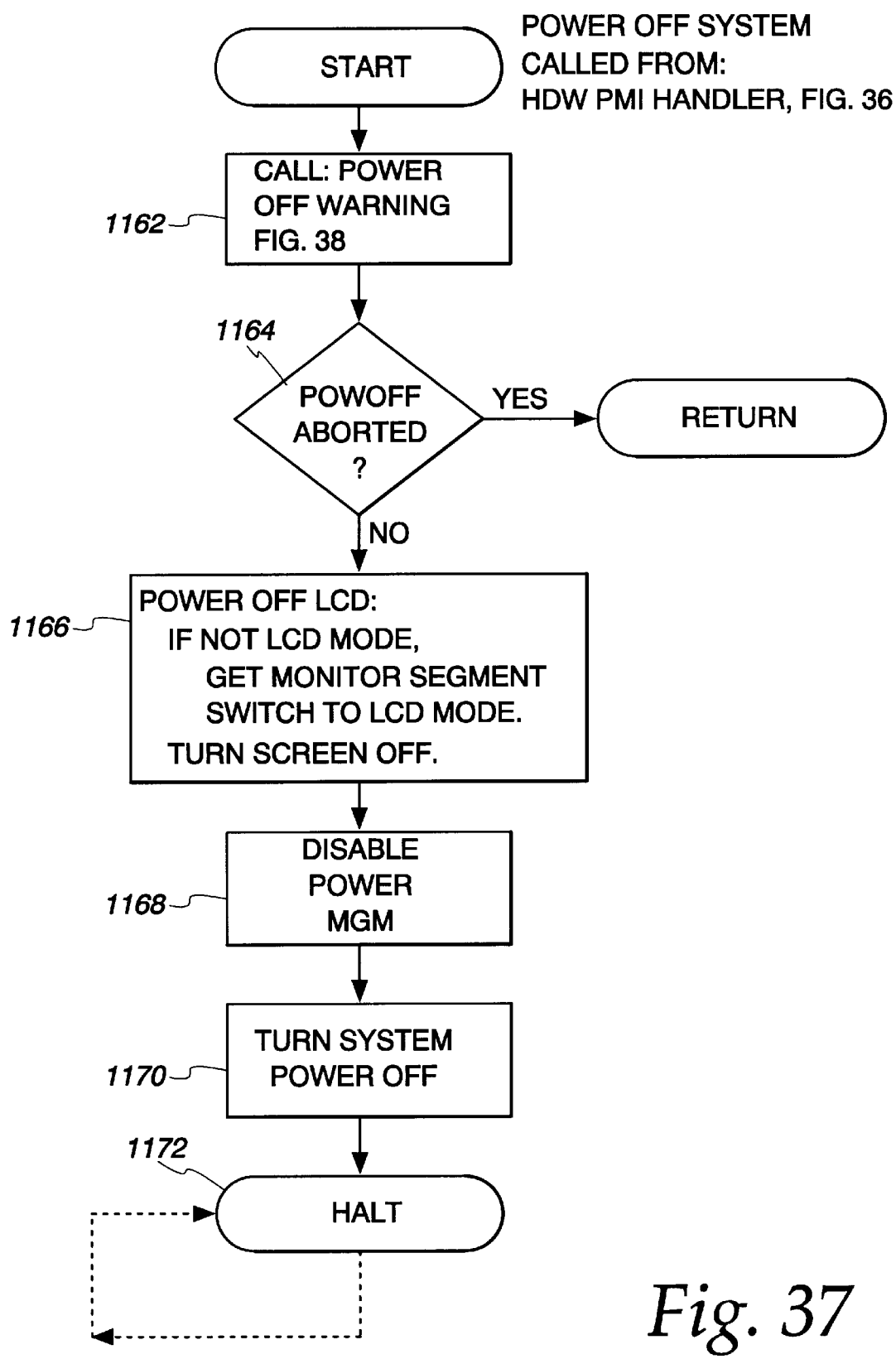

The hardware power management interrupt handler routine is set forth in block diagram form in FIG. 36. This routine is placed into operation when the user presses the on/off/suspend-resume button 313 (FIGS. 33A–33D) or when a battery low condition is detected and forces an emergency shut-down of the system. This routine begins at 1150 by retrieving the power management interrupt configuration information from the power management random access memory PMRAM (FIG. 34). At 1152, a test of this data is made to see if the user, when configuring the system, specified that the control button 313 is to function as a "on/off" button, as in a normal computer, or is to function as a "suspend-resume" button, as when actuation of the button merely suspends the program so that it may be resumed later. If the user has selected suspend mode for the on/off button, then program control continues at 1154, where the power-off system routine shown in FIG. 37 is called to completely power down the system, including all RAM other than that in the real time clock, so that no record of the state of the system is maintained other than in the real time clock and on the hard and floppy disk drives. When the system is restarted, it does a complete conventional reboot from the disk drive and commences again from the beginning without any form of resume.

On the other hand, if the user setup information indicates that the on/off button is to perform a suspend-resume operation, then program control proceeds from block 1152 to block 1156, where a suspend handler routine (FIG. 57) is called to initiate suspension of operation. If the program does suspend properly, it will eventually resume only in response to a timeout of the alarm clock, a ring signal from the modem, or the user actuating the resume button, in which case program control will eventually return to block 1156 and proceed to block 1158.

Program control may return to block 1156 even though for some reason the program could not be properly suspended. In some cases, the user is given an opportunity to abort out of the suspension, as described later, and in that case a test at block 1158 causes a return to the routine of FIGS. 35A–35C. Similarly, at block 1160, a test is made to see if the exit from the suspend handler is due to a resume from the suspend state, and if not control proceeds directly to block 1154 to shut down the system. Otherwise, program control leaves the block 1160 and returns to FIGS. 35A–35C.

The power-off system routine, entered from block 1154 in FIG. 36, is shown in FIG. 37. This routine begins with blocks 1162 and 1164, which warn the user that the power is about to be shut off and ask the user to reconfirm that a power off is desired. This is to prevent an accidental powering down of the system when the user presses the power-off button accidentally or with the belief the system is going to suspend, as opposed to powering down. If the user wishes to abort the power-off action, then program control immediately returns from the power-off system routine.

The power-off procedure is quite simple. At block 1166, the system switches into LCD mode if it is presently in monitor mode and then turns off the screen. At block 1168, the system disables power management functions. At block 1170, the system turns off the system power, and then at block 1172 a halt instruction is executed to halt the main processor 311. In this manner, the entire system is powered down to a state where no battery power is drawn other than by the real time clock circuit.

Figure 38A:
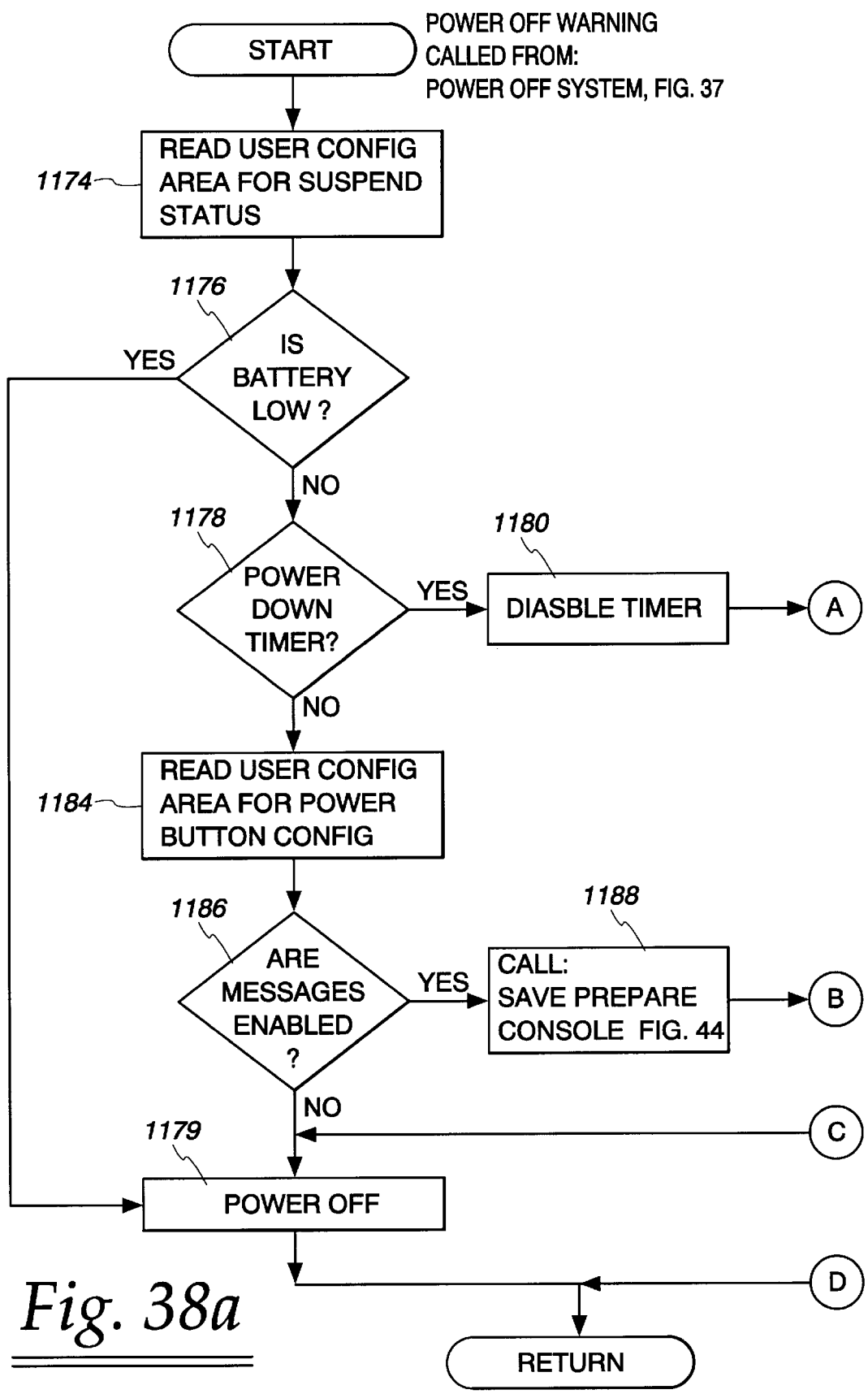
Figure 38B:
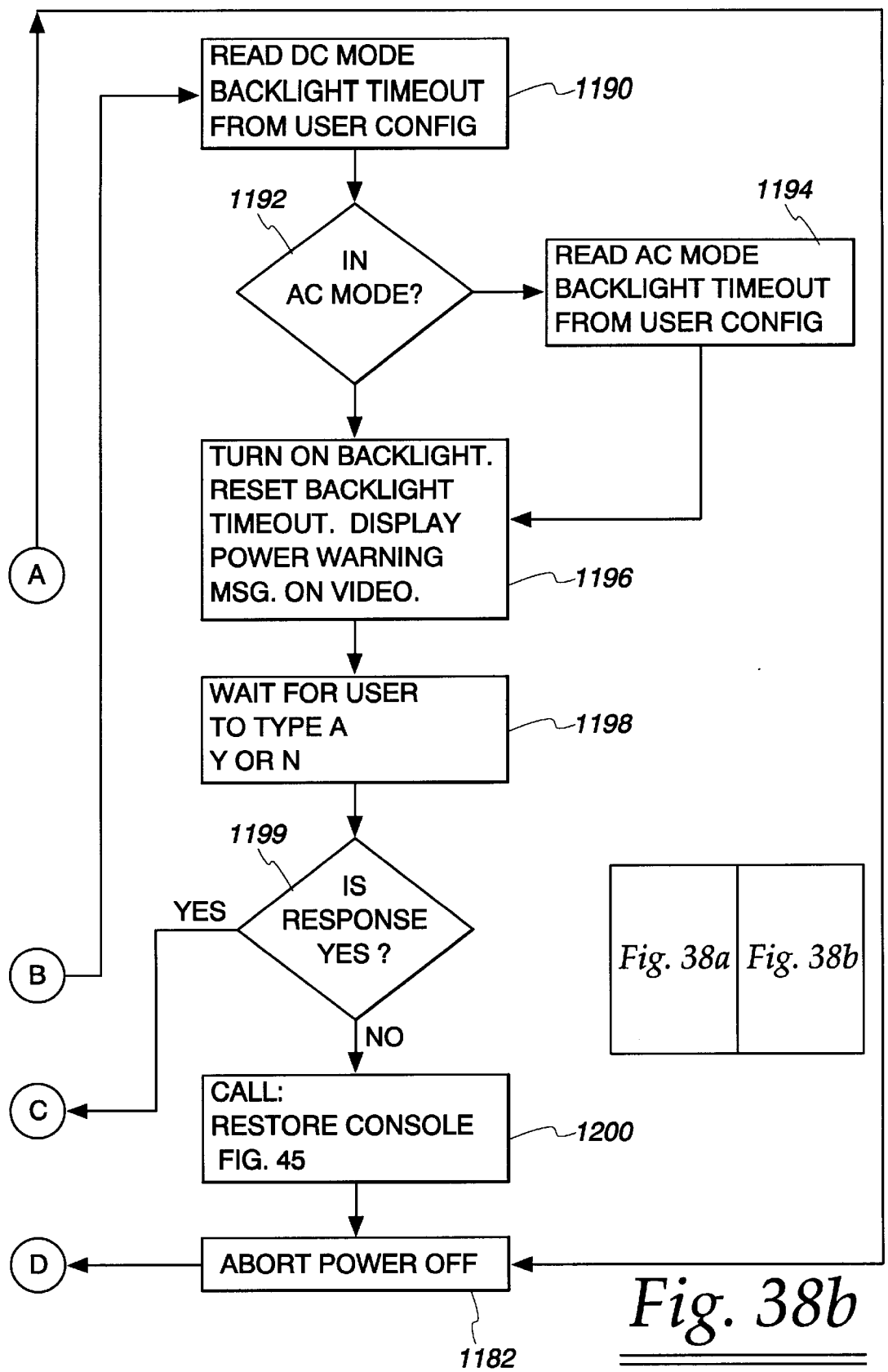

FIGS. 38A–38B presents a block diagram of the power-off warning routine which is called on by the power-off system shown in FIG. 37 to warn the user that the power is about to go off and to get affirmation from the user that he/she really wishes to shut the system down completely. At 1174, the system checks the user configuration area to determine the suspend status of the system preparatory to making the various tests indicated at further points in this routine. In step 1176, a check is made to see if the battery is low. If so, the subroutine sets a power off flag at block 1179 and returns to initiate powering down the system. When the battery is about to be drained, the system has to be shut down before the battery is possibly damaged or has its polarity reversed by continued current drain, so the user is not prompted. Next, at block 1178, a test is made to see if the power off condition was initiated not by the user but by the power down timer within the system. This is an abnormal condition which should never happen, since the timer is normally disabled. But if the timer initiated the power-down action, the timer is disabled at block 1180, an abort power off flag is set at block 1182, and control returns to the calling routine.

Figure 44A:
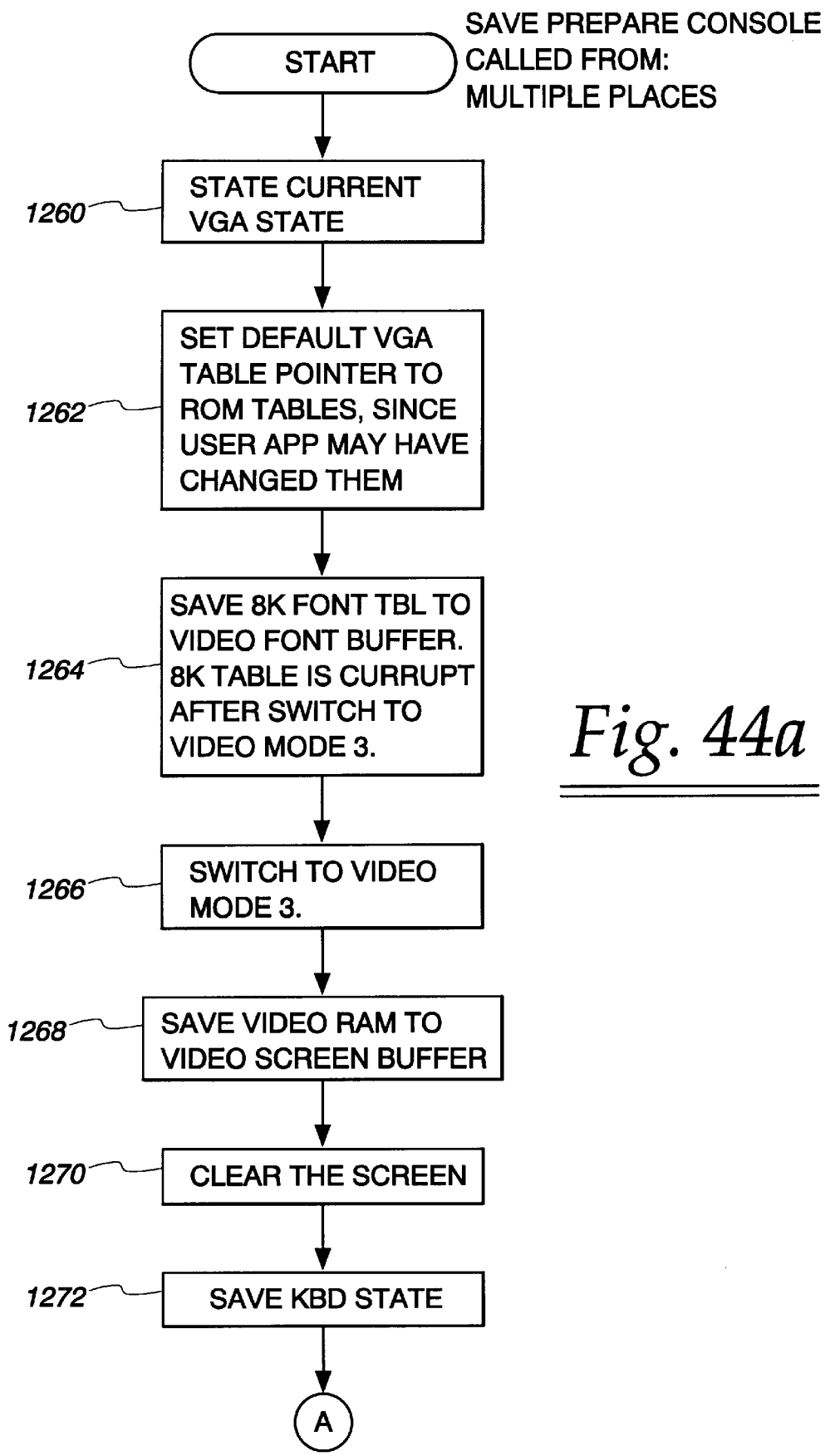
Figure 44B:
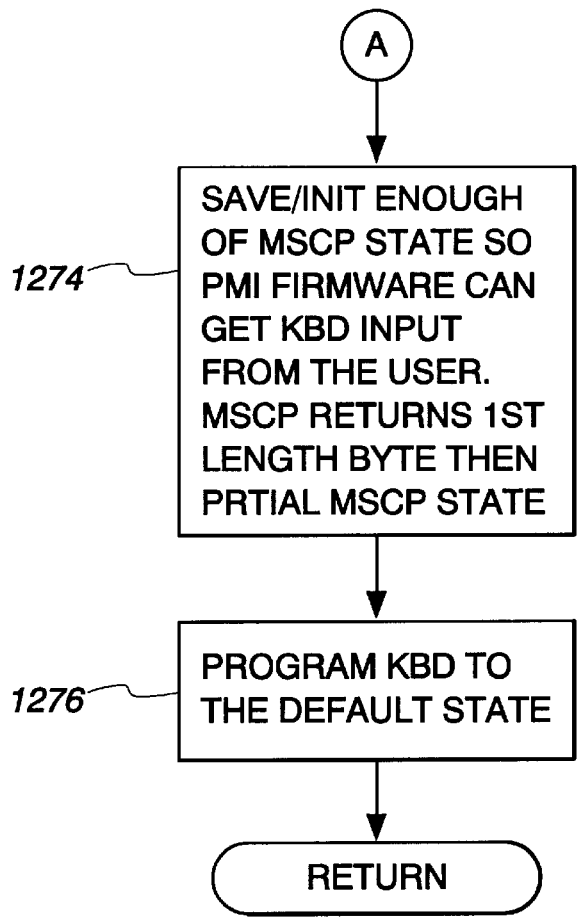
Figure 45:
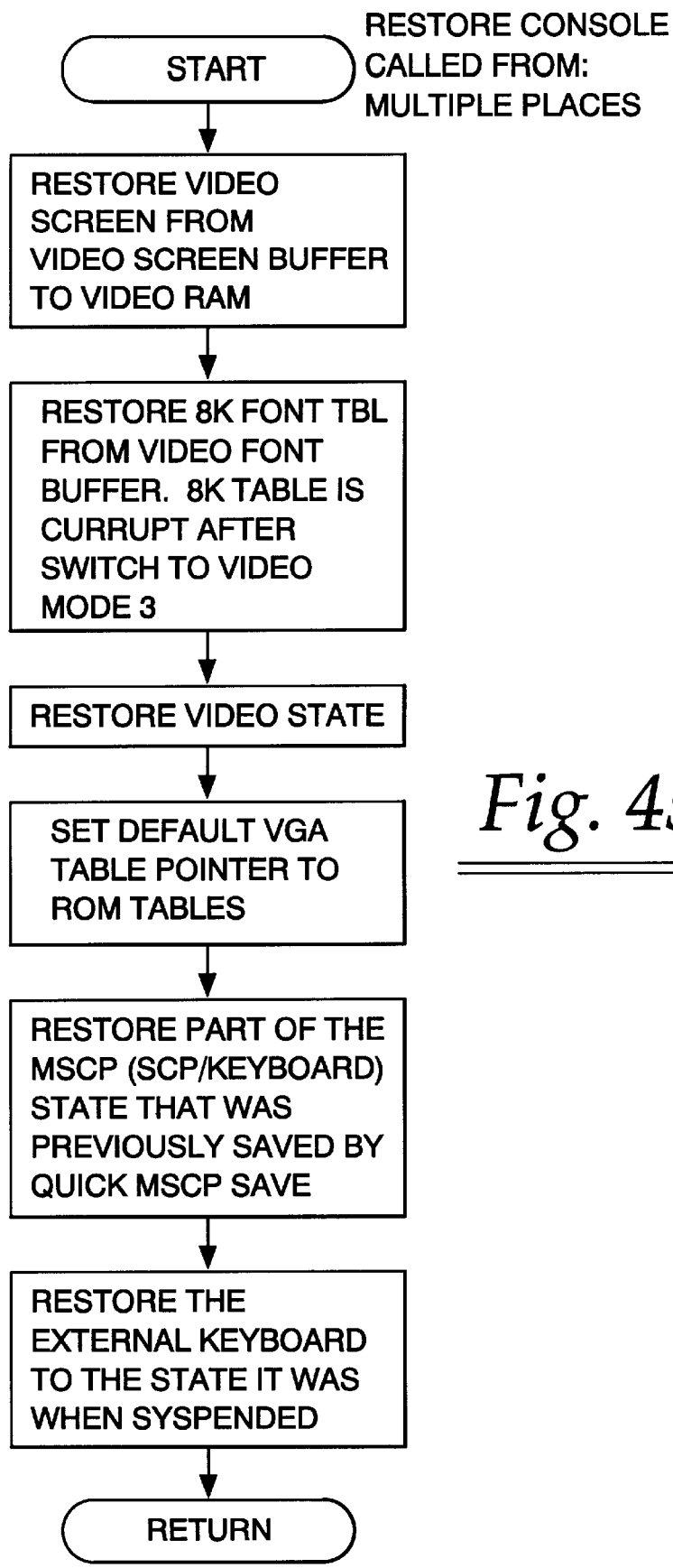

Block 1184 again checks the user configuration information. If user messages have been suppressed, program control passes from block 1186 to the setting of the power off flag at 1179, and the routine terminates. But if messages are enabled, then program control proceeds to block 1188 where a save and prepare console routine shown in FIGS. 44A–44B is called to save the screen and prepare it for the displaying of a system message. Routine blocks 1190, 1192, and 1194 then check the user data to retrieve either the DC mode backlight timeout value or the AC mode backlight timeout value in accordance with whether the system is running on AC power or DC power. Then at block 1196, the backlight timeout value is restored and the backlight is turned on. Then the user power-down warning message is displayed and the user is prompted as to whether he/she really wants to power down or alternatively to continue operating. At block 1198, the system waits for the user to respond with a yes or no answer to the prompt. If the user responds yes, then at block 1199 program control continues to block 1179 where the power off flag is set. If user responds no, then the restore console routine set forth in FIG. 45 is called upon at block 1200 to restore the screen to its original state. Program control then proceeds to block 1182 where the abort power-off flag is set.

FIG. 39 presents a block diagram overview of the input/output trap handler routine which is placed into operation by the power management interrupt handler (FIGS. 35A–35C) when the input/output trap flag is set.

This routine (FIG. 39) is called when some user program attempts to access an input/output device whose operation has been suspended by the power management system. The attempt to access the device is trapped by the logic 361 in the main processor 311, which generates a power management interrupt. The purpose of the routine of FIG. 39 is to power up and restart the device, restore its internal registers to their previous state, and then recommence operation of the interrupted application program after the device is ready to service the needs of the program.

The device controlled by this routine in the disclosed embodiment is the floppy disk drive 327, but it could also be the hard disk drive or some other device. Program control commences at block 1202, where the power management first in/last out (PMFILO) buffer routine (FIGS. 40A–40B) is called upon to retrieve from the circuit 372 (FIGS. 33A–33D) within the main processor 311 a record of the last few input and output operations executed by the main processor 311 under software control. These will include the input/output commands which were being passed to the floppy disk drive to initiate a disk drive operation. Since the disk drive was powered down, it could not respond to these commands, and hence they are retrieved at block 1202 and saved to be presented to the floppy disk drive again after it has been restarted. Next, at block 1204, the input/output device trap which produced the interrupt is checked, and the repetitive steps that follow are then executed for each input/output device whose trap initiated a power management interrupt. In the preferred embodiment of the invention, there is presently only one trap, which is for the floppy disk controller.

Step 1206 then powers up the floppy disk controller and restores it to its previous operating status. By way of further explanation, whenever the registers of the floppy disk drive controller are provided with data, duplicates of that data are written out into the FDD shadow registers 486 shown in the PMRAM in FIG. 34. Accordingly, the shadow register data 486 is simply retrieved and resubmitted to the floppy disk drive controller to reprogram it as it was programed before it was powered down.

Next, block 1206 reexecutes the series of input and output instructions which were retrieved from the circuit 372 (FIGS. 33A–33D), to reinitiate the input/output operation requested by the application program.

Next, block 1206 disables the power management interrupt traps for the floppy disk controller so that it does not interfere with further program requests for service from the floppy disk controller after the floppy disk drive is up and running. Finally, assuming the user has requested that the floppy disk drive automatically shut down when it is not in use, the block 1206 reinitiates and starts a timer that will shut the floppy disk drive down again after a predetermined time interval, if such is appropriate.

Figure 40A:
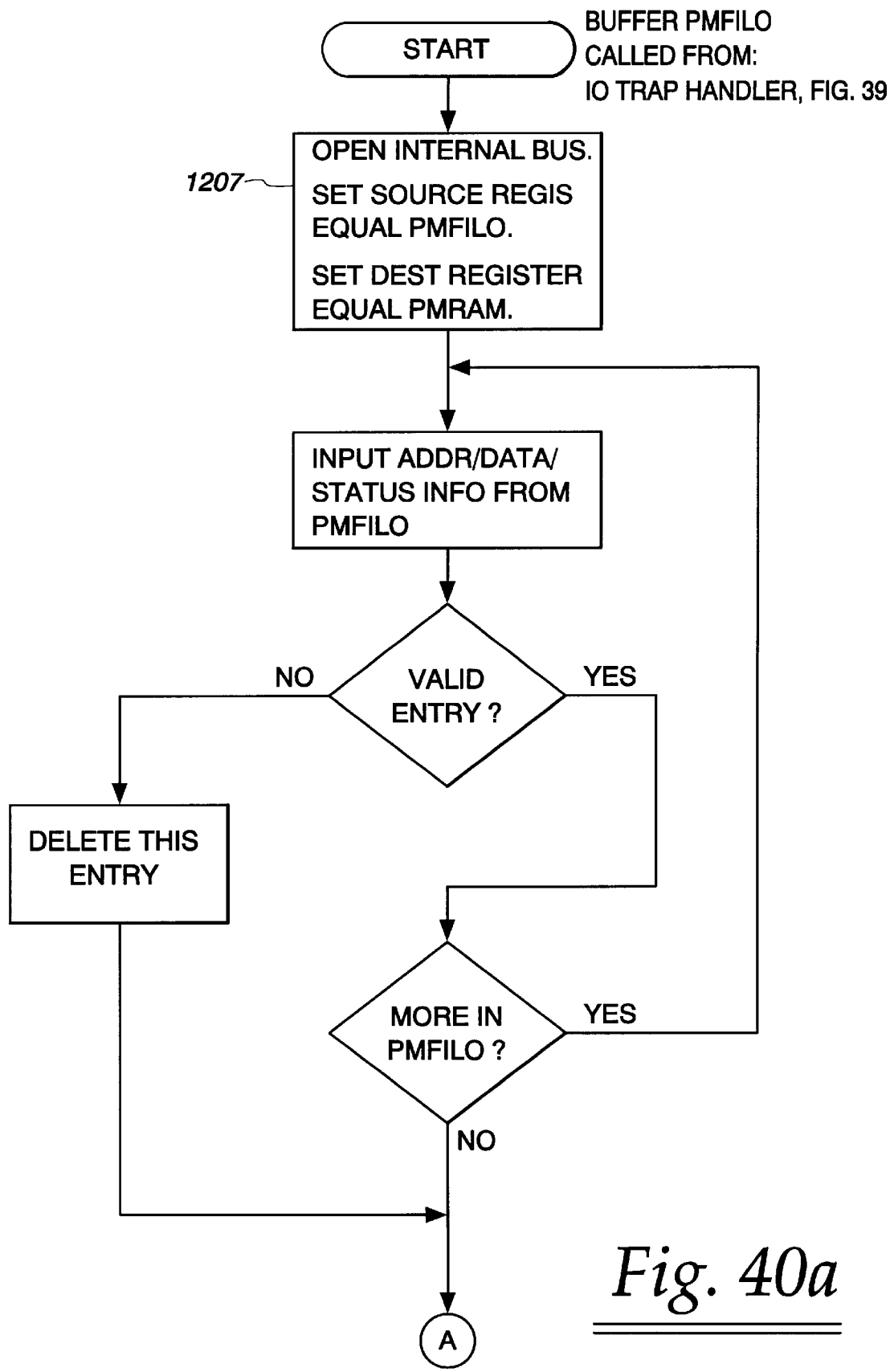

FIGS. 40A–40B is a block diagram of the power management first in last out buffer information retrieval program which, as mentioned above, is called upon at step 1202 in FIG. 39 to retrieve the last few input/output cycles from the circuit 372 within the main processor 311. In this routine, PMFILO is a reference to the circuit 372 within the main processor 311. The reference PMRAM is a reference to the I/O FILO image region 1056 within the PMRAM shown in FIG. 34. Briefly summarized, this routine begins at 1207 and opens up an internal bus within the main processor 311 in order to gain access to the PMFILO data within the device 372. It then transfers all valid data into the I/O FILO image region 1056. In this manner, a record of the last few input/output cycles initiated by the main processor 311 are retrieved from the circuit 372 and transferred to the RAM area 1056. The routine shown in FIG. 39 then uses this information to retransmit I/O requests to the floppy disk drive after it has been restarted, as has been explained.

Access to the circuit 372 is then closed again in block 1208 by disabling special register units which close the internal bus.

Figure 41:
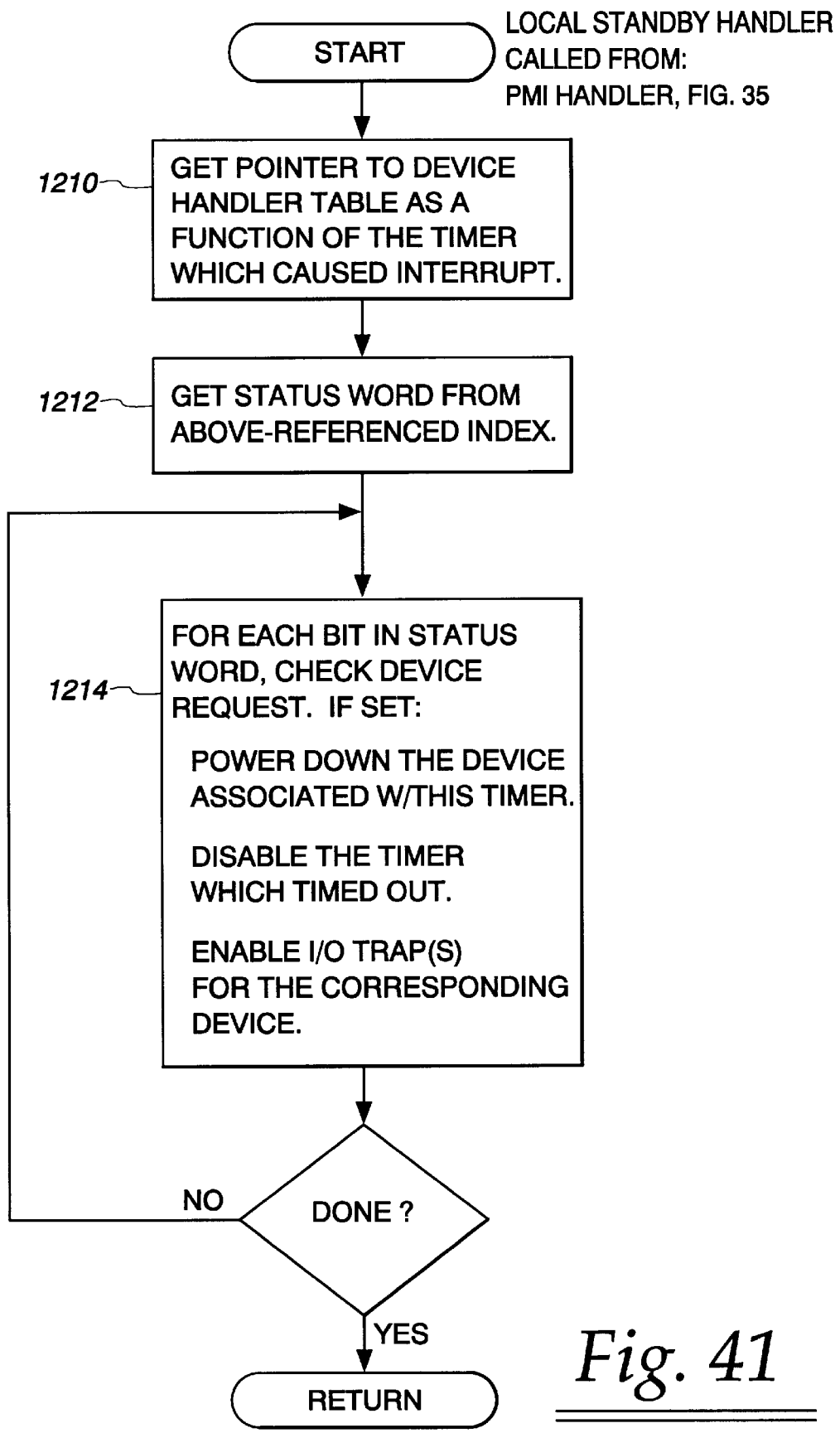
Figure 42A:
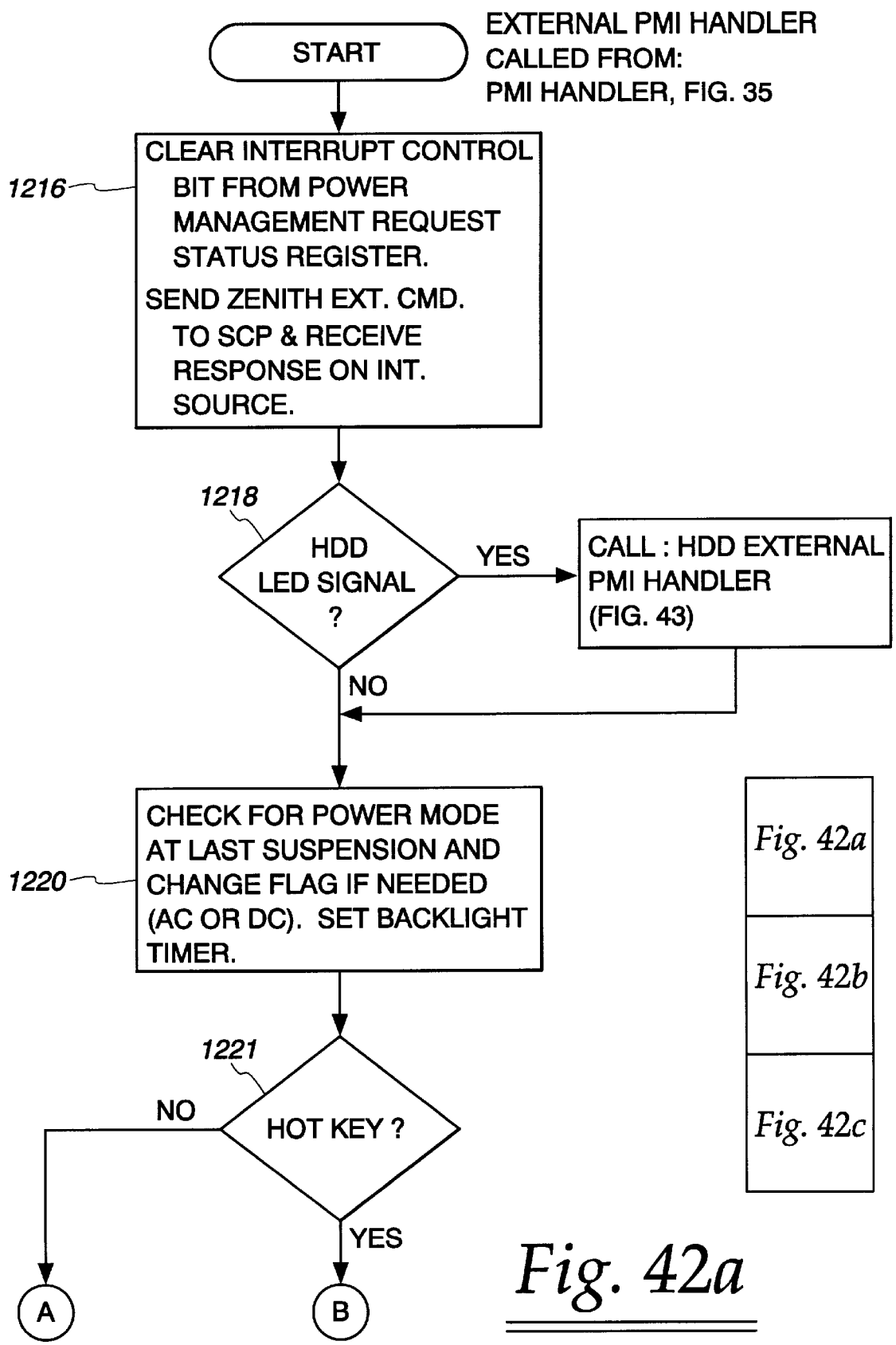
Figure 42B:
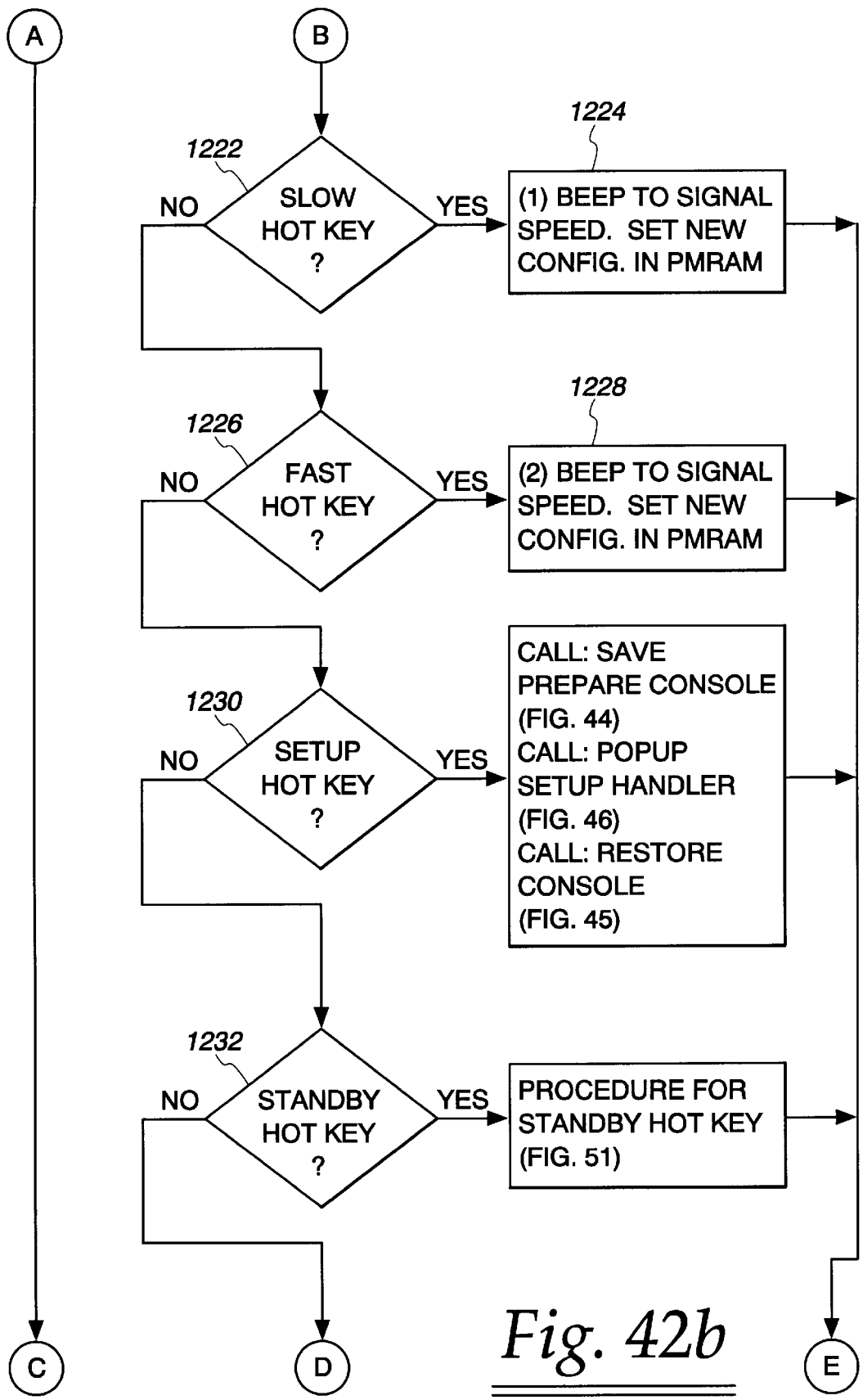
Figure 42C:
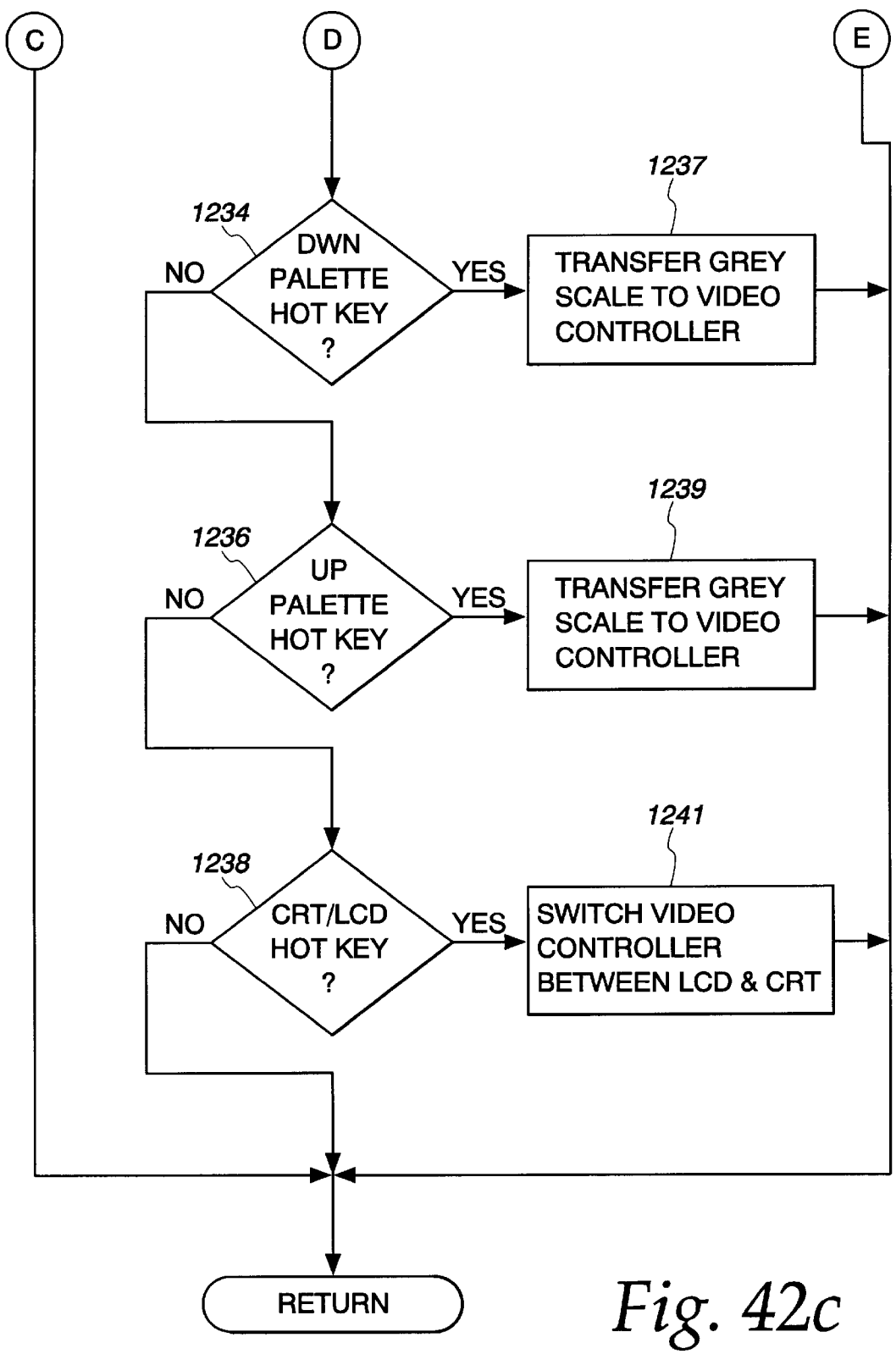

FIG. 41 presents a block diagram of the local standby handler routine, which is placed into operation by the power management interrupt handler shown in FIGS. 35A–35C in response to a local standby timeout interrupt. By way of further explanation, various timeout intervals are associated with various power drawing peripheral devices on the computer. Hardware counters such as timer 351 (FIGS. 33A–33D) keep track of the passage of time and generate a power management interrupt when it is time to shut one of these peripheral devices down. When that happens, the routine shown in FIG. 41 is called upon. It begins at block 1210 by retrieving a pointer to a device handler table 1052 (FIG. 34). The specific pointer selected is a function of the timer which caused the interrupt, so as to locate corresponding data from the device handler table. At 1212, a status word is retrieved from this table.

Block 1214 then is executed once for each bit in the status word which was retrieved. If a bit corresponding to the device associated with the expired timer is set, then the device is powered down. The timeout timer is disabled so it does not generate another interrupt, and then the associated input/output trap, which generates a power management interrupt when software attempts to access this device, is enabled and placed into operation. In this manner, the device is powered down, and the processor 311 is adjusted so that the next time software attempts to access that device, the device will be powered up by a subsequent power management interrupt generated by the input/output trap in response to an input or output instruction.

FIGS. 42A–42C presents an overview block diagram of an external power management interrupt handler routine. This routine is placed into operation by the interrupt handler routine of FIGS. 35A–35C when the power management interrupt originates externally of the main processor 311, typically from the system control processor (SCP) 316. The interrupt which triggers the operation of this routine originates from the SCP when the system switches between AC and DC power sources, when a user depresses a special hot key such as the pop-up/set-up hot key, the standby hot key, the up or down pallet hot keys, the fast or slow hot keys, or the CRT/LCD hot key. The routine shown in FIGS. 42A–42C is also called when the SCP generates a PMI because the disk drive light of the hard disk drive turns off after some form of power management interrupt action was suspended pending completion of a hard disk drive task.

Program control commences with the block 1216 where the interrupt control bit from the power management request status register is cleared. Next the main processor 311 inquires of the SCP 316 as to what caused this particular interrupt, since all of these interrupts originate one way or another from the SCP 316.

Figure 64:
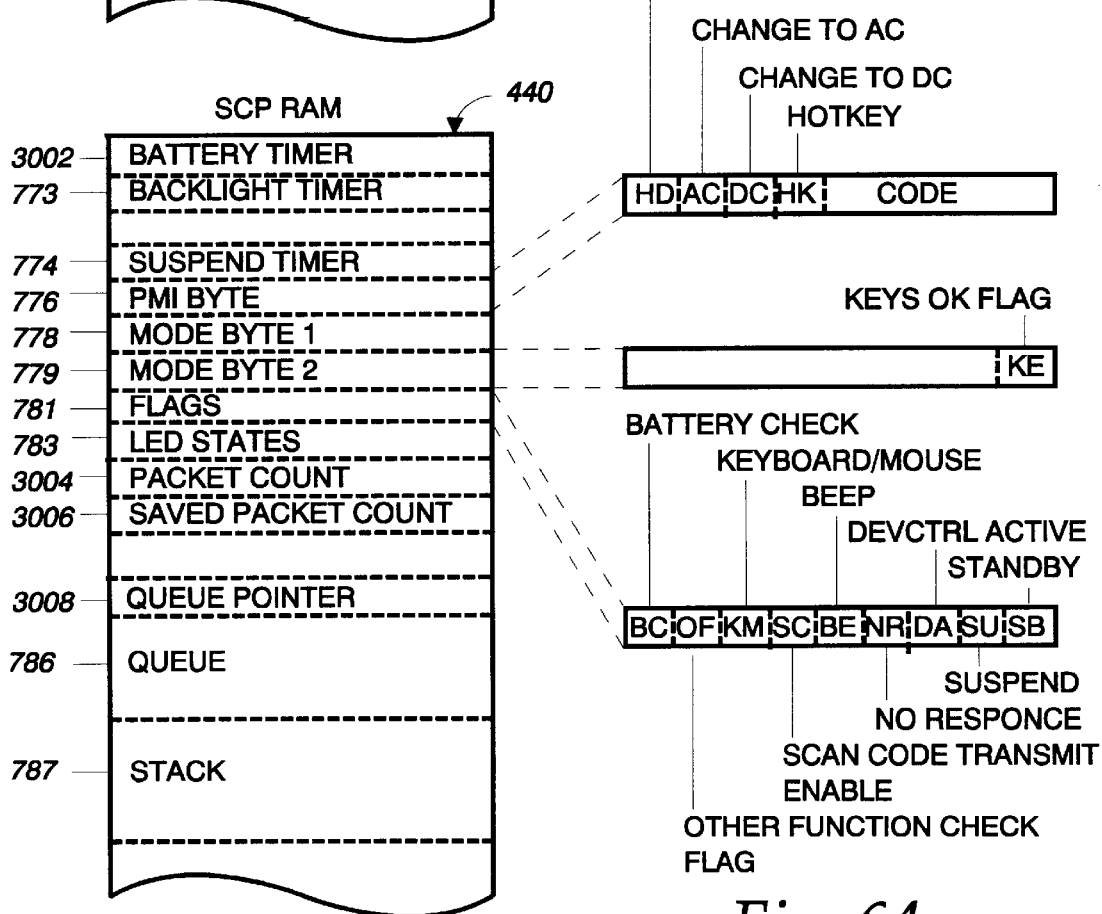

The main processor 311 sends an inquiry command to the SCP 316 and receives back from the SCP RAM 440 the PMI byte 776 which is illustrated in FIG. 64. This byte indicates the following: whether the hard disk LED signal has been enabled to generate a PMI interrupt; whether the power supply has changed to AC; whether the power supply has changed to DC; and whether any hot key was pressed and, if so, which hot key has been actuated. The remaining steps in the routine shown in FIGS. 42A–42C check each of these bytes to determine the precise source of the power management interrupt and to then initiate an appropriate action.

The block 1218 checks the hard disk LED signal bit within the byte 776. If this bit is set, it indicates two things. First of all, the main processor 311 has previously commanded the system control processor 360 to generate the ENABLE signal to the AND gate 438 such that the hard disk drive LED signal shown in FIGS. 33A–33D can generate a power management interrupt when that signal terminates. Secondly, the power management interrupt may (or may not) have been caused by the termination of the hard disk drive LED signal, which signals the end of the hard disk drive operation. If the hard disk drive LED signal bit in the PMI byte 776 is found to be set, program block 1218 branches to the hard disk drive external PMI handler routine, which shown in FIGS. 43A–43B.

Figure 43A:
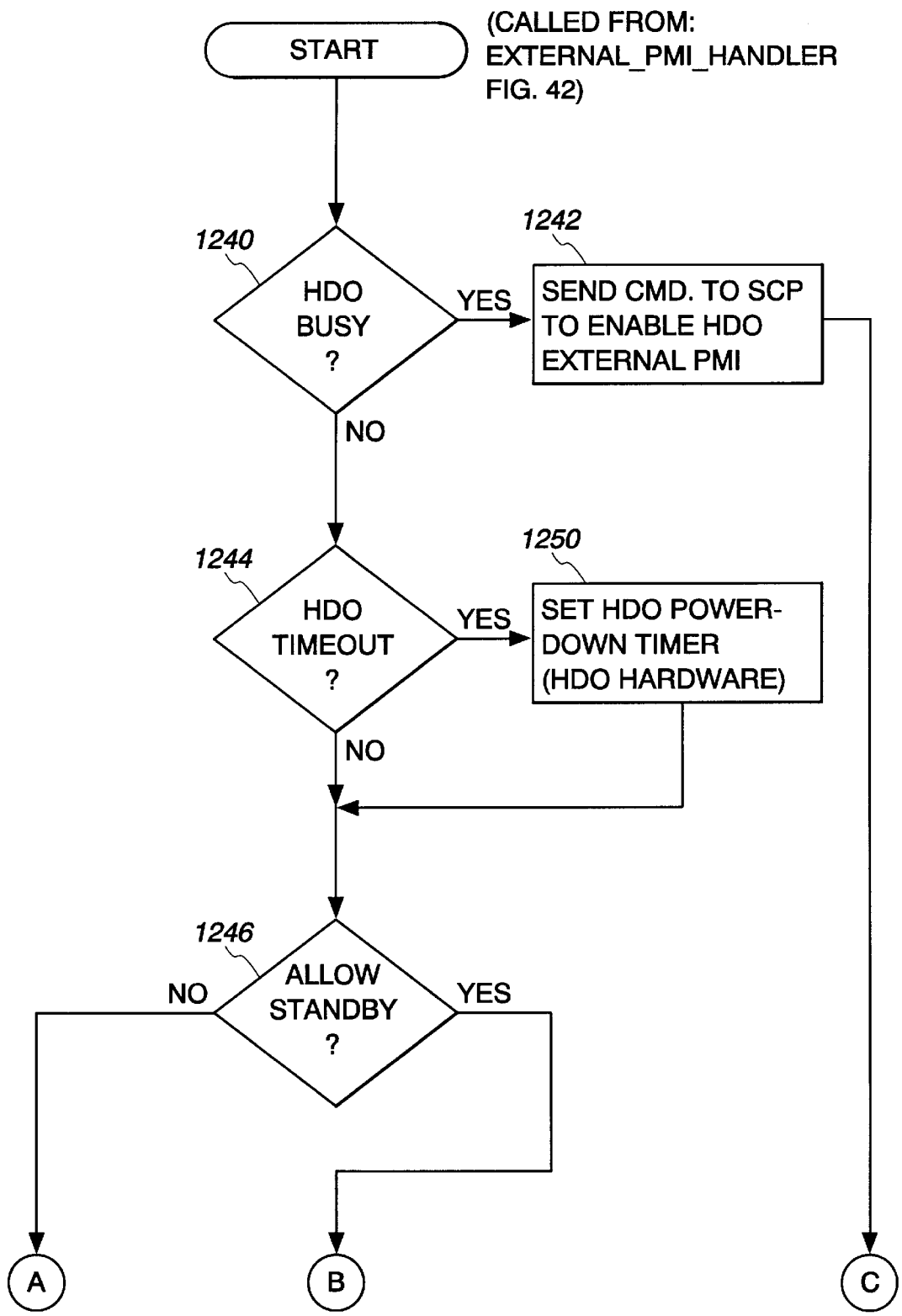
Figure 43B:
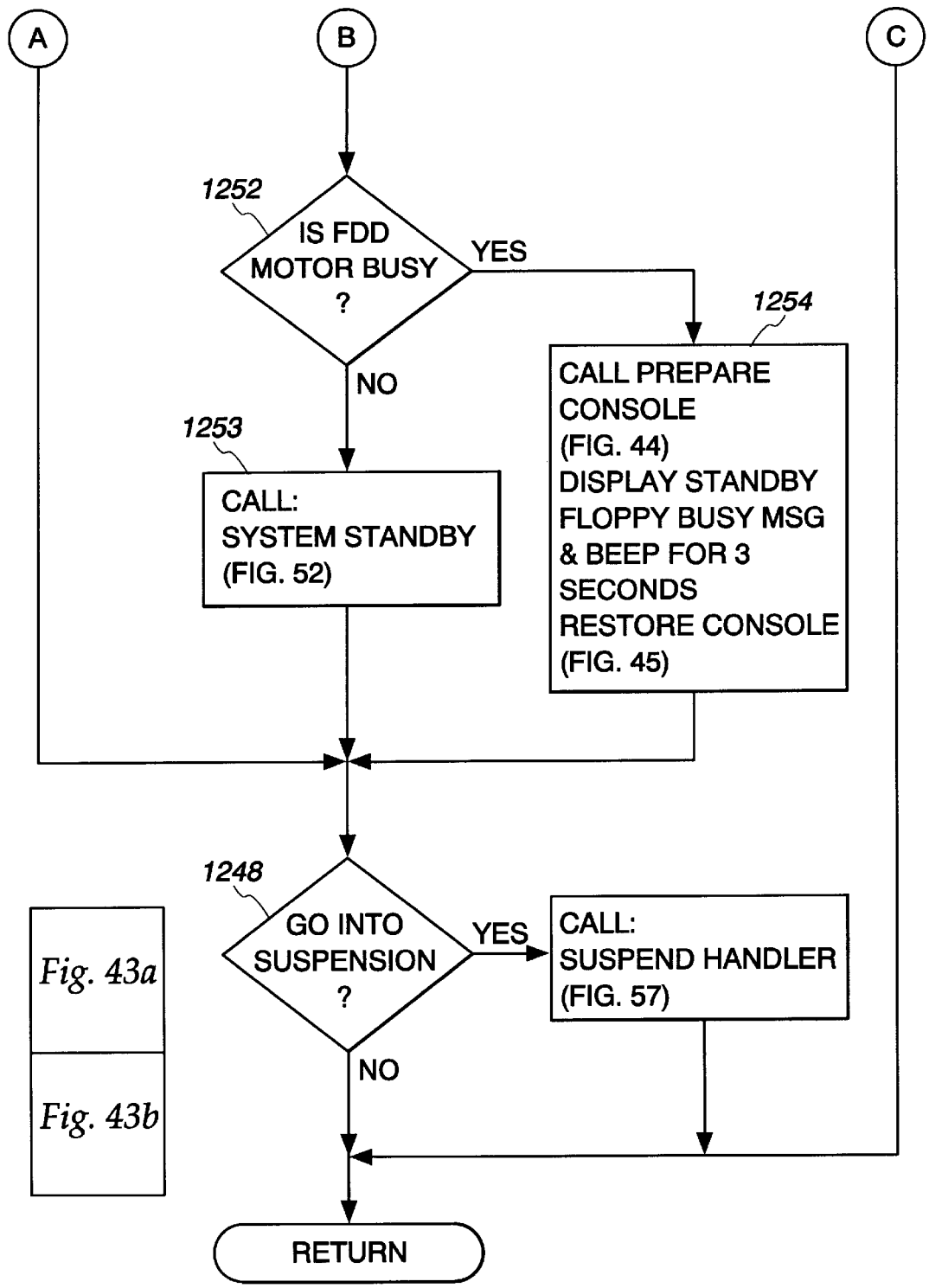

Referring now to FIGS. 43A–43B, execution begins at block 1240 by testing to see whether or not the hard disk drive is still busy. With reference to FIGS. 33A–33D, the hard disk drive 323 supplies its LED signal to the system control processor which can, by the presence or absence of that signal, tell whether or not the hard disk drive is in the middle of an operation. If it is busy, then it may be presumed that the power management interrupt did not result from the termination of that signal. However, the request by the routine shown in FIG. 42 for the PMI byte 776 from the system control processor caused the PMI byte in the system control processor to be cleared and terminated the ENABLE signal, which then terminated the possibility of the hard disk drive generating a power management interrupt. Accordingly, program control branches to step 1242 which commands the system control processor 316 to actuate the ENABLE LED signal once again. The routine shown in FIGS. 43A–43B then terminates, its only function being to ensure the continuation of the possibility that a power management interrupt will be generated by the termination of the hard disk drive LED signal.

If, however, the hard disk drive is not busy, then the routine shown in FIGS. 42A–42C continues on the assumption that the hard disk drive's LED signal has terminated, and that some operation which occurred earlier, and which was suspended pending the completion of a hard disk drive operation, now needs to be resumed.

In the preferred embodiment of the invention the three operations which cannot be completed during a hard disk operation are: adjustment of the duration of the hard disk drive suspend timer within the hard disk drive controller; suspending operation of the main processor 311; and placing the main processor 311 into standby mode. If an attempt to do any of these three things occurred during a hard disk drive operation, then appropriate flags 487 (FIG. 34) are set. The flag HT signals that the hard disk drive timer could not be reset; the flag ST indicates that the system was unable to enter standby mode; and the flag SF indicates the system was unable to enter suspend mode. Accordingly, the blocks 1244, 1246, and 1248 within the routine shown in FIG. 43 test each of these three flags to determine what needs to be done in response to the turning off of the hard disk drive's LED.

At block 1244, if the hard disk drive power suspend timer needs to be reset, then at block 1250 an appropriate command is transmitted to the hard disk drive controller to reset its internal timer.

If the standby flag ST is set, then block 1246 in FIG. 43 attempts to place the system into standby mode. At step 1252, a test is made to see if the floppy disk drive motor is running. If it is not, then the system standby routine shown in FIGS. 52A–52E is called, and normally the system will enter standby mode until the user strikes a key or a mouse button. But if the floppy disk drive motor is running, block 1254 saves the screen and displays a message that warns the user he/she cannot enter standby mode while the floppy disk drive is busy. The message is displayed, the system beeps for three seconds, and then the display is restored.

Figure 57B:
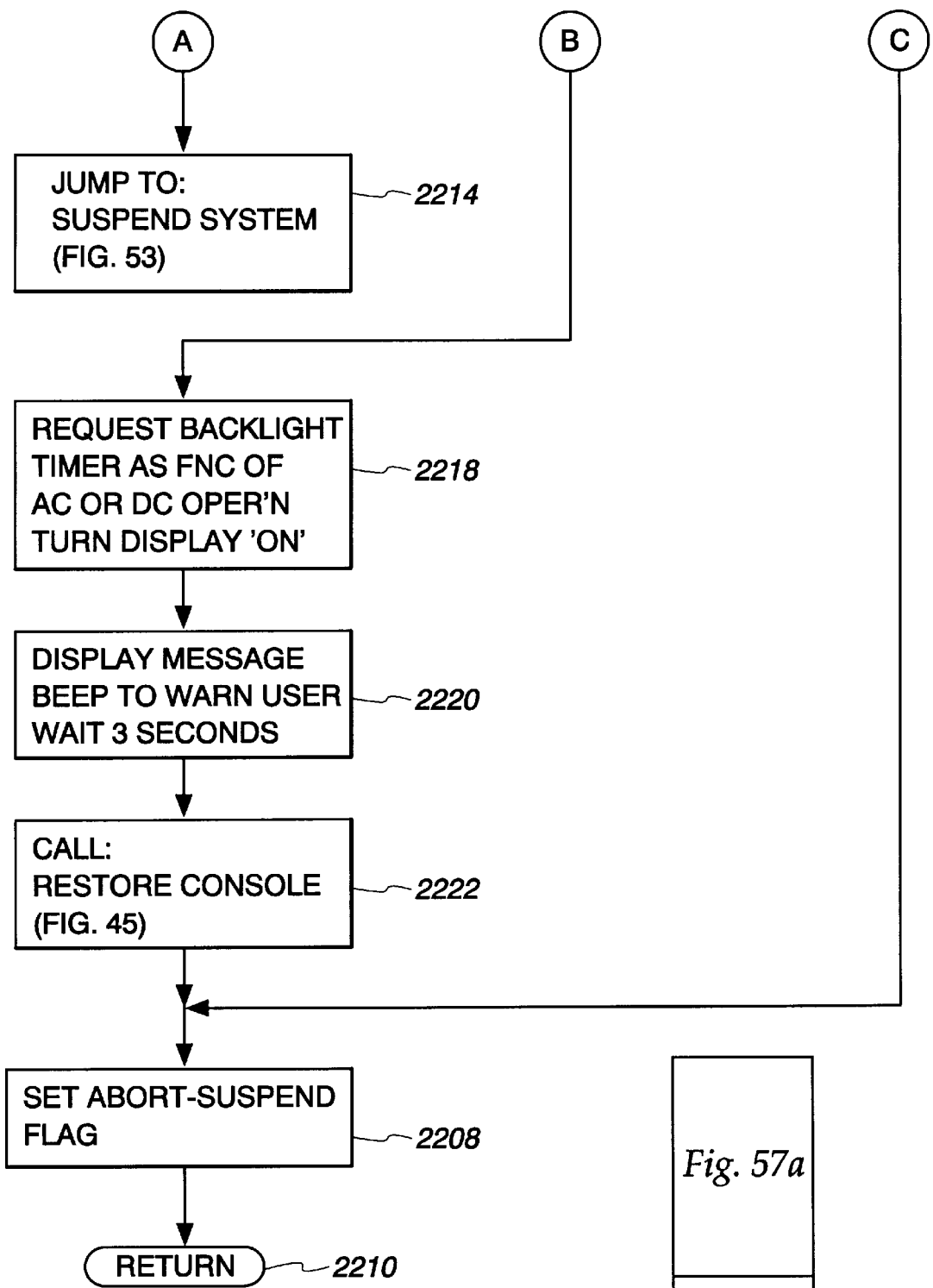
Figure 58A:
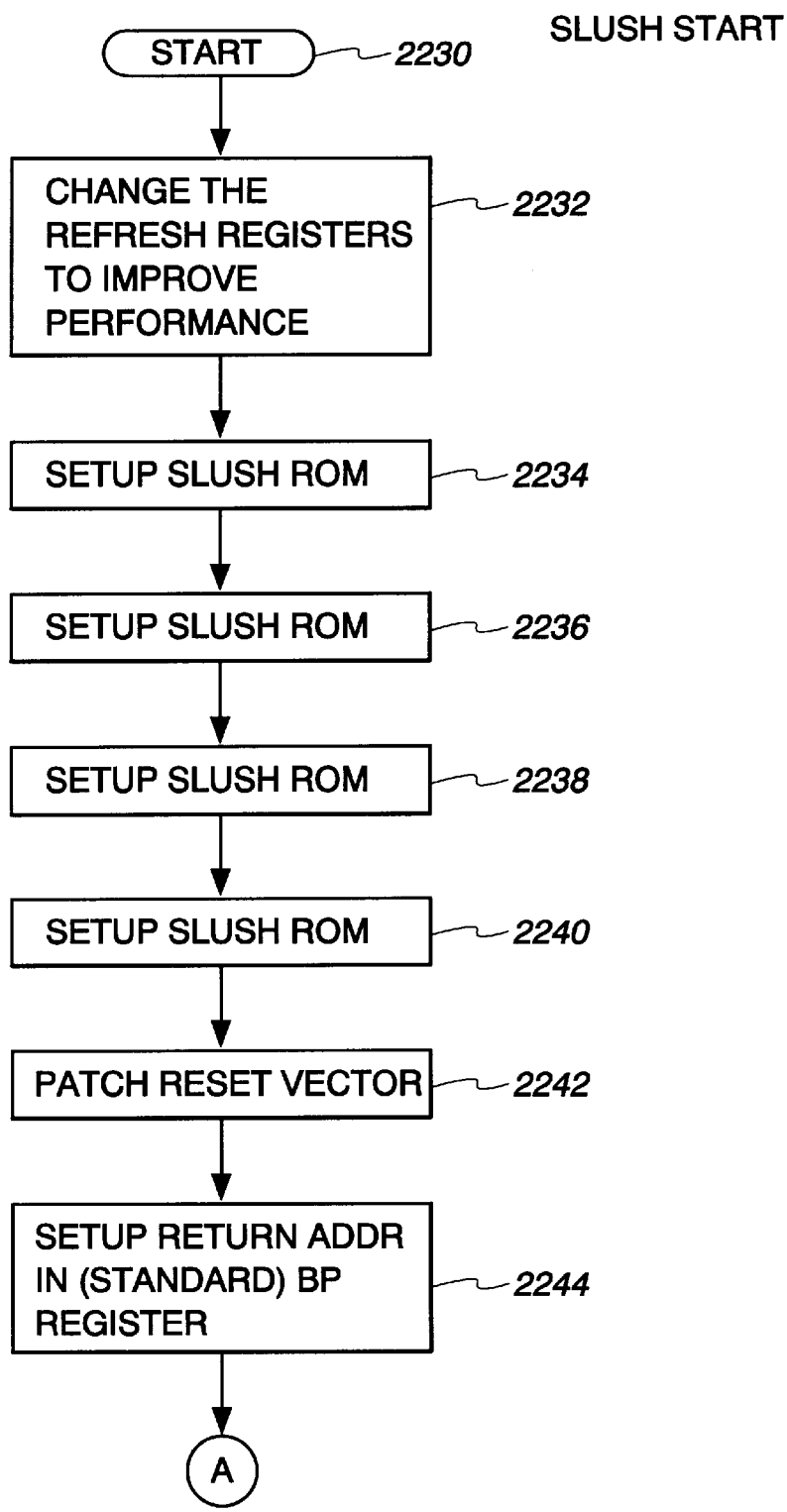
Figure 58B:
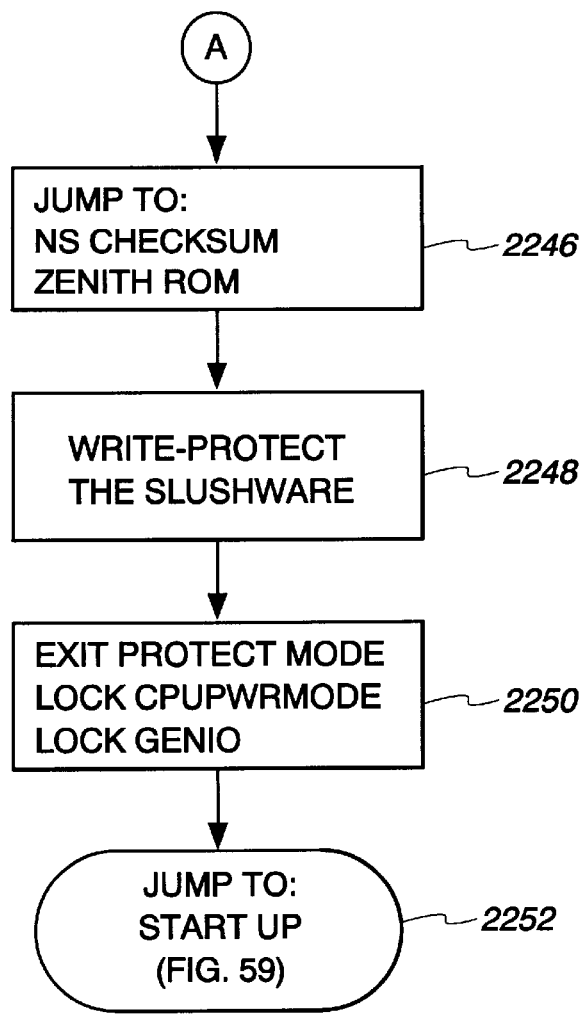

If the suspend flag SF is set, then block 1248 branches program control to the suspend handler which is shown in FIGS. 57A–57B.

Returning now to FIGS. 42A–42C, following block 1218 and the possible call to the routine in FIGS. 43A–43B, program control proceeds to block 1220. The block 1220 checks the AC and DC flags within the PMI byte 776 (FIG. 64) which is returned by the SCP 316. If either of these bits are set, it indicates that the user has changed from AC power to DC, or from DC power to AC. If such a change has occurred, then it is necessary to reset the various timeouts accordingly, since the system provides for different timeouts depending upon whether the source of power is a battery or the AC line. For example, the user may want the display illuminated at all times when the system is powered by AC power, but may wish the display powered down after several minutes of inactivity to conserve battery power if the system is powered by the battery. Accordingly, if either the AC or the DC bit is set, then block 1220 selects the appropriate counter presets from the PMI configuration region 1058 within the PMRAM in FIG. 34 and transfers the counter values to the various timer registers within the main processor 311 and the hard disk drive 323, such that the appropriate timer durations are implemented.

Next, at block 1221, the routine in FIGS. 42A–42C checks the hot key bit HK within the PMI byte 776 provided by the system control processor 316. If the hot key bit is not set, then the routine shown in FIGS. 42A–42C returns. If it is set, then with reference to the code portion of the PMI byte 776, the routine shown in FIG. 42 proceeds, in blocks subsequent to 1221, to identify precisely which hot key was actuated by the user and to launch an appropriate subroutine to carry out whatever command the user has given.

Block 1222 responds to the "slow" hot key by proceeding to block 1224 to give off a single signal beep to indicate the switch to slow speed and to adjust the configuration information in the PMRAM (FIG. 34) appropriately. In response to actuation of the "fast" key, block 1226 causes block 1228 to produce two beeps signalling the switch to high speed and to also adjust the configuration information in PMRAM. Block 1230 detects actuation of the "set-up" hot key and responds by calling the pop-up set-up handler routine shown in FIGS. 46A–46B, which displays set-up menus and enables the user to alter the system's set-up. Block 1232 detects actuation of the "standby" hot key and launches the standby routine shown in FIG. 51.

Included within the ROM BIOS program are a series of sixteen possible gray scale conversion pallette values which are used by the video controller 318 when it converts color digital values into gray scales suitable for presentation to the liquid crystal display 321. Any one of these sixteen pallettes may be transferred from its storage place in ROM into the video controller 318 to change the way in which colors are rendered on the liquid crystal display 321 without affecting the presentation of colors on an external CRT 426. The blocks 1236 and 1234 respectively detect actuation by the user of the "up" pallet hot key and the "down" pallet hot key. The particular pallet in use at any given time is stored in PMRAM (FIG. 34) as a numeric value between zero and fifteen which designates the gray scale pallet currently in use. If the user actuates the up pallet hot key, then this number is incremented and the block 1239 transfers the next higher gray scale data set to the video controller 318 for use in converting color values into LCD gray scale values. If the user actuates the down pallet hot key, then the routine 1237 is called upon after the pallet number is decremented to select the next lower pallet of gray scale values for transfer to the video controller 318. Regardless of what the current program is doing, the user is thus enabled to actuate either the up or down pallet hot keys and watch as the different gray scales presented to the video controller 318 change the way in which colors are displayed on the LCD display. The up hot key progresses through the gray scale pallets one after another in ascending order, while the down key proceeds through them in descending order. The count value overflows and underflows so that either the up key or the down key may be used to rotate repeatedly through all of the possible gray scale values. Some of these gray scale values include reverse video modes which can substantially reduce the amount of power utilized by the screen, depending upon program activity.

The block 1238 detects the CRT/LCD hot key, which initiates execution of a block 1241 that sends appropriate commands to the video controller 318 to cause it to shift between outputting analog RGB signals to the connector 427 and external CRT 426 (FIGS. 33A–33D) or digital values to the liquid crystal display 321.

In the preferred embodiment of the invention, there is a function key on the keyboard which can change the meaning of other keys. The hot keys just described are the conventional PC function keys labeled "F1", "F2" and so on actuated simultaneous with depression of the separate function key, which changes the meaning of these keys. The interpretation of these keystrokes is carried out by the system control processor SCP 316 in a way that cannot be affected by user programs, and in response to an actuation of these particular hot key combinations, the system control processor generates a power management interrupt over the line 435 (FIGS. 33A–33D) which forces the main processor 311 to recognize these hot keystrokes irrespective of what the user software is doing and even in the case where the user software has malfunctioned so badly that the system is hung and has become inoperative. For example, when the software malfunctions so that the keyboard no longer functions, the set-up hot key may still be used to enter the setup menu and to force the system to re-boot from its hard disk drive. Such an operation was not possible on any previous version of the IBM personal computer.

Note in FIGS. 33A–33D that the manual switch 313, which serves as an off/on or suspend/resume switch, is not part of the normal keyboard and is not serviced by the system control processor 316. Accordingly, it is not processed by the routine shown in FIGS. 35A–35C. This is because at a time when the system is suspended, the manual switch must still act to institute a resume of system operations when both the main processor 311 and the system control processor 316 are powered down and when the system control processor 316 thus cannot recognize any of the normal keystrokes that may occur.

Whenever normal system operations are interrupted and a message or menu is displayed to the user, it is necessary to save the contents of the video controller RAM 448 (FIGS. 33A–33D) and to later restore the contents of that RAM to its initial state before permitting program execution to continue, so that the display of an application program is not affected by the message or menu. It may also be necessary to save the contents of the video controller registers 446 and restore them to their initial state at a later time. The save and prepare console routine shown in FIGS. 44A–44B saves away the state of the video screen prior to its use by the system for displaying messages to the user, and the restore console routine shown in FIG. 45 restores the saved values back to the screen after the system is through and the user has responded to any necessary prompts.

With reference to FIGS. 44A–44B, the routine that saves and prepares the console begins at 1260 by saving the current VGA state, including the precise state of all VGA register values within the video controller 318. Color pallette values and video BIOS area values are also saved. Next, at block 1262, the VGA table pointer 1050 (FIG. 34) is set to a default value in the ROM gray scale tables, since the user may have changed the gray scale. At 1264, the video font table in the video controller is saved away so that it will not be corrupted by a subsequent switch to video mode 3. At block 1266, the video mode is switched to mode 3, which is a normal text message display mode. Then at 1268, the video RAM is saved away in the video RAM save area 478 shown in FIGS. 4A–4B. At block 1270, the screen is cleared. Then at 1272, the complete state of the keyboard as recorded in the system control processor is saved away. Values saved include the light emitting diode status (such as the values of the num lock, caps lock and scroll lock light settings), the keyboard enable or disable status, the active keyboard scan set (1, 2 or 3), and the keyboard key down repetition rate. All of this is saved away in PMRAM.

At block 1274, part of the status of the SCP 316 is obtained and saved so that the power management interrupt firmware programs can accept keyboard input from the user, regardless of whether the interrupted application program had disabled input from the keyboard. And finally, at 1276, the keyboard is programmed to its normal default state. The video controller 318 and the system control processor 316 are now ready to support power management interrupt message displays and to interact with the user through the keyboard.

FIG. 45 discloses the restore console routine, which simply reverses the process of the save operations executed by the routine shown in FIGS. 44A–44B and restores both the screen and SCP 316 to their states prior to the power management interrupt.

Figure 46A:
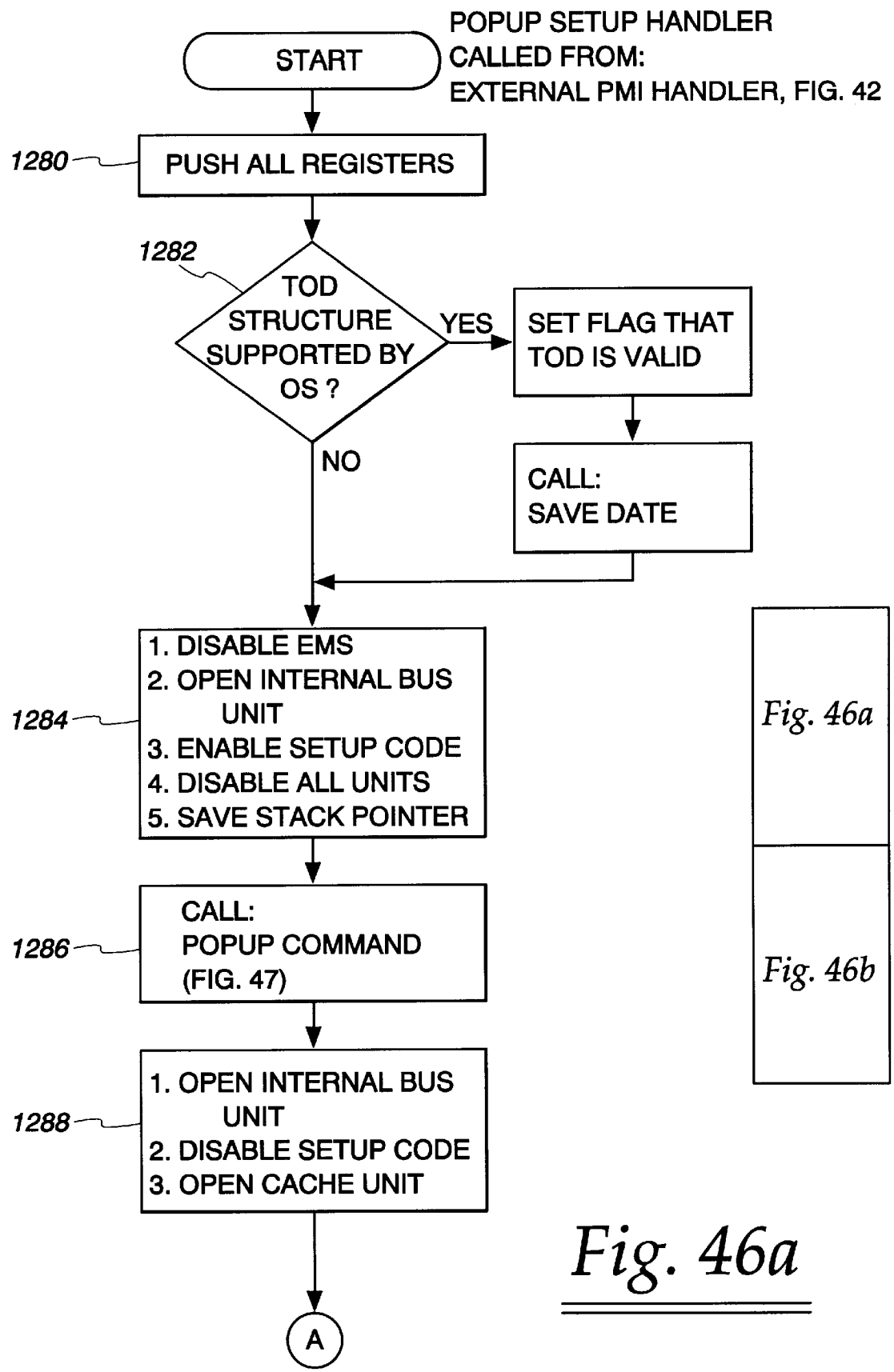
Figure 46B:
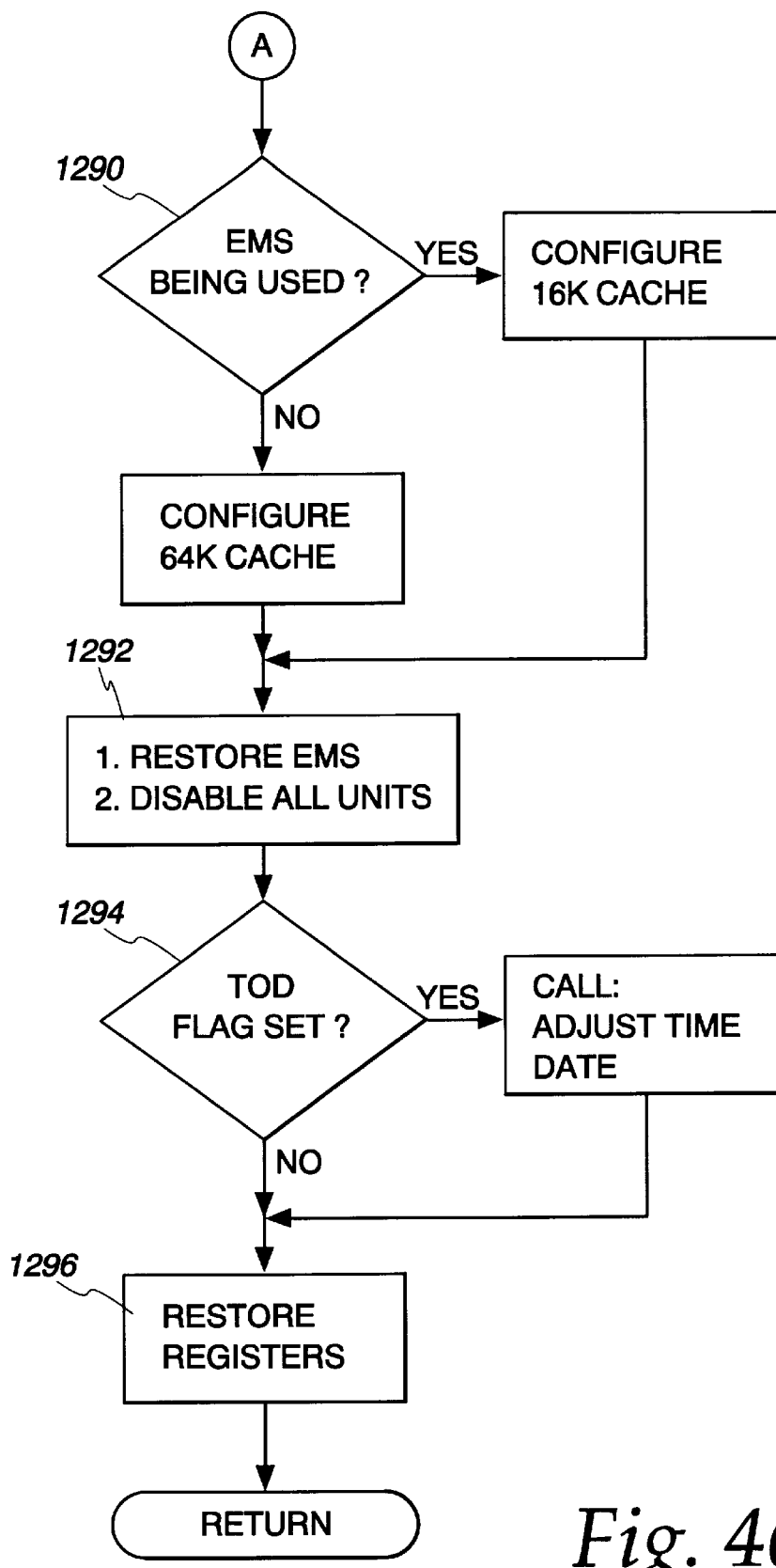
Figure 47A:
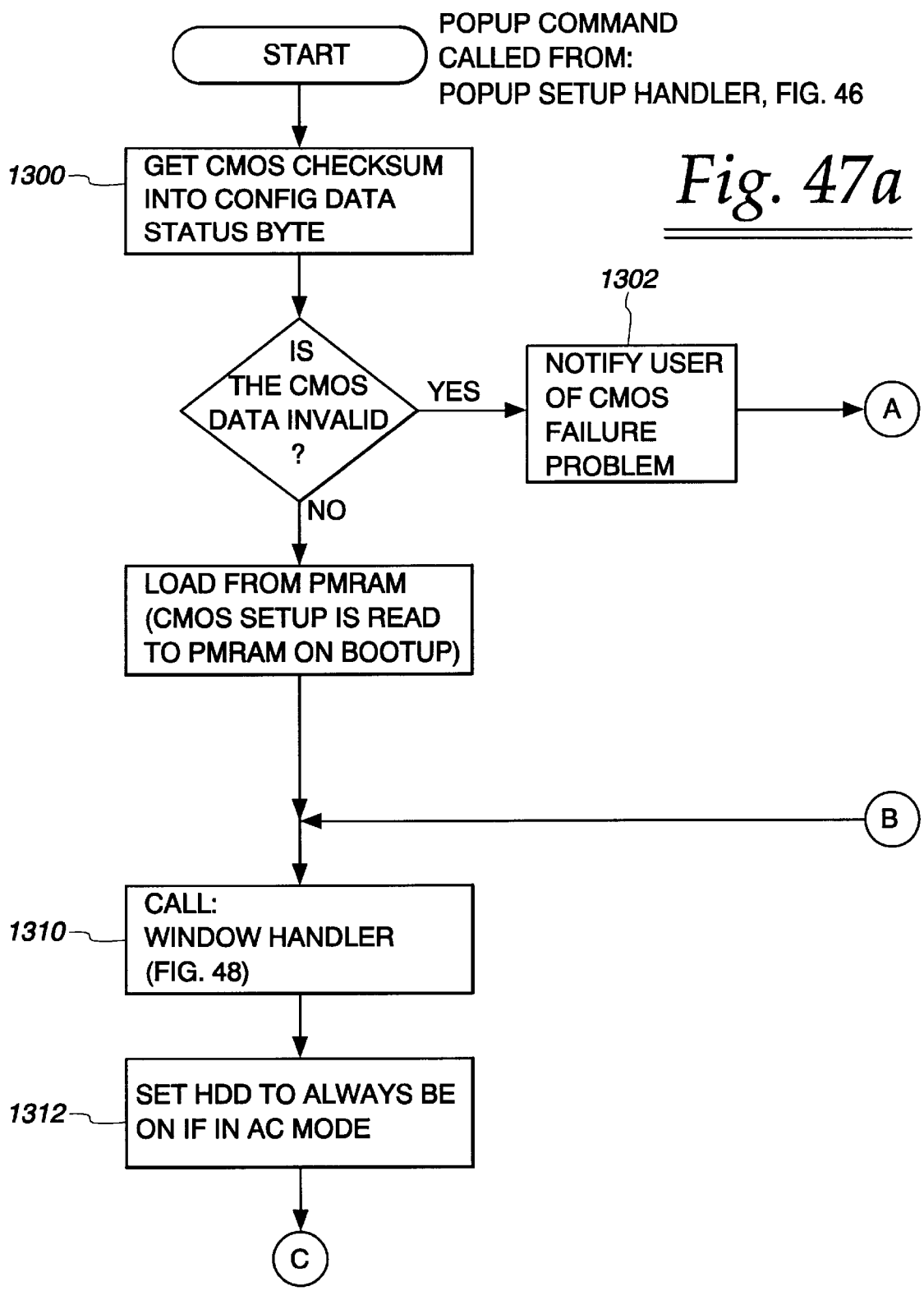
Figure 47B:
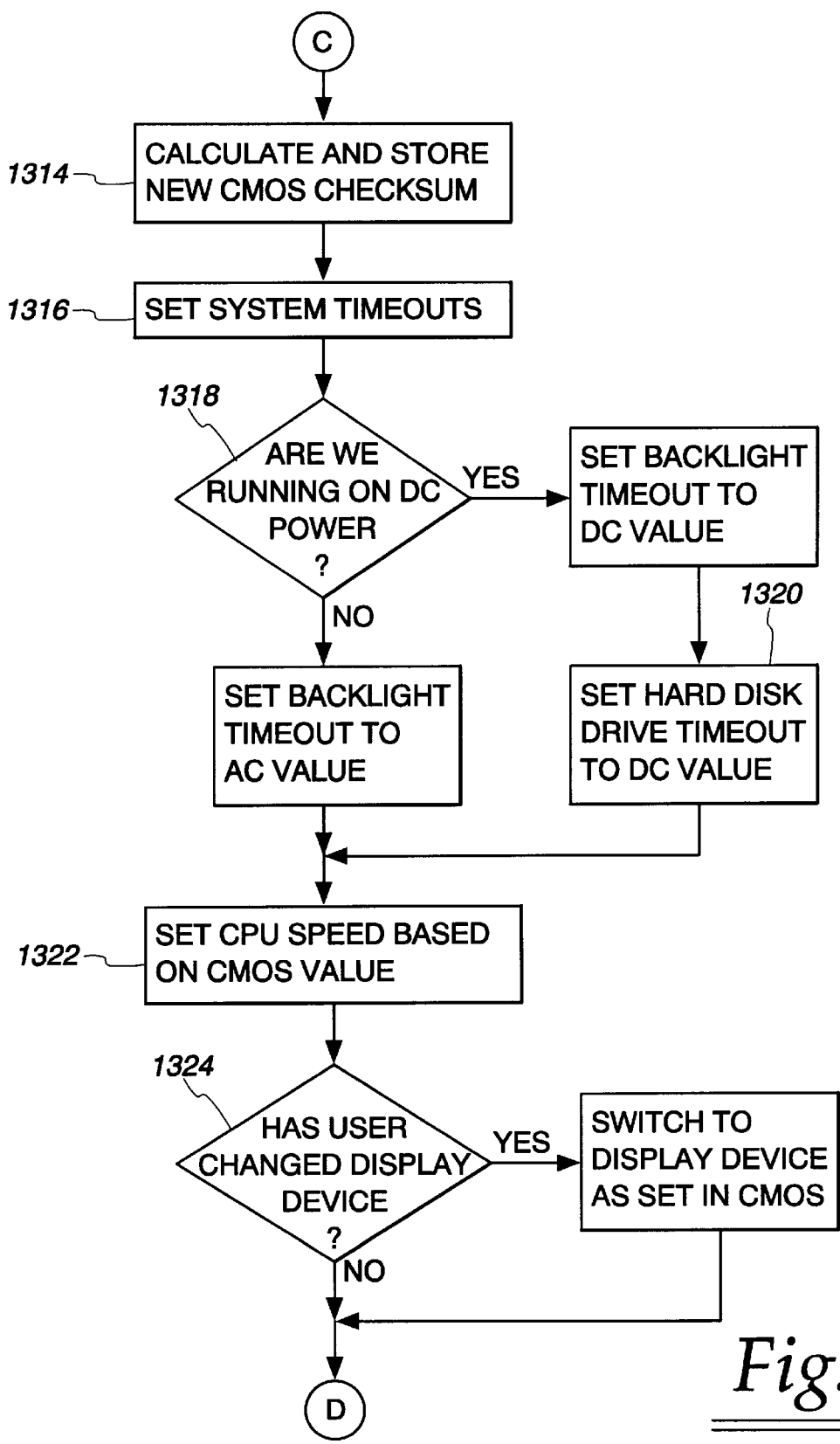
Figure 47D:
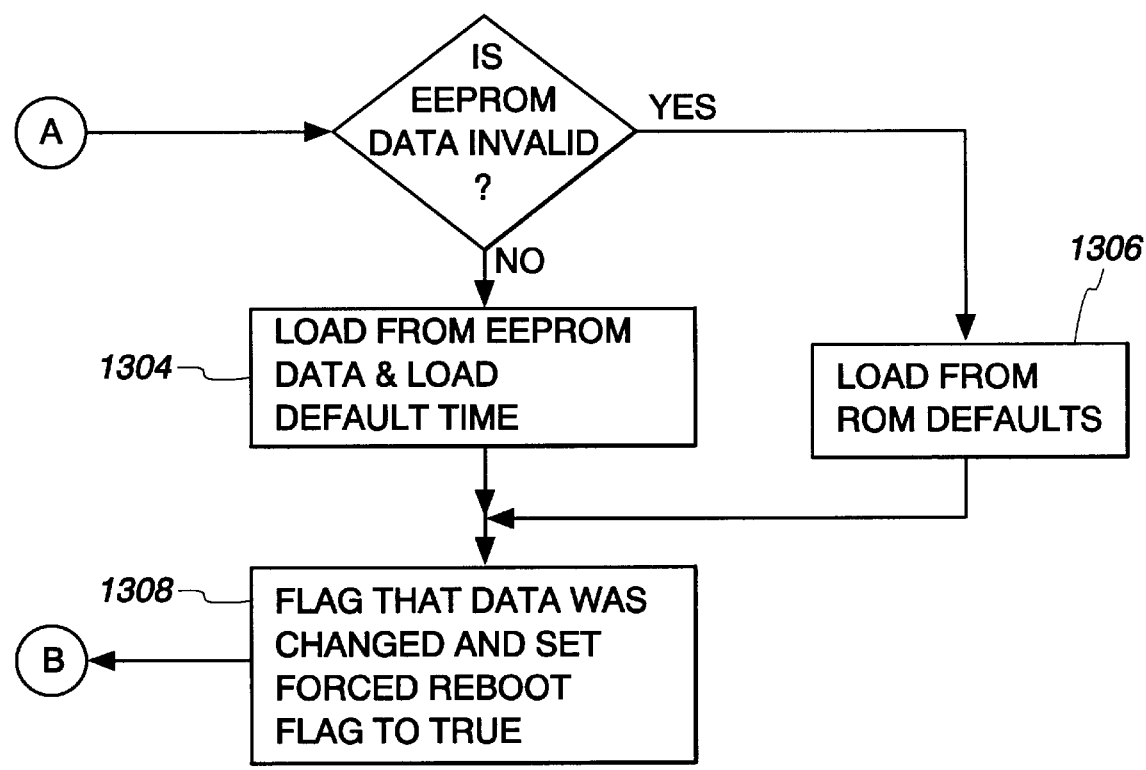
Figure 48A:
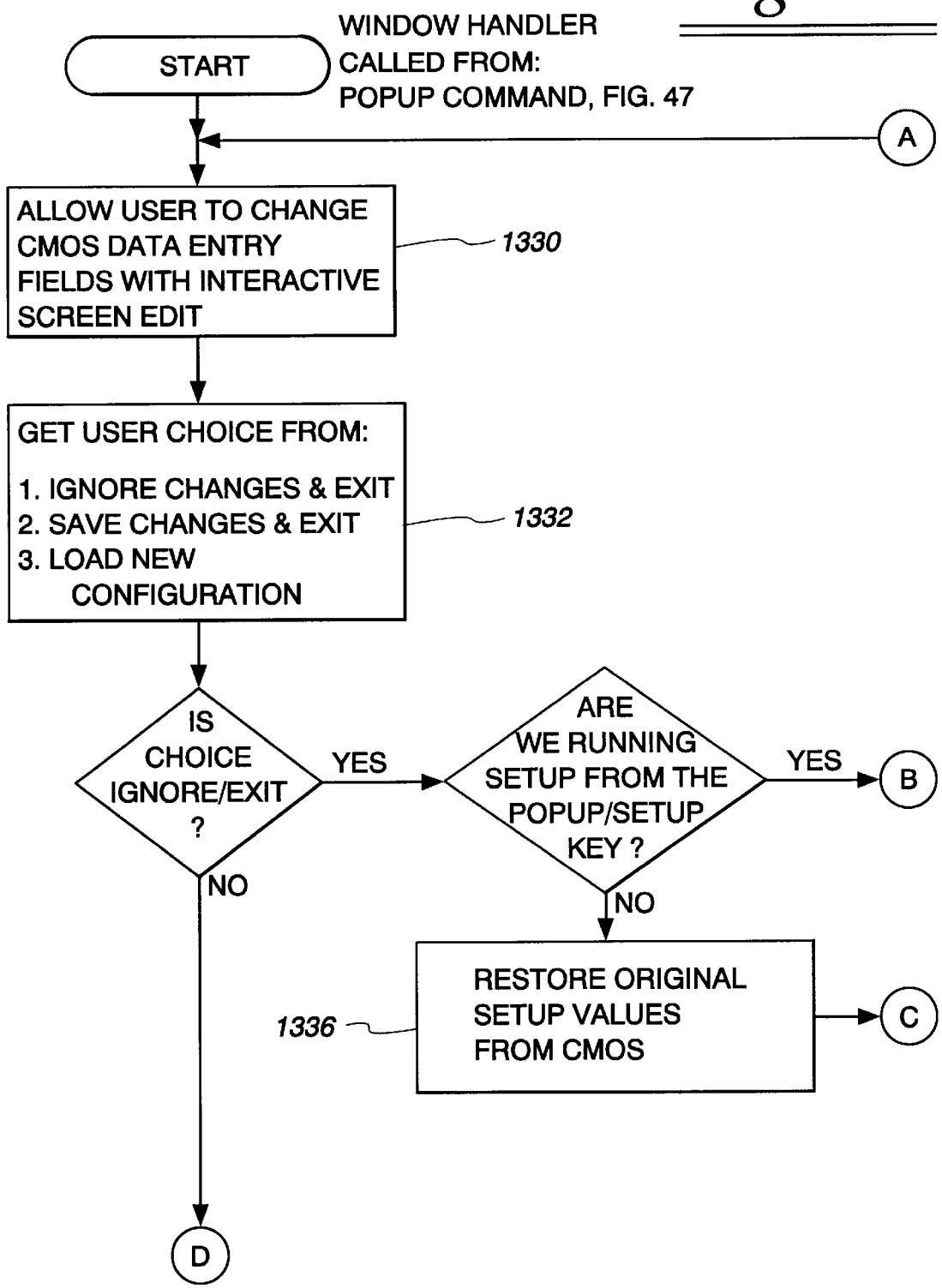
Figure 48B:
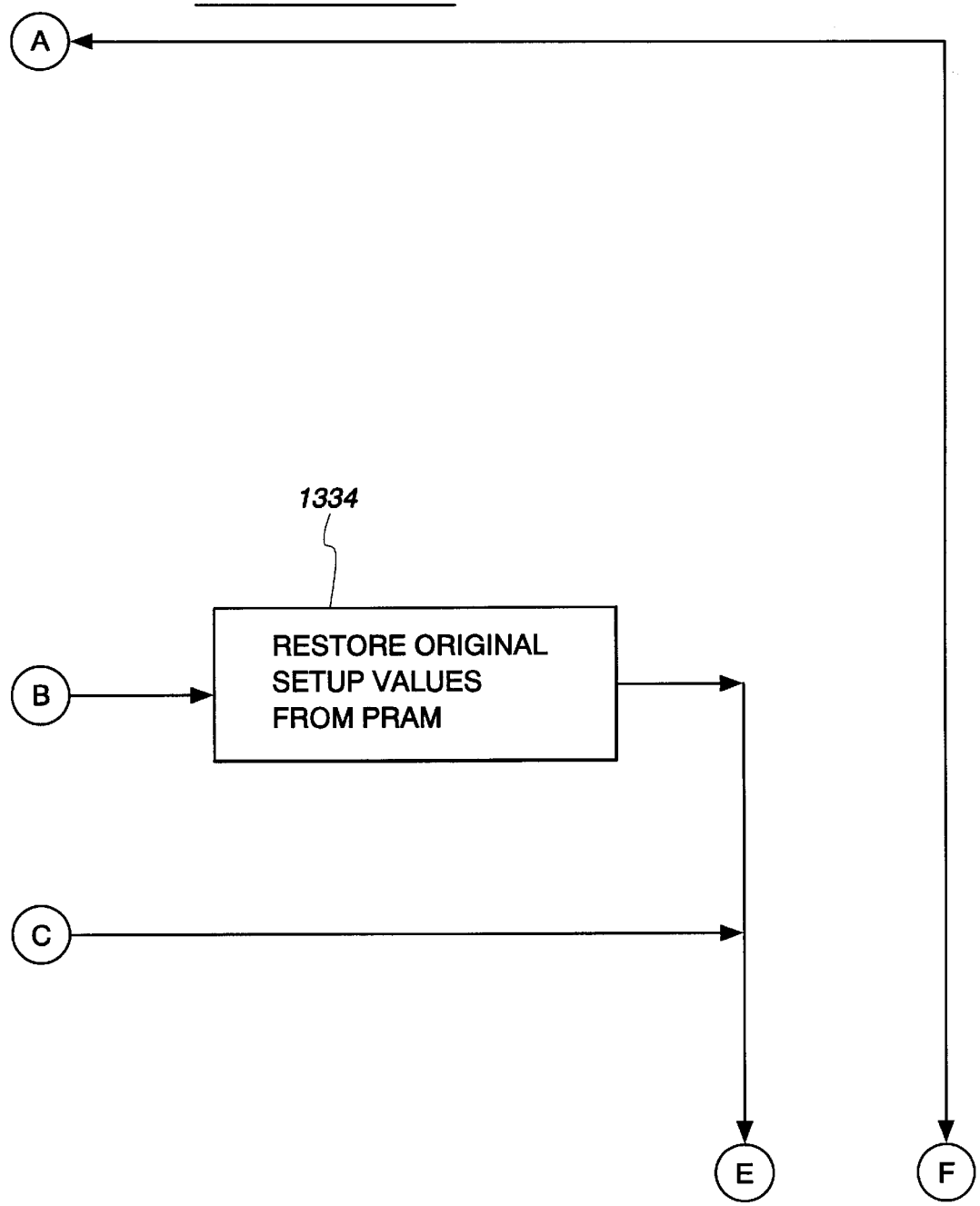
Figure 48C:
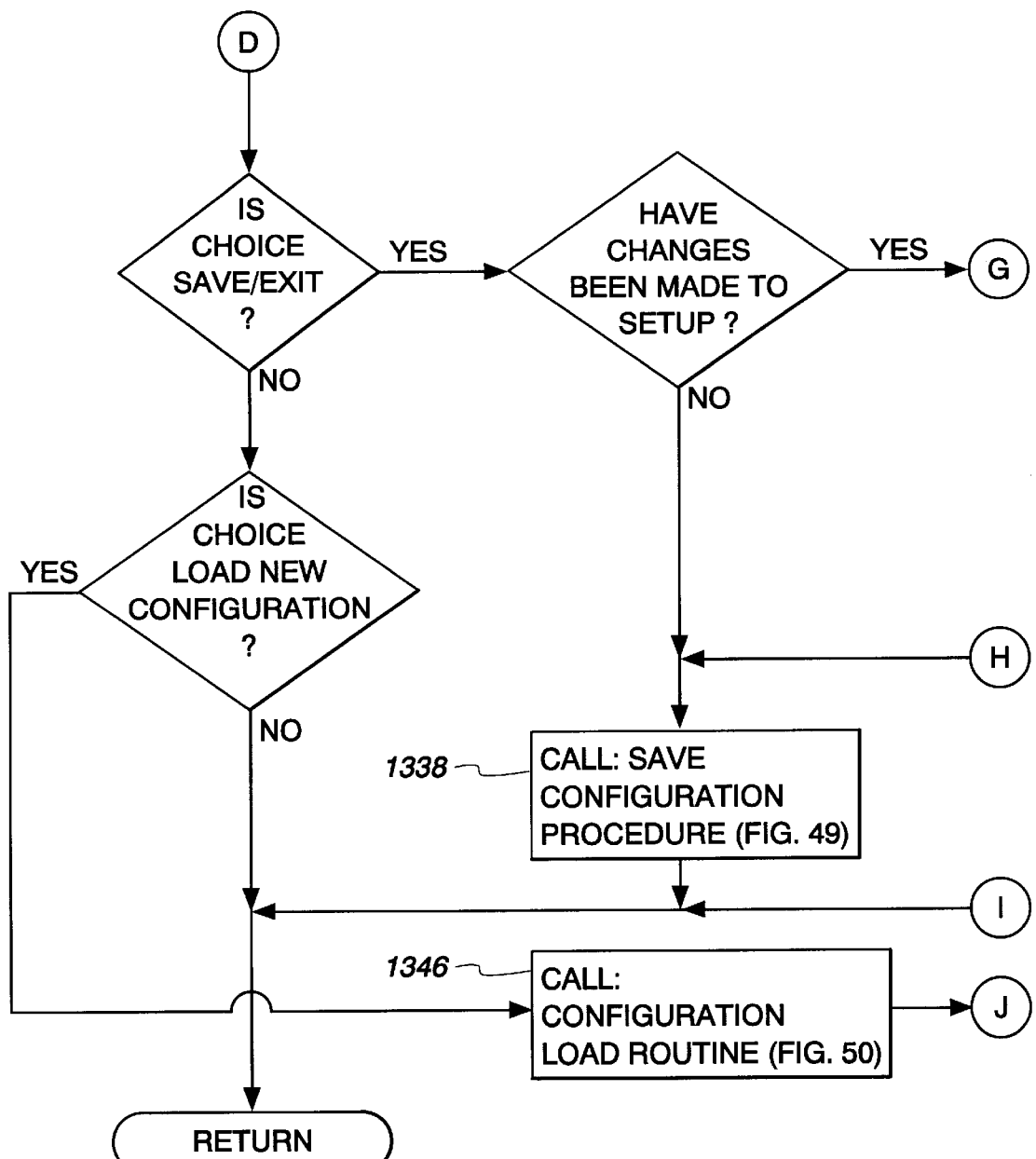
Figure 49A:
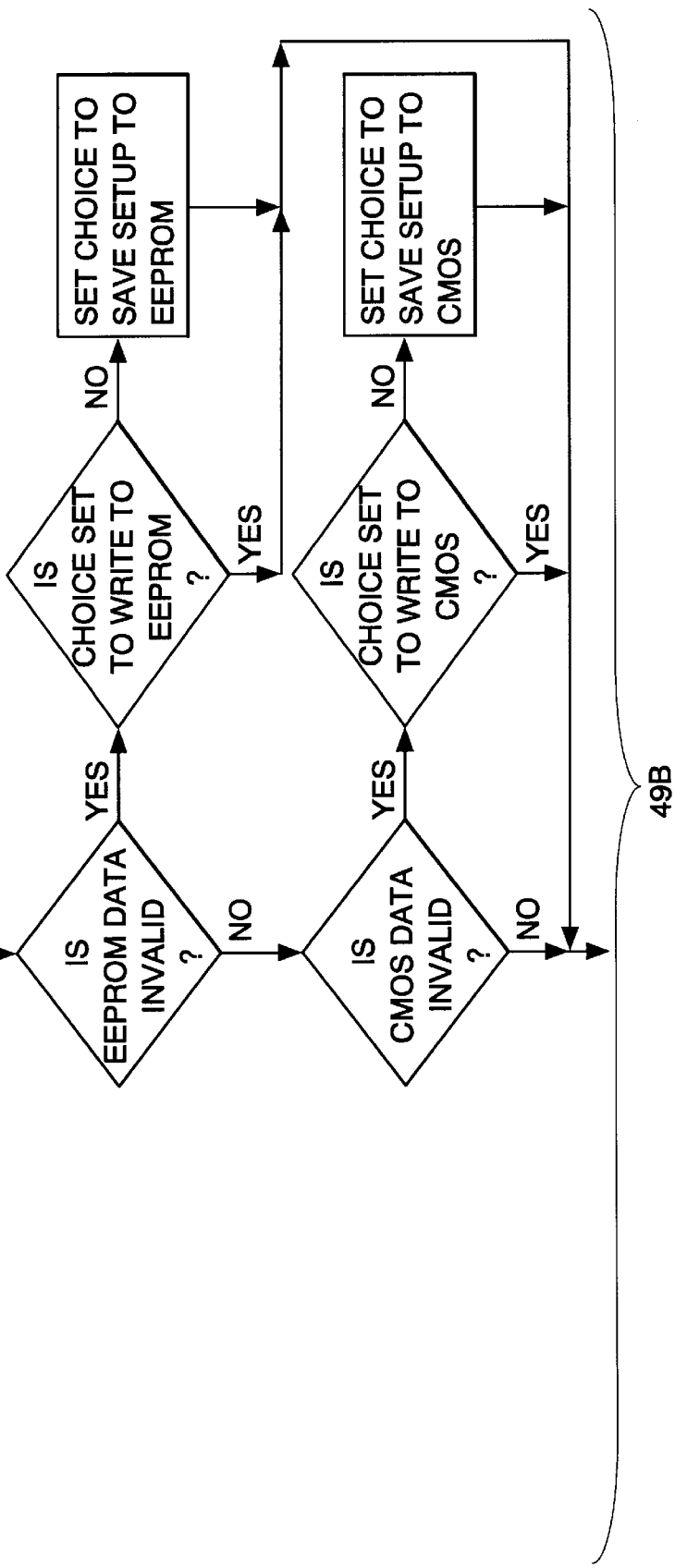
Figure 49B:
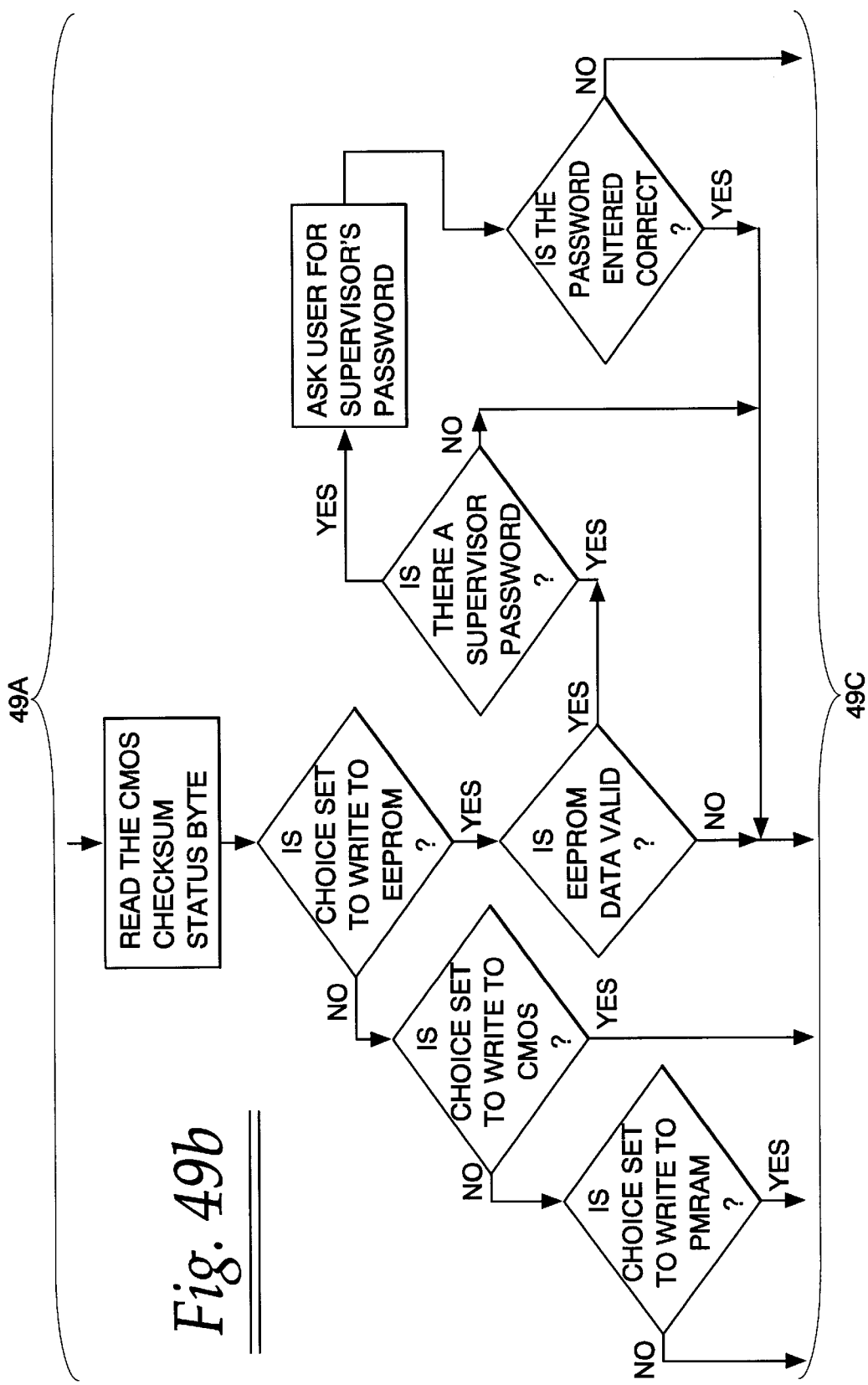
Figure 49C:
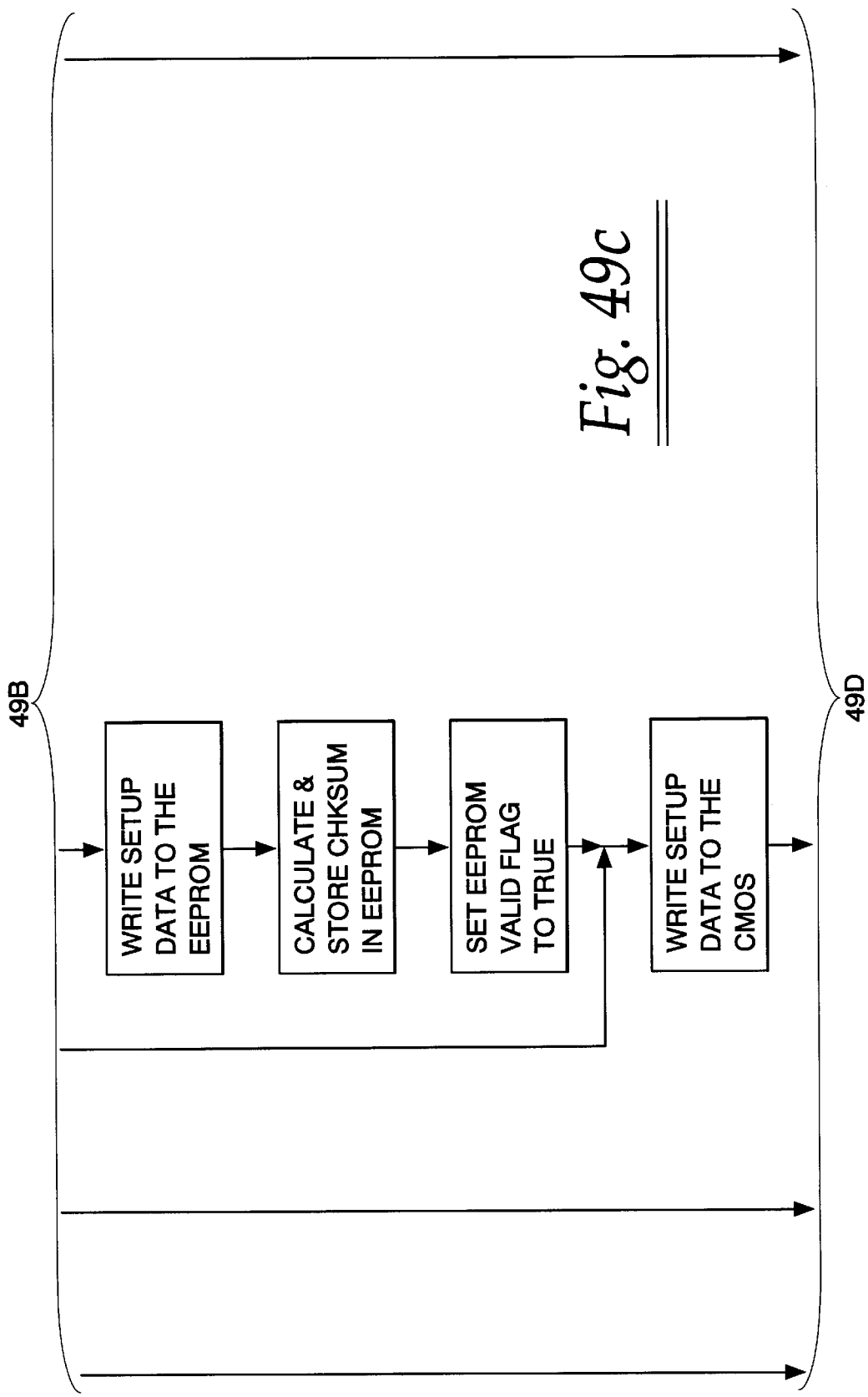
Figure 49D:
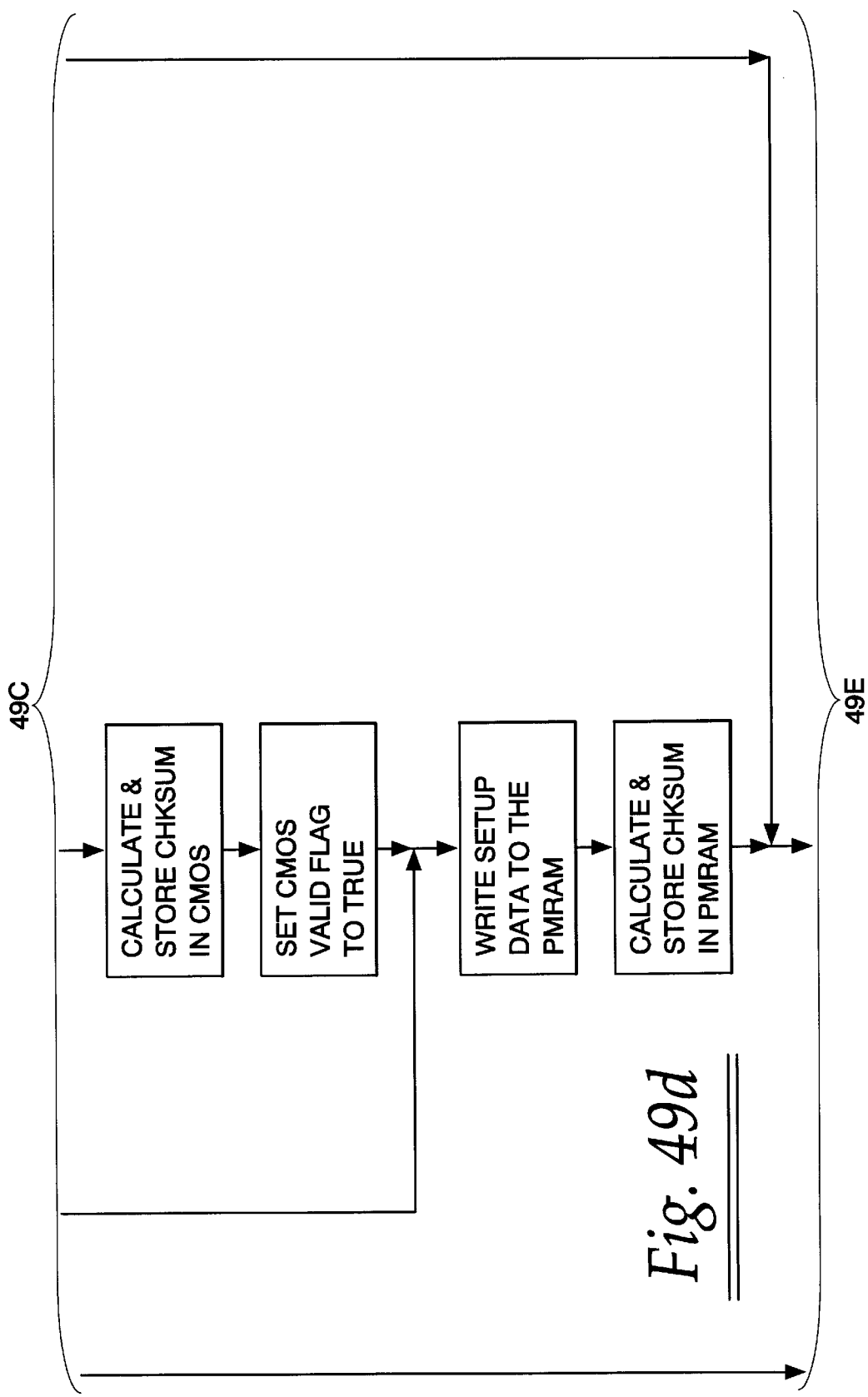
Figure 49E:
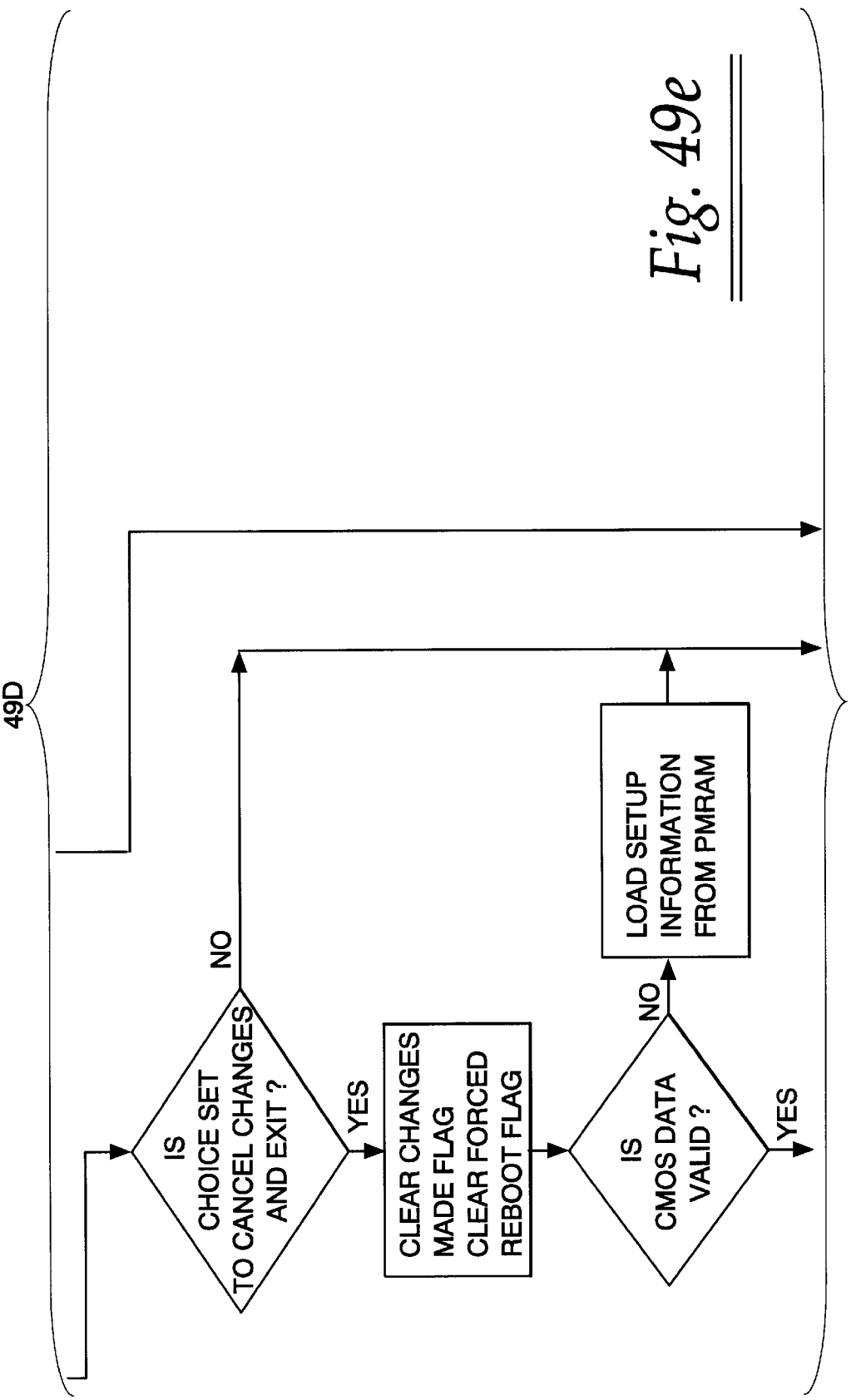
Figure 49F:
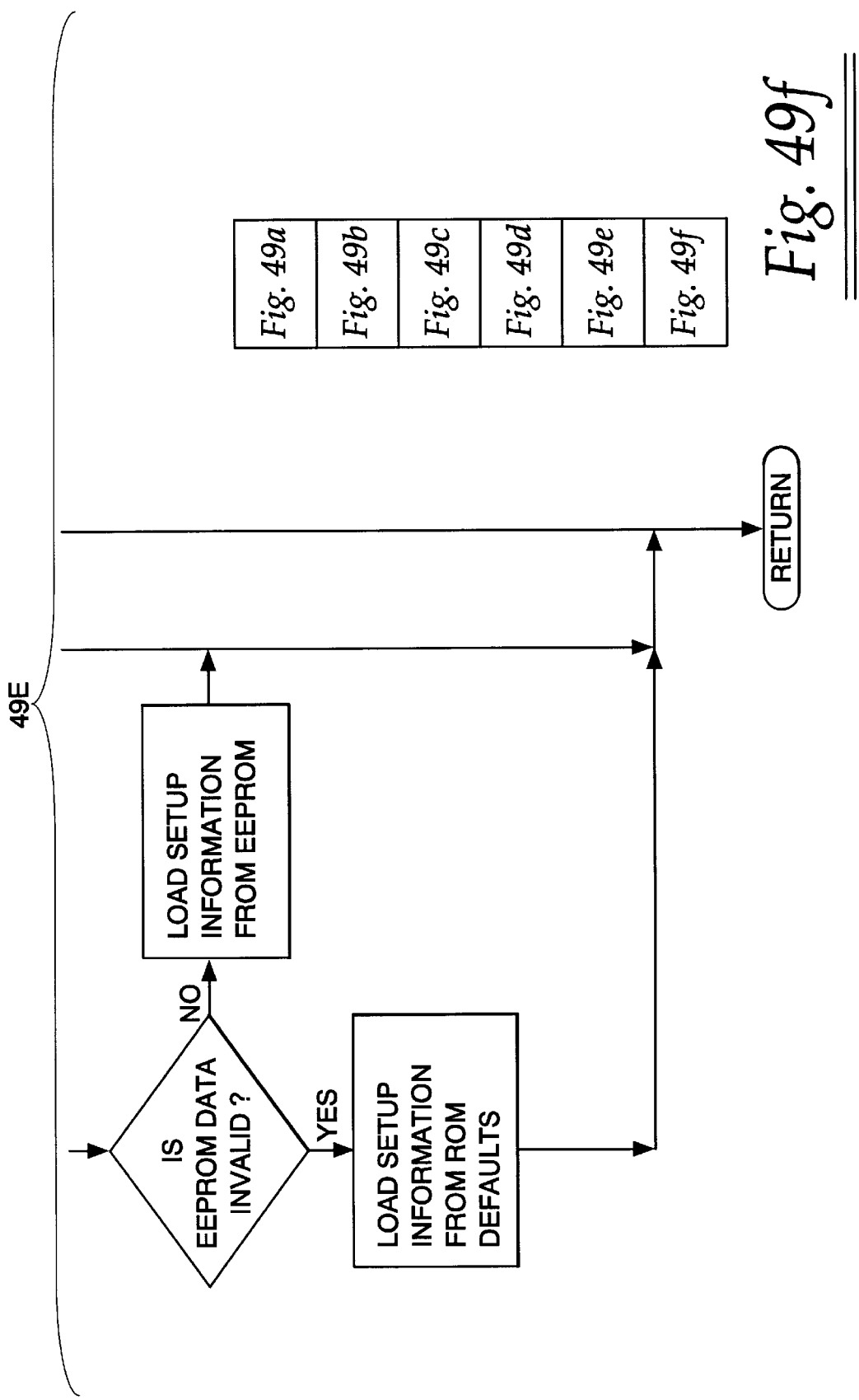

When a user actuates the set-up hot key, the power management interrupt handler shown in FIGS. 35A–35C and the external PMI handler shown in FIGS. 42A–42C eventually transfer program control to the pop-up/set-up handler shown in FIGS. 46A–46B. The pop-up/set-up handler, briefly described, displays a series of menus to the user that permit the user to change all of the various defaults relating to the system. If these system defaults do not adversely affect running programs, then upon exit from this routine the changes are in effect and the programs are still running. However, some system defaults, such as the drive and port identity, cannot be changed without forcing a re-booting of the system from scratch. At the exit to this routine, the user is given the option of saving the changed values simply for the session, making the changes permanent for the user, or locking in the changes at a supervisory level.

The routine in FIGS. 46A–46B begins by saving all registers at block 1280. Then at 1282, the system preserves the date value if time and date information are actively supported by the operating system. At 1284, the system reconfigures its hardware as needed to permit set-up operations to be executed, and also saves away the stack pointer from the user's program. At 1286, this assembly language routine calls upon the pop-up command program, written in the language C, which appears in FIGS. 47A–47D.

After the pop-up command program has run to completion, block 1288 reverses the steps carried out in 1284. If EMS memory is in use, at block 1290 the cache is configured to 16K; otherwise the cache is configured to 64K. At 1292, the hardware is restored for program operation. And at 1294, if the time was originally valid, the time and date in the operating system are updated from the real time clock. Finally, at 1296, the system registers saved at 1280 are restored to their initial values, and program control returns to the calling routine. However, note that some set-up procedures may require that the system be re-booted, in which case program control never returns from step 1286.

The pop-up command routine appears in FIGS. 47A–47D. Block 1300 checks to see if the set-up data in the CMOS RAM of the real time clock has been corrupted. If so, program control branches to block 1302, where the user is notified of the problem and an attempt is made to load supervisors set-up data from the electronically erasable PROM memory 439. If the EEPROM data is valid, it is loaded at block 1304. If not, then factory default set-up values are loaded from the system ROM at 1306. In either case, block 1308 flags the fact that the configuration data was changed and sets the forced re-boot flag FR so that program execution will not recommence and instead the system will be re-booted.

If the CMOS configuration data was valid, the routine loads up data from the PMRAM (FIG. 34) and in particular PMI configuration data 1058.

Next, at block 1310, the window handler routine (FIGS. 48A–48D) is called upon to display the configuration data to the user and to accept changes which the user may wish to make in the configuration data. Next, at 1312, if the system is in AC power mode, the hard disk drive is configured to always be on. Then a new checksum value is calculated and stored in CMOS memory. The system timeouts are next set at block 1316 within the main processor 311 in order to take into account any changes. Block 1318 and the adjoining blocks test whether or not the system is running on DC power and set the backlight time out to the appropriate AC or DC value and, in the case of DC power, also sets the hard disk drive timeout to the DC value at block 1320. This ensures that relevant changes made in setup are taken into account. Note that the blocks 1312 and 1320 can only adjust the hard disk drive 323 timer 1000 (FIGS. 33A–33D) if the hard disk drive is not running. If the hard disk drive is running, then the HDD timer flag HT (FIG. 34) is set, to cause the hard disk timer to subsequently be correctly set after the hard disk stops running, and the system control processor SCP 316 is commanded to generate its ENABLE signal so that the termination of the hard disk drive's LED signal will cause a power management interrupt so that the new timeout value can be transferred to the hard disk drive by steps 1244 and 1250 in the routine shown in FIGS. 43A–43B.

The CPU speed is then updated at block 1322. At block 1324, if the user has switched from one display device to the other (from the LCD display to the CRT display or vice versa), then an appropriate command is sent to the video controller 318 through the SCP to switch the display. And finally, at 1326, if the forced re-boot flag FR is true, meaning that the system cannot simply resume operation where it left off, then at 1328 the main processor 311 is forced through its entire cold boot procedure, and there is no return from this routine. Otherwise, program control returns to FIGS. 46A–46B.

The window handler routine which enables the user to view and alter system parameters is shown in FIGS. 48A–48D. Additional portions of this routine appear in FIGS. 49A–49F and 50A–50B. Alterations in some parameters can only be done if the user is willing to have the system re-booted. Alternations in other parameters can be carried out with the user program then resuming right where it was interrupted. The following functions, in the preferred embodiment of the invention, may be altered without the need for a cold re-boot of the system:

Power button function (on/off versus suspend/resume).
Power off warning message (displayed or not displayed).
Resume on alarm (on or off).
Resume on modem activity (on or off).
Timeout to system standby (adjustable with different values for AC power versus DC power).
Timeout to system suspension (adjustable with different parameters for AC power versus DC power).
Timeout to backlight auto-power down (off or adjustable with different values for AC versus DC power).
Timeout to HDD auto-power-down (off or adjustable value for DC power).
Active display device (LCD or CRT).
LCD screen mode (adjustable gray scale).
Key click enable (off or on).
Caps lock position (regular or reverse with control key).
Num lock initial state (shifted or unshifted).
Warning beeper (enabled or disabled).
Time (adjustable).
Date (adjustable).
Operating speed (fast or slow).
Change user password.
Change supervisor password.
Select boot device (hard disk, floppy drive A, floppy drive B, or floppy drive A and then hard disk).
Select extended RAM size (adjustable).
Select EMS RAM size (adjustable). 64K cache memory (enable or disable).

Adjustment of the following parameters cannot be done without the system restarting from a cold boot:

Serial port selector (COM 1 or COM 2).
Modem port selector (COM 1 or COM 2).
Parallel port selector (LPT 1 or LPT 2).
Internal floppy disk drive type (A: or B:).
External floppy disk drive type (A: or B:).
Floppy disk drive power management (on or off).
IDE hard disk information (adjustable).

For security reasons, passwords are stored in EEPROM through calls to the system control processor, where they are out of reach of any user programs. Other fields are stored in the PMRAM memory, the CMOS RAM memory 377 or in the EEPROM memory 439, depending upon whether the user requests the changes to apply only to the session, to the user configuration or to the supervisory configuration, respectively.

After the user has viewed and adjusted the system parameters at block 1330 in the routine of FIGS. 48A–48D, the user is asked to discard the changes, save the changes, or load an entirely new configuration before returning to program operation (or cold re-boot, depending on the changes made). If the user chooses to ignore the changes, and if the set-up program is running in response to the set-up hot key, the block 1334 restores the original values from PMRAM memory 1253 within the main memory 326 (FIGS. 33A–33D). But if the set-up program is running from the system monitor with no programs running, then the original set-up values are restored from the CMOS RAM 377 within the real time clock 376 (FIGS. 33A–33D) at block 1336.

If the user chooses to save the configuration values and then return to program operation (or to cold re-boot), then block 1338 calls upon the saved configuration procedure set forth in FIGS. 49A–49F to store away the new user values. If the user has changed the set-up, then block 1340 so notifies the user, and if the changes necessitate a forced re-boot, then the user is so notified by block 1342.

If the user wishes to load a new configuration from storage, then the block 1344 calls upon the routine in FIG. 50 to load a previously stored user or system supervisor configuration, and program control recommences with block 1330 where the user is permitted to change those values before proceeding. Ultimately, program control returns to the calling routine.

The procedure for saving a new configuration is illustrated in FIGS. 49A–49F. At block 1446, the user is prompted as to where the configuration information is to be saved. If the user merely wishes to save the configuration information for the current session and then discard it, the user selects option 1, and the information is stored in the PMRAM 453 within the main memory 326 (FIG. 33A). If the user wishes to save the configuration as the user's default for later sessions, then the user selects option 2, and the configuration information is saved in the CMOS within the RAM of the real time clock 376 (FIGS. 33A–33D). If the user has supervisor password permission and wishes to save the configuration as the supervisor's default configuration, then the information is routed to the system control processor SCP 316 and stored in the EEPROM 439.

Once the user has made his or her selection, then the operation of the routine shown in FIGS. 49A–49F is completely straightforward and is fully explained by the flow diagram. Simply summarized, the data is stored in whichever memory the user wishes to have it stored, and in lower memories. For example, if the user requests to have the set-up information stored as a supervisor default, it is written into all three storage areas—EEPROM, CMOS, PMRAM memory. This occurs only if the user is able to supply the proper supervisor password, or if the system has no supervisor's password in effect. If the user asks to have the information saved as a user default, then the information is written into CMOS memory and into PMRAM memory. If the user asks to have the information saved only for the current session, the information is only stored in PMRAM memory. In any case, if any of the memories contain invalid data, as indicated by checksum status information, the invalid data is overwritten with new information and the program returns to the calling routine.

Figure 50A:
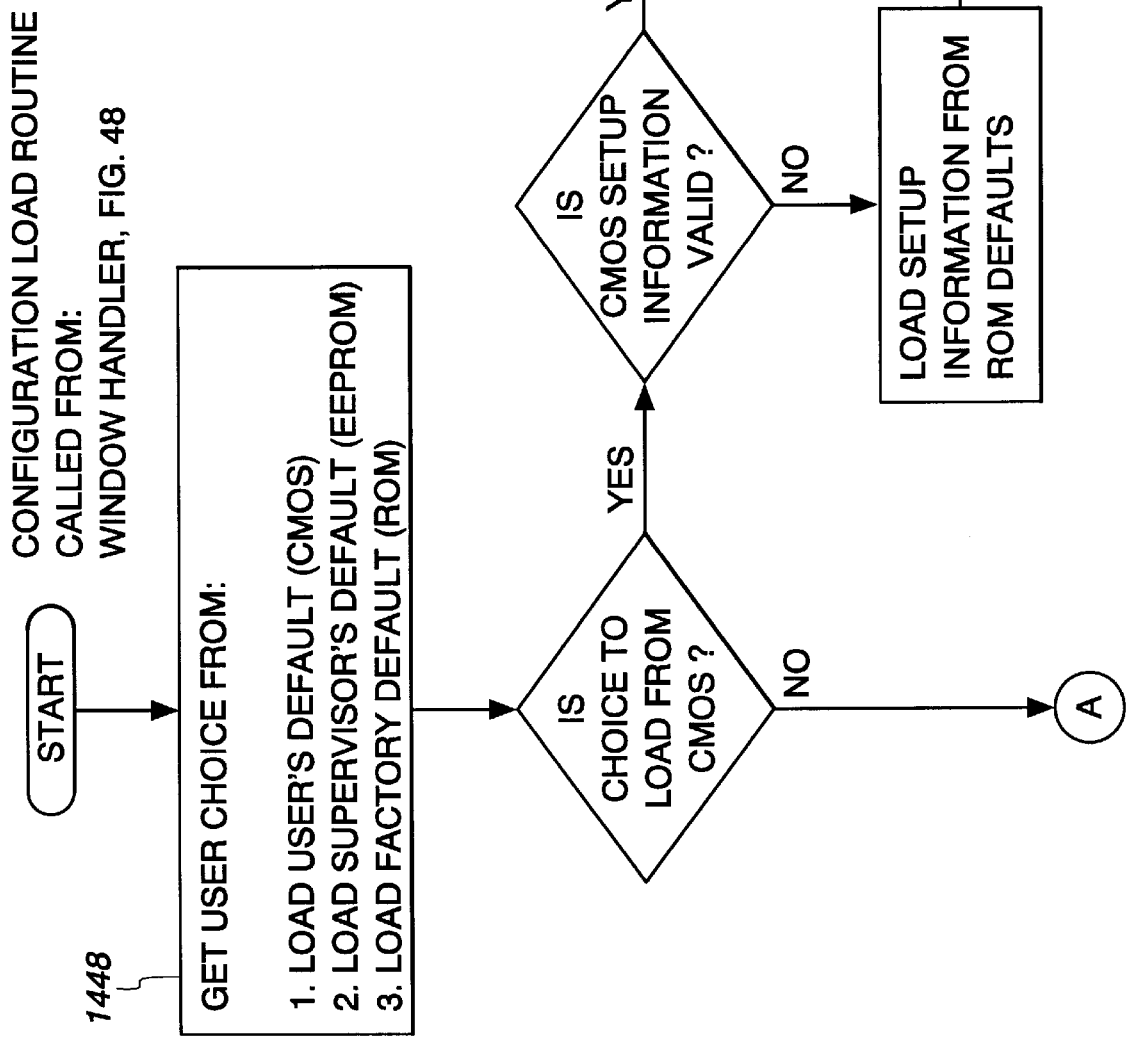
Figure 50B:
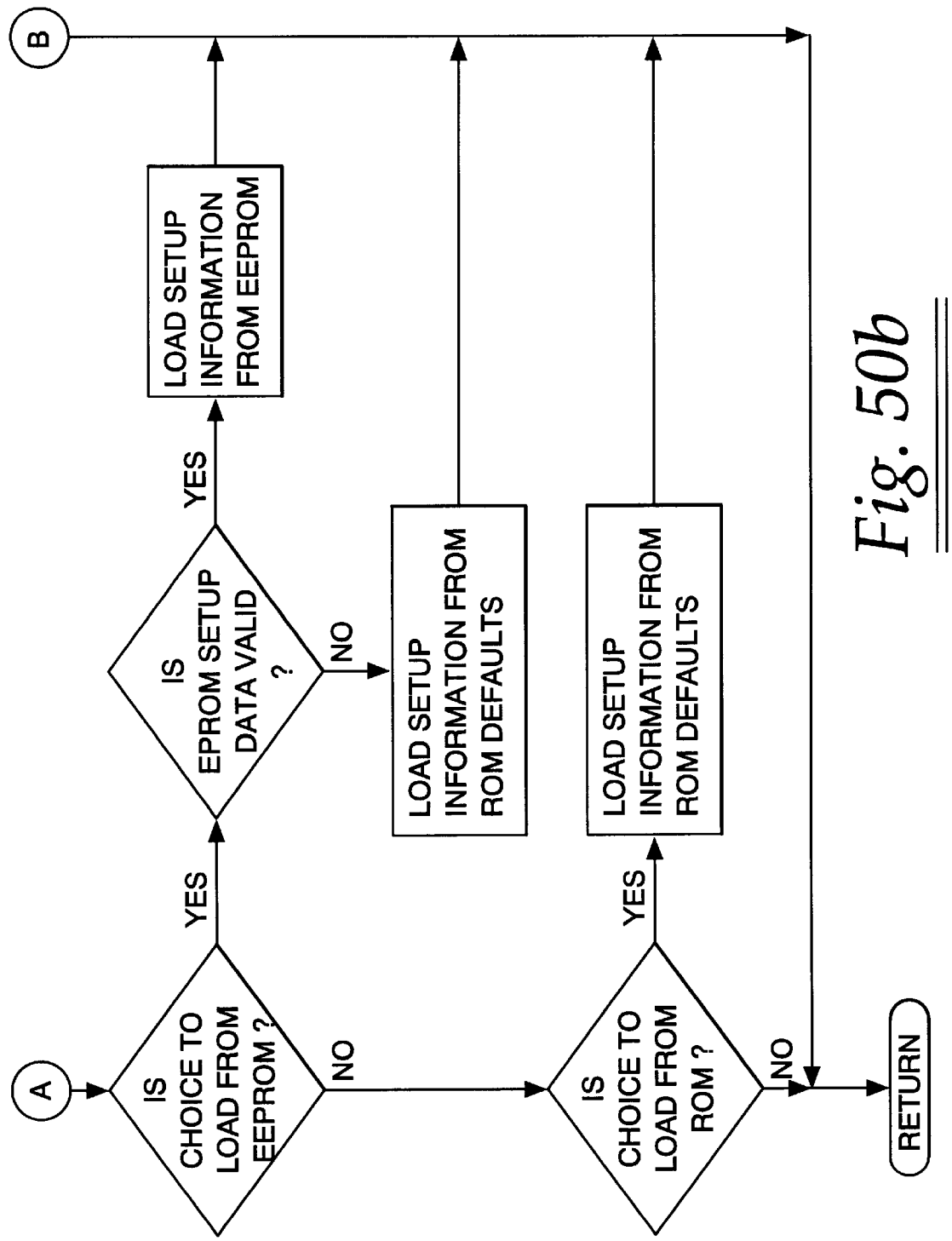

FIGS. 50A–50B illustrates the routine that loads a stored configuration data set into the PMRAM memory 453 within the main memory 326 (FIGS. 33A–33D) to serve as the configuration values for the current session. At block 1448, the user is prompted to choose whether to load the user's values from the CMOS RAM 377 of the real time clock 376 (FIGS. 33A–33D), to load the supervisor's values from the EEPROM memory 439 within the system control processor SCP 316, or factory default values which are retrieved from the ROM memory 328 (FIGS. 33A–33D). The user selects one of these options, and then the system transfers the data selected by the user into the PMRAM memory 453 as indicated by the steps in the flow chart. But if the requested data in CMOS RAM 377 or EEPROM memory 439 is invalid, the system defaults to the ROM data 328 to try and ensure that the configuration information is valid.

Figure 51:
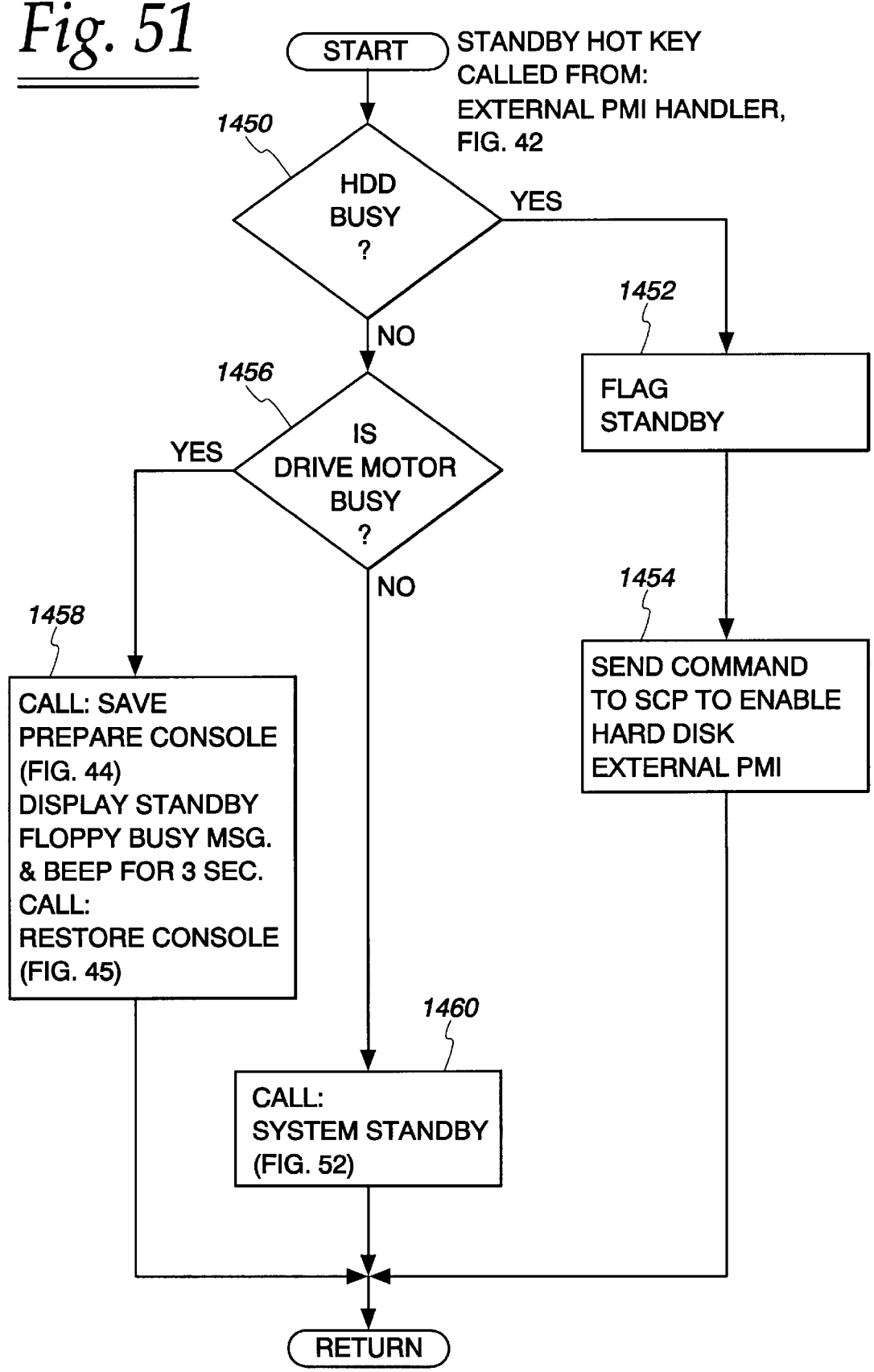
Figure 52A:
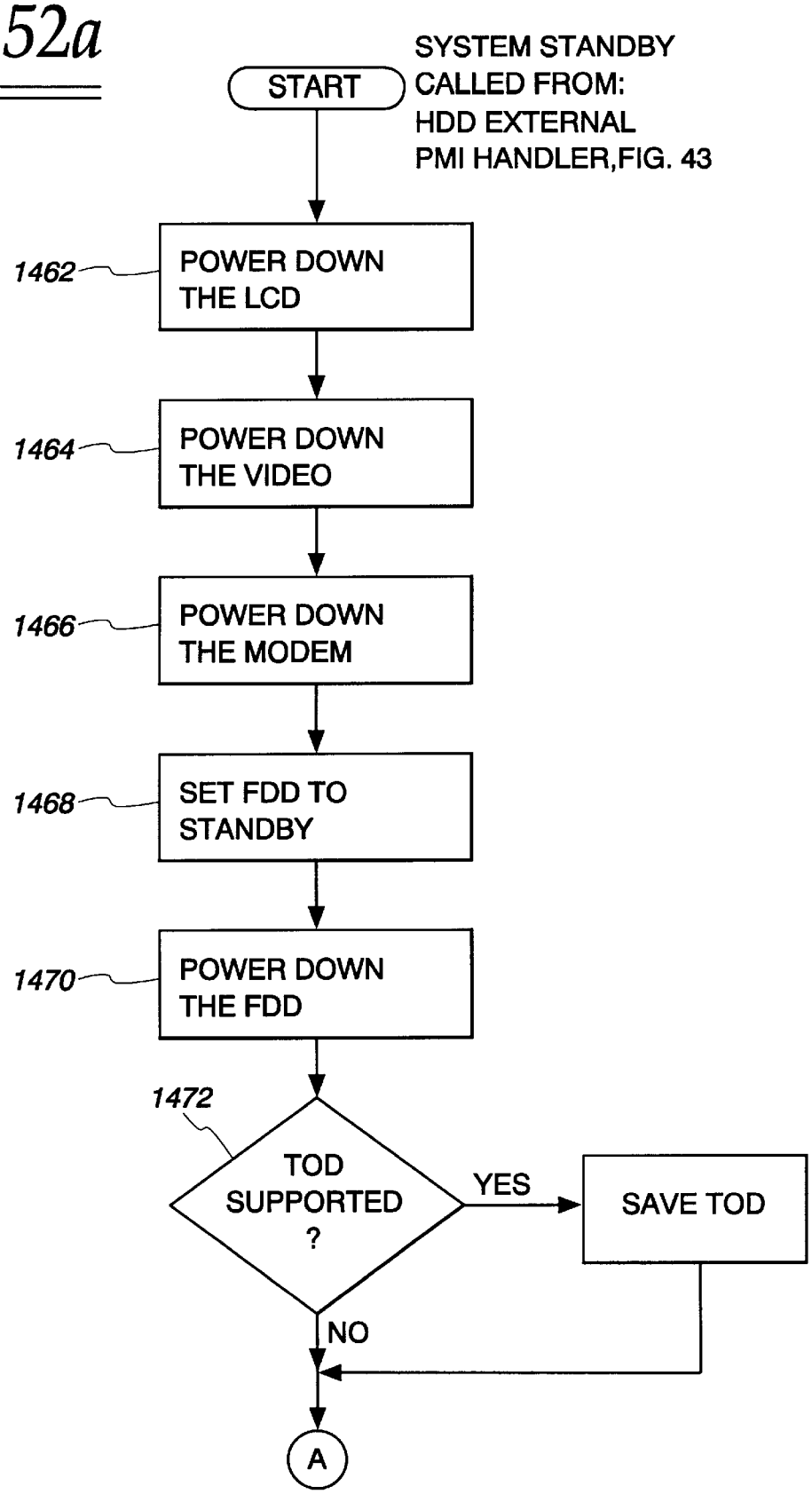
Figure 52B:
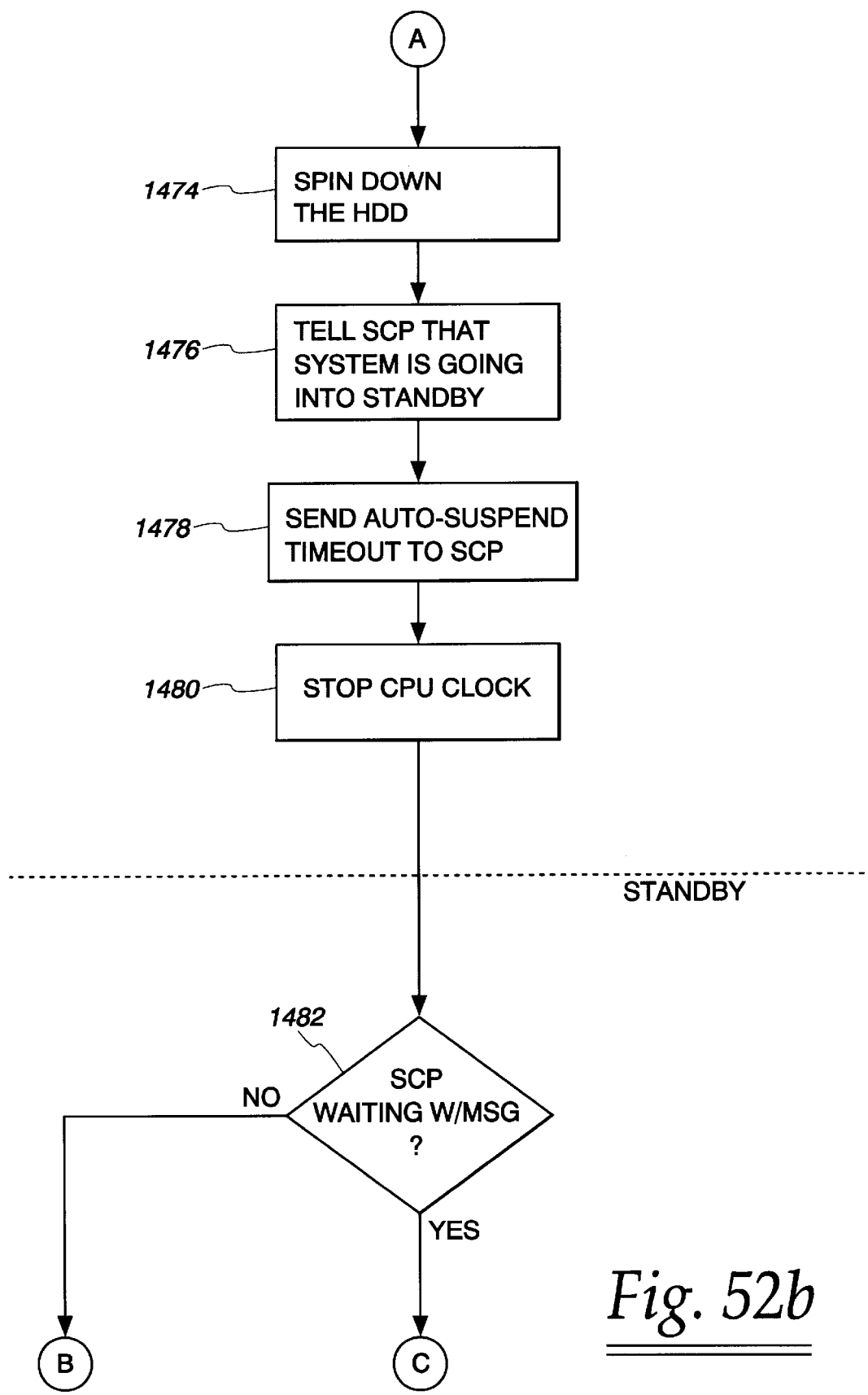
Figure 52C:
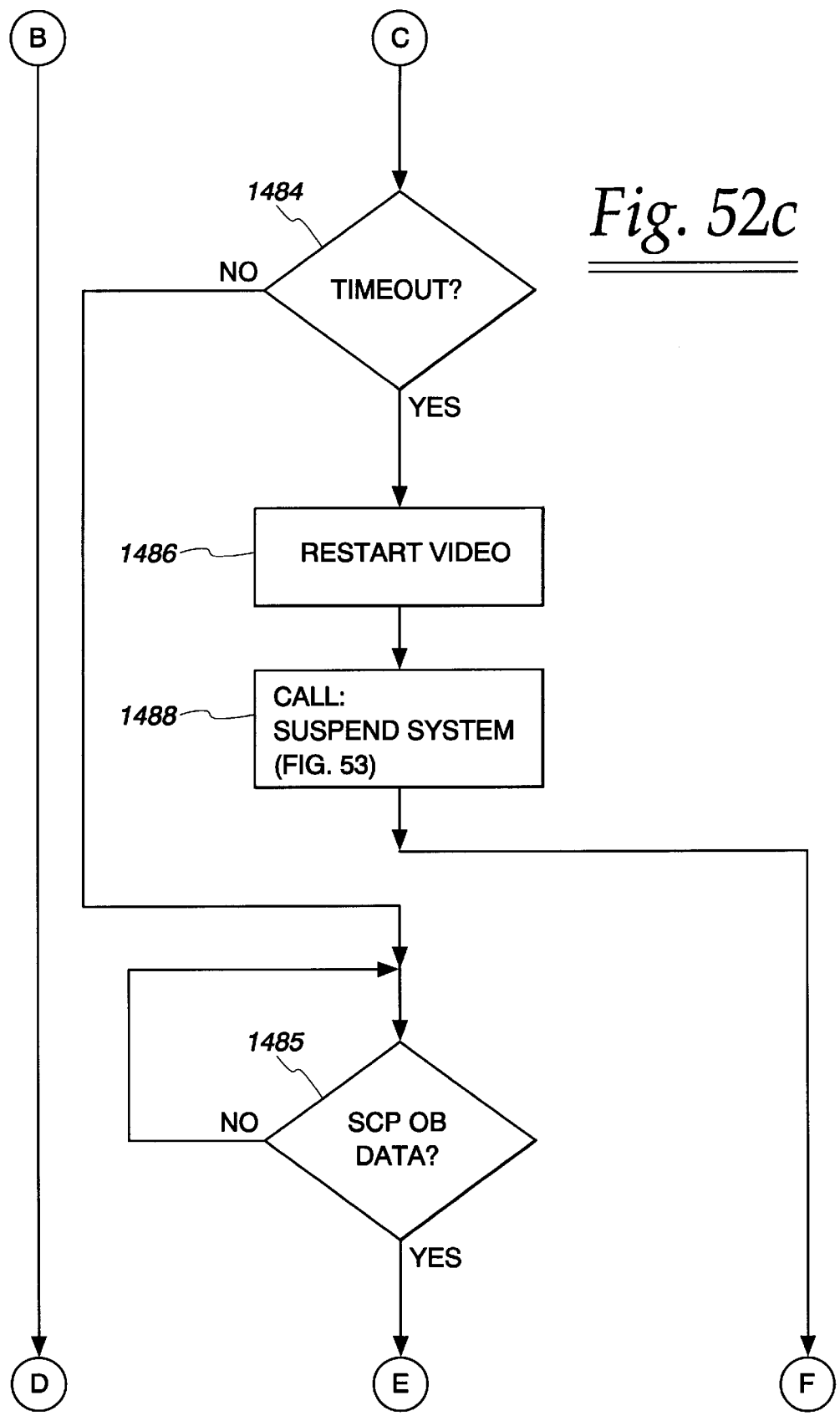
Figure 52D:
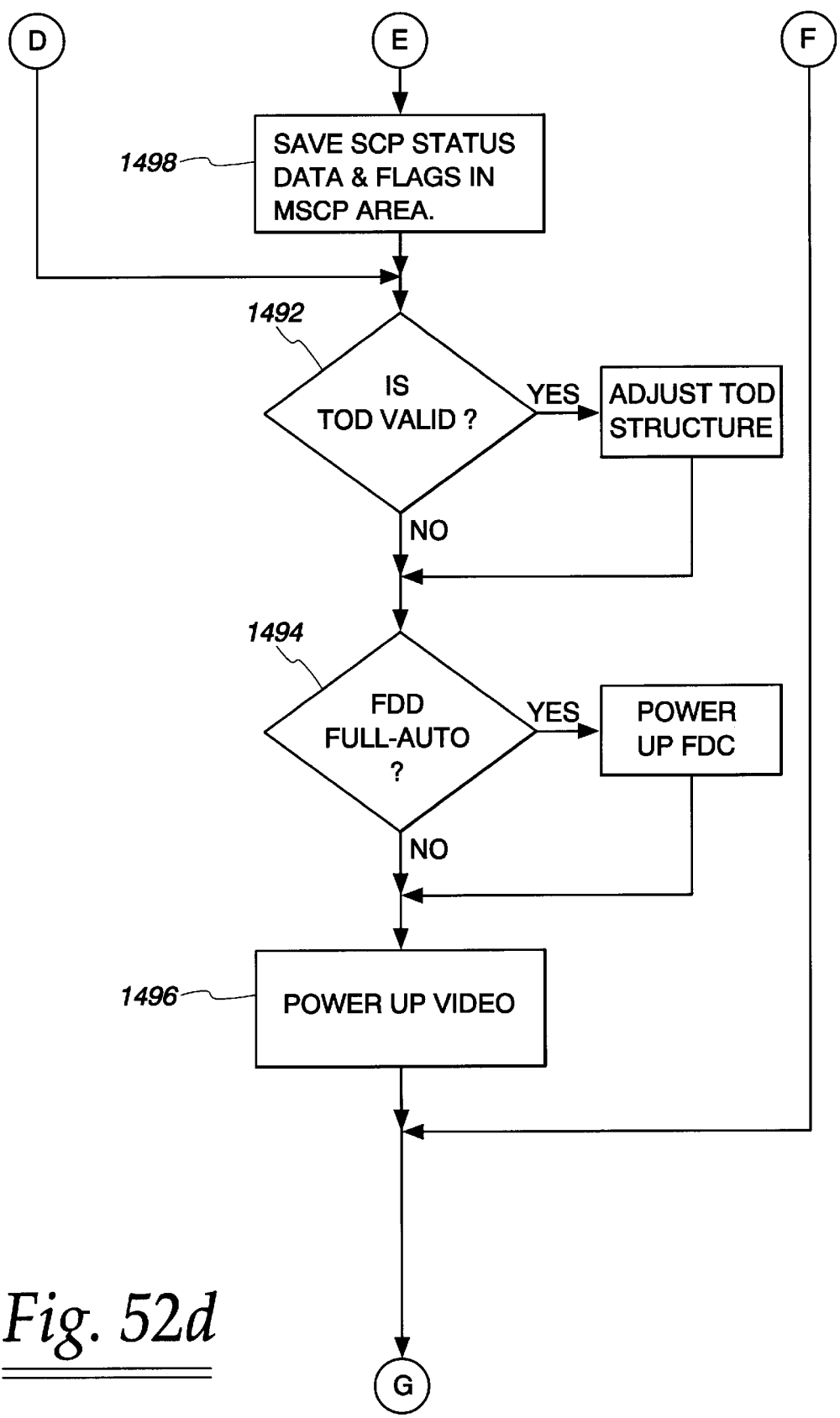
Figure 53A:
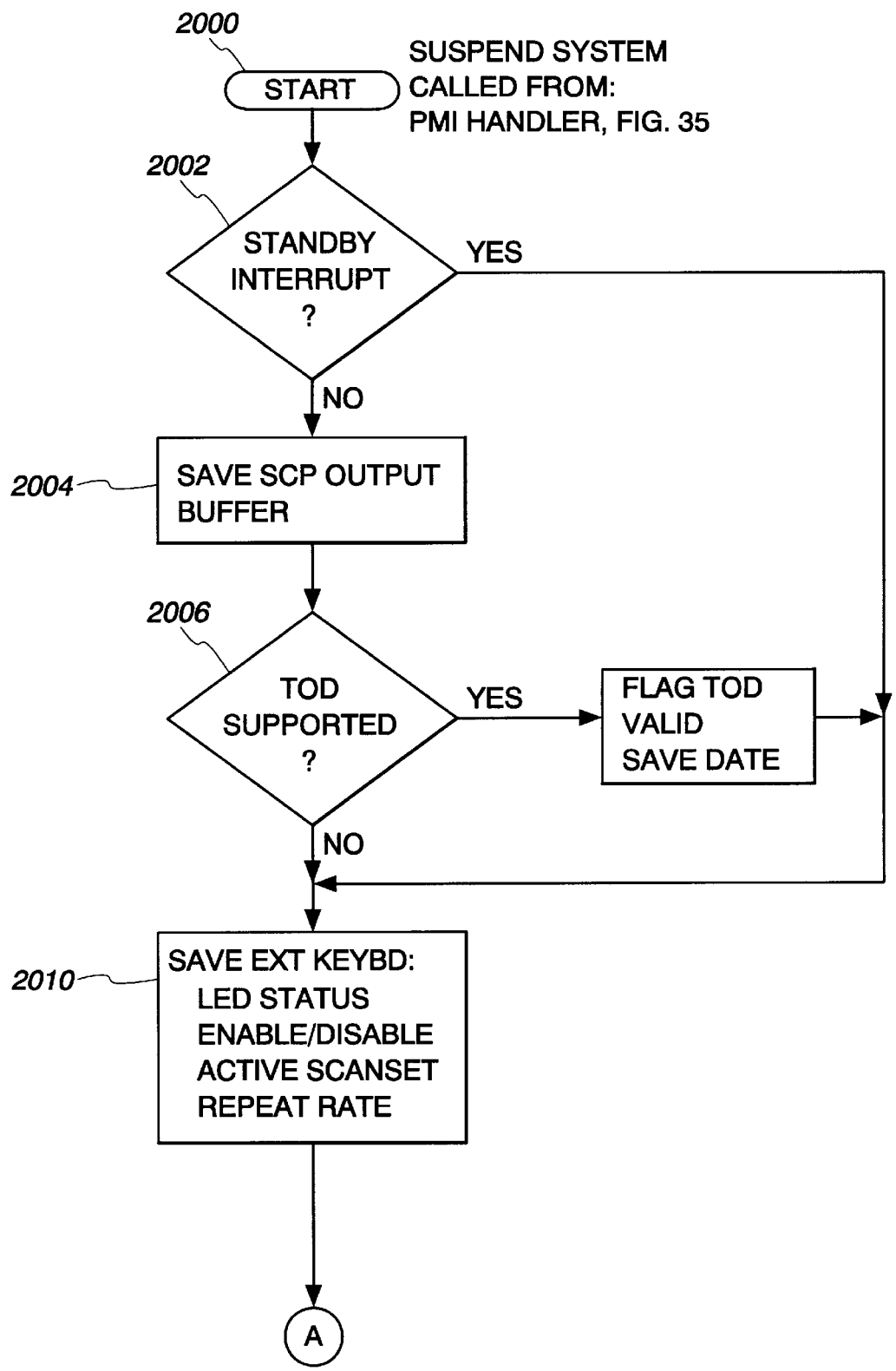
Figure 53B:
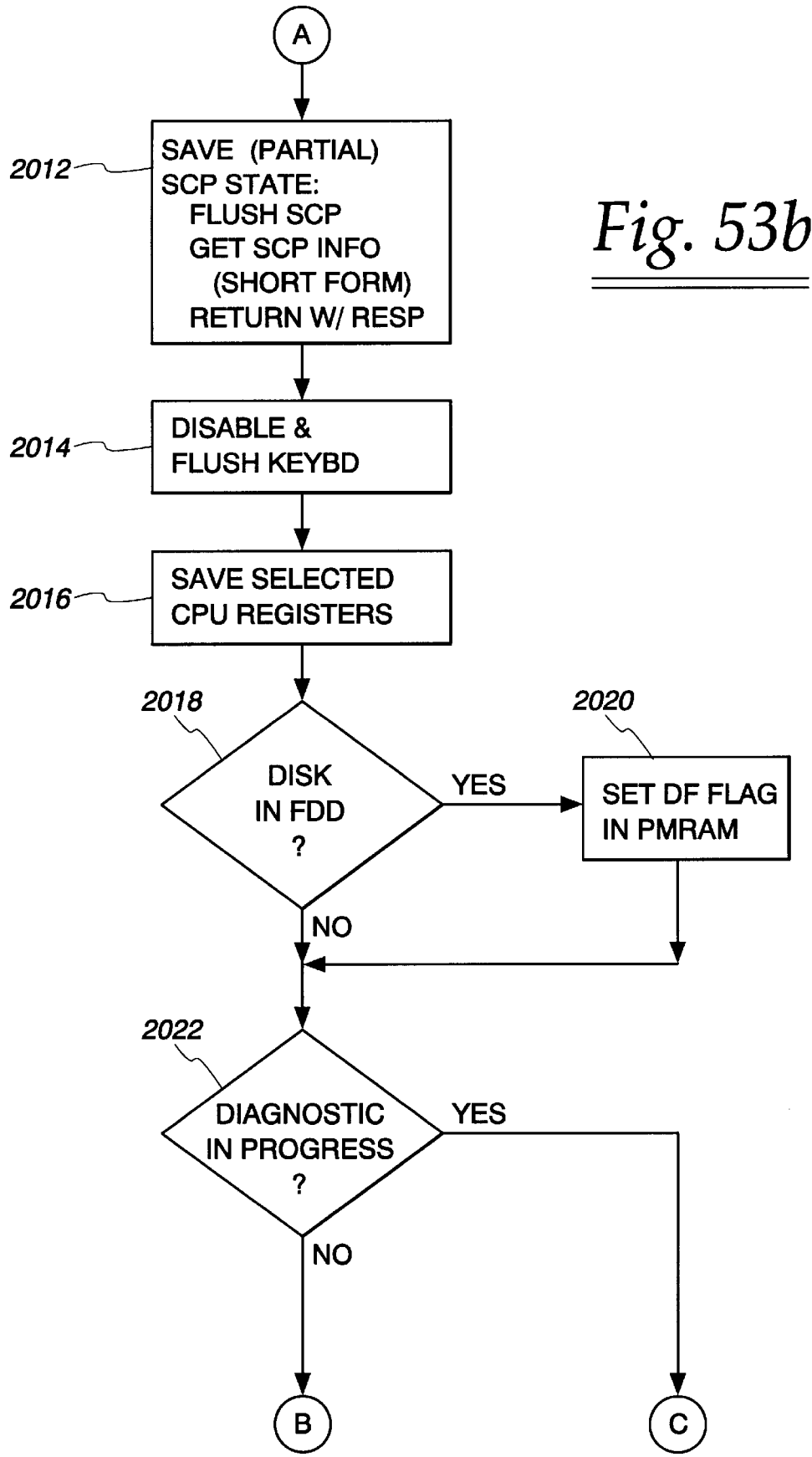
Figure 53C:
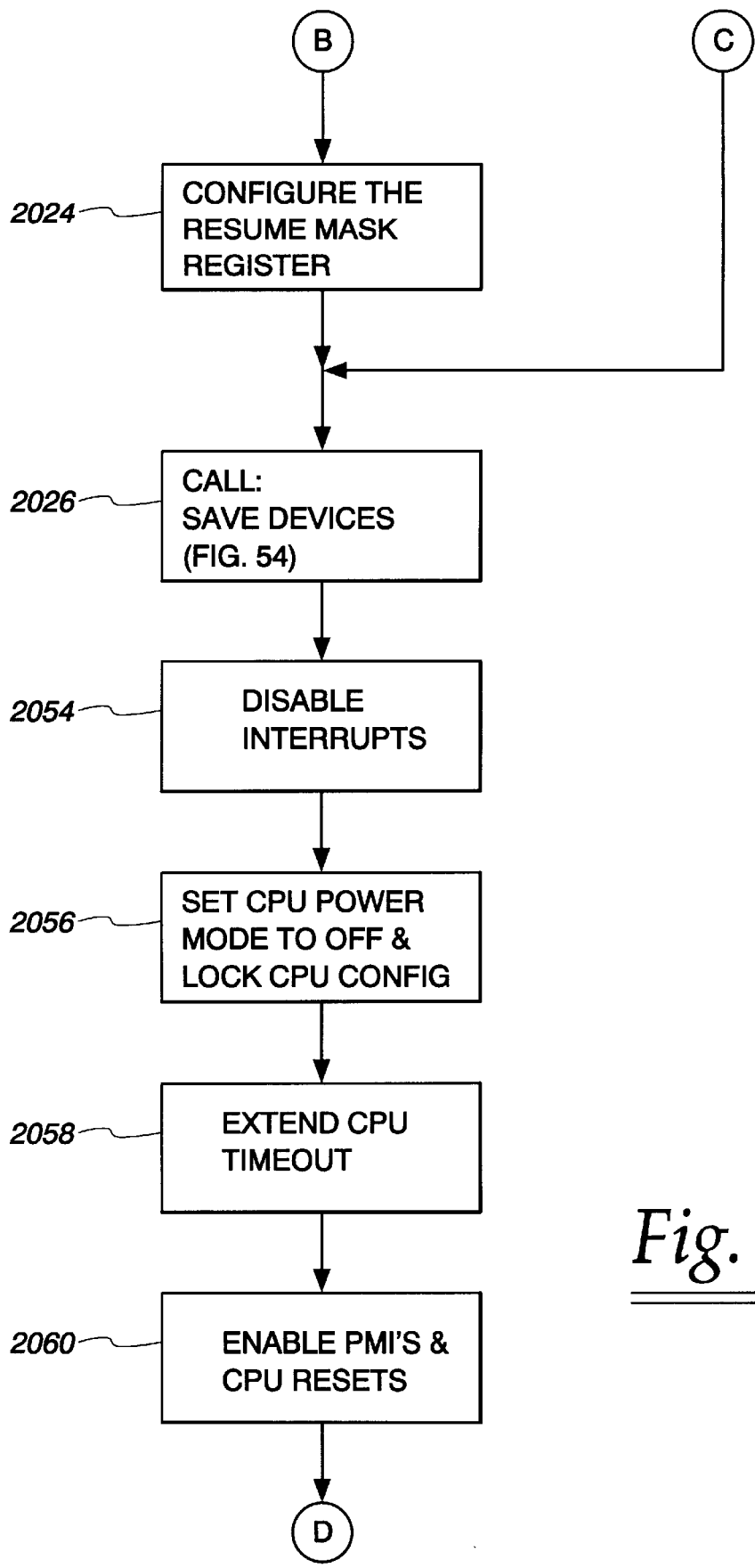
Figure 53D:
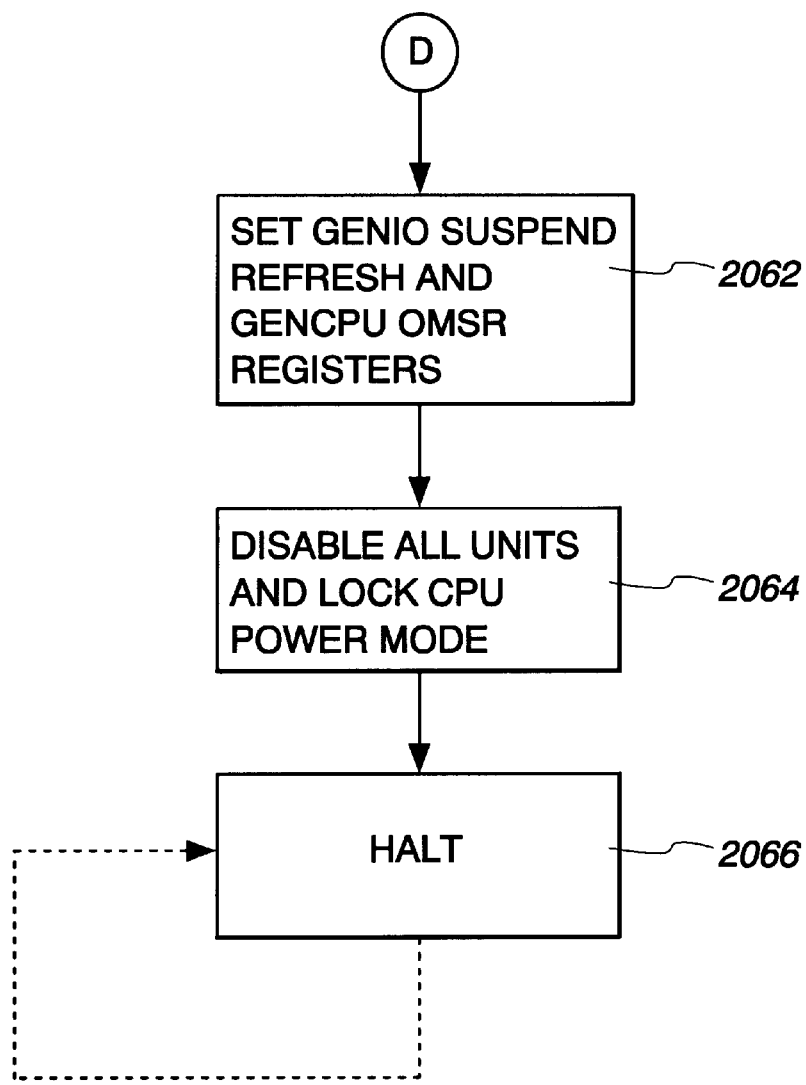

The standby hot key procedure, which is called from the routine of FIGS. 42A–42C, is illustrated in FIG. 51. Beginning at block 1450, the system checks whether the hard disk drive is busy. If it is, then the standby request must be postponed until the hard disk drive stops rotating, as signalled by the turning off of the hard disk drive LED. Accordingly, block 1452 sets the standby flag bit ST (FIG. 34) within the flags location 487 of the PMRAM 453. Then block 1454 sends an appropriate command to the SCP 316 to actuate the ENABLE line so that termination of the hard disk drive LED signal generates a power management interrupt.

If the hard disk drive is not busy, then block 1456 checks to see if the floppy disk drive motor is busy. If so, then an appropriate error message is displayed for three seconds by block 1458 and the request for standby is not executed. But if neither the hard disk drive or the floppy disk drive is busy, then step 1460 calls upon the system standby routine in FIGS. 52A–52E to place the system in standby mode with the clock of the main processor 311 halted, and with the SCP 316 continuing to run so as to restart the system at the first keystroke or upon motion of the mouse.

If the standby operation was not executed because the hard disk drive was running, then when the hard disk drive ceases to run, it generates a power management interrupt which ultimately causes the routine shown in FIG. 43 to call the system standby routine in FIGS. 52A–52E at step 1253 in FIGS. 43A–43B.

FIGS. 52A–52E illustrates the system standby routine which halts the main processor completely to preserve battery power. Block 1462 removes power from the liquid crystal display 321 so that the screen data is no longer visible on the display. Block 1464 powers down the video controller 318, but does not necessarily power down the RAM 448 which still contains the video data. Block 1466 substantially powers down the modem, but note that it is still possible for the system control processor SCP 316, which remains running, to detect a ring signal from the modem, just as it can detect mouse keystrokes and keyboard keystrokes.

Step 1468 configures the floppy disk drive into the standby mode, and block 1470 powers down the floppy disk drive. Then at block 1472, if the operating system supports maintenance of the time of day, the TV flag is set and the date is saved for later restoration. Step 1474 powers down the hard disk drive motor. Then, block 1476 sends a command to the SCP 316, advising it that the main processor 311 is going to go into standby mode and that the SCP 316 should wake up in response to the next keystroke or mouse stroke. And if an auto-suspend timeout is in effect, the auto-suspend timeout value is sent to the system control processor SCP 316 at block 1478 so that the SCP 316 can measure that timeout and generate a power management interrupt which will switch the system into suspend mode if the timeout expires without the occurrence of any event which would wake up the main processor. The main processor 311, at block 1480, next configures itself as to which interrupts will wake it up from the suspend mode of particular importance, an interrupt event from the serial or modem ports, as well as the power management interrupt from the system control processor SCP 316, must restore the main processor 311 to its normal mode of functioning, or else incoming characters from a serial line or from a telephone lines may be lost. Then a command within a main processor 311 is executed so that it stops its CPU clock and enters suspend mode.

When the system control processor SCP 316 detects a keystroke on the keyboard or receives an input on the mouse 421 over the connector 418, it generates a power management interrupt on the line 435 which causes the main processor 311 to return to its normal mode of operation with its clock running. Likewise, the modem or serial port interrupt will also cause the main processor to return to normal operation. When it does so, at block 1482, the main processor 311 checks to see if the interrupt originated with the system control processor 316. If so, it then inquires of the system control processor at 1484 as to whether the cause of the system restart was the expiration of the time to when the system should be suspended. If so, block 1486 restarts the video, and then the suspend system program shown in FIGS. 53A–53D is called upon to suspend all system operations. Hence, program control ends at step 1488 unless for some reason the system is unable to suspend, in which case program control commences with block 1489, where the modem is powered up, and block 1490, where the liquid crystal display is powered up, at which point the system is totally returned to normal operation.

At block 1482, if the system control processor is not waiting with a message, this means that the system was pulled out of standby mode by an event such as an interrupt from the serial port. In that case, program control recommences at block 1492, where the time of day information in the operating system is updated if the TV flag is set. Then, at block 1494, if the floppy disk drive is being operated in full-auto mode, power is reapplied to the floppy disk drive. The video control is powered up at blocks 1496 and then block 1489 and 1490 power up the modem and the liquid crystal display.

If at block 1482 the system control processor is waiting with a message, but that message indicates that a key has been struck or that a mouse action has occurred, as opposed to expiration of the suspend timeout, then block 1484 branches to block 1485 where the main processor 311 waits until the keyboard or mouse character is received from the system control processor. Next, the status of the system control processor is saved in PMRAM 453, and then program control continues with block 1492 in the same manner as if the serial port interrupt had occurred.

Figure 56B:
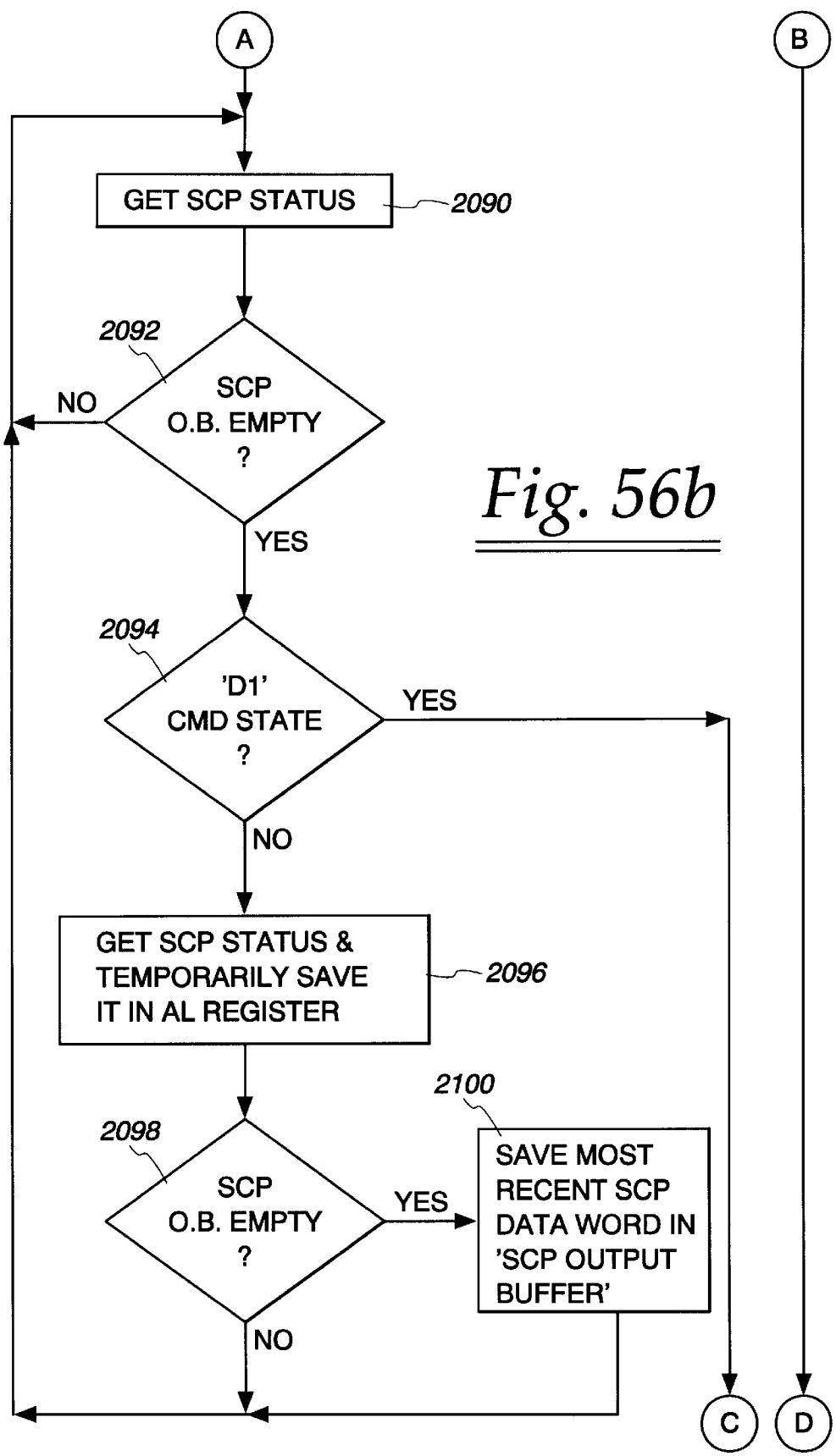
Figure 56C:
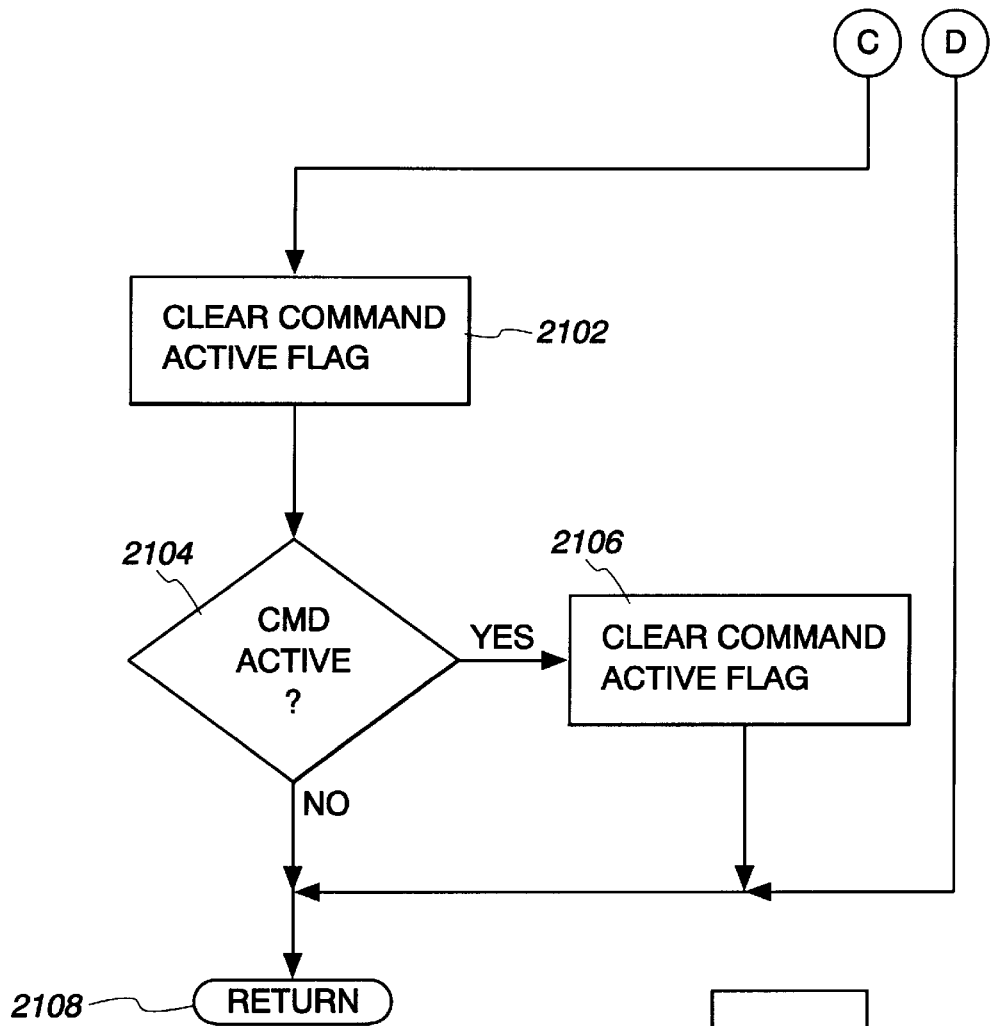

FIGS. 53A–53D depicts the routine which guides the system into suspend mode. Execution starts at block 2000, and proceeds to block 2002, where a check is made to see if the global standby timer 352 (FIGS. 33A–33D) has just expired. If it has, then the system is already in standby mode and certain housekeeping tasks have already been done, and blocks 2004, 2006 and 2008 are skipped. However, if the system is not already in standby, then the housekeeping needs to be done, and so the system proceeds to block 2004, where it saves the SCP output buffer, for example by calling the routine which is shown in FIGS. 56A–56C and described later. Then, at block 2006, the system checks to see if the operating system is one which maintains the time of day and date. If it is, then at block 2008 the system sets the TV flag (FIG. 34), and extracts the date from the operating system and saves it at 1054 in FIG. 34.

Execution then proceeds to block 2010, where the main processor 311 saves in the PMRAM 453 the state of the external keyboard, including the status of the LEDs, an enable/disable bit, an active scan set definition, and a repeat rate. Then, at block 2012, the main processor carries out a partial save of the SCP, of the type described in detail in association with the previous embodiment. In particular, the SCP output buffer is flushed, after which the SCP returns a length byte and a portion of its state which is enough to permit the keyboard to be used to get input from a user. This information is stored at 483 (FIG. 34) in the PMRAM 453.

Then, at 2014, main processor instructs the SCP to disable the keyboard and discard any input from the keyboard which has not already been processed. Then, at 2016, the main processor saves at 488 in the PMRAM certain selected registers and state information which are not automatically saved when a PMI occurs. Then, at 2018, the main processor checks to see if a disk is present in the floppy disk drive. If it is, then at block 2020 the main processor sets the DF flag (FIG. 34) in the PMRAM, so that when the system eventually resumes it will know that a floppy disk should be present in the disk drive. Then, control proceeds to block 2022, where the system checks to see whether a diagnostic program is in progress. If not, then control proceeds to block 2024, where the system configures the resume mask and loads it into the resume mask register 382 (FIGS. 33A–33D) in order to define the events which will cause the system to resume from a suspend mode. The PMI configuration section 1058 of the PMRAM includes the information discussed above in association with FIGS. 48A–48D, which is specified by the user and indicates the events that can initiate a resume, and the mask simply reflects these user selected options. If it is determined at block 2022 that a diagnostic program is being run, then block 2024 is skipped, because the diagnostic program will have independently set the selected options in the resume mask in order to test proper system operation, and it is thus important to avoid block 2024, since it would overwrite the information in the mask register and thus interfere with the diagnostic test. During normal operation, block 2022 will always cause block 2024 to be executed. Control ultimately proceeds to block 2026, where a subroutine call is made to the routine shown in FIGS. 54A–54B.

Figure 54A:
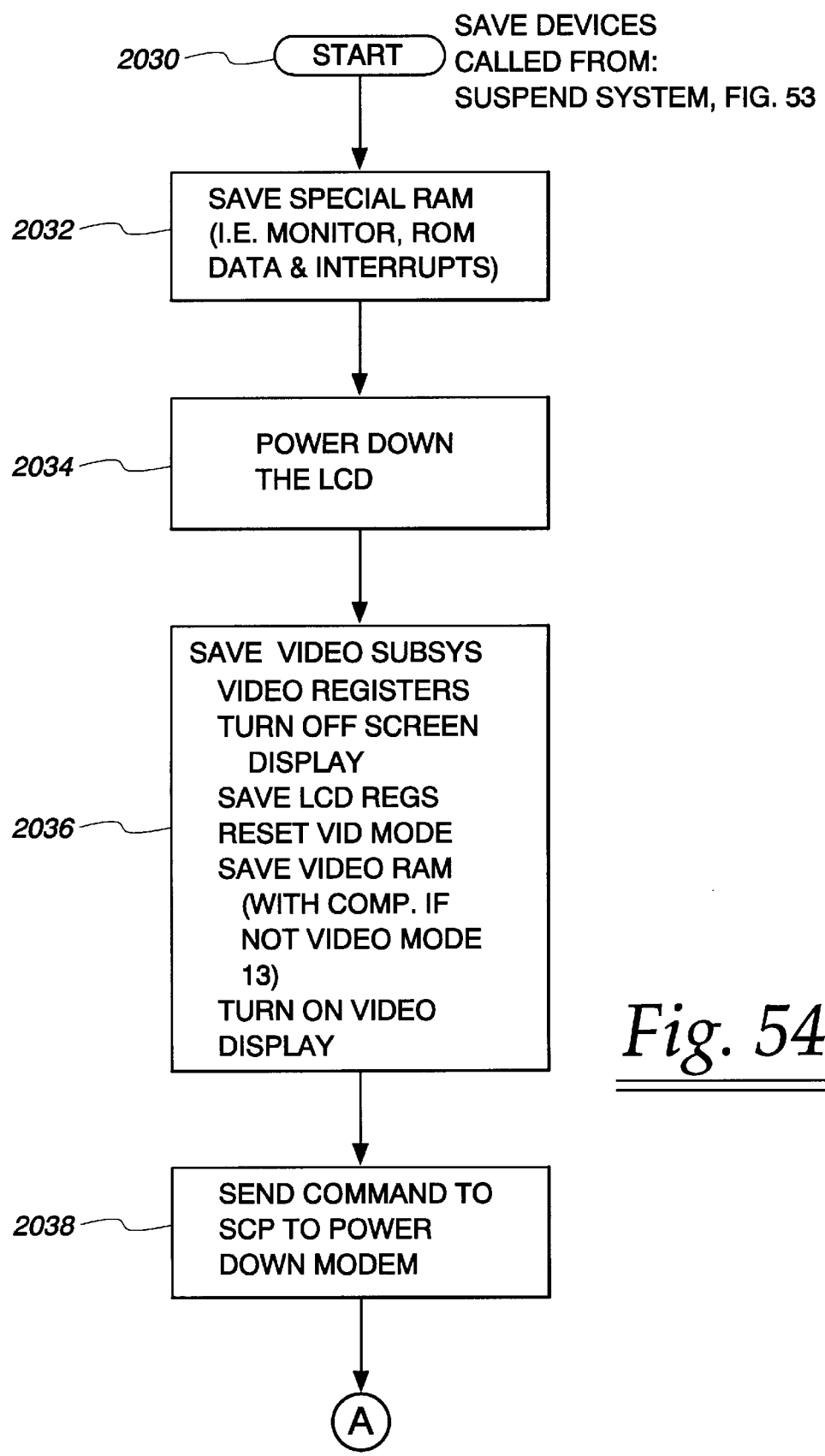

Turning momentarily to FIGS. 54A–54B, execution starts at block 2030, and proceeds to block 2032, where the main processor saves in the PMRAM certain information, including interrupt handling information and contents of the monitor RAM (which is an image in RAM of the BIOS ROM in order to facilitate faster execution of BIOS routines). Then, at block 2034, the main processor sends to the SCP a command which instructs the SCP to turn off the power to the LCD display. Then, at block 2036, the processor saves in the PMRAM the registers 446 (FIGS. 33A–33D) of the video controller, turns off the screen display, saves the LCD registers, resets the video mode, saves the video RAM 448 in the portion 478 of the main memory (carrying out data compression if the active video mode was not mode 13), and then instructs the SCP to turn on the video display.

Then, at block 2038, the main processor instructs the SCP to turn off the modem. Thereafter, at block 2040, the main processor saves in the portion 482 of the PMRAM the status and configuration associated with an external mouse (if any), and then at 2042 instructs the SCP to send its entire operational state to the main processor so that it can be saved. The SCP then sends to the main processor a dump of its internal state, including the RAM 440, followed by a dump of the state of its I/O ports. The main processor saves all of this data in the PMRAM. Then, at block 2044, the main processor saves in the PMRAM the checkpoint port state, and then at 2046 it saves in the PMRAM the state of the numeric coprocessor (if one is plugged into the slot at 1006 in FIGS. 33A–33D). Then, at 2048, the hard disk drive is instructed to send its internal state to the main processor, which stores it in the PMRAM. Thereafter, at 2050, control is returned to block 2026 in FIGS. 53A–53D.

Control then proceeds from block 2026 to block 2054 in FIGS. 53A–53D, where the main processor disables all interrupts, to block 2056 where the main processor sets its CPU power mode register to disable all units and then locks its configuration registers, and to block 2058 where the main processor extends a reset timeout. Then, at block 2060, the main processor enables the PMI and enables resets of itself, in order to facilitate a resume from the suspend mode. Then, at block 2062, the main processor sets certain registers in the refresh control unit 386 (FIGS. 33A–33D) in order to initiate the slow refresh of the main memory 326 which is associated with the suspend mode, and thereafter sets internal registers at 2064 to disable all units and lock the internal registers. Then, at 2066, the CPU executes an instruction which essentially halts it and simultaneously places it in suspend mode.

Figure 55A:
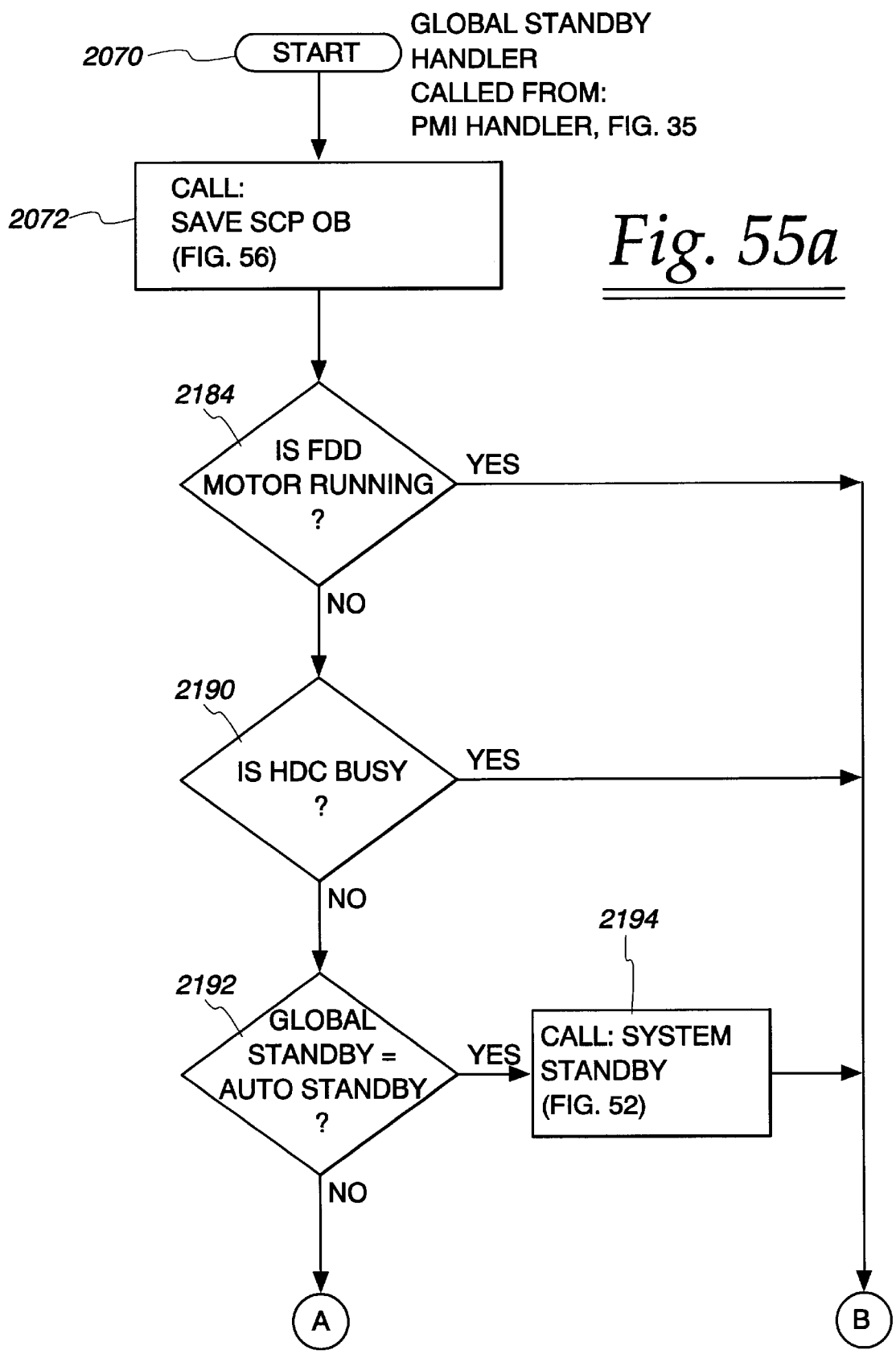

FIGS. 55A–55B depicts a routine which is executed when the global standby timer 352 (FIGS. 33A–33D) times out. Control begins at 2070 and proceeds to 2072, where a call is made to a routine which is shown in FIGS. 56A–56C and which saves the output buffer of the SCP. Referring to FIGS. 56A–56C, execution begins at 2076, and proceeds to block 2078, where the main processor checks to see if the CPU-SUREQ request line to the SCP is already actuated (low). If it is, then the output buffer of the SCP has already been saved, and control proceeds directly to block 2180 where a return is made to the calling routine. On the other hand, if the line has not yet been actuated, control proceeds to block 2082, where the main processor reads a status byte from the registers 449 (FIGS. 33A–33D) in the SCP and stores it in an internal CPU register, and then at 2084 checks to see if the SCP output buffer is currently empty. If it is, then at 2086 the main processor reads from the output buffer the data word most recently read from it, and saves this value so that the output buffer can be fully restored when the system resumes. The interrupted application program may in fact have already accepted this value, but it is nevertheless saved and restored so that when the system later resumes it is fully stored to the state it was in when the application program was interrupted. In either case, control proceeds to block 2088, where the main processor actuates the CPUSUREQ request line to the SCP in order to indicate that the main processor needs to interrupt the SCP.

Then, at 2090, the main processor gets a status word from the SCP and at 2092 checks to see if the output buffer is empty. If it is not, control returns to block 2090, and the system loops at block 2090 and 2092 until it is determined at block 2092 that the output buffer is empty. Then, control proceeds to block 2094, where the system checks to see if a D1 command state is in effect. This involves an operational state within the interface 449 between the main processor and SCP, which may be initiated by some older applications programs. If no such state is in effect, then control proceeds to block 2096, where the main processor gets the SCP status and saves it in a register in the same manner as occurred in block 2082. Then, at block 2098, the main processor checks to see if the SCP output is empty. If it is, then at block 2100 the main processor reads and saves a data word in the SCP output buffer in a manner similar to that described at block 2086. Ultimately, from block 2098, control returns directly or via block 2100 to block 2090.

When it is ultimately determined at block 2094 that a D1 command state is in effect, control proceeds to block 2102, where the processor clears the command active flag CA (FIG. 34), and then at block 2104 the processor checks to see if a command is active. If it is not, then the processor proceeds directly to block 2108, whereas if there is an active command the processor proceeds to block 2106 and sets the CA flag and thereafter proceeds to block 2108. At block 2108, the processor returns to block 2072 in FIGS. 55A–55B, where control proceeds to block 2184.

In block 2184, the processor checks to see if the floppy disk drive motor is running. If it is, then it is not appropriate for the system to enter standby or suspend mode, and control proceeds directly to block 2186, where the processor restarts the global standby timer 352 (FIGS. 33A–33D) in order to clear the request for entry to standby mode, and then returns to the calling routine at block 2188. On the other hand, if it is determined at block 2184 that the floppy disk drive motor is not running, then control proceeds to block 2190, where the processor checks the controller circuit in the hard disk 323 in order to see if the controller is busy. If it is, then it is not appropriate to enter standby or suspend mode and control proceeds directly to block 2186. On the other hand, if the hard disk drive controller is not busy, then at block 2192 the processor checks user specified information in the PMI configuration section 1058 of the PMRAM in order to determine whether the user has indicated that a request to enter standby mode is in fact to result in an entry to standby mode, or whether standby mode should be bypassed and a direct entry made into suspend mode.

If an entry to standby mode is allowed, then control proceeds to block 2194, where a call is made to a routine which is shown in above-described FIGS. 52A–52E and which places the system in standby mode. When the system ultimately exits standby mode, control will return to block 2194 and proceed to block 2186. On the other hand, if the user has indicated that a request for standby mode is to in fact send the system directly into suspend mode, then control proceeds from block 2192 to block 2196, where a call is made to the suspend handler routine, which is shown in FIGS. 57A–57B and described in more detail below.

FIGS. 57A–57B, as mentioned above, shows the routine which determines whether the system should enter suspend mode. Control begins at block 2200 and proceeds to block 2202, where the processor reads status information from the hard disk and then, at block 2204, checks the status information to determine if the hard disk is busy. If the hard disk is busy, then the entry to suspend mode must be deferred, and therefore at block 2206 the main processor instructs the SCP to actuate its ENABLE output so that when the hard disk drive is done with its task and disables its LED output, a further PMI will be generated. Then, control proceeds to block 2208, where the main processor executes an arbitrary instruction which has the effect of setting the carry bit 1014 (FIGS. 33A–33D) to serve as an indication that entry to suspend was aborted, and then at block 2210 a return is made to the calling routine.

If it is determined at block 2204 that the hard disk drive is not busy, then at block 2207 the main processor reads the status register 371 (FIGS. 33A–33D) and checks to see if the contents of this register indicate that the battery voltage is low. If it is, then at block 2210 the system proceeds directly to the routine shown in FIGS. 53A–53D, which guides the system directly into suspend mode. On the other hand, if the battery voltage is not low, then at block 2212 the system checks to see if the floppy disk drive motor is busy. If it is not, then at block 2214 the system proceeds directly to the routine of FIGS. 53A–53D in order to enter the suspend mode.

However, if the floppy disk drive motor is busy, then at block 2216 the processor calls the previously-described save console routine shown in FIGS. 44A–44B, and then at block 2218 restarts the backlight timer with an appropriate time value dependent on whether the system is presently operating on AC or DC power, and then turns the display on. This ensures that there is an active display so that an error message can be displayed. In particular, at block 2220, the processor displays the message "Cannot enter suspend mode while floppy is being accessed!", then provides a beep to attract the attention of the user, and then waits three seconds in order to give the user a chance to see the message. Then, at block 2222, the previously-described routine shown in FIG. 45 is called in order to restore the state of the console, and then control proceeds to block 2208 where the carry flag is set to indicate that entry to suspend has been aborted, and control returns to the calling routine at 2210.

As described for the preceding embodiments, when an event occurs during the suspend mode which is permitted by the resume mask at 382 (FIGS. 33A–33D) to cause the system to exit suspend mode and resume operation, the hardware of the main processor 311 automatically generates a resume reset at the output of the selector 381 which resets the processor and which sets the resume flag 383. Every reset to the processor, including not only the resume reset but also warm and cold boots of the system, cause the processor to automatically begin execution at a predetermined address, which address contains the first instruction of the routine shown in FIGS. 58A–58B. In particular, execution begins at block 2230, and proceeds to block 2232, where the processor 311 changes the refresh registers at 386 in order to speed up the refresh rates so the main memory 326 can be accessed.

Then, at blocks 2234–2248, the main processor 311 performs several functions which are conventional and not a part of the present invention, and which are therefore described only briefly for purposes of completeness. In particular, in blocks 2234–2240, the system moves respective sections of BIOS code from true ROM into "slush ROM", the later actually being a portion of the main memory 326 which is RAM rather than ROM and which thus permits the BIOS code to execute more quickly then it would if it were in true ROM. The BIOS code moved includes the video code, the PMI code, the setup/flash code and the BIOS code. Then, at block 2242, a conventional patch is made to handle a reset vector which ensures compatibility with the preexisting Intel 8088 microprocessor. Then, at 2244, a return address is set up in a conventional manner in a CPU register, so that at block 2246 a subroutine can be called without actually using a stack, because in the case of a cold boot the system memory has not yet been checked and thus no stack has been set up.

Figure 59A:
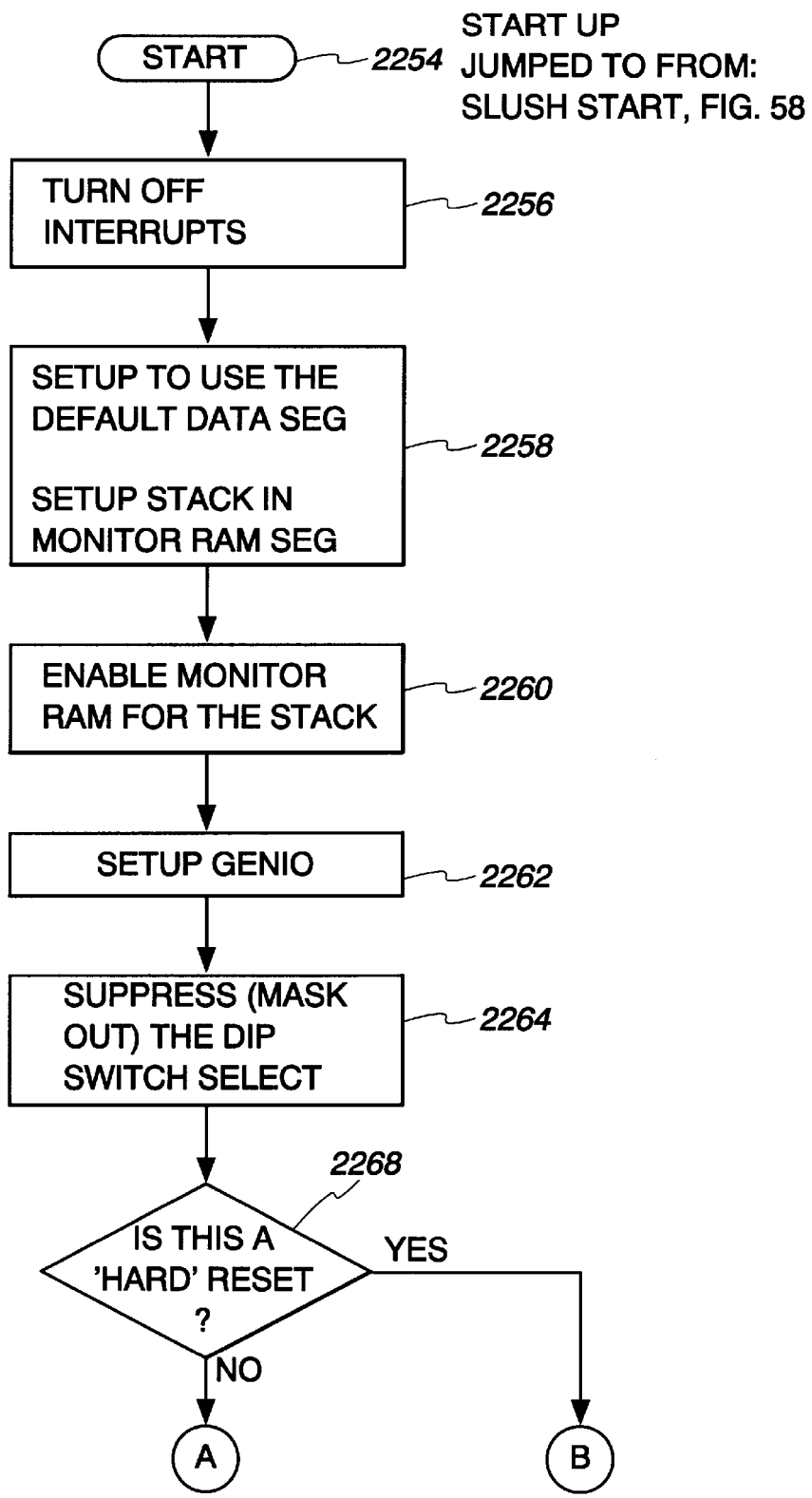
Figure 59B:
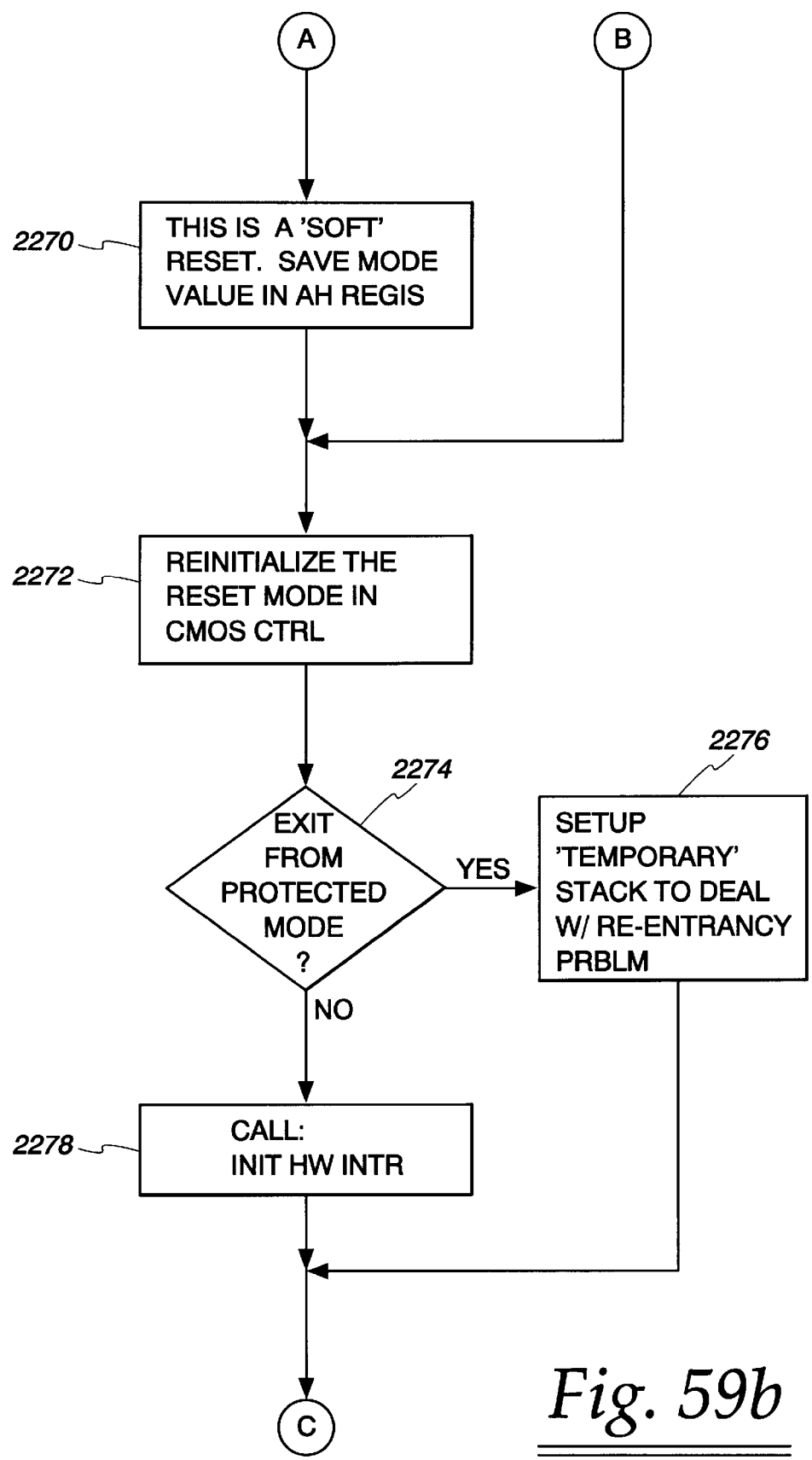
Figure 59C:
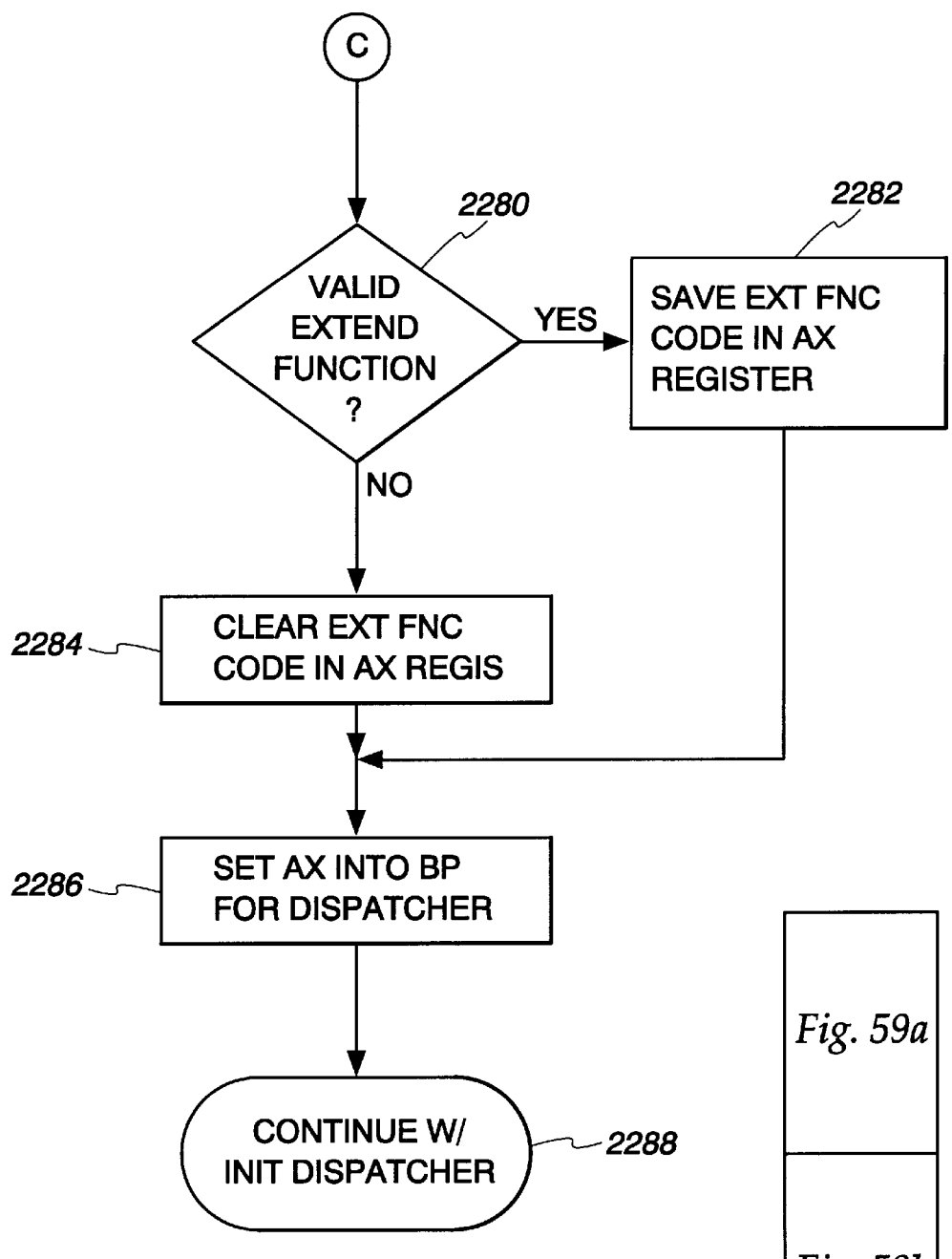

In block 2246, the system does a jump (not a call) to the subroutine, which is conventional and is not illustrated and described in detail, but which carries out a checksum on the system ROM in order to make sure that it is not corrupt. Assuming it is not, the routine uses the address in the register-to return to block 2246, and control then proceeds to block 2248 where a conventional and not-illustrated hardware circuit is switched to a mode in which it write protects the above-mentioned slush ROM in order to prevent it from being inadvertently changed by an application program. Then, at block 2250, the CPU exits protected mode, and locks certain internal registers. Then, at block 2252, control proceeds to the routine of FIGS. 59A–59C. In FIGS. 59A–59C, control begins at block 2254, and proceeds to block 2256, where the system turns off all interrupts. Then, at block 2258, the main processor sets itself up to use a default data segment in the memory, and in a conventional manner sets up a stack in the main memory. Then, at 2260, it enables the monitor RAM for the stack, and then at block 2262 the main processor sets up its input/output registers. Thereafter, at block 2264, the system suppresses the effect at one of its input ports of a not-illustrated manual switch.

Then, at block 2268, the system checks to see if the reset in progress is a hard reset as opposed to a soft reset. If it is a soft reset then at block 2270 the system saves in an internal register a mode value from the CMOS RAM. In either case, control proceeds to block 2272, where the system reinitializes a reset mode indication in the CMOS RAM. Then, at block 2274, the main processor 311 evaluates an exit from protected mode. In the event of an exit, at 2276 the system sets up a temporary stack in the main memory 326. Otherwise, at block 2278, the system calls a routine which is conventional and therefore not illustrated, and which initializes master and slave interrupt controllers for CMOS reset modes 0 to 8.

From each of blocks 2276 and 2278, control proceeds to block 2280, where the processor checks to see if there is a valid extend function. If there is, then the extend function code is placed in the processor's internal AX register at 2282, whereas if there is not, the AX register is cleared at 2284. From either of blocks 2282 and 2284, control proceeds to block 2286, where the main processor moves the contents of its AX register into its base pointer register BP, and then proceeds through block 2288 to the routine of FIGS. 60A–60B.

Figure 60A:
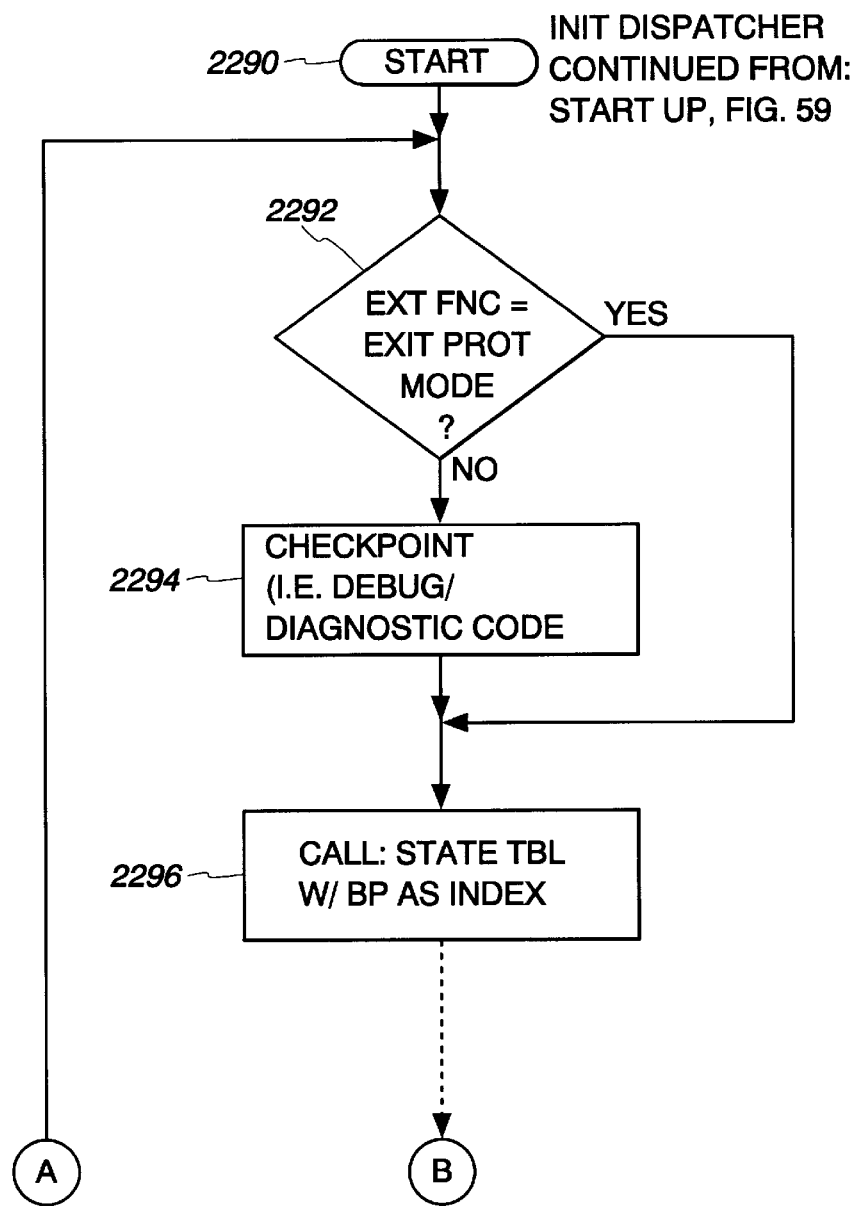
Figure 60B:
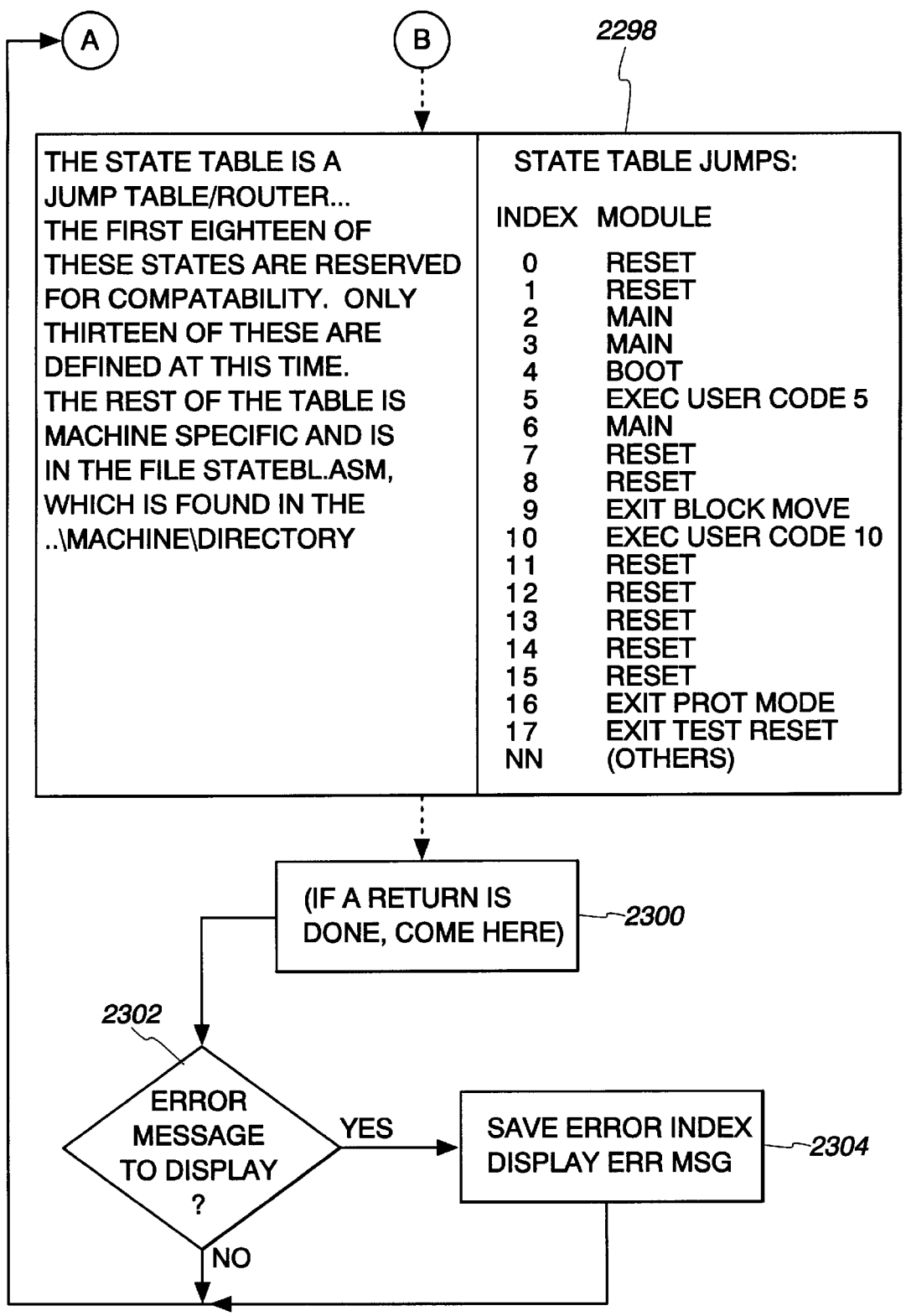

Referring to FIGS. 60A–60B, execution begins at block 2290 and proceeds to block 2292, where the processor checks to see if the extended function code specifies an exit protected mode. If not, then at block 2294 the system performs a checkpoint operation involving debug/diagnostic code, and then proceeds to block 2296. Alternatively, if it was determined at block 2292 that the system was to exit protected mode, then control would proceed directly to block 2296. At block 2296, the processor uses the value in its BP register as an index to a state table shown diagrammatically at 2298, which contains a series of jump instructions which vector control to a plurality of respective routines. The first eighteen of the routines are reserved for compatibility purposes, and only thirteen of them are presently defined. The rest of the table is machine specific, the details of which are not pertinent here and are thus are not described in detail.

Normally, when control vectors through block 2298, it never returns to the routine of FIGS. 60A–60B. However, in the unusual event that a return occurs, control returns to block 2300, and then returns to block 2302, where the processor checks to see whether, in association with the return to blocks 2298 and 2300, there is an error message to display. If there is, then at block 2304 the system saves a value which identifies the error and then displays a corresponding error message, and thereafter returns to block 2292.

Figure 61A:
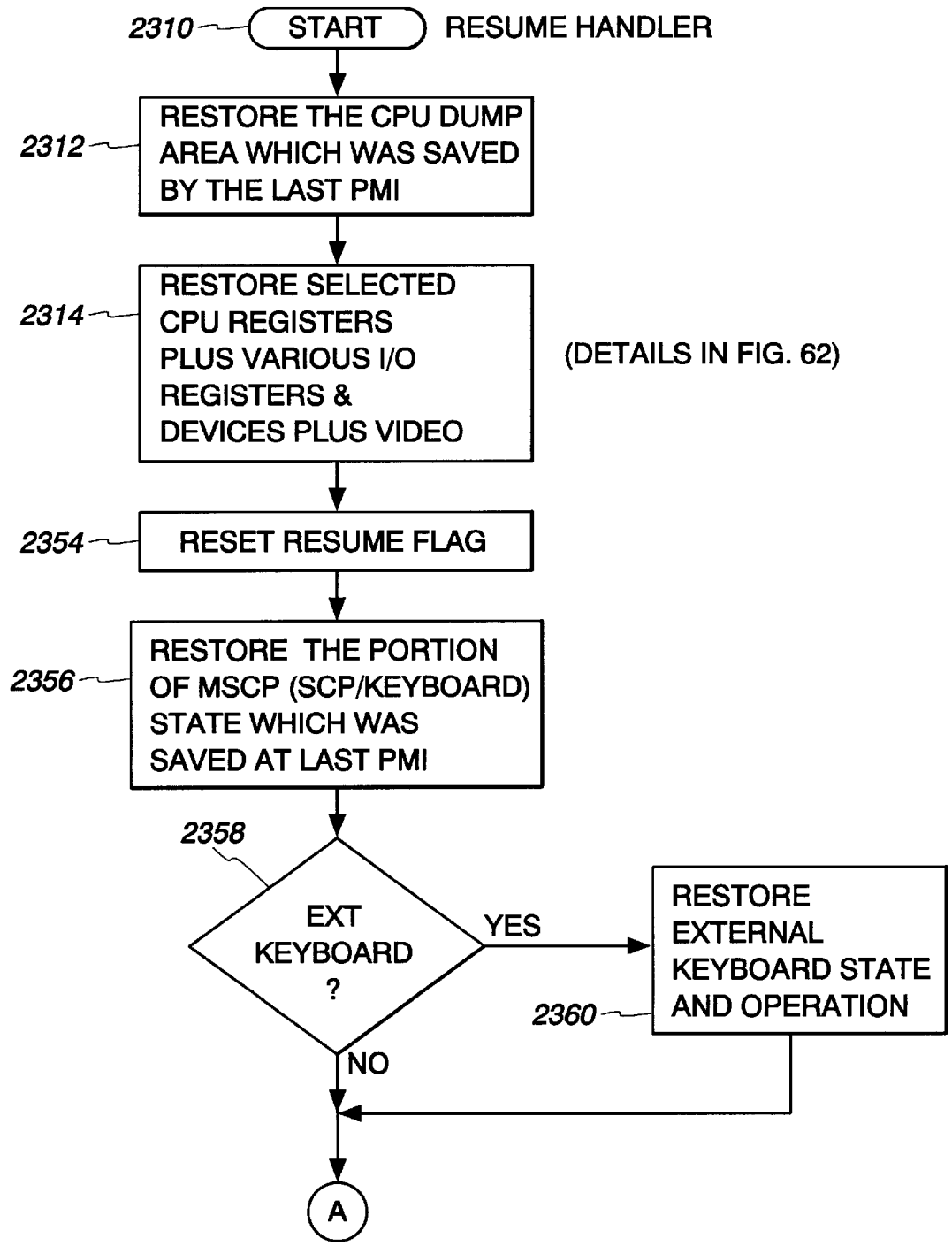
Figure 61B:
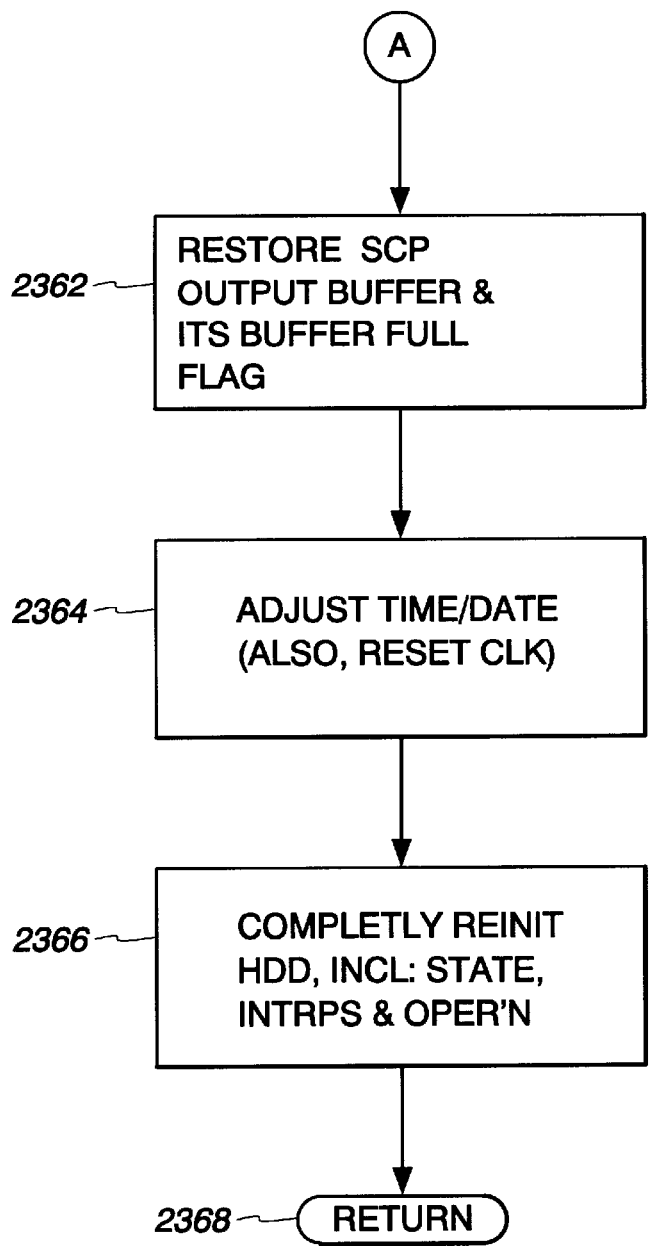
Figure 62A:
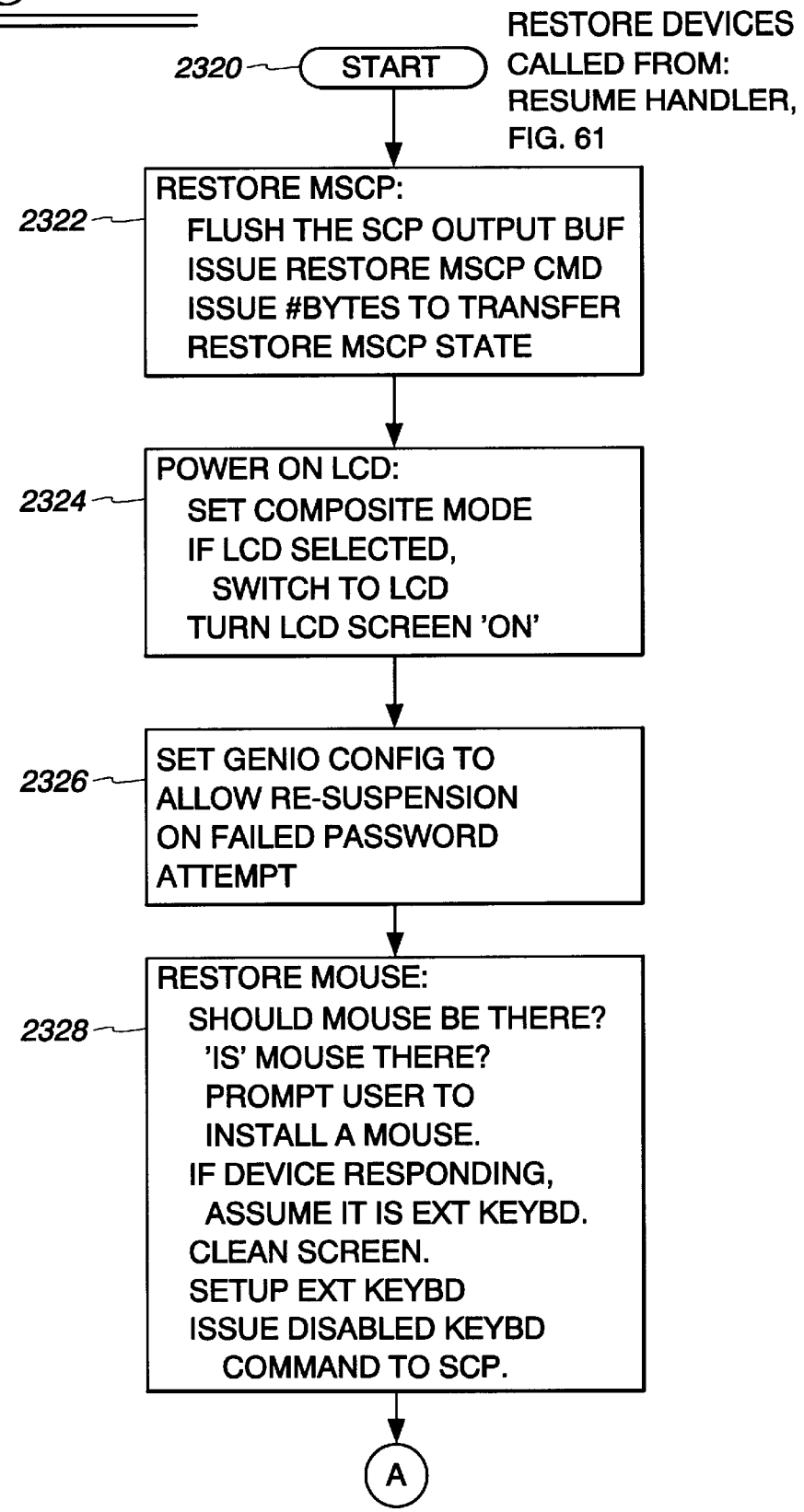
Figure 62B:
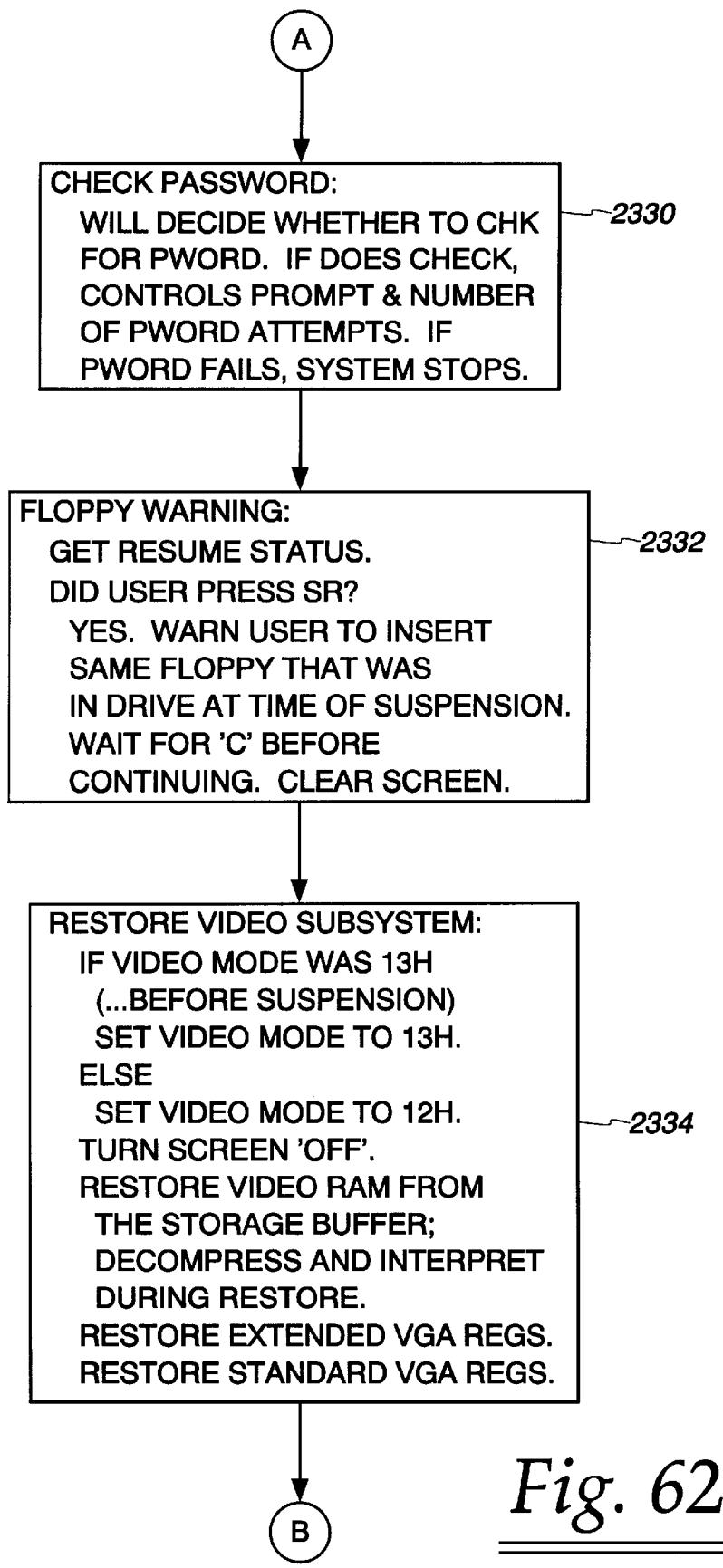
Figure 62C:
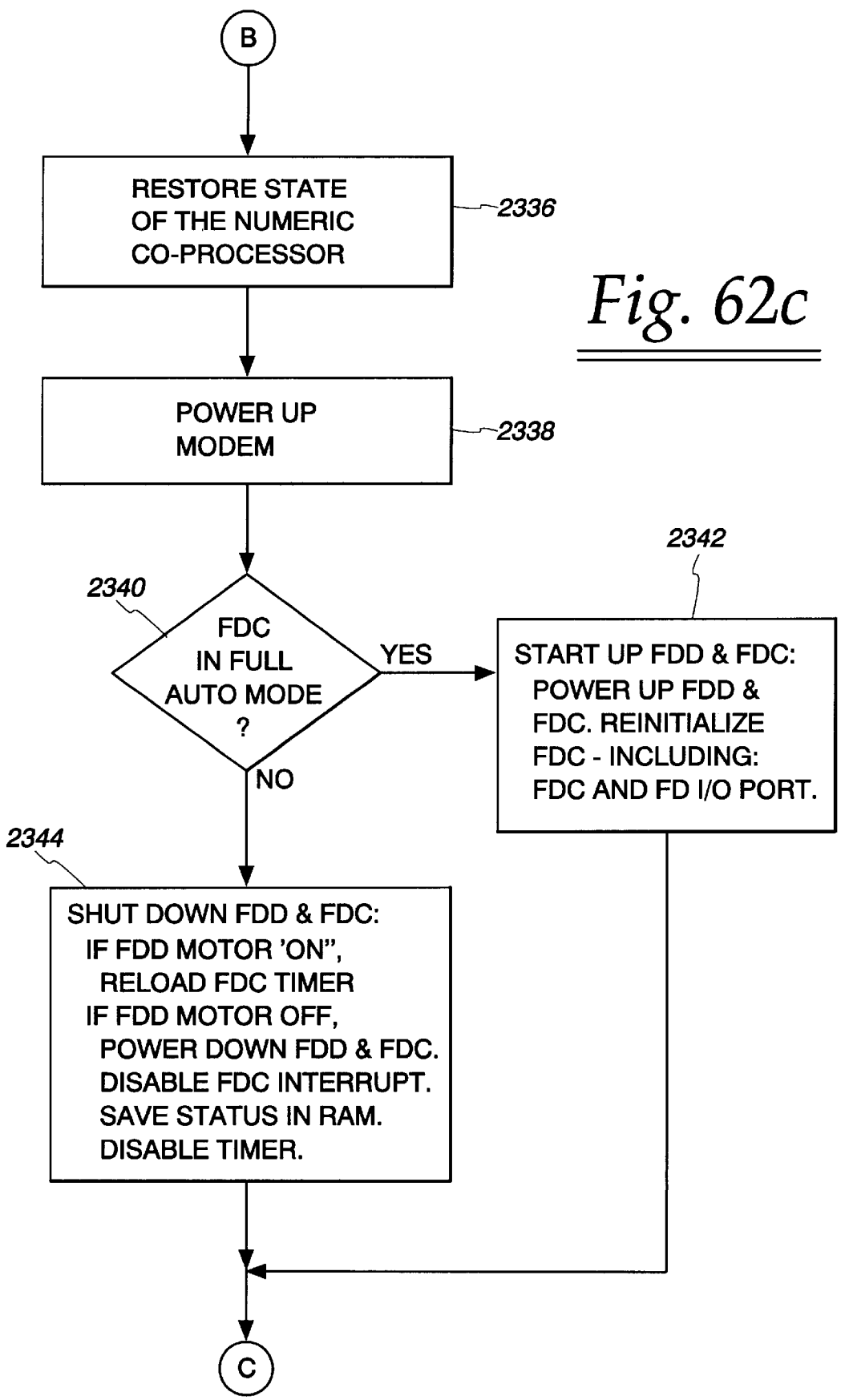
Figure 62D:
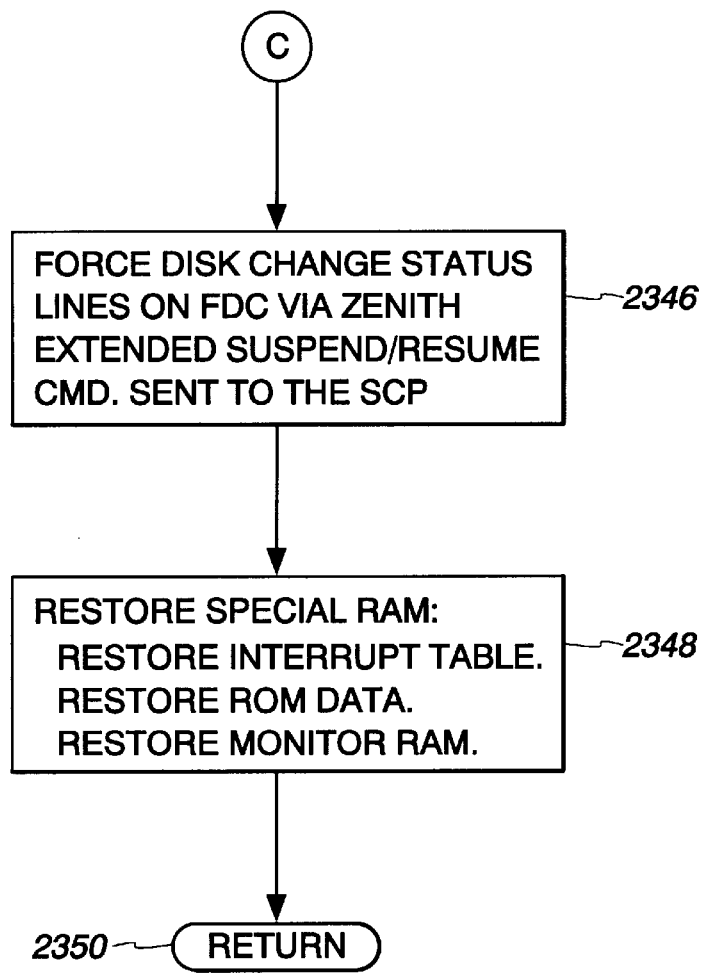

After the processor determines from the resume flag 383 (FIGS. 33A–33D) that the reset was due to a resume reset rather than some other type of reset, and initiates a software PMI in order to reenter the PMI handler routine of FIGS. 35A–35C, the PMI handler routine of FIGS. 35A–35C causes control to shift at block 1102 to the routine of FIGS. 61A–61B, which carries out the steps necessary to cause the processor to resume from the suspend mode. In FIGS. 61A–61B, execution begins at block 23 and proceeds to block 2312, where it transfers from the portion 488 of the PMRAM to the portion 481 the states of the processor registers which were previously stored at 481 by the PMI which cause the system to enter the suspend mode, thereby overwriting the information more recently stored at 481 by the software PMI executed following the resume reset in order to reenter the PMI handler. Thus, at the end of the resume handling routine, the hardware will be able to find and restore the processor state information relevant to the suspended application program as the PMI handler is exited. Then, at block 2314, the processor restores the selected CPU registers which were stored at 488 (FIG. 34), and then restores additional information by calling a routine which is shown in detail in FIGS. 62A–62D.

Referring to FIGS. 62A–62D, execution begins at block 2320, and proceeds to block 2322, where the processor restores the SCP by flushing its output buffer, sending the SCP a restore command, sending the SCP a count of the number of bytes which it will receive, and then sending the SCP the indicated number of bytes containing information which allows the SCP to restore its entire state, including its RAM 440 and its I/O ports. Then, at block 2324, the system sets up the LCD display. Initially, the system assumes that the CRT is active. In block 2324, it implements composite mode, and then checks the LC flag (FIG. 34) in the PMRAM in order to determine whether the active video unit was the LCD display. If it was, the SCP is instructed to switch to the LCD display and to turn it on.

Control then proceeds to block 2326, where the processor adjusts some internal registers which will allow it to reenter suspend mode in the event that, during a subsequent password check described below, the user is not able to enter the correct password and thus the system does not come up and run.

Then, at block 2328, the processor checks to see whether an external mouse or keyboard is present, and if so then the processor attempts to communicate with the device in order to determine whether it is in fact present and if it is not it prompts the user to install the device. If in checking the external device the processor receives a response, it assumes that an external keyboard is present. The processor then clears the screen, sets up the external keyboard, and instructs the SCP to disable the keyboard.

Then, at block 2330, the processor calls a routine which checks to see whether any passwords are in effect, and in particular whether there are passwords at 1060 and 1062 (FIG. 34), and if so prompts the user to enter one of the passwords. If neither password is entered correctly, the system reenters the suspend mode. However, if the user properly enters the necessary password information, control proceeds to block 2332, where the main processor checks to see if a floppy disk should be present in the floppy disk drive, which includes a check of the DF flag (FIG. 34). If a disk is suppose to be present, then the processor warns the user to make certain that the floppy drive contains the same disk which was present at the time of suspension, and waits for the user to type the letter "C" to instruct the system to continue, at which point the system continues and clears the screen.

Control then proceeds to block 2234, where the processor restores the state of the video subsystem. If the saved video information indicates that the video mode was 13H before suspension, then that video mode is implemented, whereas the video mode is set to 12H if it had any other value before suspension. The screen is then turned off, and then the video RAM data saved at 478 (FIG. 34) is decompressed and restored to the video RAM 448 in the video controller 318. Then, the video registers 446 in the video controller 318 are restored, and control proceeds to block 2336. In block 2336, the state of the numeric coprocessor is restored if the numeric coprocessor is plugged into the slot 1006 (FIGS. 33A–33D), and then at block 2338 the main processor instructs the SCP to turn on power to the modem 322.

Then, at block 2340, the processor checks the PMI configuration information at 1058 to see if the user has specified that the floppy disk drive is to operate in full auto-mode, which has been described previously. If so, then at block 2342 the processor powers up the floppy disk drive and reloads its registers from the shadow register information present at 486 (FIG. 34) in the PMRAM. On the other hand, if it is determined at block 2340 that the floppy disk drive is not to operate in full auto-mode, then at block 2342 the processor checks whether the floppy disk drive motor is on, and if so reloads a floppy disk controller timer, and if not ensures that the floppy disk drive is powered down and that the floppy disk controller interrupt is disabled.

From each of blocks 2342 and 2344, control proceeds to block 2346, where the system interacts with the floppy disk drive 327 in a manner setting a disk change bit in the disk drive 327. Consequently, when operation of the suspended application program is eventually resumed, and when that application program attempts to interact with the floppy disk drive, the indication in the floppy drive that a disk change has occurred will cause the operating system to reread the file allocation table (FAT) on the disk and update an image of the FAT it is maintaining in main memory. Thus, if the user has placed the wrong disk in the floppy disk drive, the application program will be operating with a FAT which is consistent with the disk actually present in the drive. This avoids a situation in which the application program is attempting to access a disk currently present in the drive using FAT information in the image which was drawn from the disk which was previously present when the suspend occurred.

Thereafter, control proceeds to block 2348, where the processor restores the information saved at block 2032 in FIGS. 54A–54B, namely the interrupt table, certain ROM data and the monitor RAM. Then, at block 2350, control returns to block 2314 in FIGS. 61A–61B, from which it proceeds to block 2354. At block 2354, the processor resets the resume flag 383 (FIGS. 33A–33D), and then at block 2356 the processor restores to the SCP the information which was saved at block 2012 in FIGS. 53A–53D. Then, at block 2358 the system checks to see if an external keyboard was present when the system was suspended, and if so then at block 2360 the processor provides the SCP with the keyboard status which was saved at block 2010 in FIGS. 53A–53D. At block 2362, the processor restores to SCP the output buffer information which was saved at block 2004 in FIGS. 53A–53D.

Then, at block 2364, if the TV flag (FIG. 34) indicates that time and date are supported by the operating system, the processor obtains the correct time and date from the real time clock circuit 376 (FIGS. 33A–33D), and updates the time and date information present at 472 (FIG. 34) in the operating system. Then, at block 2366, the processor restores to the hard disk drive 323 the status information which it obtained and saved at block 2048 in FIGS. 54A–54B. Control then proceeds to block 2368, where the processor executes a return instruction. This causes the processor to return to the routine of the PMI handler which, prior to entry into the suspend mode, initiated the sequence of steps which led the system into the suspend mode. Ultimately, control will return to the PMI handler routine shown in FIGS. 35A–35C, where the system will eventually exit at 1124 and thereby return to the application program which was interrupted for the suspend state.

Figure 63:
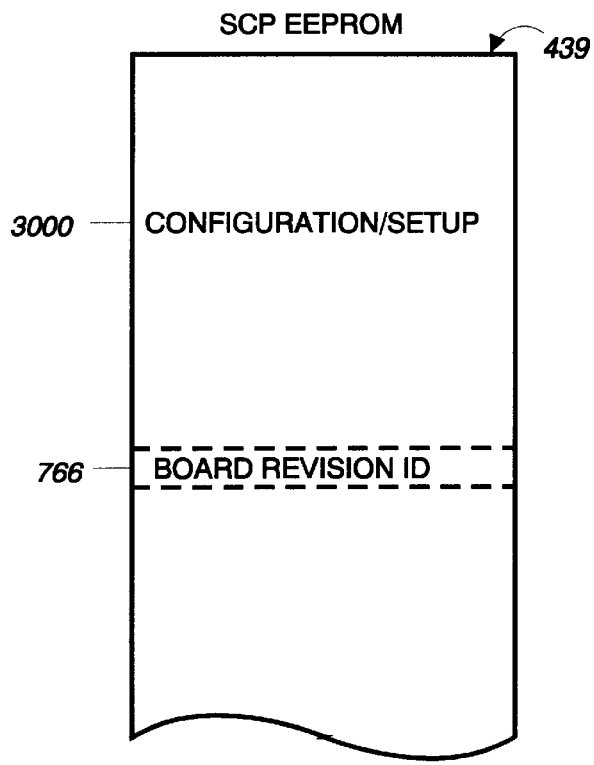
FIGS. 63 and 64 are diagrams representing the organization of respective memories used in an auxiliary processor which is a component of the system of FIGS. 33A–33D.

Turning now to the system control processor (SCP) 316, FIGS. 63 and 64 show memory maps applicable to the SCP. In particular, FIG. 63 shows that the EEPROM 439 includes a portion 3000 which contains configuration and setup information, and includes a board revision ID 766. FIG. 64 shows the SCP RAM 440. Some of the information in the RAM 440 is equivalent to that discussed for the previous embodiment in association with FIG. 28, and has been designated with the same reference numerals. Only elements which are new will be described here. In particular, the RAM 440 includes a location 3002 which contains a battery timer, a location 3004 which contains a packet count, a location 3006 which contains a saved packet count, and a location 3008 which contains a pointer to the QUEUE 786. The flags location 781 includes some additional flags, in particular an SU flag to identify a suspend condition, a DA flag to indicate that a device control line (which is the CPUSUREQ line in FIGS. 33A–33D) is active, an NR flag to indicate a no response condition, a BE flag to indicate that a beep is to be emitted, an SC flag to indicate that transmission of scan codes is enabled, a KM flag to indicate whether an external input device coupled to the system is a keyboard or a mouse, an OF flag to indicate that other functions are to be checked in a manner described later, and a BC flag to indicate that the battery voltage is to be checked.

The program executed by the SCP 316 is shown in FIGS. 65A–74K. The program in these figures is stored in ROM 437 within the SCP microcontroller 316.

Figure 65A:
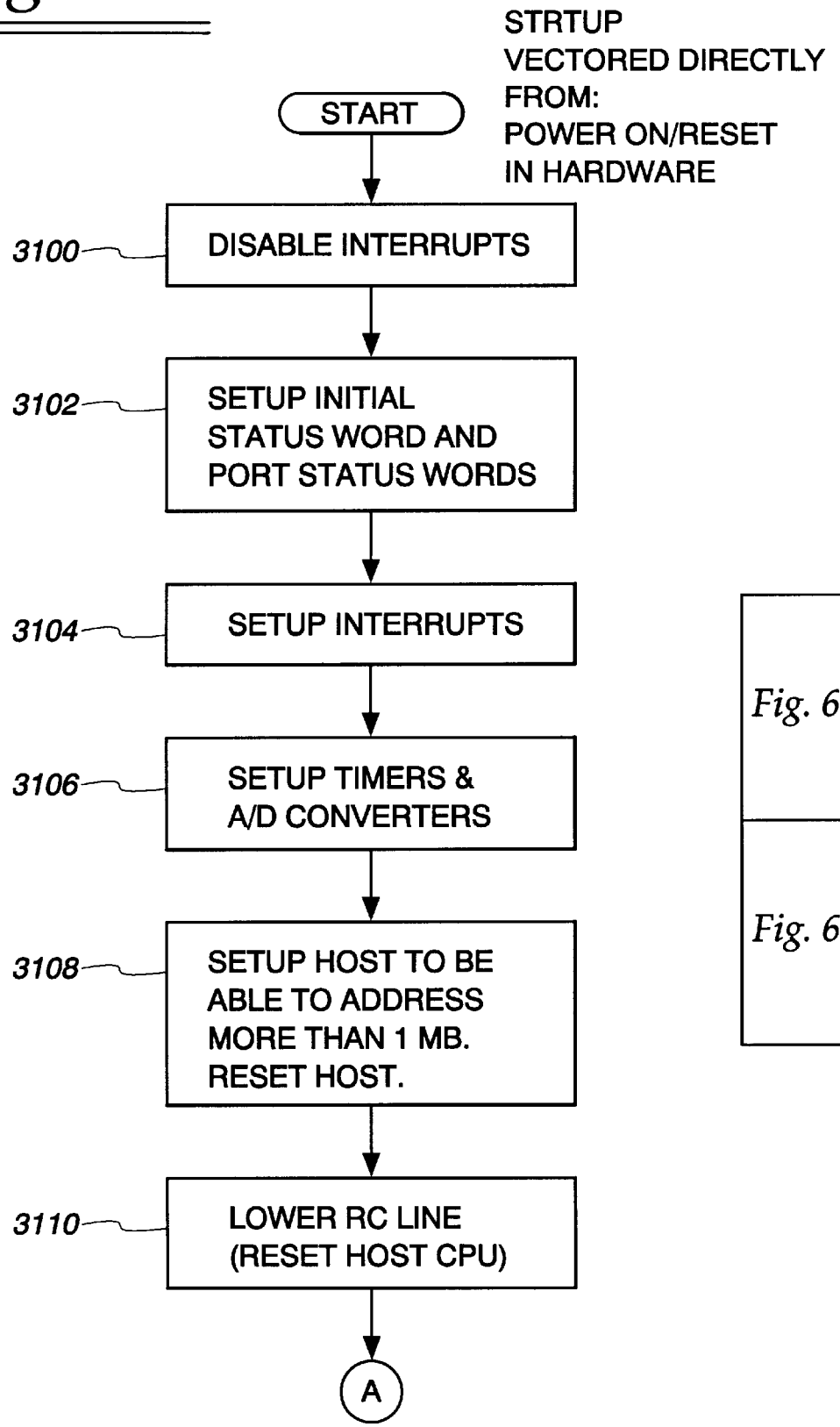
FIGS. 65A–74K are flowcharts showing respective portions of a program executed by the auxiliary processor.
Figure 65B:
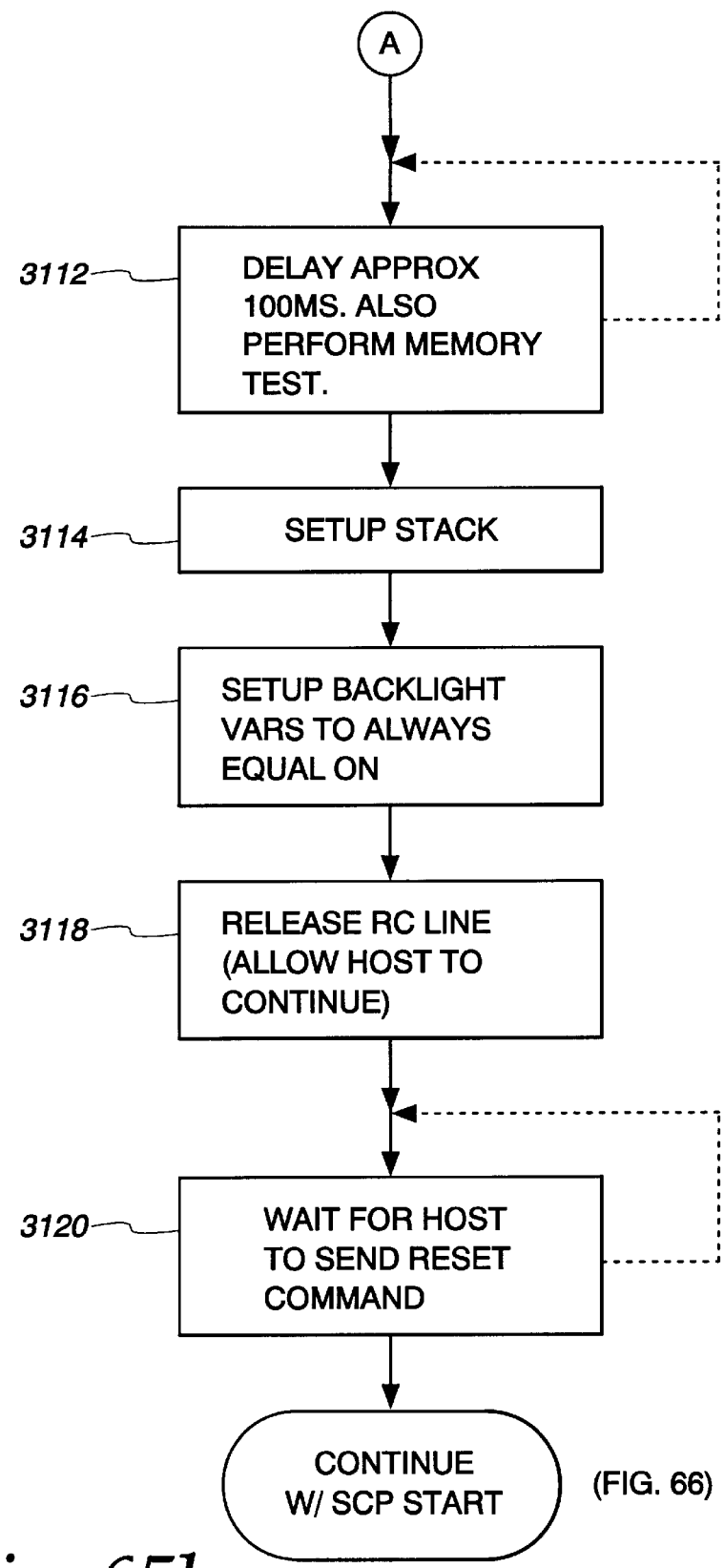

FIGS. 65A–65B describes the process performed upon initial powerup reset. The first step 3100 is to disable all interrupts so the SCP 316 can perform its initialization function without interruption of any kind. Next, the SCP 316 sets its own internal status word and port status words 3102. Next, the interrupt mask is set at 3104 for when interrupts are again allowed. All of the timers are set up and the analog-to-digital (A/D) converter 416 is set up at 3106. The next step 3108 is to set the address 20 line in the address space of the main processor or "host" CPU 311, which causes the CPU 311 to go into protected mode and allows it to address more than one megabyte of memory 326.

The host reset line (RC) is then set at 3110 to reset the host CPU. A memory test is then performed at 3112, which writes and reads selected memory locations to assure the proper functioning of the internal RAM 440. A delay is added at this point to allow the host CPU 311 to complete its reset function. The internal stack 787 is then set up in the SCP's RAM space 440 in step 3114. The backlight variables are set to ON at 3116. It should be noted that this does not actually turn on the LCD backlight, but only sets a variable which will be read at a later time. At 3118, the host reset line RC is released, allowing the host to begin operating. At step 3120 the SCP waits for the CPU 311 to return a reset command. This ensures that the SCP 316 and CPU 311 are operating in synchronization.

Figure 66A:
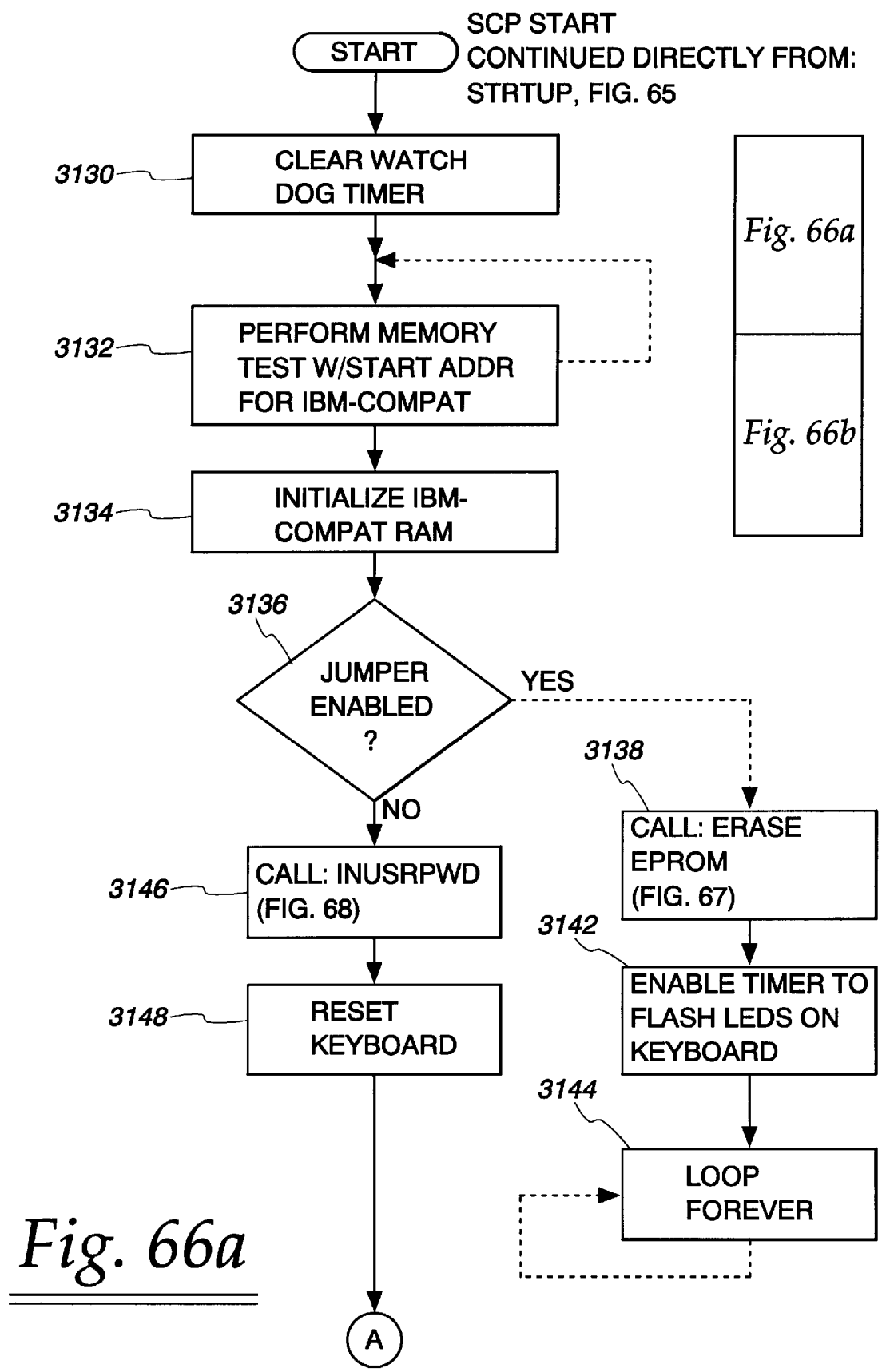
Figure 66B:
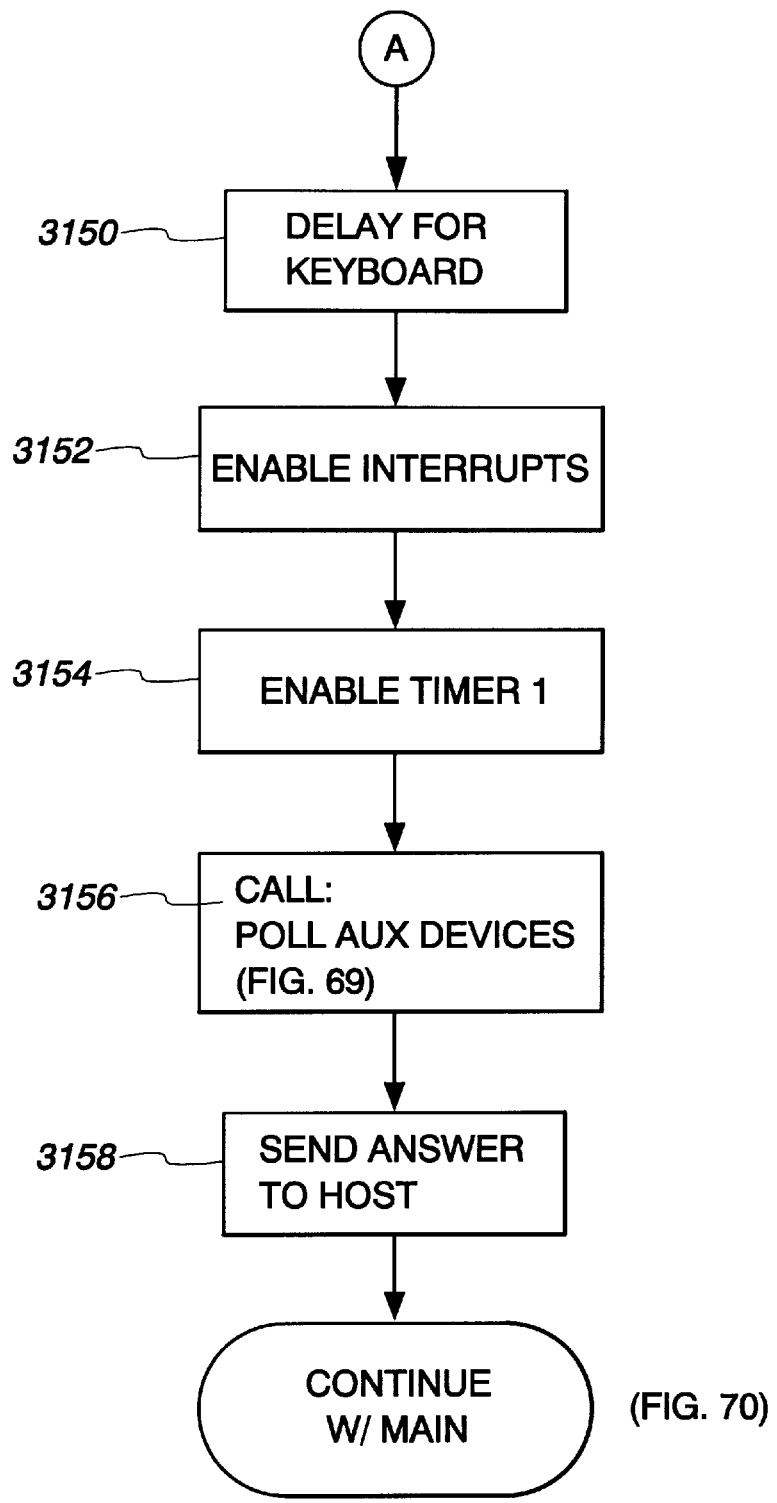
Figure 67:
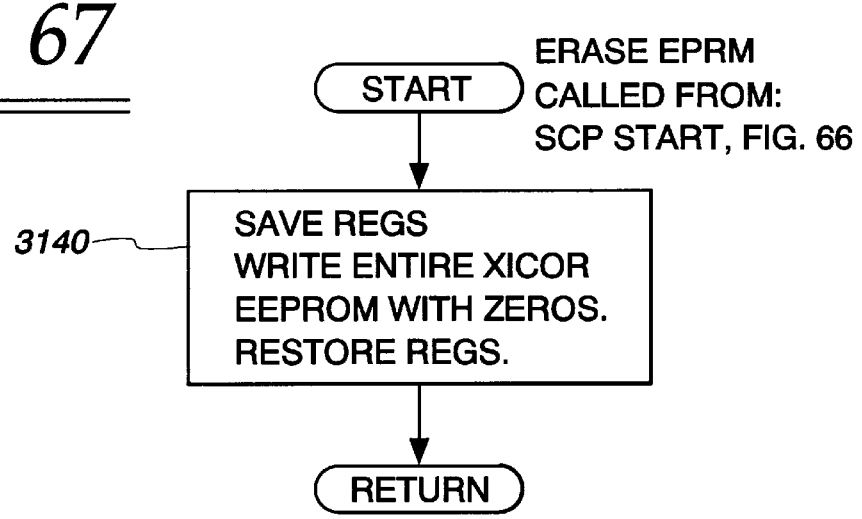

The process flows directly from step 3120 to step 3130 in FIGS. 66A–66B. Step 3130 resets the watchdog timer 1012 inside the SCP. The memory is then again tested at 3132 and is configured for 8088 compatibility.

The computer of the preferred embodiment provides a dual level password system with both user and supervisor passwords. If the passwords are activated, either the user or supervisor password is required to change the configuration information for the computer. The dual level password provides for the lending of the computer without concern about losing the password. The supervisor can set the supervisor password and the user password. The supervisor can then give the user password to a user and the user can set the configuration options as well as change the user password. However, when the computer is returned, the supervisor can enter the supervisor password without concern for what the new user password is and change the user password back or to a new password.

However, a problem still arises if the supervisor password is lost or forgotten. The preferred system provides for the addition of a jumper to the circuitry of the SCP 316 which, when the system is powered up with the jumper in place, causes the EEPROM memory 439 to be erased so that the supervisor and user passwords are cleared. Step 3136 checks to see if that jumper is enabled. If so, the process branches to step 3138, which calls the subroutine described in FIG. 67. In that subroutine, all memory in the EEPROM is erased at 3140. Once the EEPROM is erased, flashing of the LED's is started at 3142 and the system goes into an endless loop at 3144 until the technician notices the flashing LEDs and powers off the computer. At this time he can remove the jumper and reboot the computer. Both passwords will be cleared and they can be freely set as they were when the computer was new. If the jumper is not present at 3136, the process branches to step 3146, which is a call to the password initialization routine described more fully in FIG. 68.

Next, at 3148 the keyboard controller 443 variables are reset. There is a slight delay 3150 for the keyboard controller 443 to complete this process. At this point the set-up and initialization routine is complete and interrupts are reenabled at 3152. Timer 1008 is enabled in step 3154, and auxiliary devices are polled to determine which devices are present at 3156, in a manner shown in FIGS. 69A–69B. At this point, the SCP 316 responds to the CPU 311 that it is ready at 3158.

Figure 68:
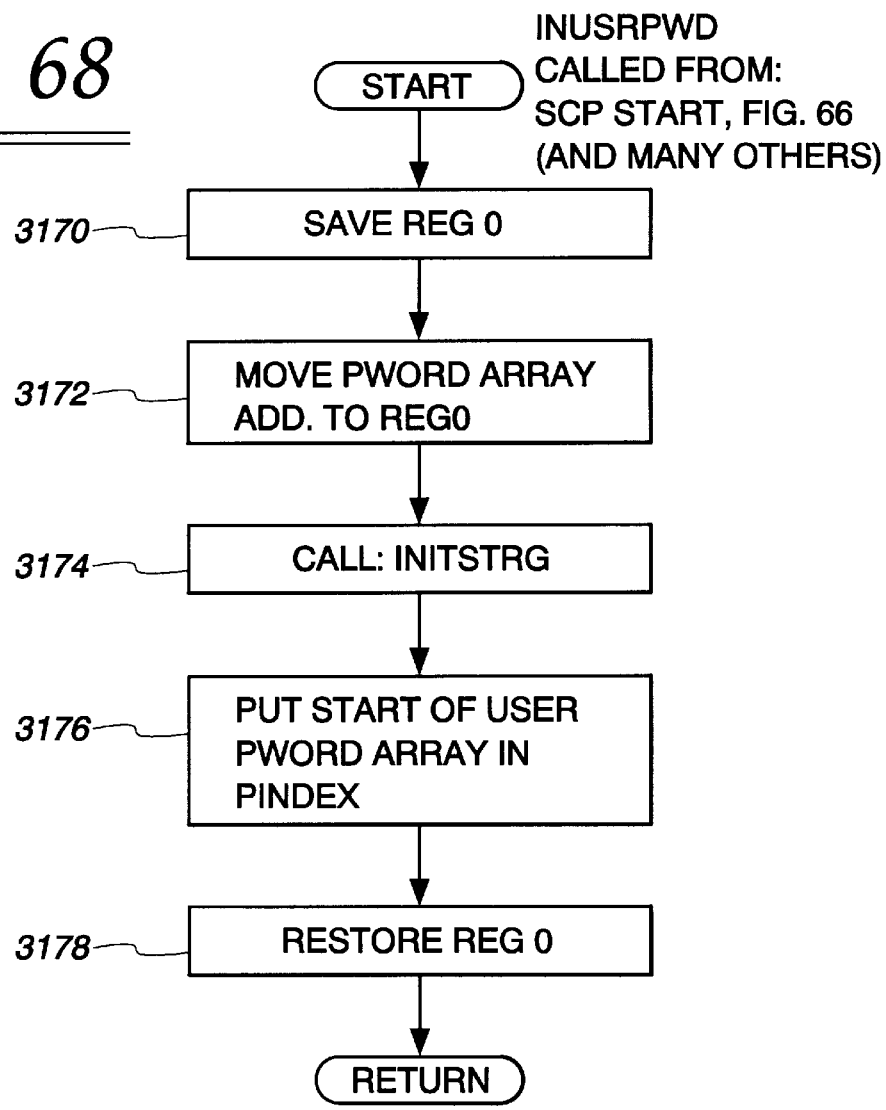

FIG. 68 shows the password initialization routine. The process begins by saving a register at 3170, moving the password array address to the register at 3172, initializing the password memory location to zero at 3174 and loading the password array address into memory at 3176, and restoring the registers at 3178.

Figure 69A:
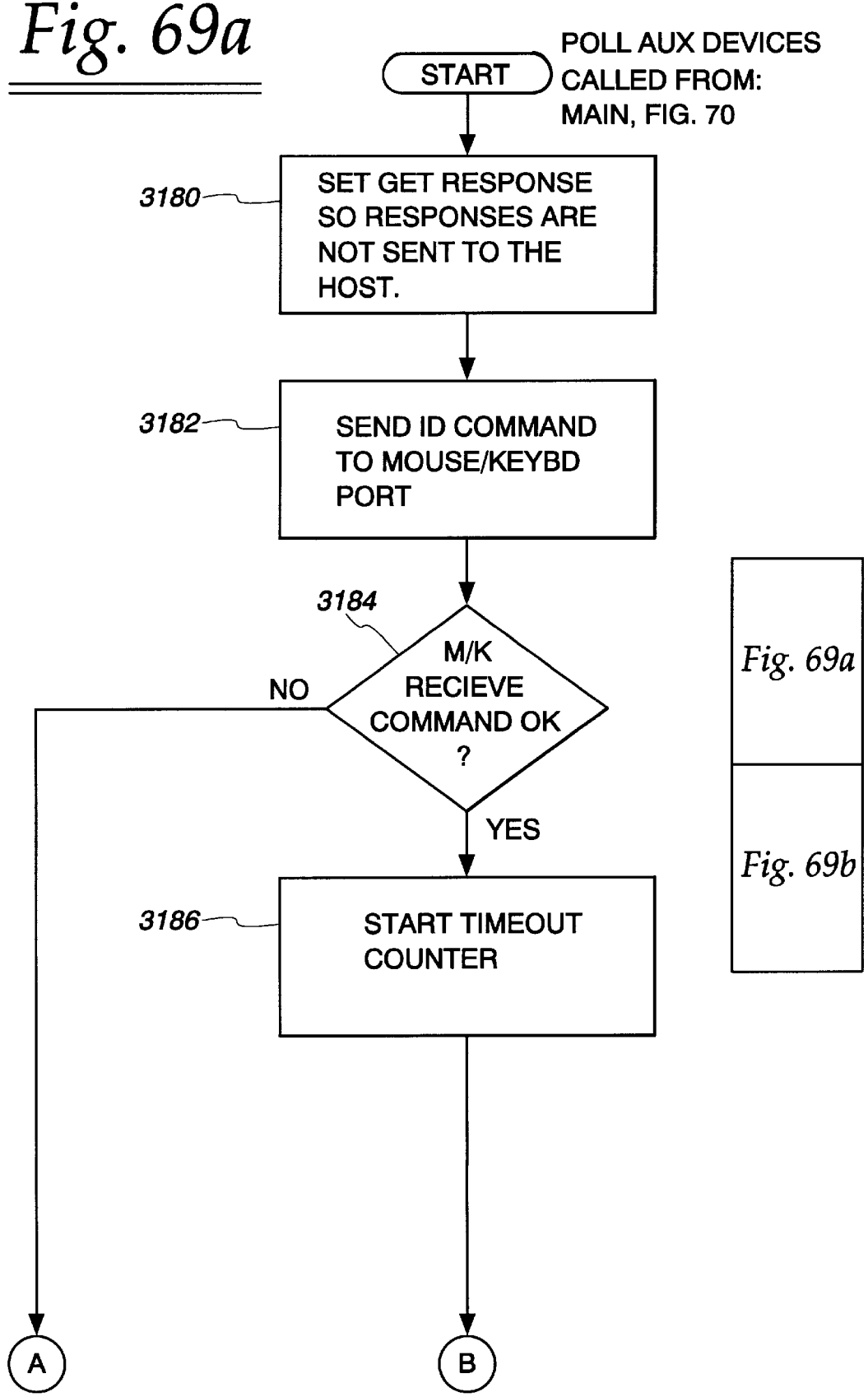
Figure 69B:
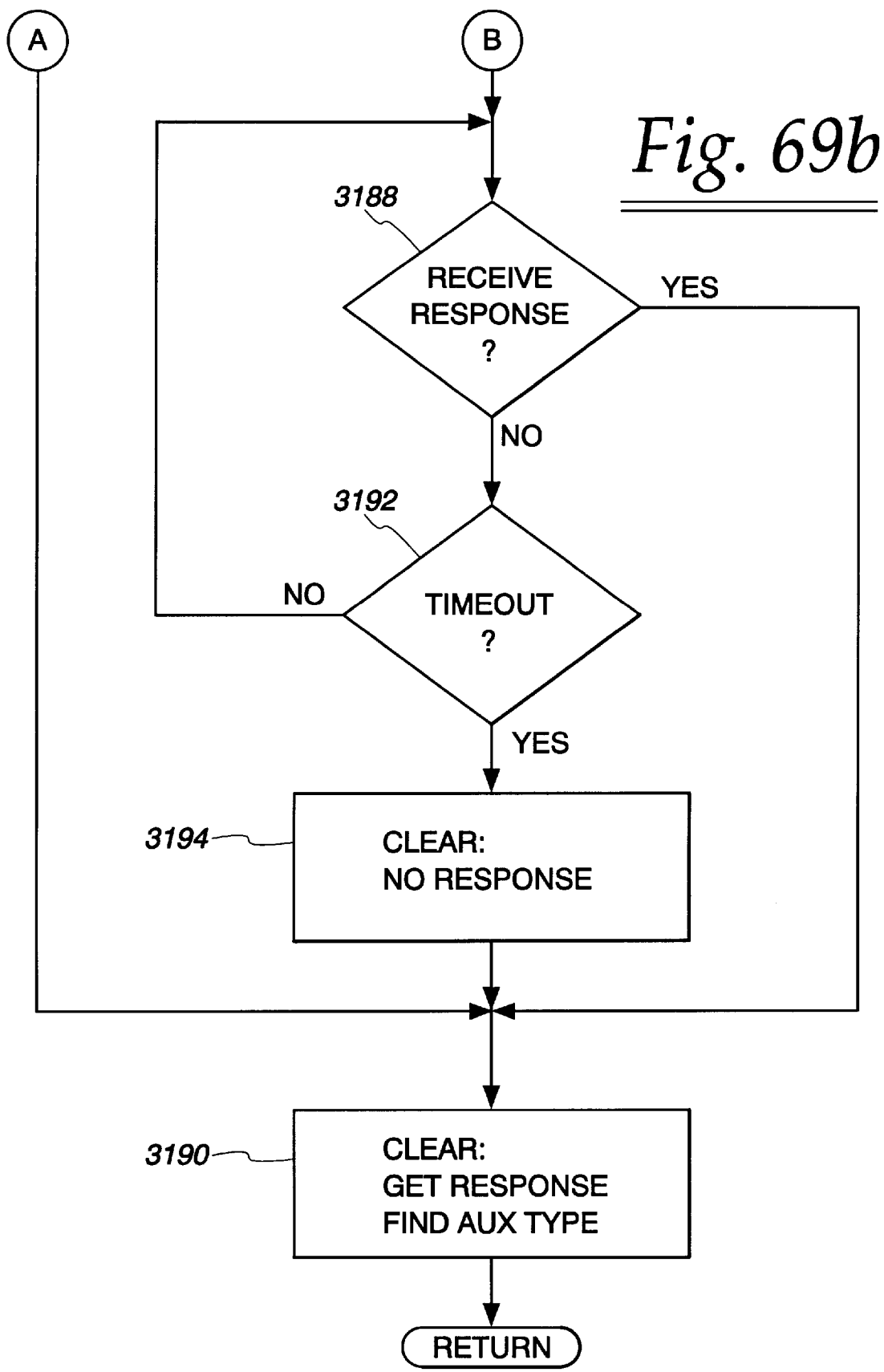
Figure 70C:
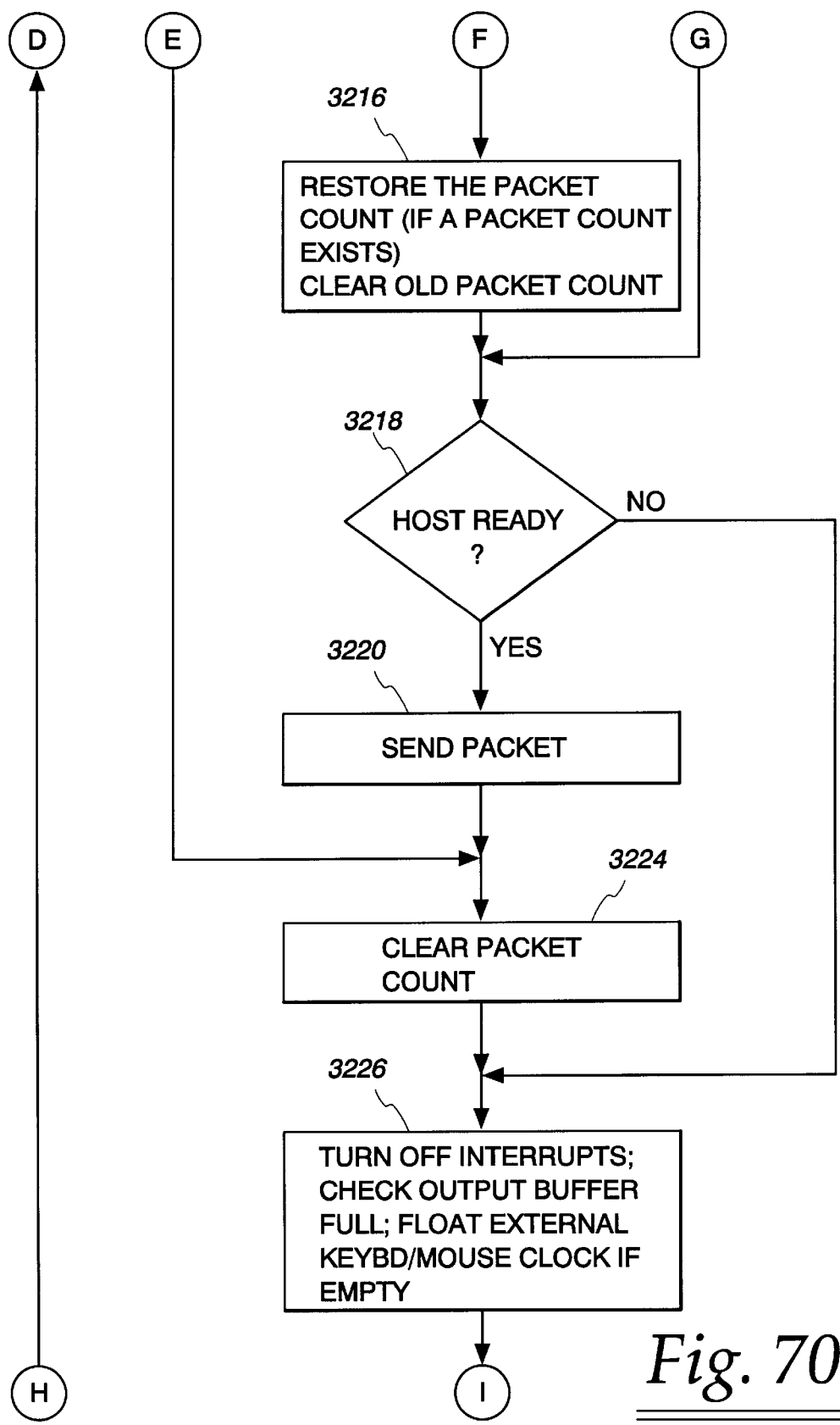
Figure 70D:
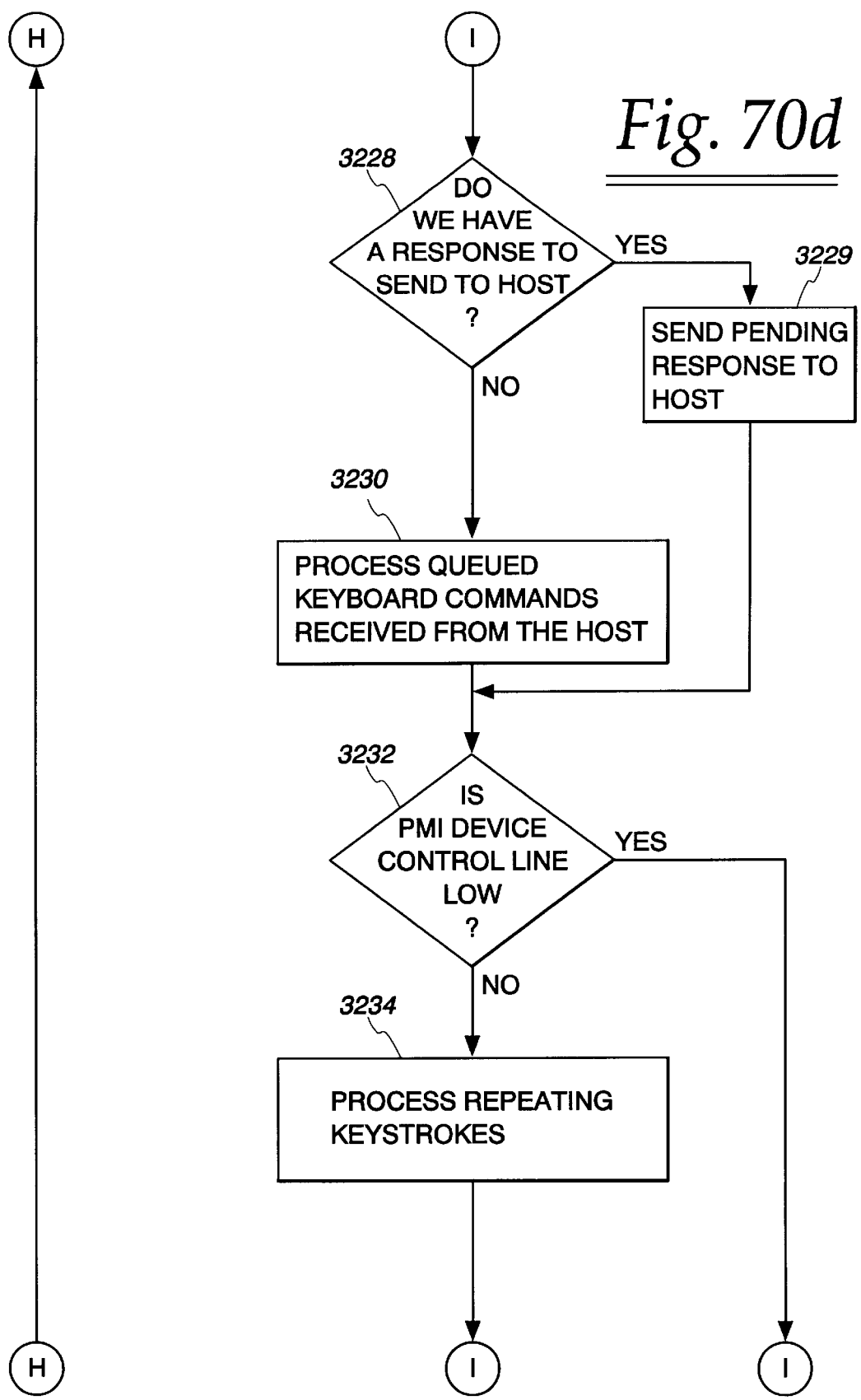
Figure 70E:
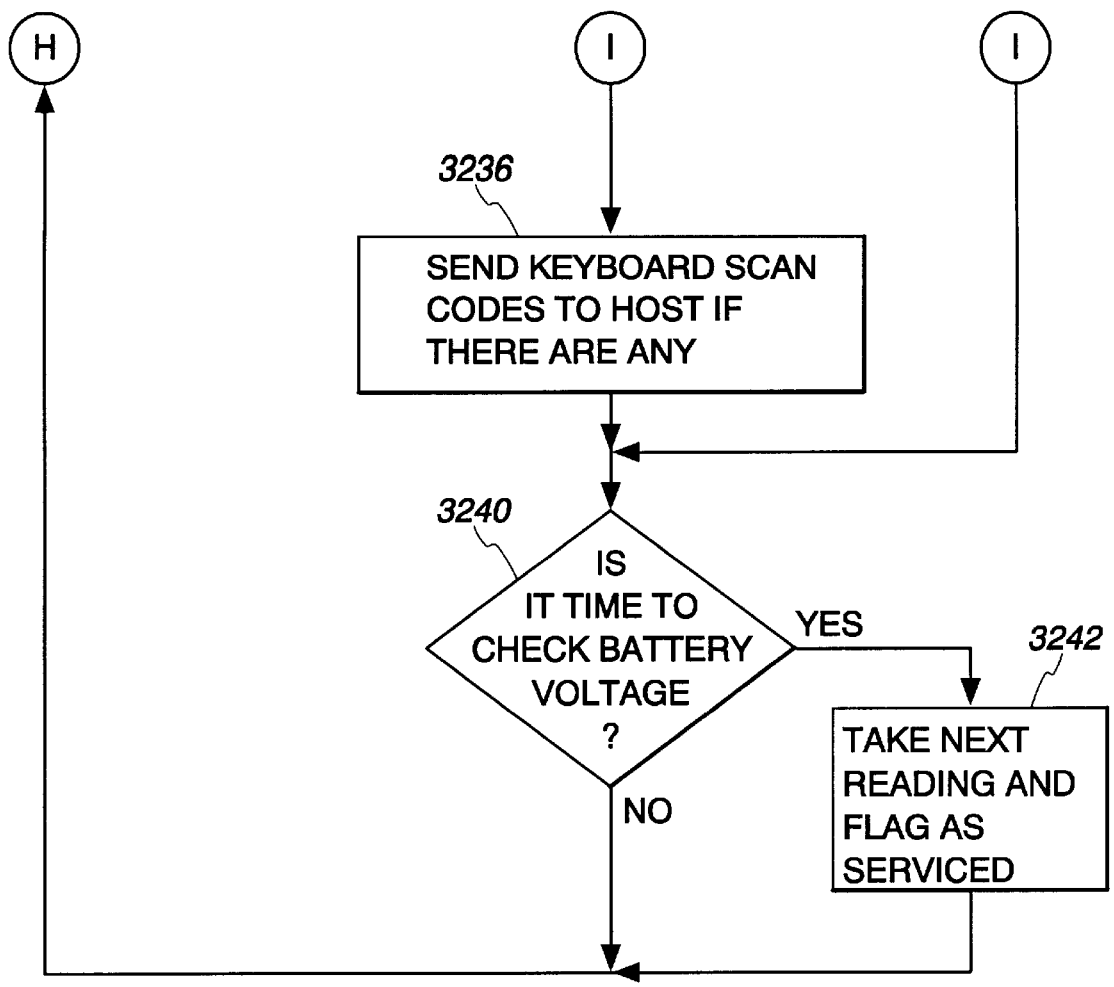

FIGS. 69A–69B shows the process of polling the auxiliary devices, namely the keyboard and the mouse. This routine is called by the main routine described in FIGS. 70A–70E, as well as by the startup routine described in FIGS. 66A–66B. The process begins by disabling communications with the CPU 311 by asserting a busy signal on the output port at 3189. A read command is then asserted on the port connected to the mouse or keyboard 317 in step 3182. If the command is received at 3184, a timeout counter begins to count down at 3186. If a response is received at 3188, the response is accepted and the type of device is identified at 3190. If a response is not received at 3188, the timeout timer is checked at 3192 and the process loops back to step 3188. This loop continues until either a response is received at 3188 or the timeout counter counts down to zero at 3192, in which case the "no response" flag is set and the subroutine returns to either the main routine described in FIGS. 70A–70E or the startup routine described in FIGS. 66A–66B.

FIGS. 70A–70E depicts the main routine, where the SCP 316 loops continuously during normal operation. The first step 3200 is to determine if a new external device has been plugged in. If so, the poll auxiliary device routine is called at 3202, which is described more fully in association with FIGS. 69A–69B. Steps 3204 through 3210 provide for debounce of the device control request line CPUSUREQ from the host CPU 311. The SCP 316 is so fast in comparison with the movement of a human finger that many loops through the main routine will occur between the times when the key is pressed and that key is released.

The state of the device control line is saved from loop to loop. The previous state of the request line is checked at 3204, and the current state is checked at 3206 and 3210. If both are low, meaning the singnal is actuated, the mouse/keyboard status is saved at 3208 and then reset, and the input buffer full (IBF) state is saved. If the request line has just been deactuated, control proceeds from block 3204 through block 3206 to block 3218. If the request line has just been actuated, control proceeds through block 3204 and block 3210 to block 3218. When both checks reveal that the request line is deactuated, control proceeds from block 3204 through block 3212. Since the request line is deactuated, indicating that the SCP 316 is not presently handling a command from the main processor 311, the SCP sets up for normal communication with the main processor. In particular, the input buffer full (IBF) flag, the queue and the queue pointer are all restored. The status port is read, cleared and updated of all but the system flag. The keys OK flag is cleared, and the device control active flag is set. Next the resume flag is checked in step 3214.

If the RESUME flag is set at 3214, the keyboard and mouse packet count is saved in step 3222 to be restored after the external PMI. If the RESUME flag is not set, the saved keyboard and mouse packet circuit is restored in step 3216. Next, the system determines if the host is ready to receive data at 3218 and if so, sends the data packet to the host 3220. Next, the system clears the packet count at 3224. In step 3226, interrupts are turned off and the output buffer is checked for data. If it is empty, the external keyboard mouse clock is placed in a condition so that the SCP 316 can receive data from an external keyboard or mouse 421. If there is data to send to the host at 3228, the data is sent in step 3232. If not, any pending keyboard commands are processed 3230.

The request line is checked again at 3232. If it is high, repeating keystrokes are processed at 3234 and keyboard scan codes are sent to the host at 3236. If a key is held down for a predetermined amount of time, the keystroke is automatically repeated. This allows multiple keystrokes without lifting the key and pressing it again. Periodically, the battery voltage is read by the A/D converter 416 in steps 3240 and 3242. The SCP 316 then returns to step 3200 and repeats the loop indefinitely.

Figure 71:
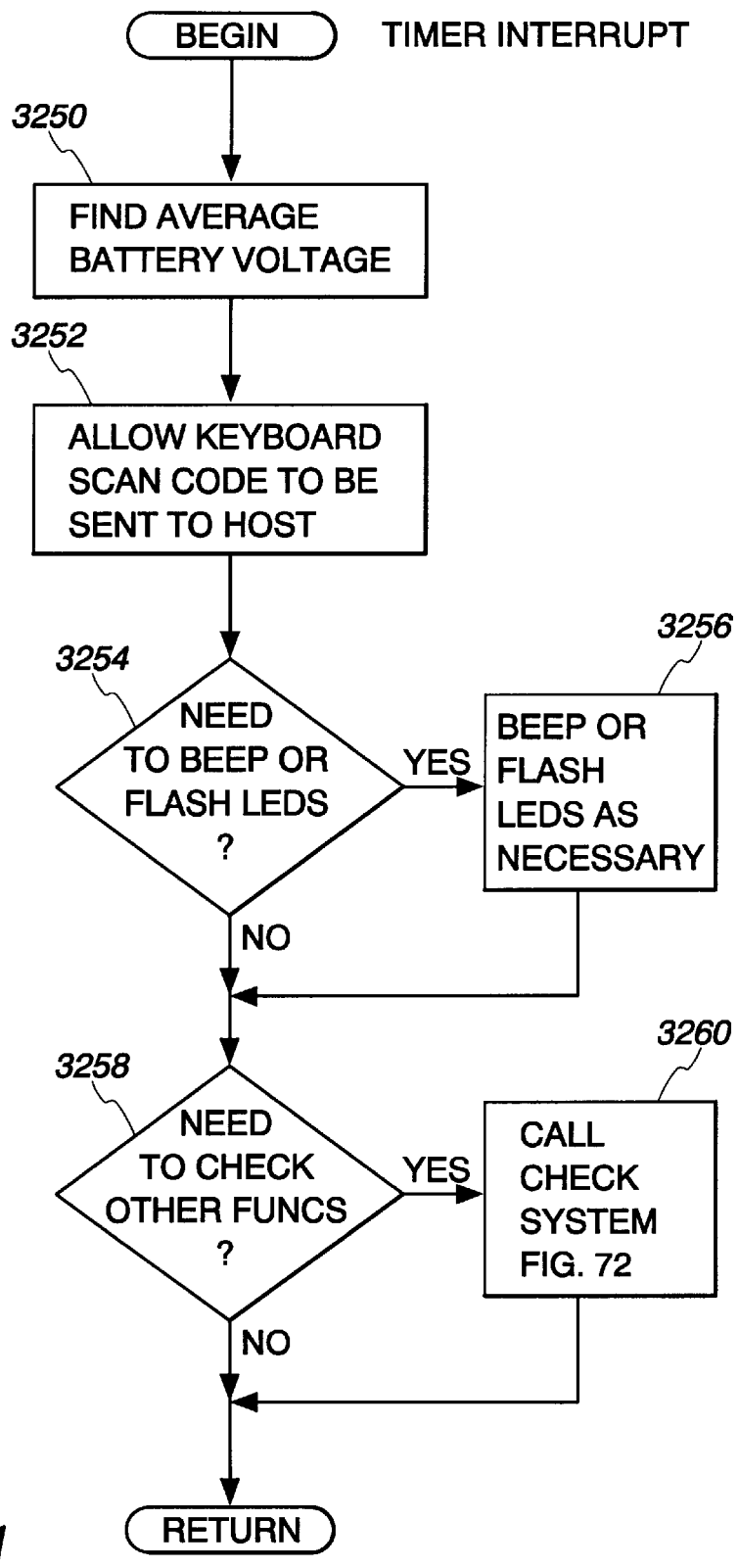
Figure 72A:
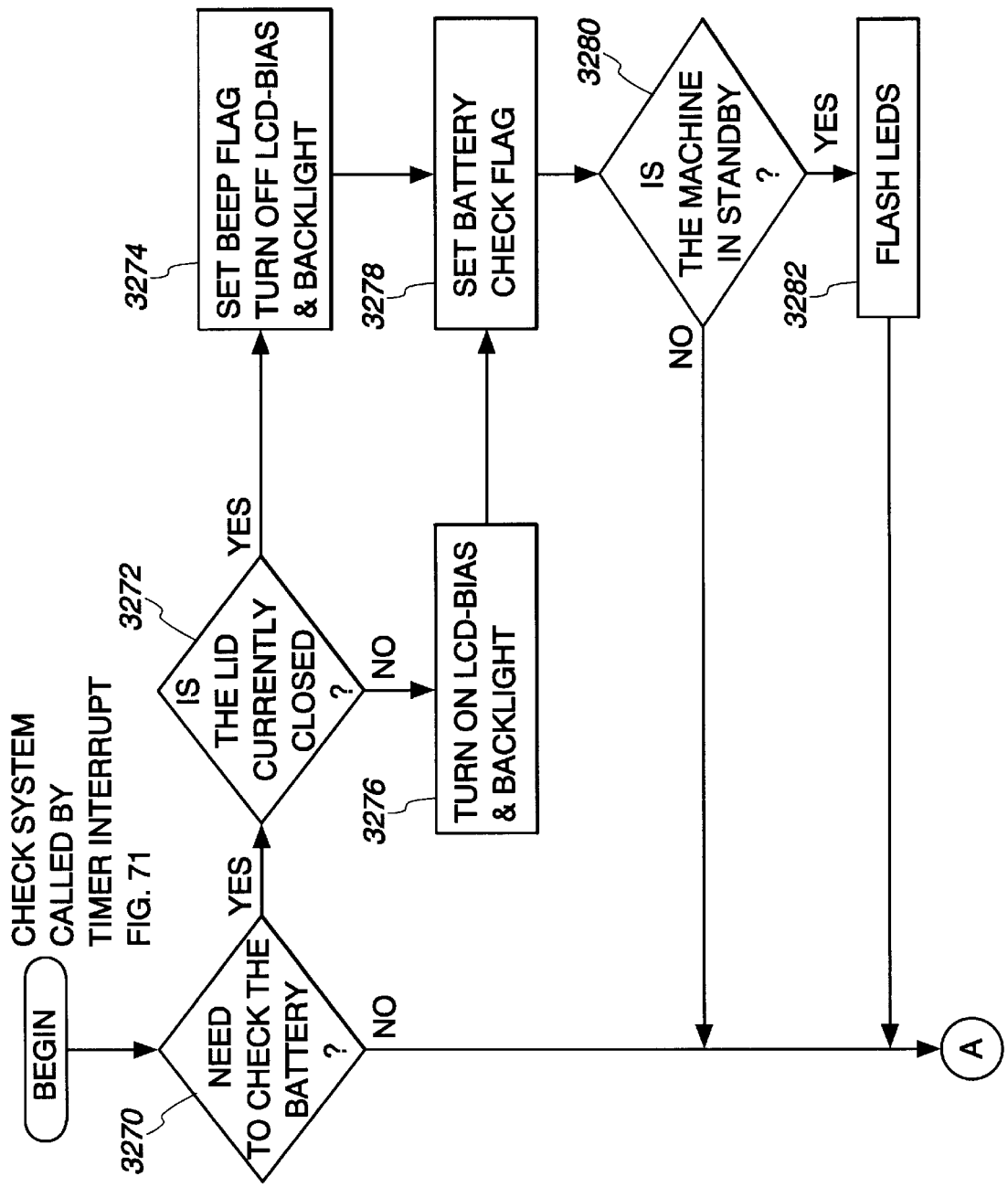
Figure 72B:
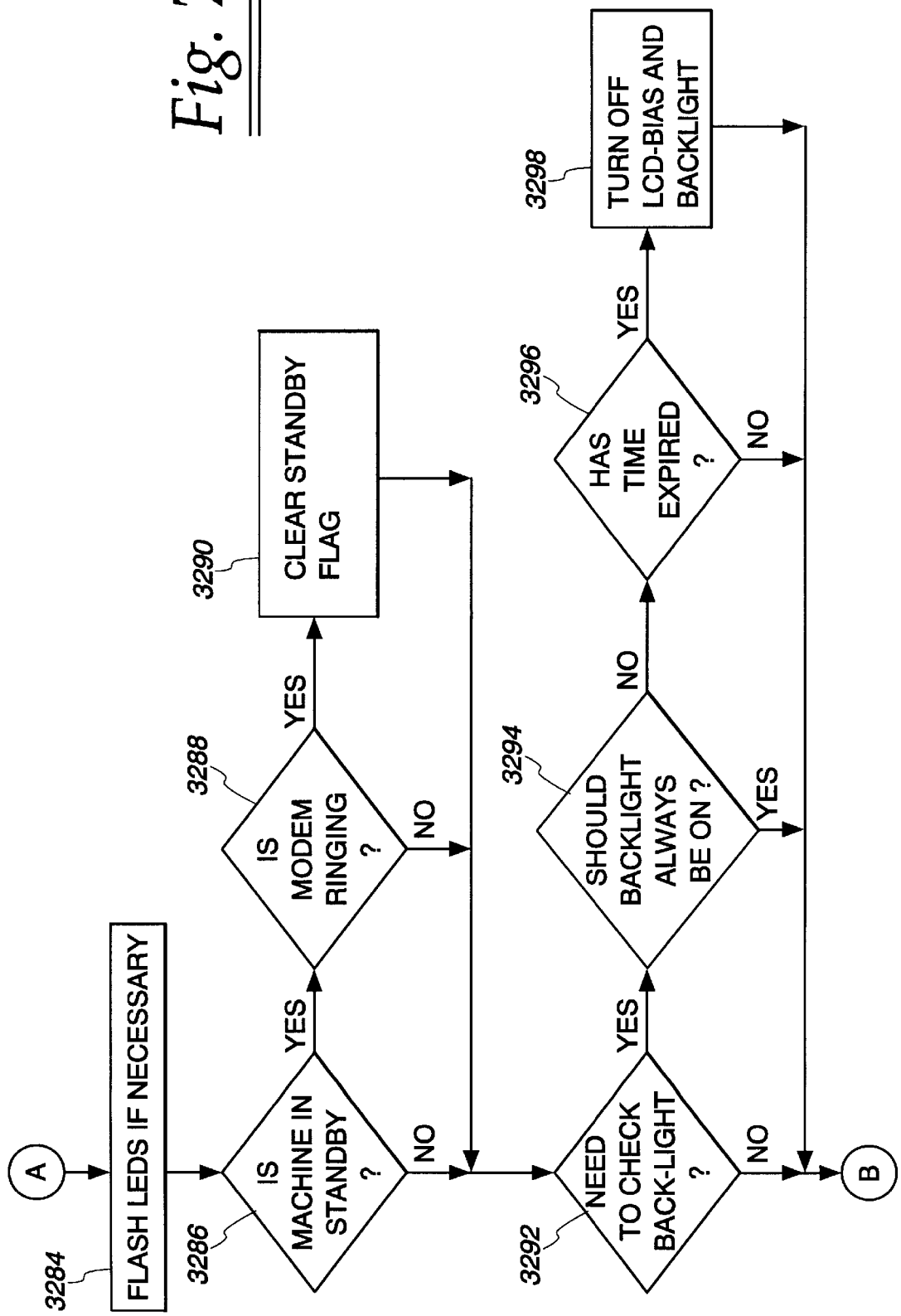
Figure 72C:
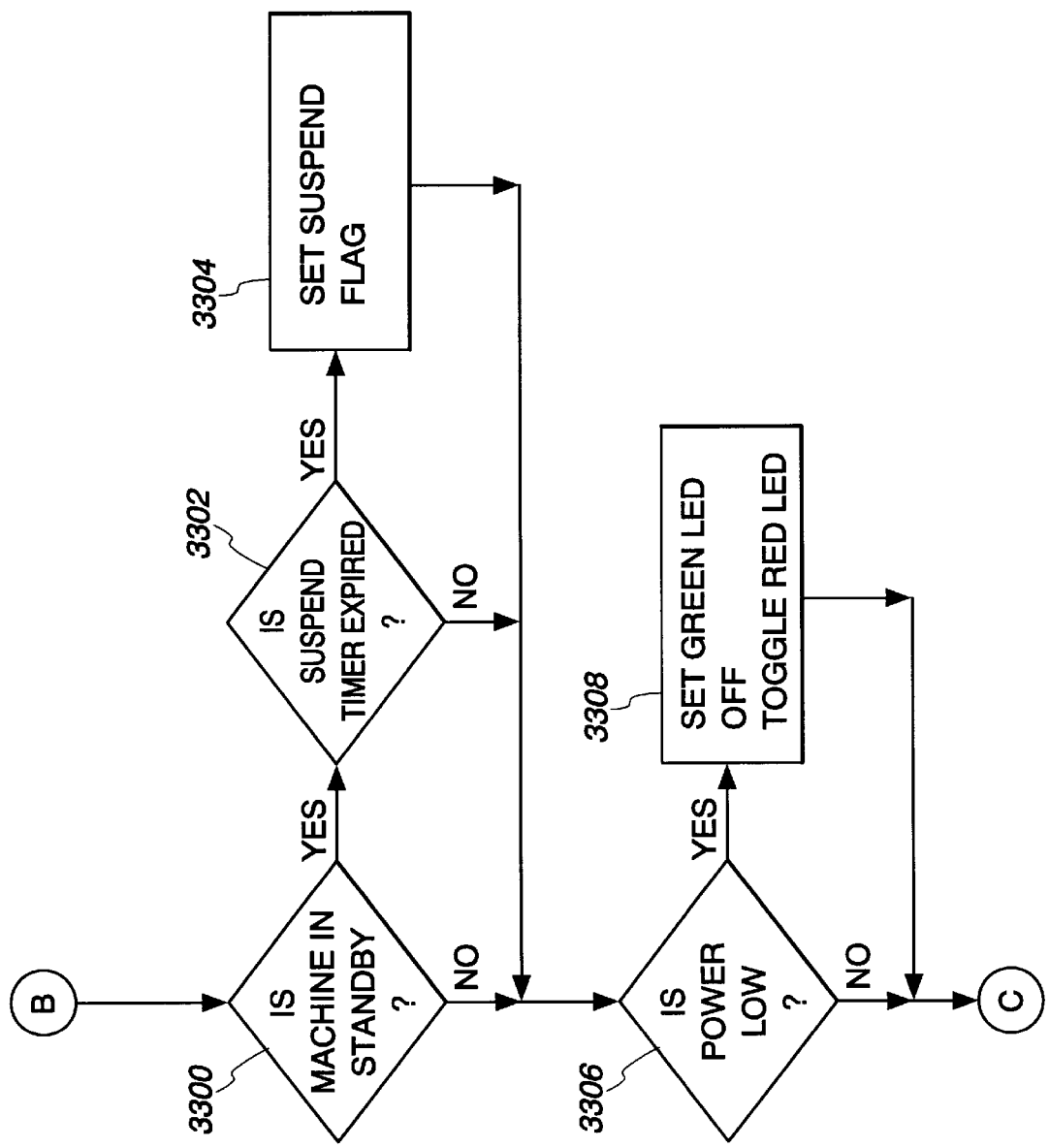

FIG. 71 shows the timer interrupt routine. A timer interrupt occurs every millisecond when timer 1 (FIGS. 33A–33D) expires. First, the average battery voltage is determined at 3250. This step is described in detail in U.S. Pat. No. 5,027,294 entitled "Method and Apparatus for Battery Power Management Using Load Compensated Monitoring of Battery Discharge". Keyboard scan code transmission to the host is enabled at 3252. If the battery voltage is low or there is another error condition in the battery or the charging system as determined in step 3254, the power and/or charge LEDs are flashed and the system beeps at 3256. The beep can be disabled as described in the pop-up/set-up section. If other system functions need to be checked at 3258, the check system subroutine is called 3260, and is shown in FIGS. 72A–72D.

FIGS. 72A–72D shows the system check and is called by the timer interrupt routine described in FIG. 71. Step 3270 determines if it is time to check the battery. This is determined by a down counter which is designed to check the battery every 0.1 seconds. If it is time to check the battery, the system must first check to see if the lid is open or closed at 3272. If the cover is closed, the system beeps to alert the user at 3274. If not, the LCD 321 and backlight 431 are turned on at 3276. In either case, the battery is checked in step 3278 and the battery check flag BC is set. If the machine is in standby mode at 3280, the LEDs are set to flash at 3282. Only if there is a battery low condition, the power LED is flashed 3284. If the computer is in standby mode at 3286 and the modem is ringing at 3288, the standby flag is cleared at 3290 so that the CPU 311 will change to run mode and process the request from the modem.

Next, the system checks to determine if it is time to turn off the backlight 431 at 3292. The SCP 316 checks for backlight timeout every half second by use of a down counter. If it is time to check the backlight 431 at 3292, the SCP 316 first checks the configuration information to see if the backlight 431 is always on at 3294. If not, the SCP 316 checks the backlight timer for expiration at 3296. If the timer has expired, the LCD panel 321 and the backlight 431 are turned off at 3298.

If the machine is in standby at 3300, the SCP 316 checks the suspend timer for expiration at 3302. If the suspend timer has expired, the suspend flag is set at 3304. If the battery is low at 3306, the power LED flashes red at 3308.

The SCP 316 next checks the configuration information to find out whether the beep is turned off or on at 3310. If enabled, and if the power is low or the lid is closed at 3312, the computer beeps fast at 3314. Otherwise, it beeps regularly at 3316.

Figure 73A:
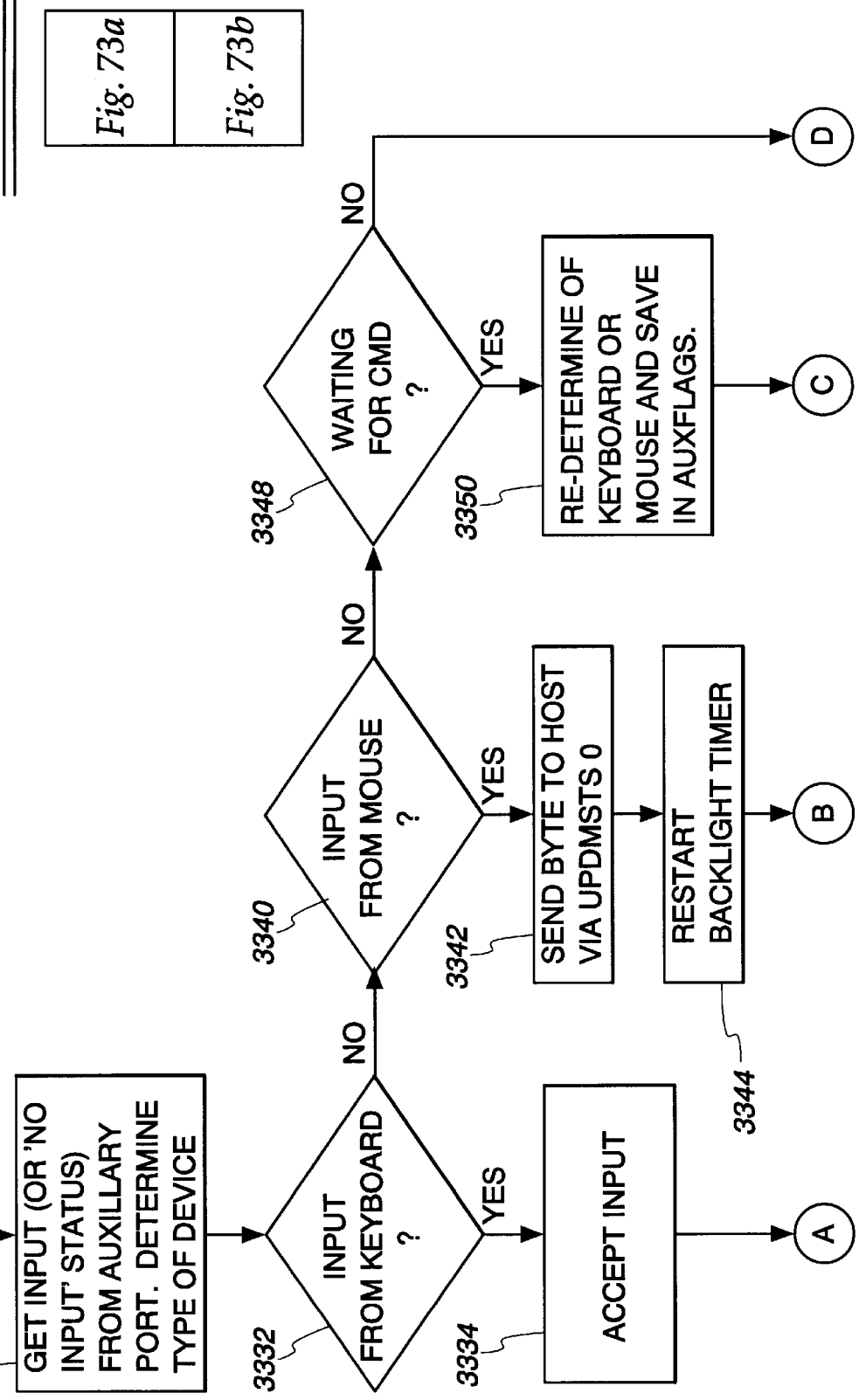
Figure 73B:
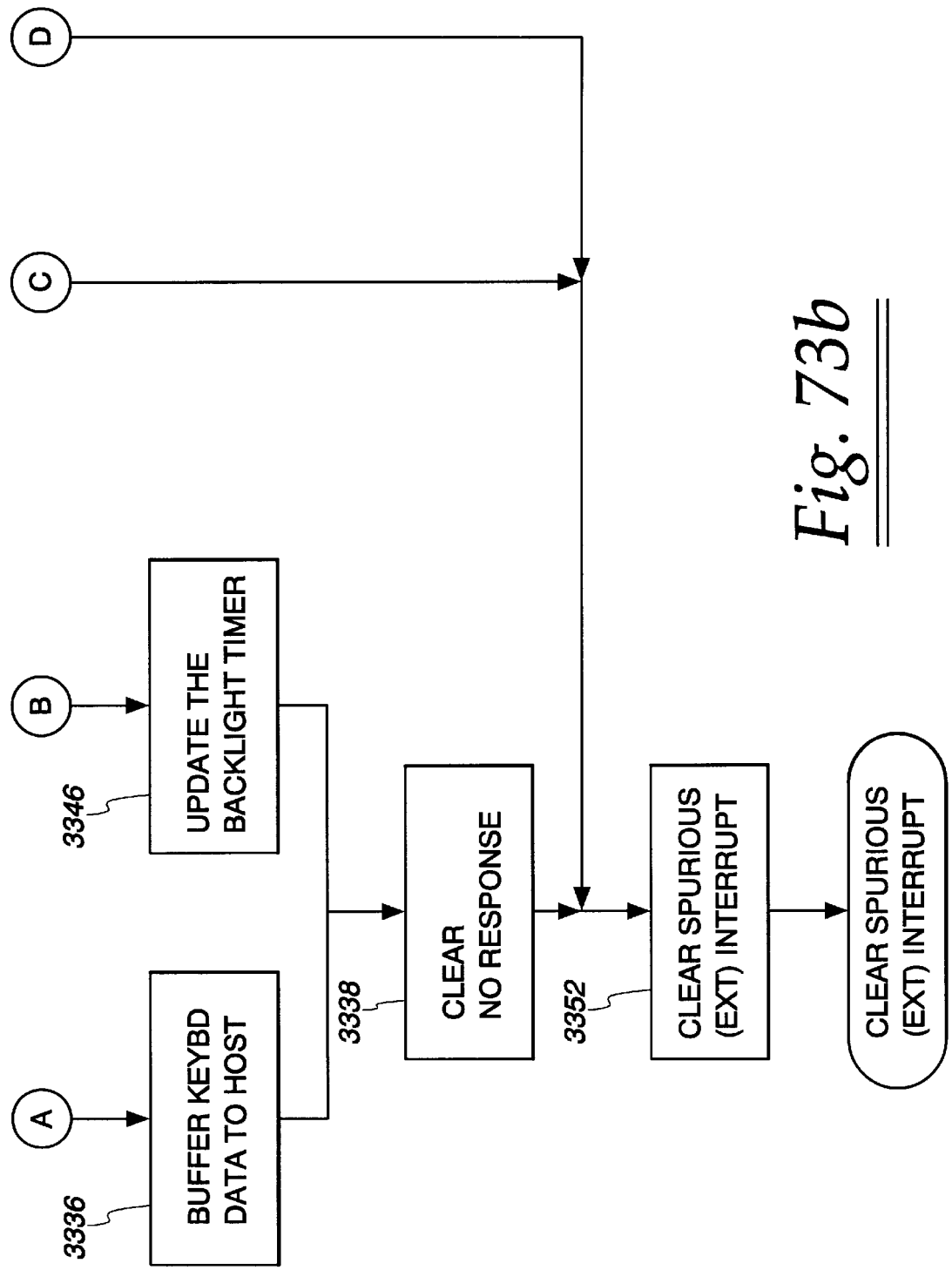
Figure 74A:
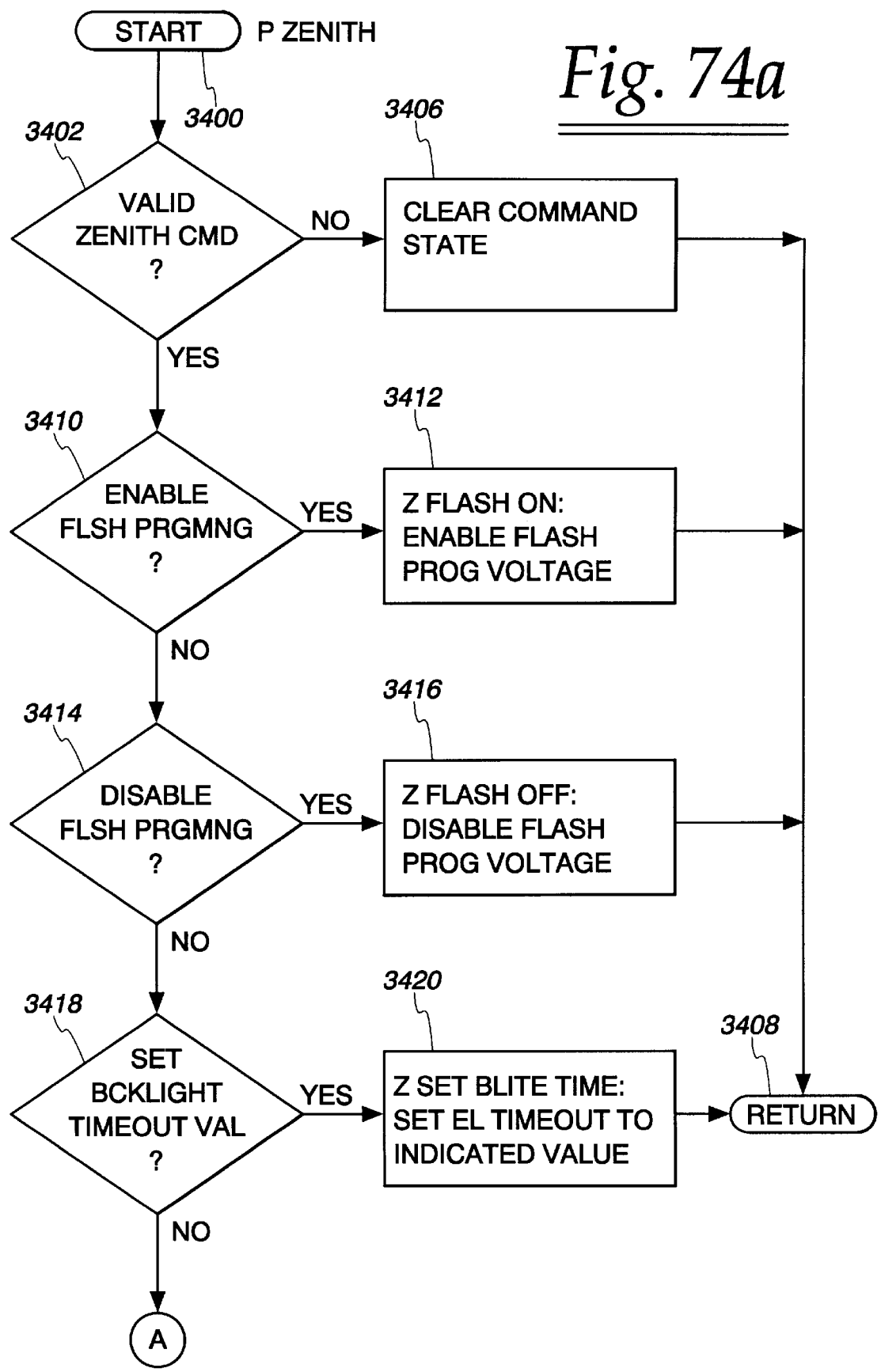
Figure 74B:
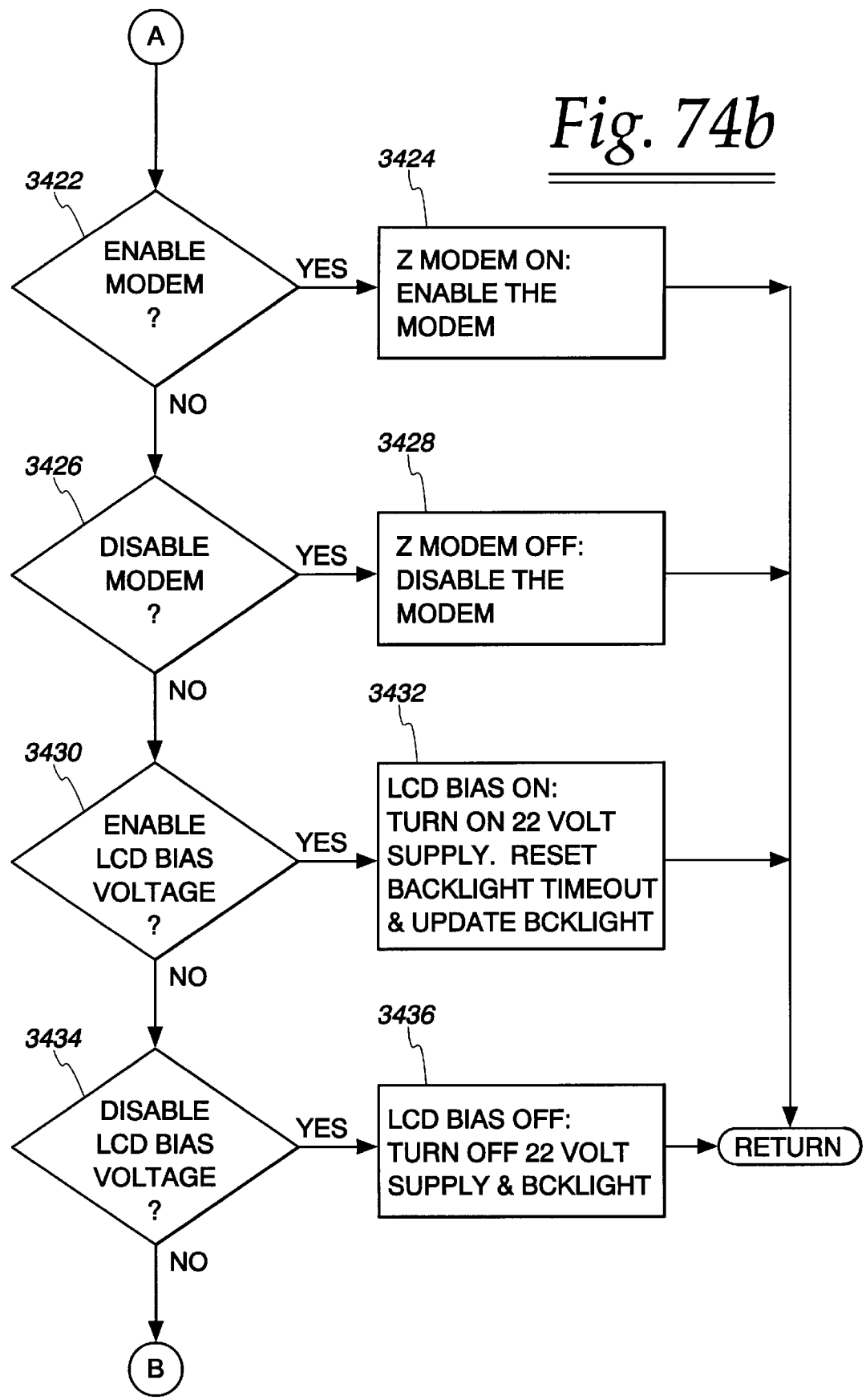
Figure 74C:
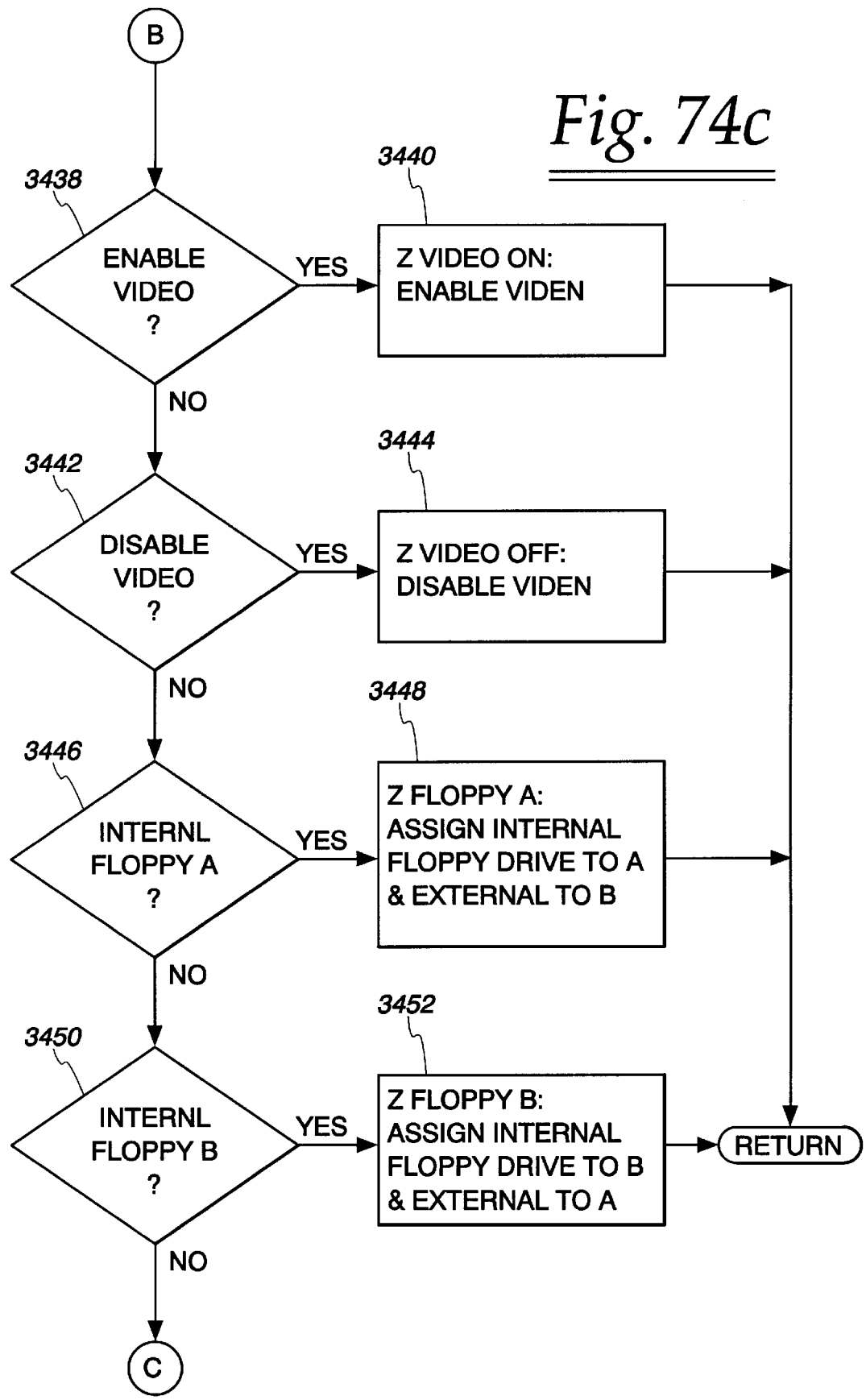
Figure 74D:
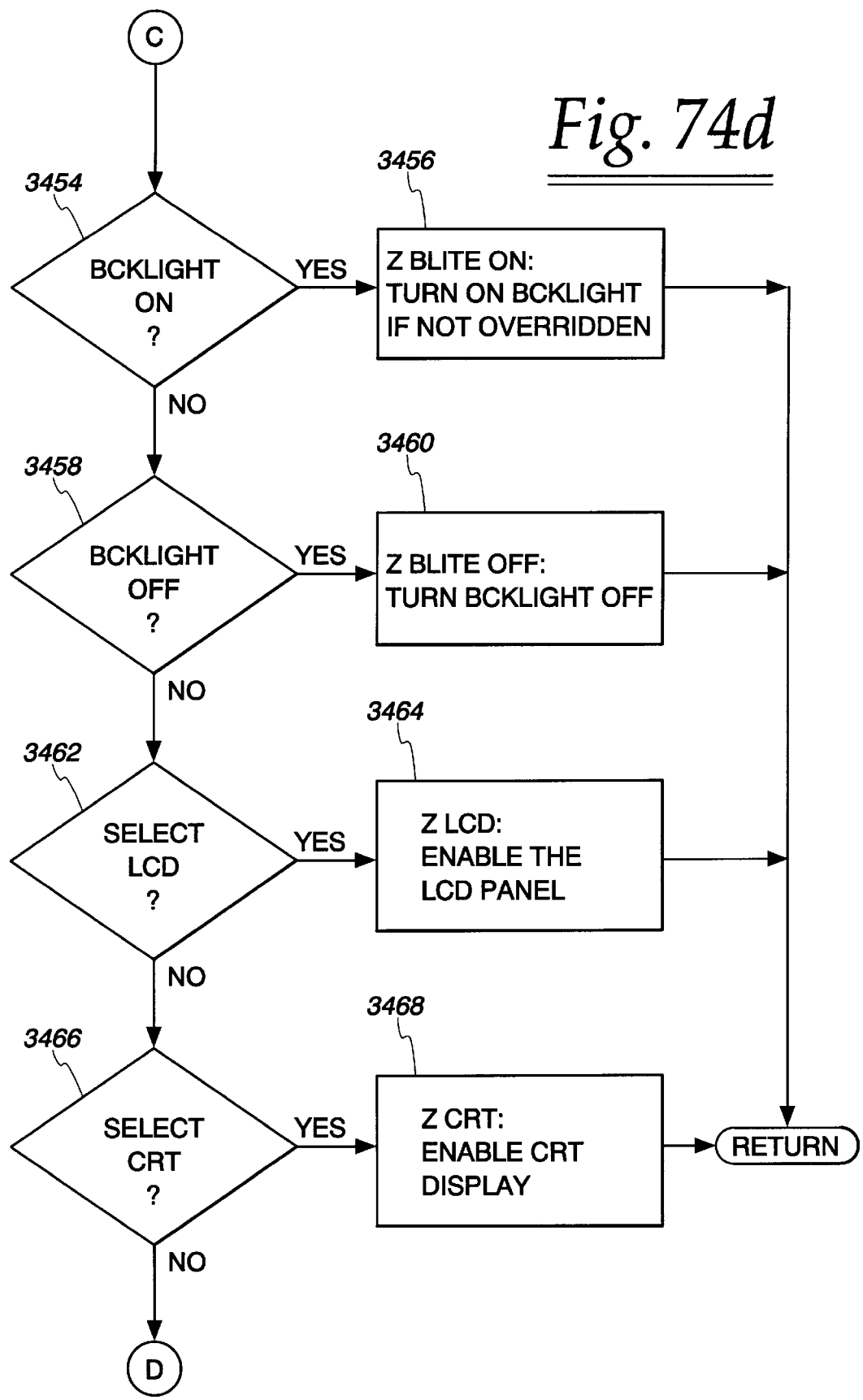
Figure 74E:
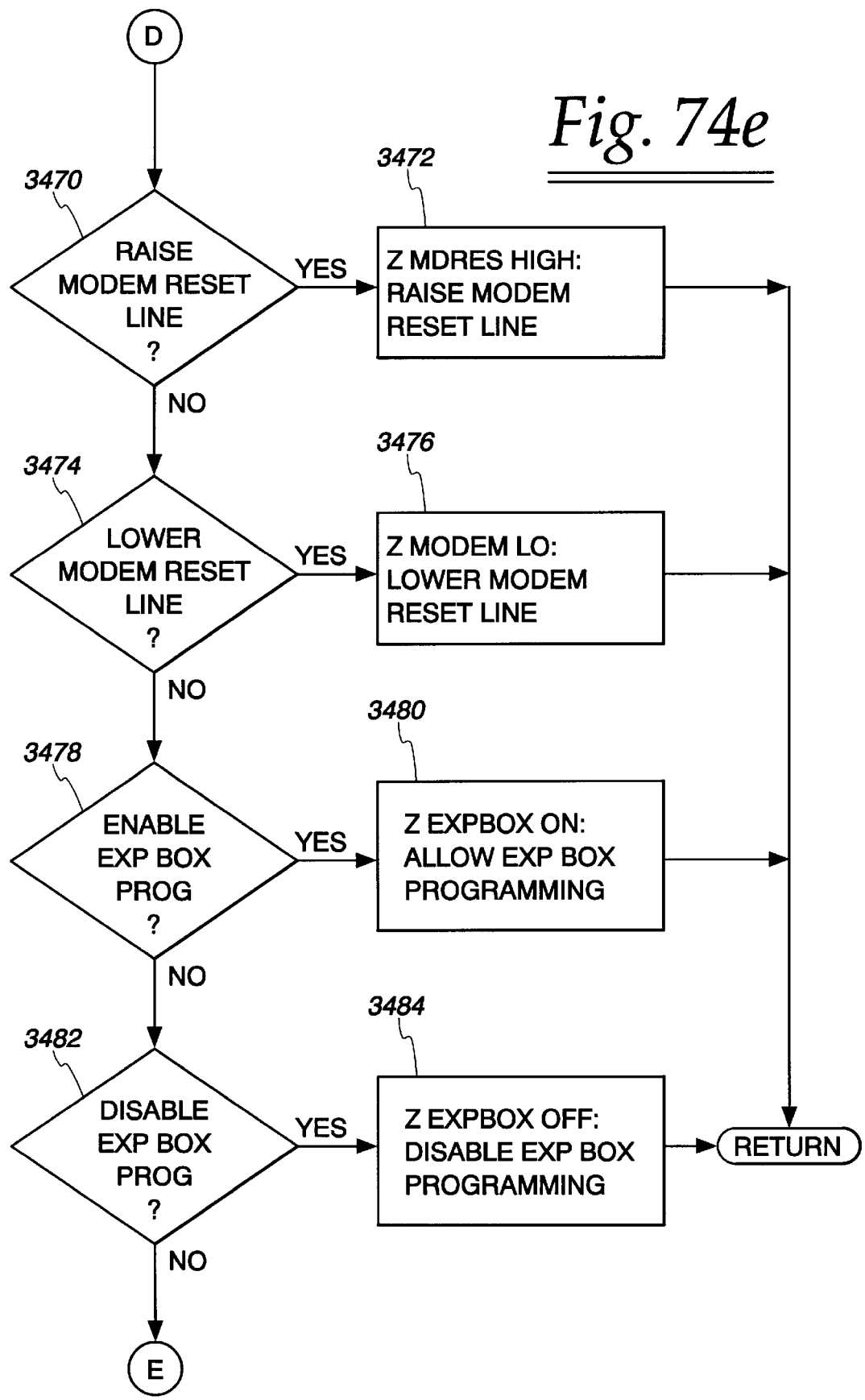
Figure 74F:
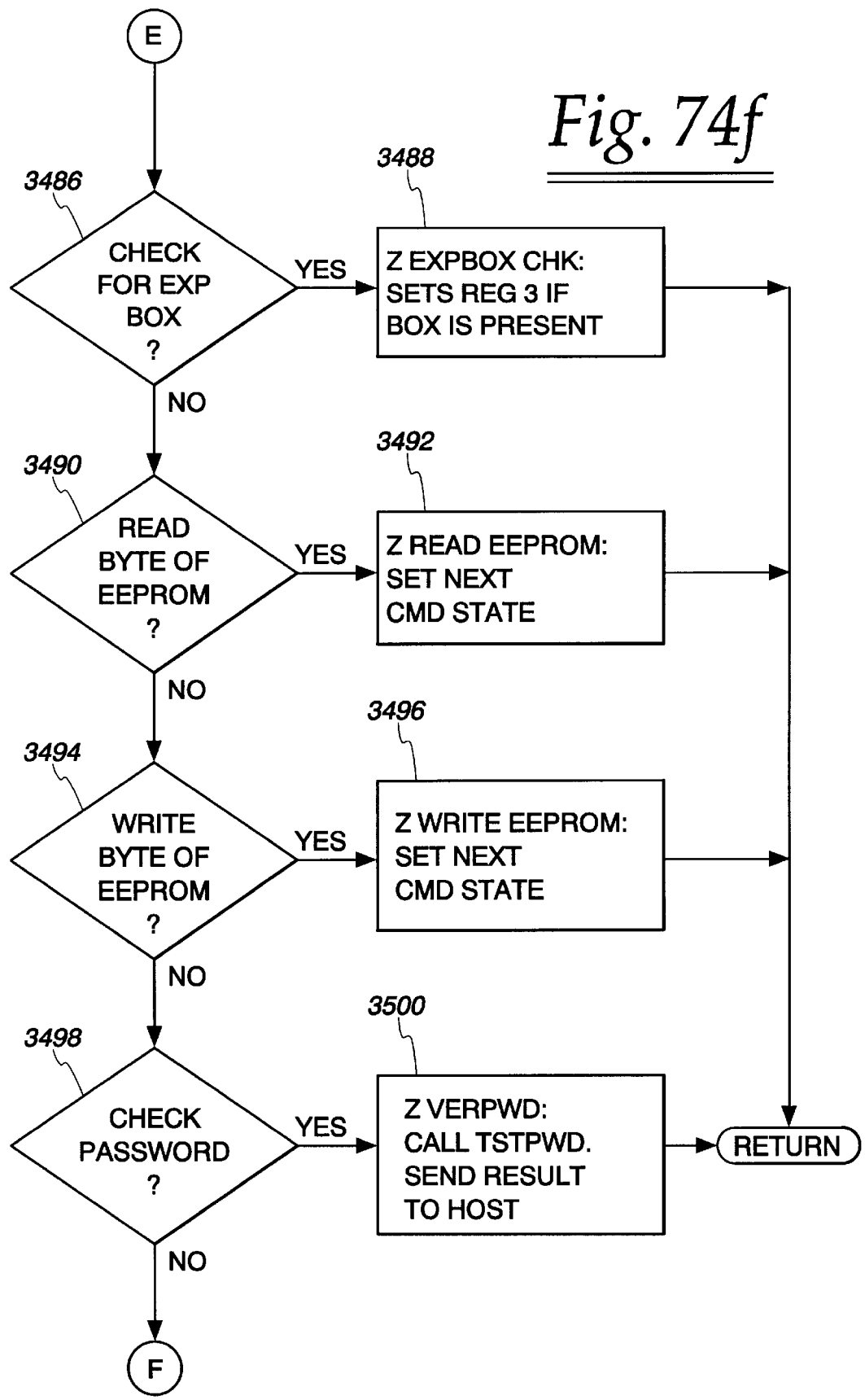
Figure 74G:
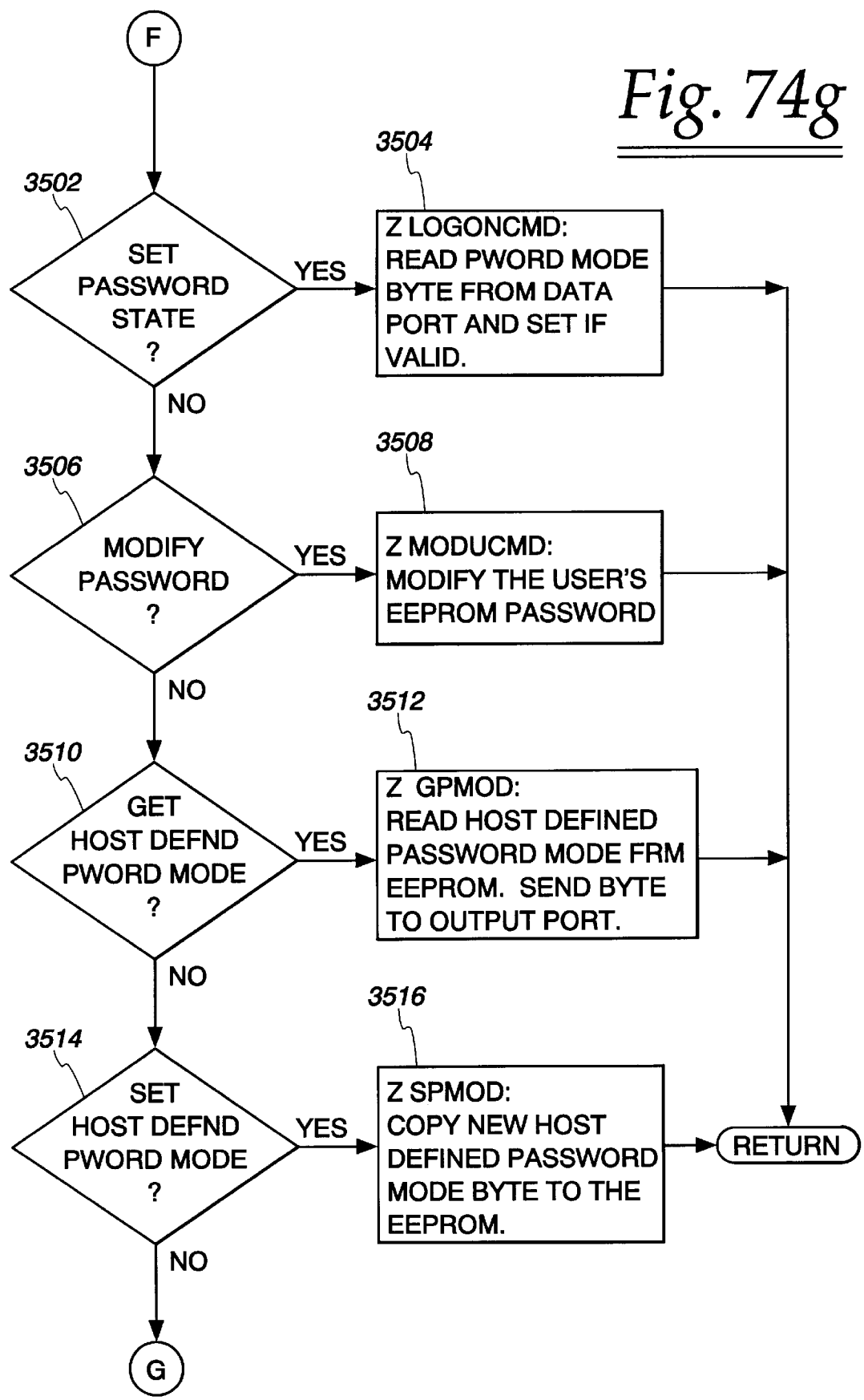
Figure 74H:
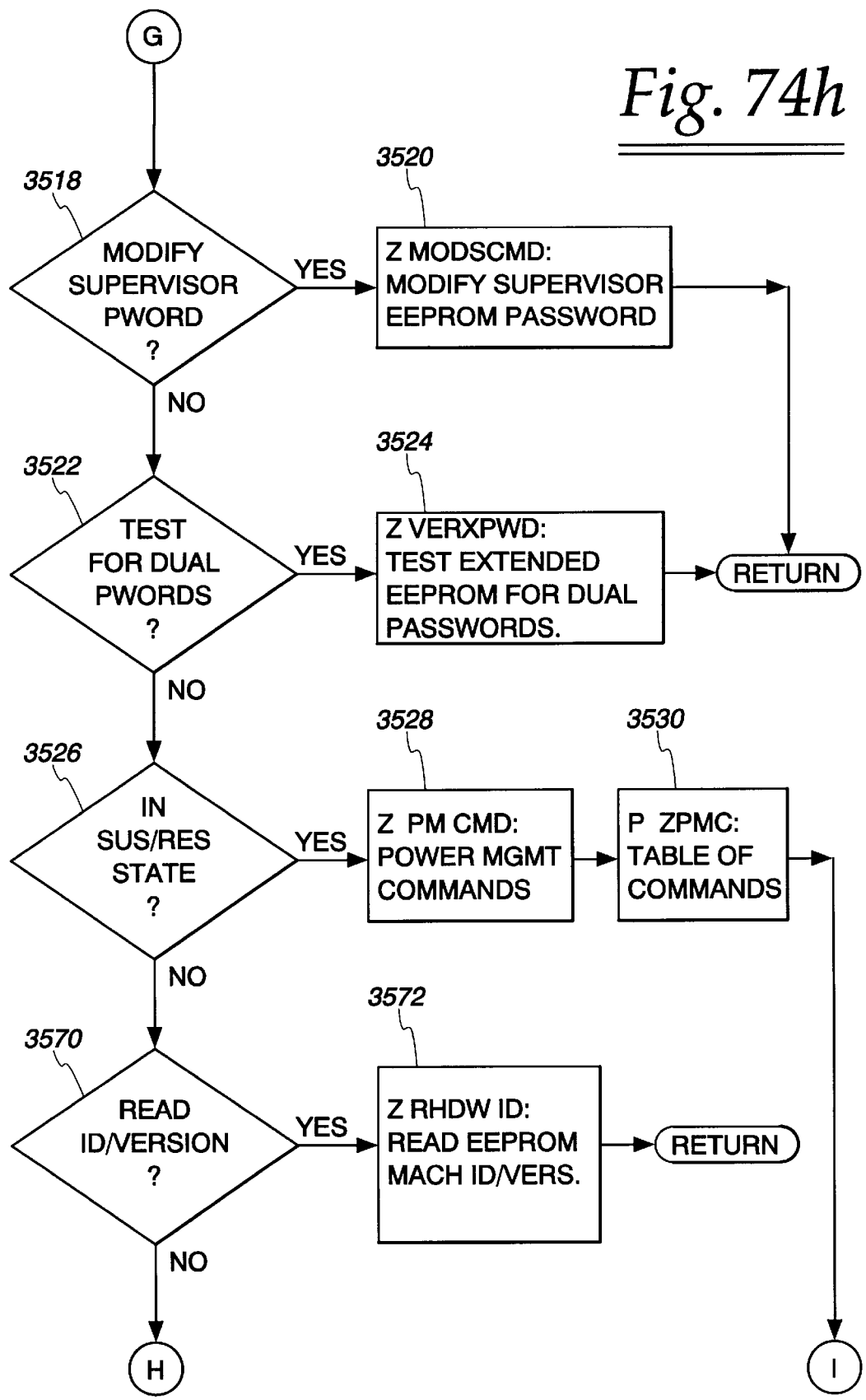
Figure 74I:
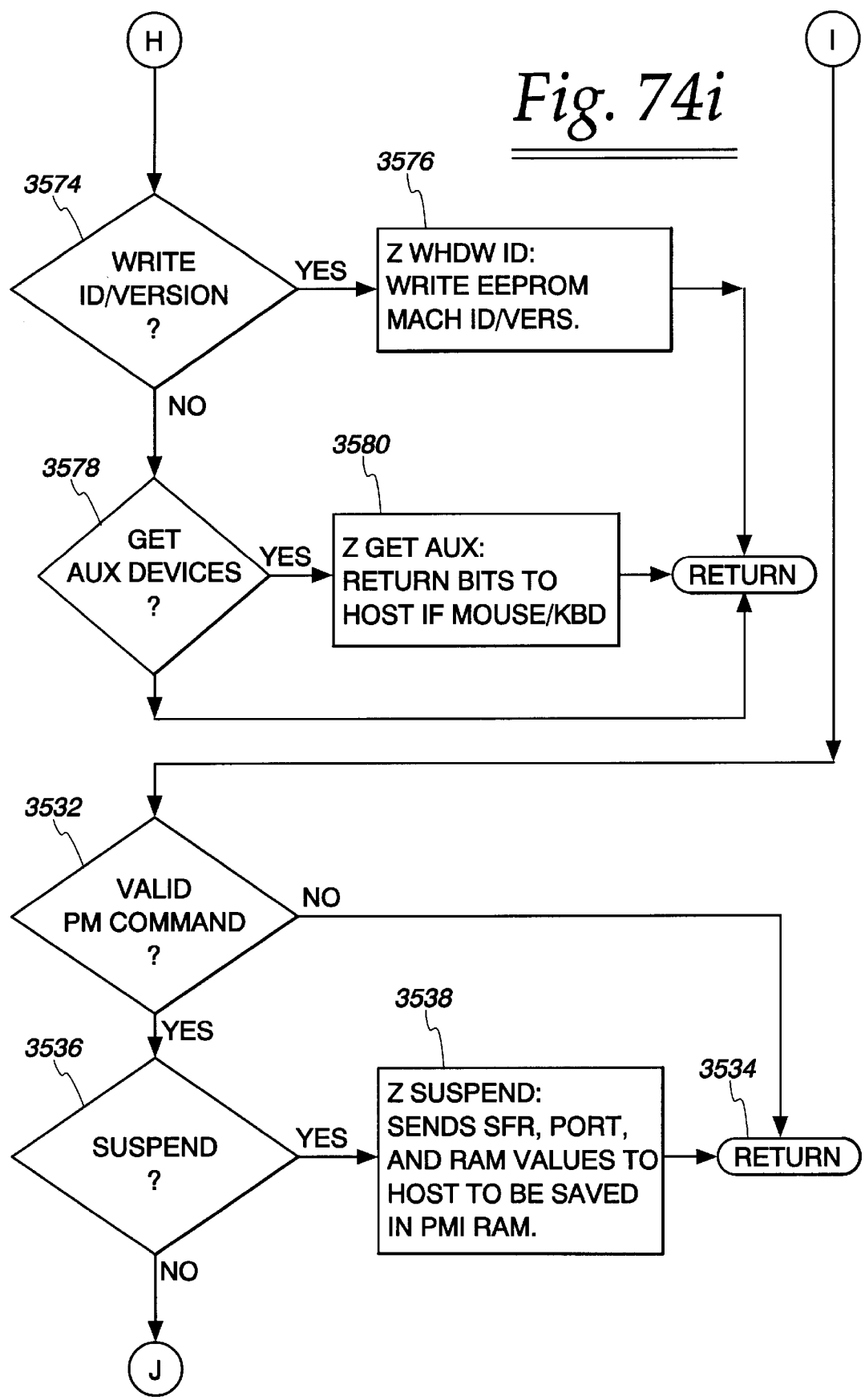
Figure 74J:
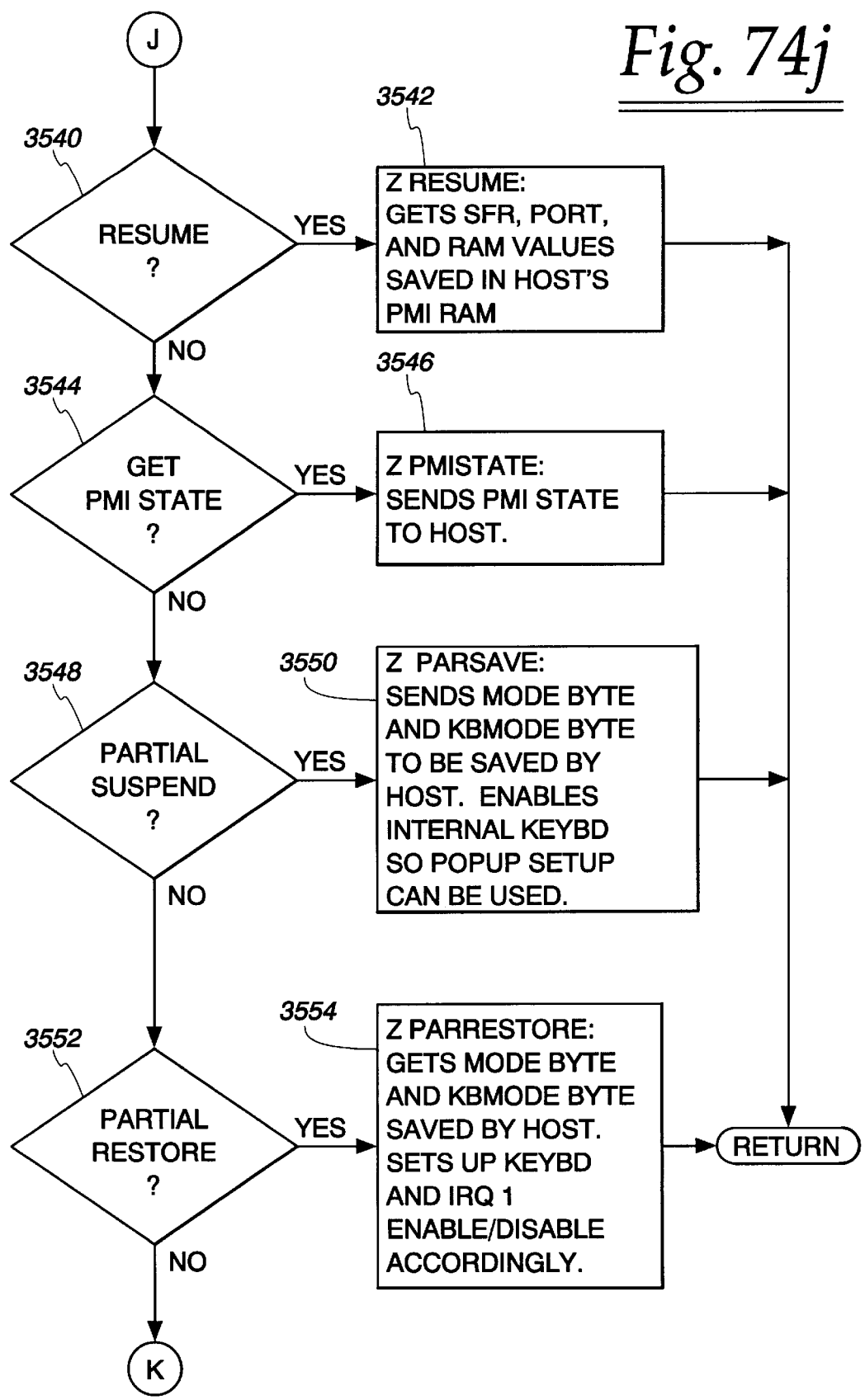
Figure 74K:
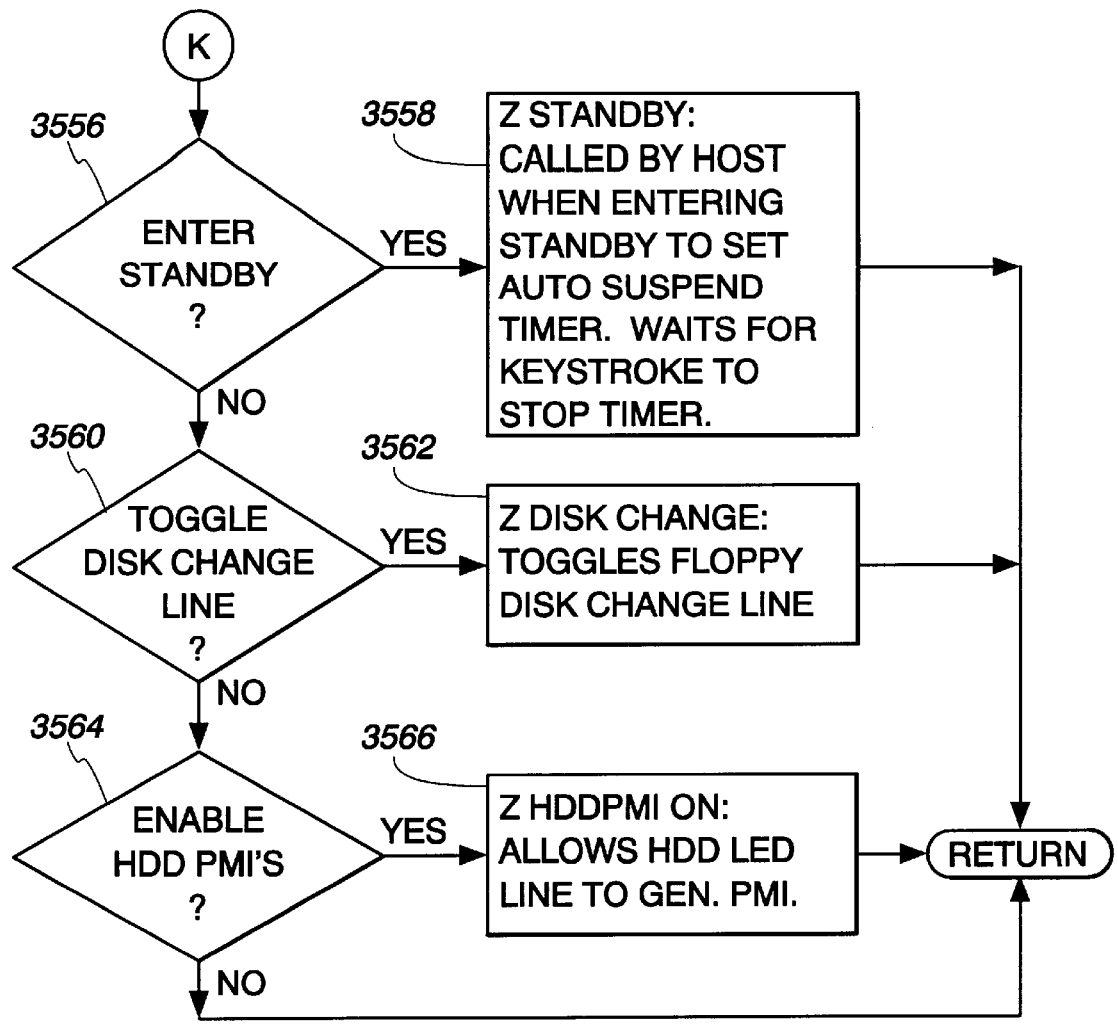

FIGS. 73A–73B shows the external keyboard or mouse interrupt handler routine. The computer of the preferred embodiment will accept either an external keyboard or mouse 421 connected through the same connector 418 and communicating with the SCP. The external device can interrupt the SCP 316. In response the SCP must determine what sort of device has interrupted it and handle the data from that device. First the SCP 316 must collect data from the external device port at 3330. If the data is found to be from a keyboard at 3332, the SCP 316 accepts the data at 3334 and places it is the queue for transmission to the host via the keyboard port 3336. If the data is found to be from a mouse at 3340, the SCP 316 must collect the input and send it to the CPU via the mouse port at 3342. Then the backlight timer is reset at 3344 and updated at 3346. The data from the mouse is sent to the host CPU via a different port than the keyboard data because keyboard data consists of a single byte while mouse data consists of three bytes. By using different ports, the host CPU knows whether to expect a single byte or three bytes of data. If there is a keyboard interrupt but it is found at 3348 that neither the mouse or keyboard provided data, the SCP determines if it is connected to a keyboard or mouse and saves that information at 3350. After the interrupt is handled, the interrupt flag is cleared at 3352, and the system returns from the interrupt.

FIGS. 74A–74K depicts an interrupt routine which is entered when the SCP determines that it has received a command code from the main processor 311. In the preferred embodiment, the command code is used as an index to a command table containing a series of jump instructions which transfer control to respective routines implementing the respective commands. For simplicity and clarity in explaining the invention, FIGS. 74A–74K diagrammatically shows the dispatch as a series of decision blocks each checking for a respective command. Those of ordinary skill in the art will recognize that this is functionally equivalent to a command table, and that either approach is equally satisfactory.

Turning now in more detail to FIGS. 74A–74K, execution begins at block 3400, and proceeds to block 3402 where the processor checks the validity of the command code. If the command code is not valid, then at block 3406 the processor clears the command code, and then at block 3408 the processor returns to the main SCP routine. If the command is valid, then control proceeds to block 3410, and if it is determined there that the command is instructing the SCP to enable programming of the flash RAM 331 (FIGS. 33A–33D), the SCP enables the FLSHEN signal to the flash RAM 331. Otherwise, control proceeds to block 3414, where the SCP checks to see if it is being instructed to disable programming of the flash RAM, in which case it disables the line FLSHEN at block 3416. If the command does not relate to the flash RAM, then at block 3418 the SCP checks to see if it is being instructed to accept and store a new timeout value for the backlight timer, in which case the new value is accepted and stored at block 3420.

At blocks 3422 and 3426, the SCP checks the command code to see if it is being instructed to respectively enable or disable the modem, in which case at blocks 3424 or 3428 it actuates or deactuates the modem enable line MDMEN. At blocks 3430 and 3434, the SCP checks to see if the command code indicates that it is to respectively enable or disable the LCD display, in which case it actuates the signals LCDPWR and BLON at block 3432 or else deactuates these signals at block 3436.

At blocks 3438 and 3442, the SCP checks to see if the command code indicates that it is to respectively enable or disable the video controller, and if so it enables the video enable signal VIDEN at block 3440 or disables this signal at block 3444. As will be evident from the discussion of the proceeding embodiment, the main processor should instruct the SCP to execute the block 3432 within ¹⁄₁₀th second after the block 3440 is executed, and should instruct the SCP to execute the block 3436 within ¹⁄₁₀th second before the block 3444 is executed.

At blocks 3446 and 3450, the SCP checks to see if the command code indicates that the internal floppy disk drive 327 is to be respectively designated as drive A or drive B for purposes of being referenced by the operating system, and if so respectively assigns the designation A or B to the internal floppy drive at block 3448 or block 3452, while simultaneously assigning to any not-illustrated external floppy drive which may be coupled to the system a designation of B or A, respectively.

At blocks 3454 and 3458, the SCP checks to see whether it is being instructed to turn the backlight on or off, in which case it turns the backlight on at block 3456 (if use of the backlight has not been inhibited) or turns the backlight off at block 3460. At blocks 3462 and 3466, the SCP checks to see if it is being instructed to select the LCD or the CRT as the active display unit, and if so sets the CRT/LCD line at block 3464 to select the LCD, or sets this line at block 3468 to select the CRT. It will be noted that the main processor should instruct the SCP to execute block 3432 within ⅒th second after execution of block 3464, and should instruct the SCP to execute the block 3436 within ⅒th second before execution of block 3468.

At blocks 3470 and 3474, the SCP checks to see if it is being instructed to respectively actuate or deactuate the modem reset line, and if so it respectively actuates or deactuates MDMRST at block 3472 or block 3476. At blocks 3478 and 3482, the SCP checks to see whether it is being instructed to enable or disable expansion box programming, and if so it takes appropriate action at blocks 3480 or 3484, which are not pertinent to the present invention and are therefore not described in detail. Similarly, at block 3486, the SCP checks to see if it is being instructed to determine whether an expansion box is connected to the system, and if so takes appropriate action at block 3488 which is also not pertinent to the present invention and therefore not described in detail.

At blocks 3490 and 3494, the SCP checks to see if the command code is instructing it to read or write a byte in the EEPROM 439 (FIGS. 33A–33D), and if so then it reads from the EEPROM a byte at a specified address and passes it to the main processor, or accepts from the main processor a byte and stores it at a specified address in the EEPROM at block 3496.

At block 3498, the SCP checks to see if the command code is instructing it to carry out a password check, and if so it proceeds to block 3500, where it calls a not-illustrated subroutine TSTPWD which asks the user to enter one of the passwords stored at 1060 and 1062 (FIG. 34) in the PMRAM, and then returns the response to the main processor.

At block 3502, the SCP checks to see if the command code is instructing it to set the password state and, if so, proceeds to block 3504, where it accepts and saves from the main processor a password mode byte which indicates whether or not any passwords are to be active and identifies each specific password which is to be active.

At block 3506, the SCP checks to see if the main processor is instructing it to modify the user password in the EEPROM and, if so, proceeds to block 3508 where it modifies the user's password in the EEPROM 439 in a manner specified by the main processor. Otherwise, at blocks 3510 and 3514, the system checks to see if the main processor or "host" is instructing it to return or to accept a byte specifying whether either or both passwords is to be in effect and, if so, accepts and stores in the EEPROM a mode byte from the main processor at block 3512, or reads from the EEPROM and supplies to the main processor a mode byte at block 3516.

At block 3518, the SCP checks to see if it is being instructed to modify the supervisor password in the EEPROM, and if so proceeds to block 3520 where it modifies this password in a manner specified by the main processor. At block 3522, the SCP checks to see if the command code is instructing it to test for dual passwords, and if so it proceeds to block 3524, where it checks the EEPROM for dual passwords and returns to the main processor an appropriate response regarding the dual passwords.

At block 3526, the SCP checks to see if it has been sent a special power management command, and if so it proceeds through blocks 3528 and 3530 to block 3532, where it checks to see if it has received a valid power management command, and if not it exits at 3534. Otherwise, at block 3536, the SCP checks to see if the main processor is instructing it to prepare for suspend mode, in which case at block 3538 the SCP sends its internal state as well as the contents of its RAM 440 and its I/O ports to the main processor for storage. At block 3540, the SCP checks to see if the main processor is indicating that a resume from suspend mode is underway, in which case at block 3542 the SCP accepts and restores all of the information which it previously sent to the main processor at block 3538.

At block 3544, the SCP checks to see if the main processor is requesting identification of the reason why the SCP generated a PMI, in which case the SCP sends the main processor the PMI byte 776 (FIG. 64) at block 3546.

At block 3548, the SCP checks to see if the main processor is instructing it to do a partial state save, in which case at block 3550 the SCP sends the main processor the two mode bytes shown at 778 and 779 (FIG. 64). At block 3552, the SCP checks to see if the main processor is instructing it to do a partial state restore, in which case at block 3554 the SCP accepts from the main processor the two mode bytes sent at block 3550, and restores them to locations 778 and 779 of the RAM 440.

At block 3556, the SCP checks to see if the main processor is indicating that it is entering standby mode, in which case at block 3558 the SCP accepts from the main processor a value to be used for the suspend timer, uses this value to start the suspend timer 774 (FIG. 64), then waits for a keystroke, and stops the timer and continues if and when a keystroke occurs. If the timer expires before a keystroke occurs, then the SCP simulates a keystroke in order to attract the attention of the main processor, and then notifies the main processor of the timer expiration so that the main processor enters suspend mode.

At block 3560, the SCP checks to see if the main processor is instructing it to force the setting of a disk change flag within the floppy disk drive 327. If so, at block 3562 the SCP toggles the force disk change FRCDC line to the floppy disk drive 327 so that the drive 327 internally sets a bit indicating that the floppy disk has been changed, regardless of whether there has in fact been a disk change.

At block 3564, the SCP checks to see if it is being instructed to actuate its ENABLE output line in order to enable the main processor to be interrupted when the LED signal from the hard disk drive is deactuated, in which case at block 3566 the SCP actuates the ENABLE line.

If it was determined at block 3526 that the command code is not a PMI command, then control proceeds to block 3570, where the SCP checks to see if the main processor is instructing it to obtain and return to the main processor the board revision ID number stored at 766 (FIG. 63) in the EEPROM 439. If so, then at block 3572 the SCP reads the ID from the EEPROM and sends it to the main processor. Similarly, if the SCP determines at block 3574 that it is being instructed to change the board revision ID in the EEPROM, it proceeds to block 3576 where it accepts from the main processor a new board revision ID and stores it in the EEPROM.

At block 3578, the SCP checks to see if the main processor is asking it to return an indication of whether a mouse or keyboard is attached to the system, in which case at block 3580 the SCP returns to the main processor a byte indicating whether a mouse or keyboard is attached to the system.

Figure 75:
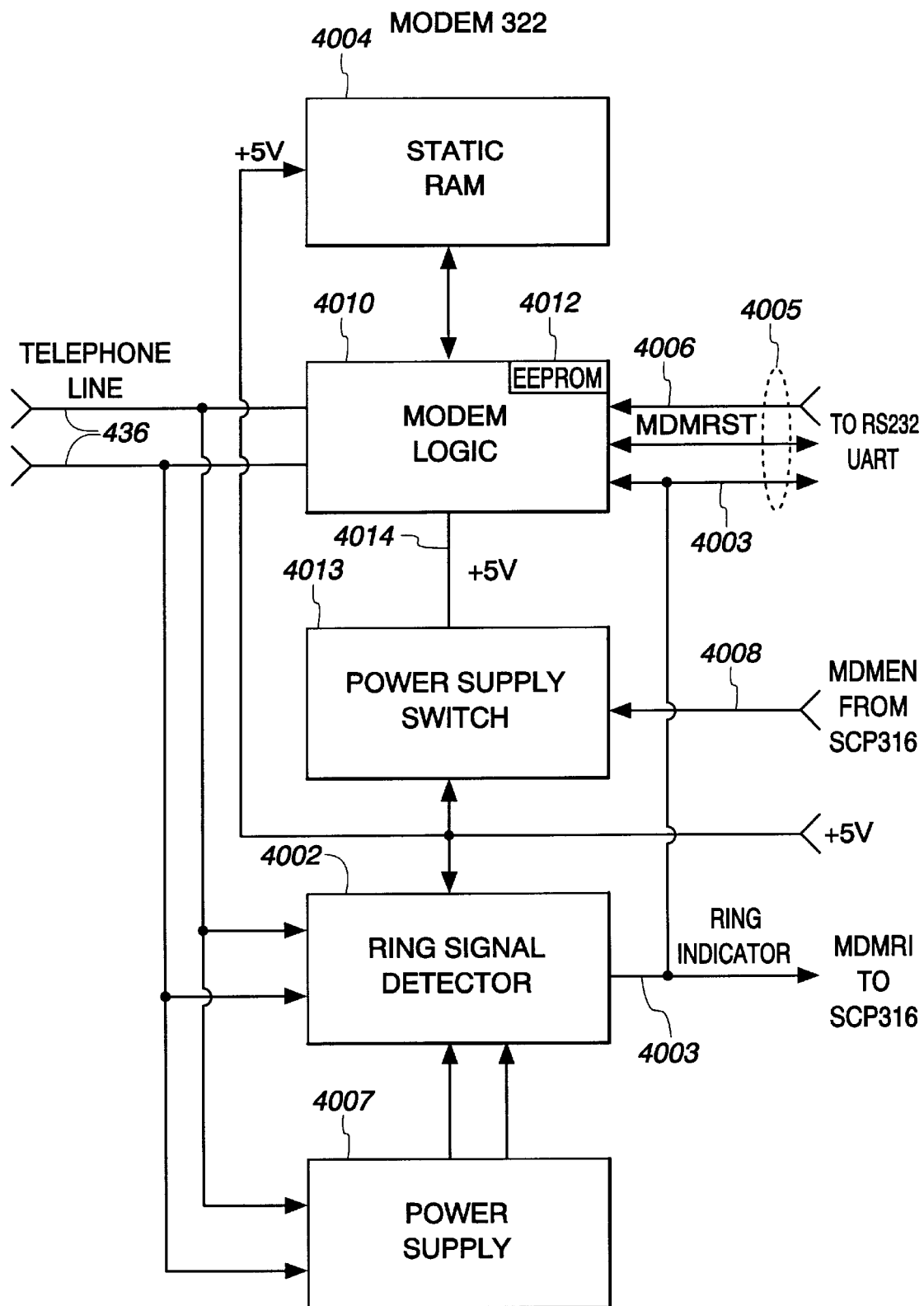
FIG. 75 is a block diagram of a modem which is a component of the system of FIGS. 33A–33D.
Figure 76A:
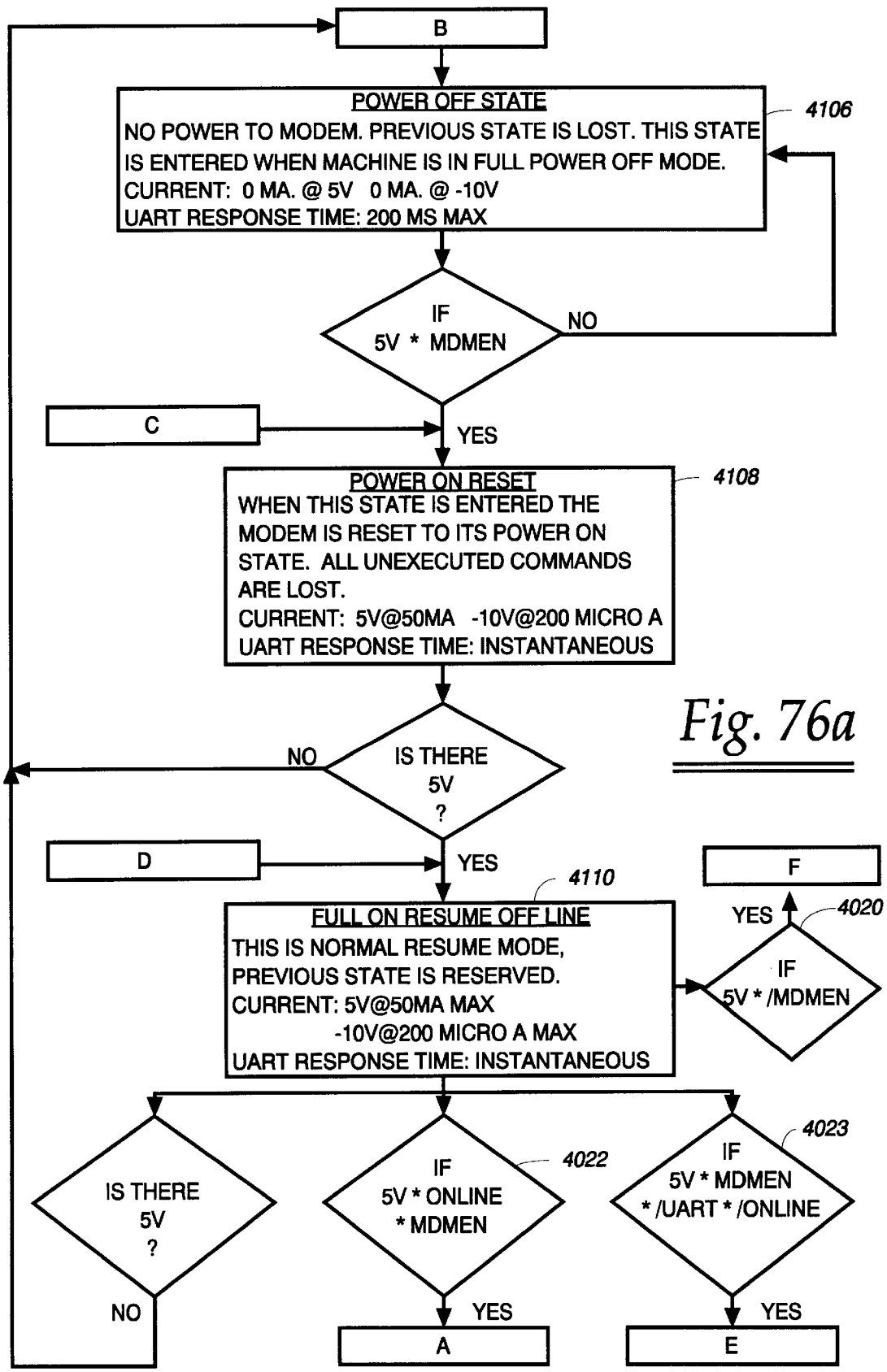
FIGS. 76A–76D is a state diagram for the operation of the modem of FIG. 75.
Figure 76B:
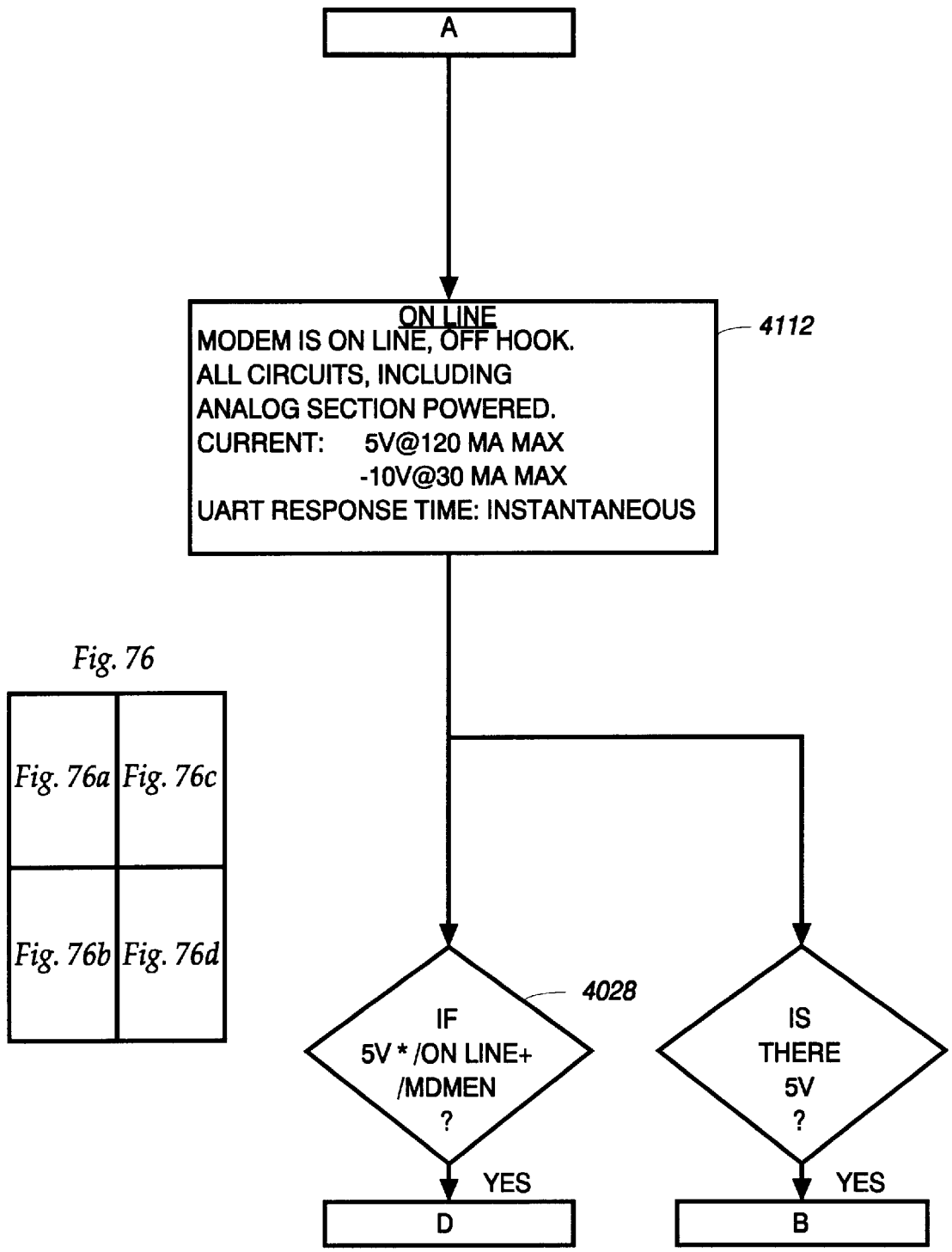
Figure 76C:
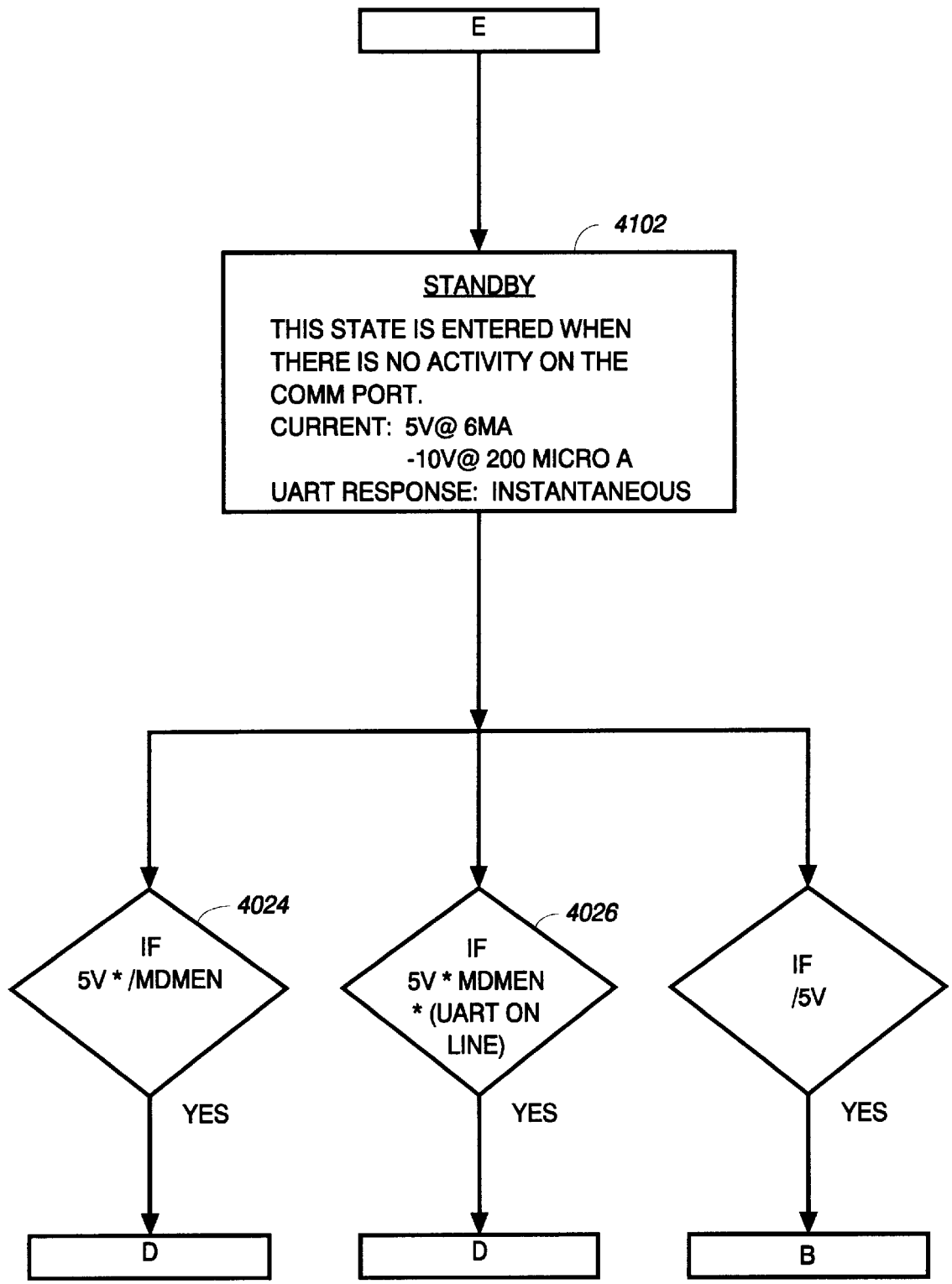
Figure 76D:
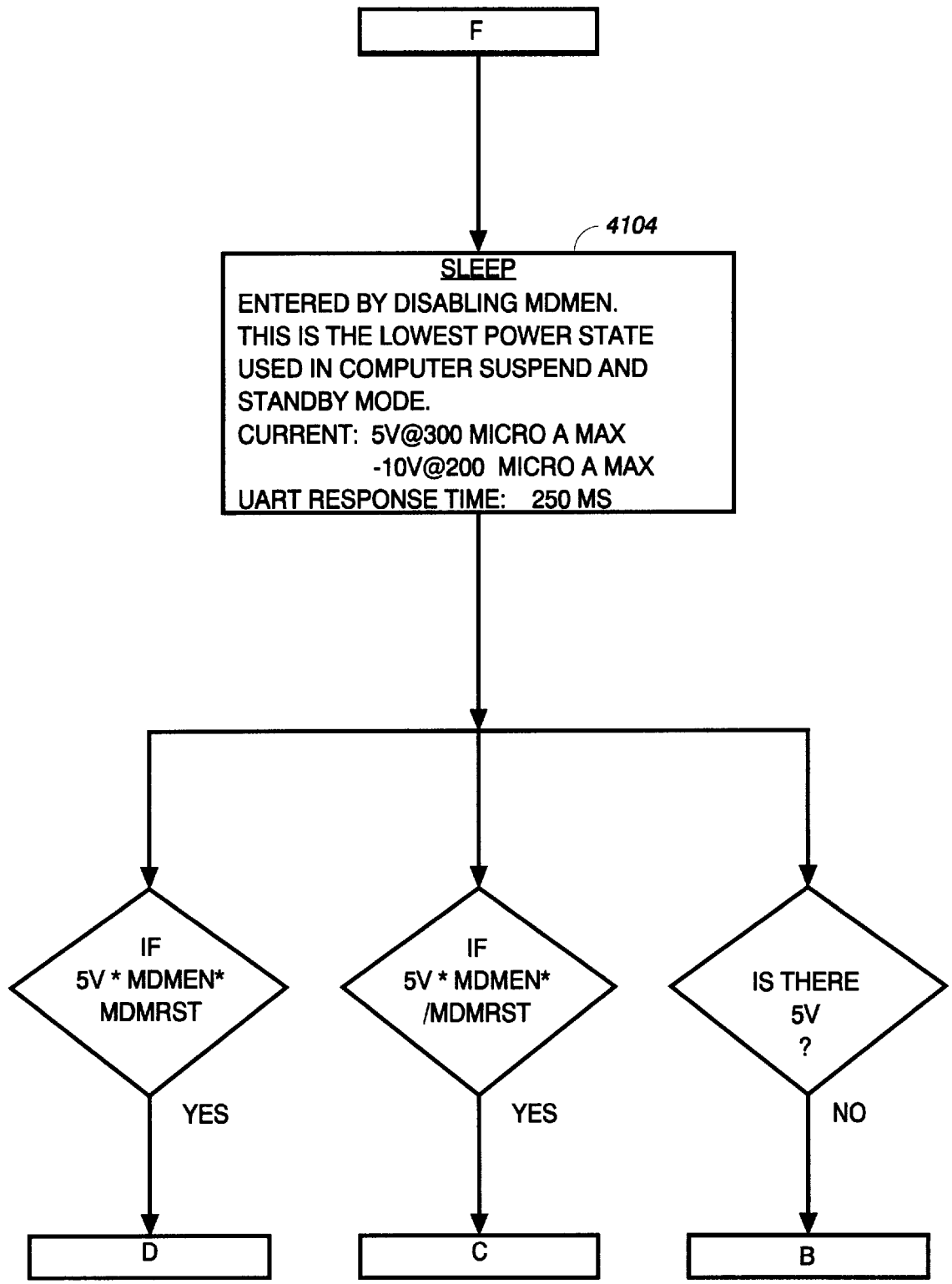

The modem subsystem 322 of the computer is introduced as an element of the overall system in FIGS. 33A–33D, and its specific details that depart from standard modem design are illustrated in FIG. 75 and in a flowchart which is presented in FIGS. 76A–76D. The modem 322 has a number of unique features which make it particularly useful for the present invention. Briefly summarized, it is designed so that even when it is powered down to minimize battery drain, the ring signal detector portion 4002 of the modem 322 (FIG. 75) continues to function normally and to generate a ring indicator signal MDMRI 4003 to the RS 232 interface 4005 which leads to the UART 4001 (FIG. 33) and which also leads to the system control processor SCP 316 and to the main processor 311. Accordingly, even when the system is in its deepest suspend mode with the power supply to the modem substantially turned off, a ringing signal on a telephone line passes right through the modem and can cause a power management interrupt which will bring the system up to full operational speed within a few seconds. Accordingly, a user can press the suspend/resume button and suspend virtually all computer operations every evening, leaving the computer attached to a telephone line. Then, when electronic mail comes in during the night, the computer automatically comes alive to receive and process the incoming mail and then returns to sleep with minimal battery drain.

Secondly, the modem 322 includes static RAM 4004 which also continuously receives power even when the modem 322 is powered down. The modem maintains within the static RAM 4004 a complete and accurate record of its state, and the new modem reset MDMRST signal line 4006 is added to the modem as a companion to the modem enable MDMEN 4008 signal which turns power for the modem on and off. When the MDMEN 4008 signal commands the modem to turn on its power, the modem logic 4010 tests the MDMRST signal line 4006 to see whether it is to revert to its initial power on state, as recorded within its internal EEPROM memories 4012, or whether it is to revert to its former state by reloading its registers from the static RAM 4004 so that the modem functions as if it had never been powered down.

Referring first to FIGS. 33A–33D, the modem 322 is shown having an RS 232 interface 4005 connecting to a UART 4001 which in turn is connected to the system bus lines 337, 338, and 339 in the conventional manner. In response to an incoming character, the UART 4001 may be programmed to generate an interrupt signal IRQ4 which can trigger software in the main processor 311 to service the incoming character and which can also wake up the main processor 311 from standby mode, as has been explained. Note that the ring indicator signal MDMRI 4003 is also split away from the RS 232 interface 4005 and fed into the system control processor SCP 316 and the main processor 311 so that it may be used to wake up the system from suspend mode, as has been explained. An important aspect of the present invention is designing the modem 322 so that even when it is powered down, the ring indicator signal MDMRI 4003 continues to function so that it may wake up the system in response to an incoming telephone call.

It is conventional with modems on portable computers to provide a means whereby they may be powered down or turned off when they are not in use. Accordingly, the system control processor SCP 316 generates a modem enable MDMEN signal 4008 which is fed to the modem 322. When the MDMEN signal is low and inactive, logic within the modem 322 turns off the power consuming components within the modem or deprives them of power and thereby greatly minimizes the power drain of the modem 322. Then, when the modem 322 is again to be placed into service, the MDMEN signal 4008 goes active high and causes all the components of the modem 322 to be powered up. In a conventional modem, the modem powers up to its factory default state, as indicated by its internal read only memories, as modified by permanently stored user data stored within EEPROMs 4012 (FIG. 75) in the modem logic 4010. When initially powered up, the modem is normally in its command state ready to receive programming commands from whatever program is in operation. The present invention adds the modem reset MDMRST signal 4006 to this interface between the system control processor 316 and the modem 322 to signal that the modem 322 is not simply to power itself up to its normal power on state but is instead to resume operation as if it had never been powered down, retrieving state values from a static RAM 4004 (FIG. 75). In this manner, the modem may be brought active from suspend and standby states without the loss of any state data provided either by the program running the computer or by the state of the telephone line. In the preferred embodiment of the invention, the UART is physically embedded within one of the two chips that constitute the main processor 311, thus the state of its internal registers are preserved in the same manner as the state of other registers within the main processor 311 are preserved in the event of a suspend action.

Referring more specifically to FIG. 75, a more detailed breakdown of the modem 322 is shown. In most respects, the modem 322 is a conventional modem, and its conventional elements are illustrated by the modem logic block 4010 shown in the figure. A telephone line 436 feeds telephone signals into the modem logic 4010, and the modem logic 4010 generates RS 232 interface signals 4005 which flow to the UART. These are not true RS 232 signals, which normally fluctuate from −5 volts to +5 volts, but instead these signals fluctuate from 0 volts to +5 volts in the manner of TTL signals. But in all other respects, the signals in the interface 4005 are the standard signals found in any RS 232 interface: carrier detect, data terminal ready, clear to send, request to send, data set ready, transmit data, receive data, ring indicator, and ground. Of these, only the ring indicator signal MDMRI 4003 is special because it is also fed to the system control processor 316 and main processor 311 so that its fluctuations can terminate suspend and standby mode, as has been explained.

The modem 322 as shown in FIG. 75 is powered by +5 volt and −10 volt sources of power which flow into a power supply switch 4013 that is switched on by the modem enable MDMEN signal 4008 and provides power over a bus 4014 to the modem logic 4010. When the MDMEN signal 4008 is low, the power supply switch 4013 is switched off, depriving the modem logic 4010 of power. When the MDMEN signal 4008 goes high, power flows over the bus 4014 to the modem logic 4010, and the modem logic powers up, normally from its "power off" state. Normally, the power on state of the modem is determined by user data stored permanently within an EEPROM 4012 within the modem logic 4010.

Naturally, the powering down of the modem logic 4010 in response to the termination of the MDMEN signal might not be done as shown in FIG. 75 by simply depriving the modem logic of power, but it might be done in a more sophisticated manner by signalling various components of the modem logic 4010 to go into a very low power state. The important thing is that the modem logic 4010 should draw minimal amounts of power when the MDMEN signal 4008 is low.

In accordance with the teachings of the present invention, it is first desired to ensure that even when the modem is powered down the presence of a ringing signal on the telephone line 436 will be detected by the ring signal detector 4002 and result in a generation of the ring indicator signal MDMRI 4003 that can then be used to wake up the computer system from a suspend or standby mode. To achieve this, the conventional ring signal detector logic 4002 is separated from the modem logic 4010 and is continuously connected to the +5 volt source of supply so that it is never powered down. The ring signal detector 4002 might contain, for example, a filter to filter out the ringing signal from other signals on the telephone line 436, a rectifier to detect and rectify that signal, a simple low pass filter to eliminate transients, and a Schmitt trigger device to generate a clean and stable ring indicator signal MDMRI suitable for presentation to the inputs of an extremely high speed digital computer of these components, possibly only the Schmitt trigger would require a very small amount of current to be drawn from the +5 volt source, and the ring signal detector could easily be designed to draw only a tenth of a milliamp or less of power from the +5 volt source of supply. Alternatively, a simple power supply 4007 powered either by the DC voltages applied to the telephone line 436 or else powered by the AC ring signal itself (which can be captured and rectified) could be used to power the ring signal detector 4002 so that the ring signal detector 4002 could be disconnected from the +5 volt source of supply, thereby further reducing the power drain on the system battery. While shown as a separate power supply 4007 in FIG. 75, this power supply might simply be the inherent property of the ring signal detector to detect an AC ring signal, rectify it, and present that signal as a voltage on the MDMRI signal line in a very simple arrangement that is essentially self-powered.

The second modification of the standard modem design is the inclusion of a modem reset signal line MDMRST 4006 which flows into the conventional modem logic 4010 as an input to the microcontroller (not shown) controlling the modem logic 4010 to alter the internal modem program in a way that is illustrated in the flowchart shown in FIGS. 76A–76D. Additionally, a static RAM 4004 is added and connected to the modem logic 4010 but powered directly from the +5 volt source, as shown in FIG. 75, such that the power to the static RAM 4004 is never interrupted by the power supply switch 4013. The static RAM 4004 is chosen to draw as little current as possible when the modem is in its standby mode. Alternately, some form of EEPROM or flash memory might be substituted for the static RAM 4004, which would draw no power from the +5 volt supply and thereby reduce current drain even further.

The normal operation of the modem logic 4010 is modified so that a complete record of all important variables defining the state of the modem 322 are continuously maintained within the static RAM 4004 or, which would be just as good, are written into the static RAM 4004 at the onset of the MDMEN signal 4008 when the system commands the modem to shut down its power drain. At a later time when the MDMEN signal recommences, commanding the modem 322 to come up to full power, the microcontroller within the modem logic 410 powers up from its normal restart condition under the control of its program within an internal ROM and tests the state of the MDMRST signal 4006 during the course of the power up procedure. If the MDMRST signal 4006 is active and high, then instead of simply placing the modem logic 4010 into the normal power up initialization state using data in the EEPROM 4012, the modem logic 4010 programs the modem's RAM memory and internal registers using data taken from the static RAM 4004 so that the modem logic 4010 is returned to the same precise state it was in when it was previously powered down, as if there had never been a powering down of the modem 322. Accordingly, when the modem is waked up at the end of a suspend or standby mode of operation, the modem is fully programmed to continue normal operation and to respond to an incoming telephone call not in accordance with its default configuration but in accordance with the configuration programmed into the modem 322 by whatever program is running within the main processor 311. Just as an example, assume that the default state for the modem 322, as previously programmed in the modem's ROM and in the EEPROM 4012, is to come up with the speaker turned on so that any dialing noises are presented in the speaker of the computer. Assume the user programs the computer with a store and forward electronic mail program that runs in the background (behind the other programs) for receiving, storing, and forwarding mail which may come in at any time of the day or night. With this program running and the computer attached to a telephone line, and located in the user's bedroom, naturally the user would want to have the speaker turned off so that any communications that occurred in the middle of the night would not disturb the user's sleep. Accordingly, the user's EMAIL program would program the modem to turn the speaker off by-sending to the modem the command "ATMO". The computer, when not in use, would enter the suspend state, with the modem powered down. Then, in the middle of the night, a ring signal would be received from the telephone line indicating incoming electronic mail. In response, the computer would wake up, answer the call, store the incoming mail, and then dial another number to forward the mail to another address. If the modem simply came up to its normal default power on state, then the speaker would be turned on and the process of sending out the EMAIL in the second phone call would produce audible dial tones and dialing tones that would act like an alarm clock to the user of the system. But because the state of the modem is stored in the static RAM 4004 and is restored upon power up of the modem due to the presence of the MDMRST signal 4006, the modem's speaker will remain disabled and the incoming mail will be received and forwarded without any audible disturbance. Obviously, there are many other examples of the benefits to be gained from restoring the modem to its prior state when powering it up again after the computer recovers from the suspended mode of operation.

In FIGS. 76A–76D, a "+" sign is a logical OR; a "*" sign is a logical AND; a "/" sign is a logical NOT or inversion; the term UART signals means that one or more of the RS 232 signals 4005 flowing from the UART 4001 to the modem 322 is active or asserted (DTR high, for example); the term on line means the modem is off-hook and is receiving a carrier signal; the term 5V means the modem is receiving power; and MDMEN and MDMRST are the presence of the signals 4008 and 4006, while /MDMEN and /MDMRST are the absence of these signals.

FIGS. 76A–76D illustrates in block diagram flowchart form the various hardware and software states that the modem logic 4010 and the modem 322 enter when it is designed in accordance with the present invention in the preferred embodiment. Viewed as a state machine, and disregarding differences between the hardware and software components of the modem, for purposes of discussion, there are six different states of modem operation. These will now be described.

The initial state, when the modem is deprived of all power, is the power off state 4106. In this state, all of its components (including the static RAM 4004) are deprived of all power because the modem is removed from the machine or because the computer's main battery is left out too long such that all backup battery power is drained away to nothing. Accordingly, as FIGS. 76A–76D clearly shows, anytime the +5 volt power fails completely, the system enters the power off state 4106. The system stays in the power off state even after the +5 volts is applied and the modem microcontroller comes into operation only after the resumption of the MDMEN modem enable signal 4008 calling for modem operation.

When the MDMEN signal 4008 is present, the modem leaves the power off state and enters the power on reset state 4108. The modem logic 4010 resets all internal registers to the initial power on state, using data retrieved from the EEPROM 4012 to set up the modem to the user defaults. The modem 322 then moves into the full on resume off line state 4110 with the modem drawing full power.

The modem then checks various incoming signals and moves to one of three states, depending upon what it finds. First, if the MDMEN signal 4008 terminates, as indicated at 4020, the modem shifts into its sleep state 4104 through actuation of the power supply switch 4012. However, prior to entering the sleep state, the modem logic 4010 makes sure that the complete record of its status is recorded in the static RAM 4004 so that that status can be restored later, if necessary. If the MDMEN signal 4008 is still present, then if the modem logic 4010 is receiving a carrier signal from the telephone line 436 and is on line, as indicated at 4022, the modem shifts to the on line state 4112 to handle the incoming information. But if there is no UART activity, as indicated by all the incoming RS 232 signals being in their rest states, and if there is no on line activity, then if the MDMEN signal 4008 is still present, the modem used in the preferred embodiment of the invention enters a standby state 4102 where it is still operating sufficiently to respond instantaneously but has turned off or reduced the current drain of many of its components so that its normal 50 milliampere current drain is reduced to a maximum of 6 milliamps, as indicated.

The standby state 4102 terminates if either the MDMEN signal 4008 is terminated, as indicated at 4024, or if the modem logic 4010 detects activity either from the telephone line 436 or from the UART 4001 as indicated in block 4026. In either case, the modem shifts back to its full on resume off line state 4110 and then proceeds immediately to the on line state 4112 if an on line status is required or to the sleep state 4104 if the MDMEN signal has terminated.

The on line state 4112 continues until either the modem is no longer on line or until the MDMEN signal 4008 terminates, as is indicated at 4028. In either case, the modem returns to the full resume off line state 4110 and, if the MDMEN signal has terminated, immediately to the sleep state 4104. But if the MDMEN signal continues, then the modem either remains in the state 4110 if the UART is active or else shifts to the standby state if it is not active.

The sleep state 4104 continues until the MDMEN signal becomes active again. At that point, if the resume signal MDMRST is not present, then the system reverts to the power on reset state 4108, and the system is reset to its initial power on state using the default stored in the EEPROM 4012. However, if the restart signal MDMRST is present, then prior to leaving the sleep state 4104, the system restores its state from the static RAM 4004 and then proceeds directly to the full on resume off line state 4110 as if it had never left that state through the block 4020.

Figure 77:
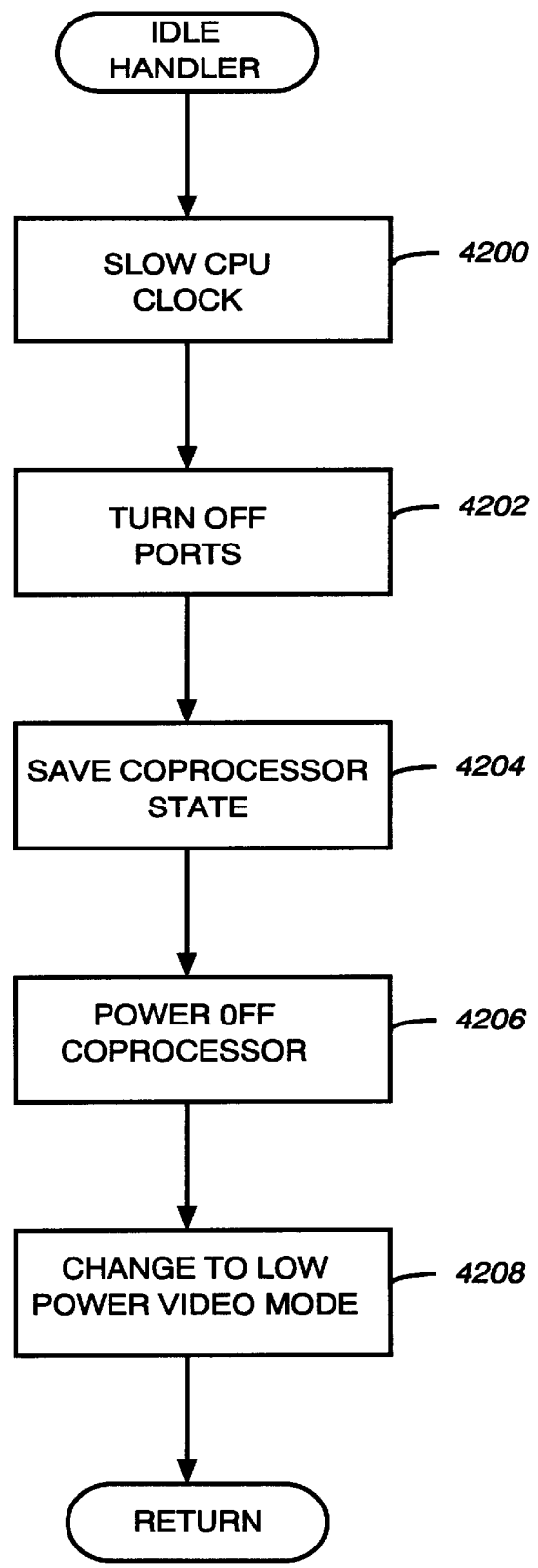
FIG. 77 is a flowchart of an idle handler routine which is a variation of the embodiment of FIGS. 33A–33D.

FIG. 77 describes another embodiment of the invention. In addition to the run, standby and suspend modes, an idle mode can be provided which draws more power than standby mode but less power than run mode and which is transparent to the user. When entering idle mode, the CPU clock is slowed significantly at 4200. As an example, a 20 $MH_z$ processor can be slowed to 5 $MH_z$ by dividing the clock signal by four. Next, the ports of the peripherals are turned off at 4202. The numeric coprocessor's state is saved at 4204. The coprocessor is turned off at 4206. The video is changed to a low power mode at 4208, where the video RAM and refresh of the LCD screen is maintained and all other video circuitry is turned off.

Because this reduced power mode is much simpler than the suspend or standby modes, it is possible to resume to run mode in a shorter time than required for the other modes. The combination of rapid resume and no perceptible difference to the user allows the computer to shift to this mode very often without any noticeable performance degradation for the user. As far as the user is concerned, the computer is still in run mode when it is changed to idle mode. This allows the computer to change to idle mode, for instance, after five to ten seconds of activity without the user being aware that any change has taken place.

While four modes are discussed here, it should be noted that the basic invention of the power management interrupt allows for an almost infinite number of modes, powering or not powering, speeding up or slowing down, any the device within the computer. The programmer is allowed to create modes depending on the degree of power saving and performance desired.

Another alternate embodiment of the invention is best described in reference to FIGS. 61A–61B. Step 2366, reinitialization of the hard disk drive requires several seconds to complete because the hard disk drive must be brought up to speed. In this alternate embodiment, step 2366 would be removed from the resume handling procedure except for asserting power to the hard disk drive, setting a flag that hard disk accesses are not allowed, and setting a timer interrupt for two to three seconds later. At the timer interrupt, when the disk drive is up to speed, the disk initialization procedure is completed and the flag locking hard disk drive access is cleared. Additionally, all hard disk drive accesses must be trapped by the PMI handler and the flag checked before the hard disk drive access is allowed to proceed. This allows the processor to run the application program during the time required for the hard disk drive to get up to speed, rather than waiting for the hard disk drive to come up to speed before resuming execution of the application program. The net result is a much faster resumption from suspend mode for any application that does not require an immediate hard disk access upon resuming from suspend mode.

Those of ordinary skill in the computer art should be able to easily generate a computer program which implements the detailed flow charts set forth in the drawings and described above. Nevertheless, for purposes of convenience and in order to show a highly efficient implementation of three routines, FIGS. 78A–80C respectively set forth assembly language source code for each of the three routines. In particular, FIGS. 78A–78C shows an implementation of the routine of FIGS. 73A–73B, FIGS. 79A–79D shows an implementation of the routine of FIGS. 70A–70E, and FIGS. 80A–80C shows an implementation of the routine of FIGS. 52A–52E.

Although certain preferred embodiments of the invention have been disclosed and described in detail for illustrative purposes, it will be recognized that there are variations and modifications of these embodiments, including the rearrangement of parts and data formats, which lie within the scope of the appended claims.

The embodiments of the invention in which an exclusive property or privilege is claimed are defined as follows:

1. An apparatus, comprising: a processor operable in normal and reduced power modes, an operating system program which can be executed by said processor, a disk drive which is operationally coupled to said processor and can removably receive a disk, and means separate from said operating system program and responsive to a first predetermined condition when said processor is in said normal mode for storing an indication of whether a disk is in said disk drive, for thereafter placing said processor in said reduced power mode, for thereafter restoring said processor to said normal mode in response to the occurrence of a second predetermined condition, and for thereafter displaying an operator perceptible warning regarding the need for the same disk in said disk drive when said stored indication indicates a disk was in said disk drive at said first predetermined condition.

2. An apparatus according to claim 1, wherein said processor is halted when in said reduced power mode, wherein said normal operational mode of said processor includes first and second operational modes, wherein in said first operational mode said processor has a predetermined set of operational capabilities and in said second operational mode said processor can perform a first subset of said operational capabilities and is inhibited from performing a second subset of said operational capabilities different from said first subset, wherein said apparatus includes application program means executed by said processor in said second operational mode, wherein said control means is responsive to said predetermined condition when said processor is executing said application program means in said second operational mode for interrupting said application program means and saving state information from said processor in a manner invisible to said application program means, for forcing said processor to said first operational mode, and for then causing said processor to begin executing special program means in said first operational mode, said special program means being part of said control means and effecting said storing of said indication, said placing of said processor in said reduced power mode and said displaying of said operator perceptible indication, and wherein after said displaying of said operator perceptible indication said special program means causes said control means to restore to said processor said state information saved therefrom and to cause said processor to continue with execution of said application program means in said second operational mode in a manner invisible to said application program means from a point at which said application program means was interrupted.

3. An apparatus comprising: a main processor operable in a normal mode and a reduced power mode, a first memory operationally coupled to said main processor, an auxiliary processor operationally coupled to said main processor and including means responsive to a first command from said main processor for providing to said main processor information representing a complete operational state of said auxiliary processor and means responsive to a second command from said main processor for accepting from said main processor information representing a complete operational state of said auxiliary processor and for placing said auxiliary processor in the operational state specified by said information accepted from said main processor, power supply means controlled by said main processor for selectively effecting and obstructing a supply of power to said auxiliary processor, and control means responsive to a first predetermined condition when said main processor is in said normal mode for sending said first command to said auxiliary processor, for accepting from said auxiliary processor and storing in said first memory said information which is provided by said auxiliary processor in response to said first command, for thereafter causing said main processor to terminate power to said auxiliary processor, for thereafter placing said main processor in said reduced power mode, for thereafter returning said main processor to said normal mode in response to a second predetermined condition, for thereafter causing said main processor to restore power to said auxiliary processor, for thereafter sending said second command to said auxiliary processor, and for thereafter sending to said auxiliary processor said information stored in said first memory.

4. An apparatus of claim 3, including a second memory operationally coupled to said auxiliary processor, and wherein said information provided to said main processor by said auxiliary processor in response to said first command includes the contents of said second memory.

5. An apparatus according to claim 3, wherein said main processor is halted when in said reduced power mode, wherein said normal operational mode of said main processor includes first and second operational modes, wherein in said first operational mode said main processor has a predetermined set of operational capabilities and in said second operational mode said main processor can perform a first subset of said operational capabilities and is inhibited from performing a second subset of said operational capabilities different from said first subset, wherein said apparatus includes application program means executed by said main processor in said second operational mode, wherein said control means is responsive to said predetermined condition when said main processor is executing said application program means in said second operational mode for interrupting said application program means and saving state information from said main processor in a manner invisible to said application program means, for forcing said main processor to said first operational mode, and for then causing said main processor to begin executing special program means in said first operational mode, said special program means being part of said control means and effecting said sending of said first command, said accepting and storing of said information, said termination of power to said auxiliary processor, said placing of said main processor in said reduced power mode, said restoration of power to said auxiliary processor, and said sending of said second command and said information, and wherein after said sending of said information said special program means causes said control means to restore to said main processor said state information saved therefrom and to cause said main processor to continue with execution of said application program means in said second operational mode in a manner invisible to said application program means from a point at which said application program means was interrupted.

6. An apparatus comprising: a main processor having a normal operational mode and a reduced power mode, said main processor including first means responsive to a predetermined interrupt when said main processor is in said reduced power mode for switching said main processor to said normal operational mode, an auxiliary processor operationally coupled to said main processor, a keyboard operationally coupled to said auxiliary processor and having a plurality of manually actuatable keys, second means for causing said auxiliary processor to monitor said keyboard in each of said normal and reduced power modes of said main processor and to respond to actuation of one of said keys by generating said predetermined interrupt to said main processor and by supplying to said main processor a unique key code corresponding to the key that was manually actuated, and third means for causing said auxiliary processor to check for a predetermined condition other than actuation of one of said keys of said keyboard when said main processor is in said reduced power mode and to respond to the occurrence of said predetermined condition by generating said predetermined interrupt to said main processor and by then supplying to said main processor a code which is different from each of said key codes for said keys of said keyboard.

7. An apparatus according to claim 6, including a modem and means for coupling said modem to a telephone line, said modem having means for generating a ring signal in response to an incoming call on the telephone line, wherein generation of said ring signal constitutes said predetermined condition.

8. An apparatus according to claim 6, wherein said main processor is halted when in said reduced power mode.

9. An apparatus according to claim 6, wherein said main processor is halted when in said reduced power mode, wherein said normal operational mode of said main processor includes first and second operational modes, wherein in said first operational mode said main processor has a predetermined set of operational capabilities and in said second operational mode said main processor can perform a first subset of said operational capabilities and is inhibited from performing a second subset of said operational capabilities different from said first subset, wherein said apparatus includes application program means executed by said main processor in said second operational mode, and wherein said control means responds to a further condition when said main processor is executing said application program means in said second operational mode for interrupting said application program means and saving state information from said main processor in a manner invisible to said application program means, for forcing said main processor to said first operational mode, and for then causing said main processor to begin executing special program means in said first operational mode, said special program means placing said main processor in said reduced power mode and thereafter being responsive to said switching of said main processor to said first operational mode by said first means for causing said control means to restore to said main processor said state information saved therefrom and to cause said main processor to continue with execution of said application program means in said second operational mode in a manner invisible to said application program means from a point at which said application program means was interrupted.

10. An apparatus comprising: processing means, a pointing device coupled to said processing means and having information stored therein, power supply means controlled by said processing means for selectively supplying and terminating power to said pointing device, and control means responsive to a first predetermined condition for causing said processing means to obtain and save said information from said pointing device, for causing said power supply means to thereafter terminate power to said pointing device, for subsequently causing said power supply means to restore power to said pointing device in response to a second predetermined condition, and for thereafter restoring said saved information to said pointing device.

11. An apparatus comprising: a processor having a normal operational mode in which said processor executes instructions and a further operational mode in which said processor is halted; an operating system program which can be executed by said processor; a disk drive which is operationally coupled to said processor and which can removably receive a disk; and control means separate from said operating system program and responsive to a predetermined condition for saving an indication of whether a disk is present in said disk drive and for thereafter switching said processor from said normal operational mode to said further operational mode.

12. An apparatus according to claim 11, including means responsive to a further condition when said processor is in said further operational mode for switching said processor to said normal operational mode, wherein said normal operational mode of said processor includes first and second operational modes, wherein in said first operational mode said processor has a predetermined set of operational capabilities and in said second operational mode said processor can perform a first subset of said operational capabilities and is inhibited from performing a second subset of said operational capabilities different from said first subset, wherein said apparatus includes application program means executed by said processor in said second operational mode, wherein said control means is responsive to said predetermined condition when said processor is executing said application program means in said second operational mode for interrupting said application program means and saving state information from said processor in a manner invisible to said application program means, for forcing said processor to said first operational mode, and for then causing said processor to begin executing special program means in said first operational mode, said special program means being part of said control means and effecting said saving of said indication and said switching of said processor to said further operational mode, and wherein in response to said switching of said processor from said further operational mode to said normal operational mode said special program means executing in said first operational mode causes said control means to restore to said processor said state information saved therefrom and to cause said processor to continue with execution of said application program means in said second operational mode in a manner invisible to said application program means from a point at which said application program means was interrupted.

13. An apparatus comprising: a processor having means for executing application program means at a selected one of a first clock speed and a second clock speed slower than said first clock speed, said processor consuming less power when operating at said second clock speed than when operating at said first clock speed; said processor including further means responsive to a predetermined condition when said selected one of said clock speeds is said first clock speed and said processor is executing said application program means at said first clock speed for interrupting said application program means in a manner invisible to said application program means, for causing said processor to execute special program means which switches said selected one of said clock speeds from said first clock speed to said second clock speed, and for thereafter causing said processor to continue executing said application program means from a point at which said application program means was interrupted in a manner invisible to said application program means and at said second clock speed.

14. An apparatus according to claim 13, wherein said processor has first and second operational modes, wherein in said first operational mode said processor has a predetermined set of operational capabilities and in said second operational mode said processor can perform a first subset of said operational capabilities and is inhibited from performing a second subset of said operational capabilities different from said first subset, said processor executing said application program means in said second operational mode, wherein said further means includes means for saving state information from said processor and switching said processor from said second operational mode to said first operational mode when effecting said interruption of said application program means, and for restoring said state information to said processor and switching said processor to said second operational mode when effecting said continuing of execution of said application program means.

15. An apparatus comprising: a processor operable in a normal mode and a reduced power mode, a hard disk drive operationally coupled to said processor and having a selectively actuable motor with actuated and deactuated states, means defining a timer for measuring a time interval, and control means responsive to a first predetermined condition when said processor is in said normal mode for causing said motor of said hard disk drive to be in said deactuated state and for thereafter placing said processor in said reduced power mode, and responsive to a second predetermined condition for returning said processor to said normal operational mode, for placing said disk drive motor in said actuated state, for starting said timer, and for resuming normal operation while inhibiting accesses to said hard disk until said timer has expired.

16. An apparatus according to claim 15, wherein said processor is halted when in said reduced power mode, wherein said normal operational mode of said processor includes first and second operational modes, wherein in said first operational mode said processor has a predetermined set of operational capabilities and in said second operational mode said processor can perform a first subset of said operational capabilities and is inhibited from performing a second subset of said operational capabilities different from said first subset, including wherein said apparatus includes application program means executed by said processor in said second operational mode, wherein said control means is responsive to said first predetermined condition when said processor is executing said application program means in said second operational mode for interrupting said application program means and saving state information from said processor in a manner invisible to said application program means, for forcing said processor to said first operational mode, and for then causing said processor to begin executing special program means in said first operational mode, said special program means being part of said control means and effecting said causing of said motor to be in said deactuated state and said placing of said processor in said reduced power mode, and wherein after said control means returns said processor to said normal operational mode in response to said second predetermined condition said special program means executing in said first operational mode effects said placing of said motor in said actuated state and said starting of said timer, said special program means further effecting said resuming of normal operation by causing said control means to restore to said processor said state information saved therefrom and to cause said processor to continue with execution of said application program means in said second operational mode in a manner invisible to said application program means from a point at which said application program means was interrupted.

17. An apparatus according to claim 16, wherein said special program means includes means for effecting said inhibiting of accesses by enabling an interrupt condition to occur in response to either of expiration of said timer and an attempted access to said hard disk, wherein said control means includes means for responding to an occurrence of said interrupt condition when said processor is executing said application program means in said second operational mode for interrupting said application program means and saving state information from said processor in a manner invisible to said application program means, for forcing said processor to said first operational mode, and for then causing said processor to begin executing interrupt program means in said first operational mode, said interrupt program means waiting for expiration of said timer if said timer is not expired, disabling said interrupt condition when said timer has expired, and then causing said control means to restore to said processor said state information saved in response to the occurrence of said interrupt condition and to cause said processor to continue with execution of said application program means in said second operational mode in a manner invisible to said application program means from a point at which said application program means was interrupted by said interrupt condition.

18. An apparatus comprising:
a processor operable in normal and reduced power modes, a disk drive which is operationally coupled to said processor, and control means responsive to a predetermined condition when said process said normal mode for checking said disk drive and for thereafter switching said processor from said normal mode to said reduced power mode when said disk drive is inactive and for maintaining said processor in a normal mode when said disk drive is active,
wherein said central means includes means responsive to said checking of said disk drive for displaying an operator perceptible warning when said disk drive is active and wherein said processor is halted when in said reduced power mode, wherein said normal operational mode of said processor includes first and second operational modes, wherein in said first operational mode said processor has a predetermined set of operational capabilities and in said second operational mode s aid processor can perform a first subset of said operational capabilities and is inhibited from performing a second subset of said operational capabilities different from said first subset, wherein said apparatus includes application program means executed by said processor in said second operational mode, and wherein said control means is responsive to said predetermined condition when said processor is executing said application program means in said second operational mode for interrupting said application program means and saving state information from said processor in a manner invisible to said application program means, for forcing said processor to said first operational mode, and for then causing said processor to being executing special program means in said first operational mode, said special program means being part of said control means and effecting said checking of said disk drive and said switching of said processor from said normal mode to said reduced power mode when said disk drive is inactive and effecting said displaying of said operator perceptible warning when said disk drive is active, said special program means further effecting said maintaining of said processor in said normal mode when said disk drive is active by causing said control means to restore to said processor said state information saved therefrom and to cause said processor to continue with execution of said application program means in said second operational mode in a manner invisible to said application program means from a point at which said application program means was interrupted.

\* \* \* \* \*